US009157735B2

(12) United States Patent
Haisty et al.

(10) Patent No.: US 9,157,735 B2
(45) Date of Patent: *Oct. 13, 2015

(54) HOLE MEASUREMENT APPARATUSES

(71) Applicant: Delta Sigma Company, Kennesaw, GA (US)

(72) Inventors: Brett Stanton Haisty, Powder Springs, GA (US); Roger Curtis Richardson, Acworth, GA (US); Bobby Dean McAllister, Acworth, GA (US)

(73) Assignee: DELTA SIGMA COMPANY, Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,624

(22) Filed: Dec. 9, 2013

(65) Prior Publication Data

US 2014/0095107 A1 Apr. 3, 2014

Related U.S. Application Data

(63) Continuation of application No. 12/942,020, filed on Nov. 9, 2010, now Pat. No. 8,606,540.

(60) Provisional application No. 61/281,108, filed on Nov. 10, 2009.

(51) Int. Cl.
*G01B 5/02* (2006.01)
*G01B 21/10* (2006.01)
*G01B 5/12* (2006.01)
*G01B 5/18* (2006.01)
*G01B 21/18* (2006.01)

(52) U.S. Cl.
CPC ........ *G01B 21/10* (2013.01); *G01B 5/12* (2013.01); *G01B 5/18* (2013.01); *G01B 21/18* (2013.01); *Y10T 29/53* (2015.01)

(58) Field of Classification Search
CPC .......... G01B 5/12; G01B 21/18; G01B 21/10; G01B 5/18; G01B 5/02; G01B 5/06
USPC ................................ 702/166, 157, 155, 158
See application file for complete search history.

(56) References Cited

U.S. PATENT DOCUMENTS

| 4,455,753 | A | 6/1984 | Keyes | |
|---|---|---|---|---|
| 8,537,374 | B2 * | 9/2013 | Briggs et al. | 356/614 |
| 8,606,540 | B2 * | 12/2013 | Haisty et al. | 702/157 |
| 2003/0063291 | A1 * | 4/2003 | Bloch et al. | 356/601 |
| 2005/0288816 | A1 | 12/2005 | Kawasaki et al. | |
| 2008/0148585 | A1 * | 6/2008 | Raab et al. | 33/503 |
| 2011/0054354 | A1 * | 3/2011 | Hunter et al. | 600/587 |
| 2011/0166824 | A1 | 7/2011 | Haisty et al. | |
| 2011/0192043 | A1 * | 8/2011 | Ferrari | 33/503 |

* cited by examiner

*Primary Examiner* — Mischita Henson
(74) *Attorney, Agent, or Firm* — Thomas | Horstemeyer, LLP

(57) ABSTRACT

The present invention is directed to automated apparatuses and methods for measuring fastener hole depth, fastener length, countersink depth and/or hole diameters in a workpiece (or other object) in an automated and extremely rapid, efficient and accurate manner. The apparatuses may be operably connected with a power source and with one or a plurality of computers or other data collection devices to transmit fastener hole depth, countersink depth and/or hole diameter measurement data and/or information to them each time that a fastener hole is measured, while the apparatus is continuously measuring fastener holes (i.e., with no interruptions).

20 Claims, 88 Drawing Sheets

ZEW 89 Qty: 34

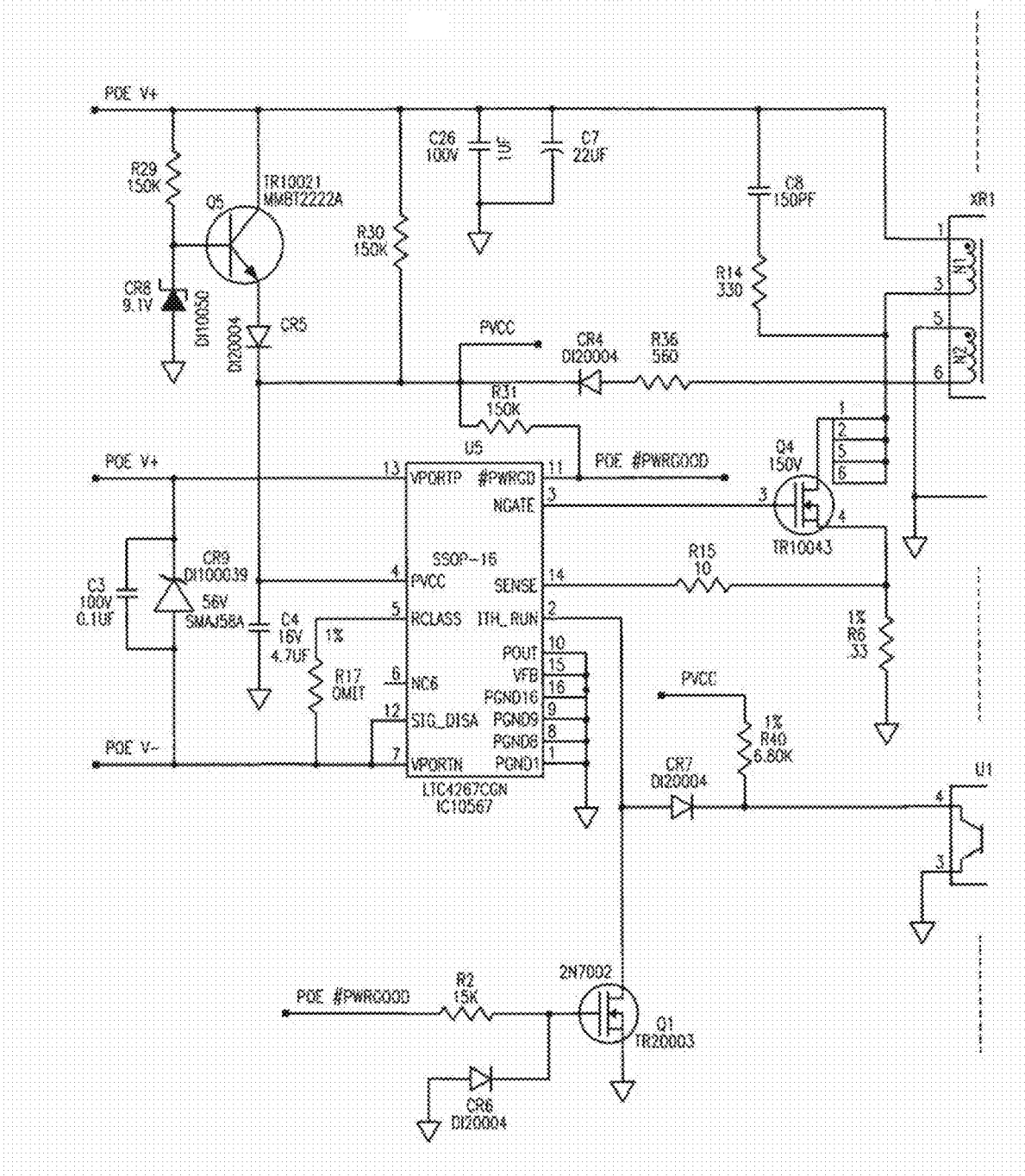

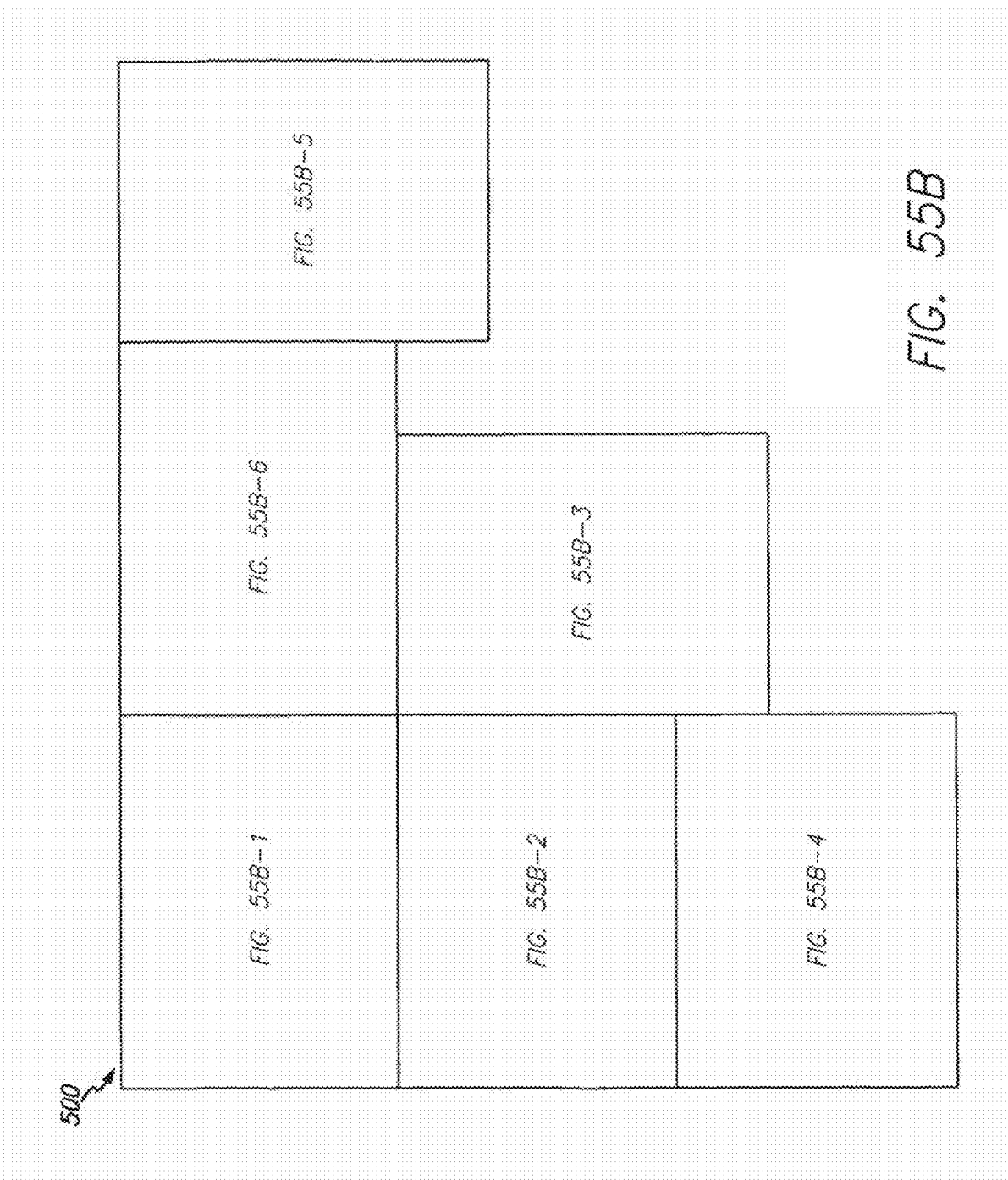

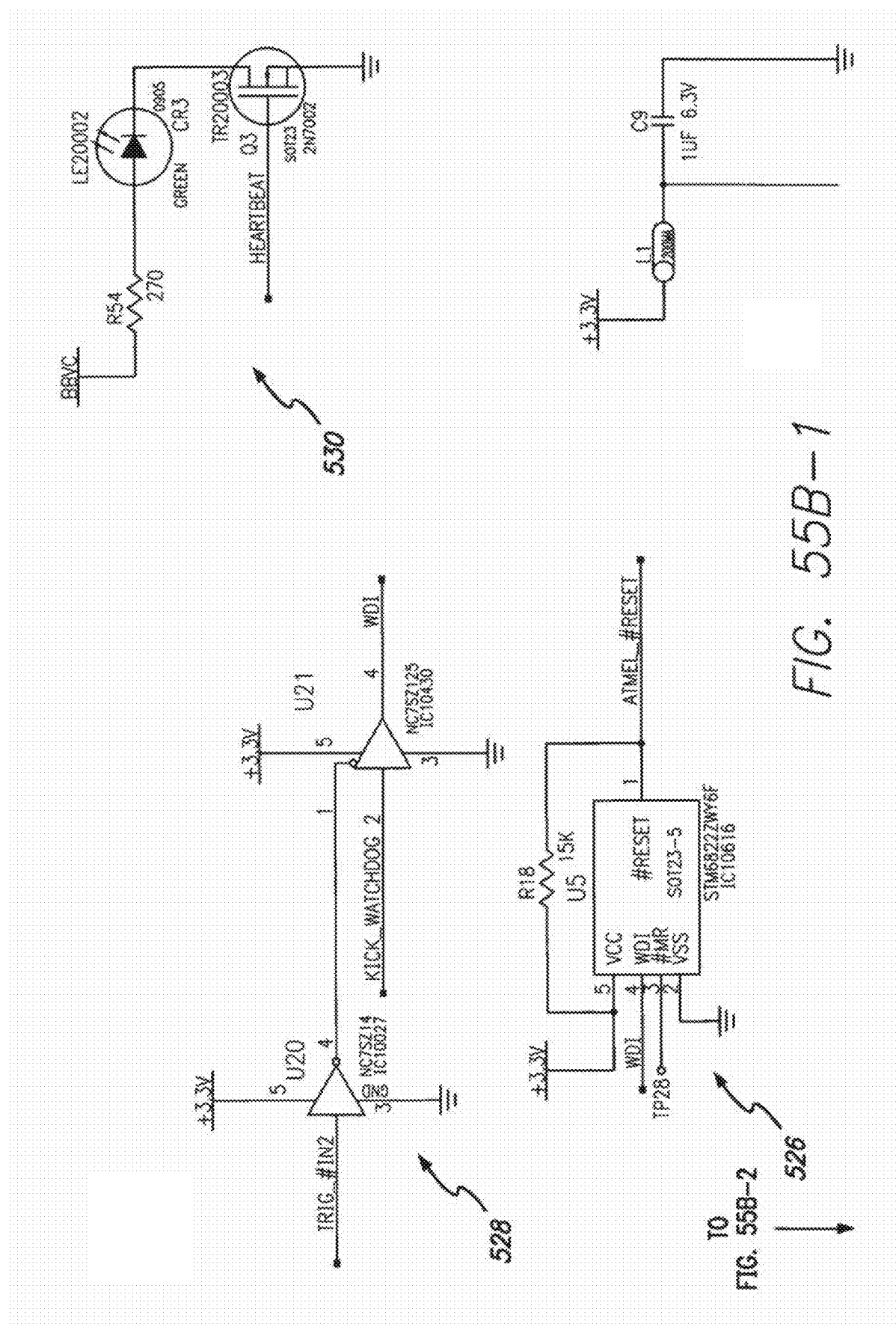

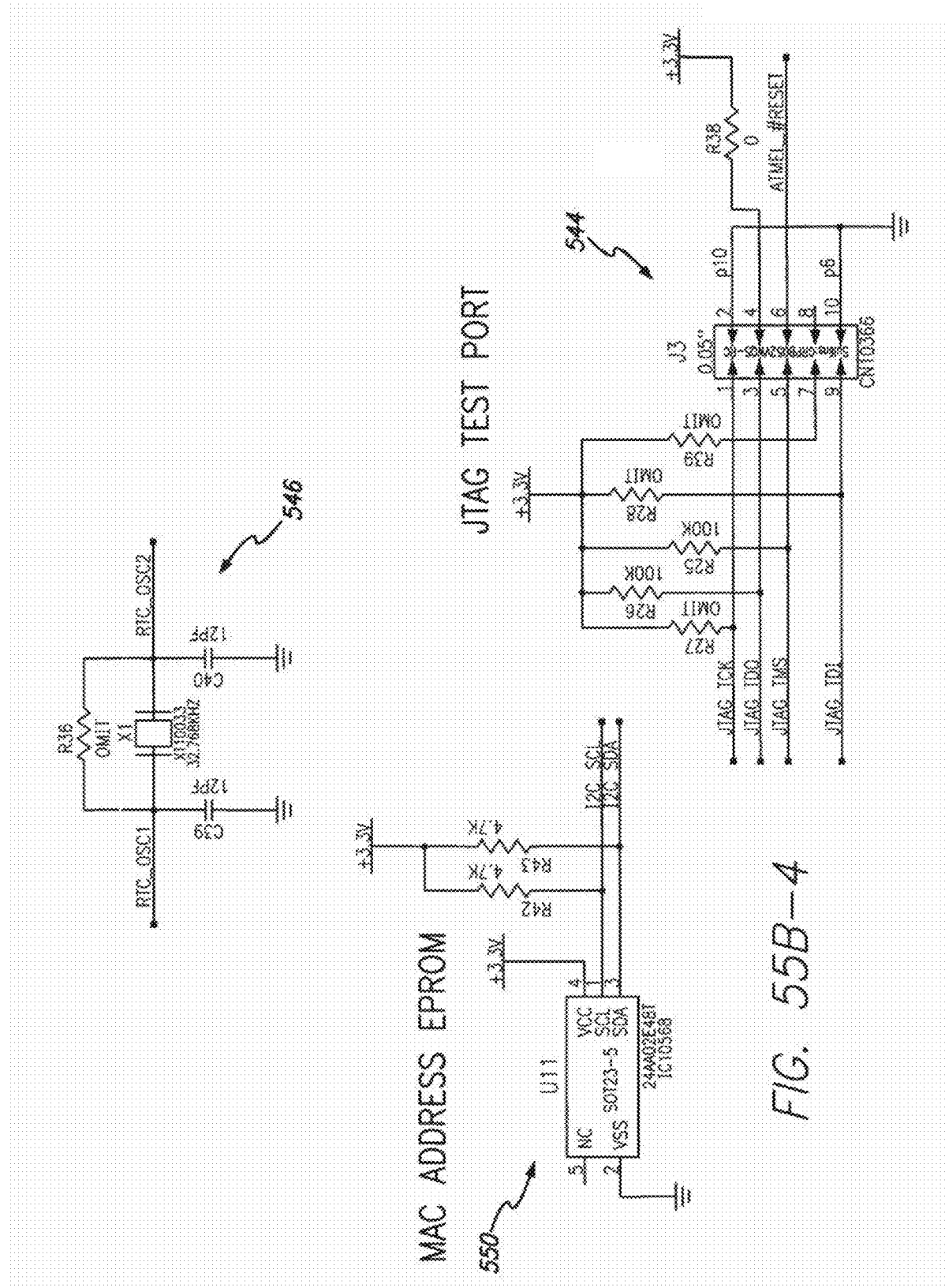

HOLE MEASUREMENT APPARATUSES

CROSS-REFERENCE TO RELATED APPLICATIONS

This patent application is a continuation of copending U.S. utility application entitled, "Hole Measurement Apparatuses," having Ser. No. 12/942,020, filed Nov. 9, 2010, which claims the benefit of prior Provisional patent application U.S. Ser. No. 61/281,108, filed on Nov. 10, 2009, which are hereby incorporated into this patent application in their entireties by reference (including all computer files and computer code).

COPYRIGHT NOTIFICATION

Portions of this patent disclosure contain materials that are subject to copyright protection. The copyright owner has no objection to the facsimile reproduction by anyone of the patent document or the patent disclosure as it appears in the Patent and Trademark Office (PTO) patent file or records, but otherwise reserves all copyright rights.

COMPUTER PROGRAM LISTING APPENDIX

A computer program listing appendix is included as an appendix to this disclosure. The computer program listing was submitted electronically via the PTO EFS-Web system as ASCII text files. For economy purposes, each computer program listing contains one or more computer source code text files that have been appended to create the computer program listing. Each computer program listing also has a filename that reflects the subject matter and/or content of the computer source code text files contained within that computer program listing. For example, the computer program listing "AuthoringAssembly_Software_Tool_Files.txt" contains one or more computer source code text files pertaining to the authoring assembly software tool. The computer program listings in the computer program listing appendix are subject to copyright protection and any use or reproduction thereof other than as part of the facsimile reproduction of this patent disclosure is prohibited.

The computer program listings in the computer program listing appendix are identified below along with the computer source code text files contained within each computer program listing. Corresponding computer source code files (.cs file) are also listed next to the computer source code text files. A few of the computer source code text files below have file names that appear on two lines rather than on one line. Where this occurs, there will not be a file size or creation date on the second line. Each computer program listings and the computer source code text files therein may be opened by Word, Notepad. Wordpad, or any other word processing program that supports the .txt format. For purposes of viewing the information in the files, the .txt extension should be used. Any individual computer source code text file may be extracted by copying the portion of the computer program listing for that computer source code text file and pasting that portion into a new text file. The new text file may be converted to a source code file (.cs file) by changing its file name from XXX.txt to XXX.cs. This may be performed in Windows Explorer by right clicking on the file and selecting rename, then typing the new name of the file in the highlighted area. These .cs files may be used by Microsoft Visual Studio or similar software development tool that supports C#, and can be compiled. The creation dates of the C#files are also listed hereinbelow. All of the computer source code text files were originally created on Nov. 6, 2009, except for "main.c," which was created on Sep. 13, 2010. All of the computer program listings were originally created on Nov. 8, 2010.

| Authoring Assembly Software Tool Files (Filename: "Authoring_Assembly_Software_Tool_Files.txt," Size: 941,214 bytes) | | | |
| --- | --- | --- | --- |
| Size (Bytes) | File Name (C#) | File Name (.TXT) | Creation Date (C#) |
| 2,728 | AddDrawingSurface.cs | AddDrawingSurface.txt | Oct. 28, 2008 |
| 11,022 | AddDrawingSurface.Designer.cs | AddDrawingSurface.Designer.txt | Oct. 28, 2008 |
| 744 | AddPart.cs | AddPart.txt | Aug. 7, 2008 |
| 29,034 | AddPart.Designer.cs | AddPart.Designer.txt | Oct. 28, 2008 |
| 990 | CalFrame.cs | CalFrame.txt | Dec. 6, 2008 |
| 595 | CalibrationFrame.cs | CalibrationFrame.txt | Dec. 20, 2008 |
| 4,274 | CalPoint.cs | CalPoint.txt | Sep. 2, 2009 |
| 5,854 | Circle.cs | Circle.txt | Sep. 2, 2009 |
| 140 | Class1.cs | Class1.txt | Feb. 12, 2008 |
| 661 | ColumnDefinition.cs | ColumnDefinition.txt | Nov. 7, 2008 |
| 5,272 | Complex.cs | Complex.txt | Aug. 15, 2008 |
| 33,606 | Data Import Form.cs | Data Import Form.txt | Sep. 2, 2009 |
| 99,998 | Data Import Form.Designers.cs | Data Import Form.Designer.txt | Sep. 2, 2009 |
| 528 | DataHeader.cs | DataHeader.txt | Nov. 7, 2008 |
| 4,288 | Diamond.cs | Diamond.txt | Sep. 2, 2009 |
| 1,715 | DocumentDisplay.cs | DocumentDisplay.txt | Aug. 28, 2009 |
| 343 | Doublet.cs | Doublet.txt | Dec. 15, 2008 |
| 24,519 | Drawing.cs | Drawing.txt | Aug. 20, 2009 |
| 1,154 | DrawingSurface.cs | DrawingSurface.txt | Nov. 25, 2008 |
| 2,670 | DrawingSurface.Designer.cs | DrawingSurface.Designer.txt | Aug. 18, 2008 |
| 6,462 | Feature.cs | Feature.txt | Sep. 2, 2009 |
| 148,340 | Form1.cs | Form1.txt | Sep. 14, 2009 |
| 164,576 | Form1.Designer.cs | Form1.Designer.txt | Aug. 28, 2009 |
| 343 | Form2.cs | Form2.txt | Aug. 21, 2008 |
| 2,527 | Form2.Designer.cs | Form2.Designer.txt | Nov. 5, 2009 |
| 951 | FOVForm.cs | FOVForm.txt | Nov. 5, 2009 |
| 4,389 | FOVForm.Designer.cs | FOVForm.Designer.txt | Feb. 3, 2009 |
| 1,375 | FrameMatrixForm.cs | FrameMatrixForm.txt | Aug. 25, 2008 |
| 3,728 | FrameMatrixForm.Designer.cs | FrameMatrixForm.Designer.txt | Nov. 5, 2009 |
| 6,377 | Gage.cs | Gage.txt | Apr. 23, 2009 |
| 1,831 | GeometryDisplay.cs | GeometryDisplay.txt | Aug. 28, 2009 |

Authoring Assembly Software Tool Files
(Filename: "Authoring_Assembly_Software_Tool_Files.txt," Size: 941,214 bytes)

| Size (Bytes) | File Name (C#) | File Name (.TXT) | Creation Date (C#) |
| --- | --- | --- | --- |
| 691 | GetInputForm.cs | GetInputForm.txt | Nov. 16, 2008 |
| 4,619 | GetInputForm.Designer.cs | GetInputForm.Designer.txt | Nov. 5, 2009 |
| 681 | GetLabelForm.cs | GetLabelForm.txt | Nov. 16, 2008 |
| 3,199 | GetLabelForm.Designer.cs | GetLabelForm.Designer.txt | Nov. 16, 2008 |
| 921 | GetProcessGroupName.cs | GetProcessGroupName.txt | Jul. 8, 2009 |
| 4,076 | GetProcessGroupName.Designer.cs | GetProcessGroupName.Designer.txt | Jul. 8, 2009 |
| 6,182 | GLMatrix.cs | GLMatrix.txt | Nov. 14, 2008 |
| 1,433 | GLPoint.cs | GLPoint.txt | Nov. 5, 2009 |
| 4,094 | HMatrix2D.cs | HMatrix2D.txt | Dec. 15, 2008 |
| 10,445 | HMatrix2DMap.cs | HMatrix2DMap.txt | Nov. 5, 2009 |
| 12,134 | HMatrix3D.cs | HMatrix3D.txt | Aug. 24, 2009 |
| 974 | HVector2D.cs | HVector2D.txt | Dec. 15, 2008 |
| 1,448 | HVector3D.cs | HVector3D.txt | Aug. 18, 2009 |
| 542 | IDScreen.cs | IDScreen.txt | Nov. 17, 2008 |
| 2,514 | IDScreen.Designer.cs | IDScreen.Designer.txt | Nov. 17, 2008 |
| 2,486 | ImageBrowser.cs | ImageBrowser.txt | Sep. 14, 2009 |
| 5,200 | ImageBrowser.Designer.cs | ImageBrowser.Designer.txt | Sep. 2, 2009 |
| 2,059 | ImageChooser.cs | ImageChooser.txt | Sep. 14, 2009 |
| 4,646 | ImageChooser.Designer.cs | ImageChooser.Designer.txt | Jan. 10, 2009 |
| 6,264 | ImageDef.cs | ImageDef.txt | Nov. 5, 2009 |
| 457 | ImageII.cs | ImageII.txt | Dec. 7, 2008 |
| 893 | ImageViewer.cs | ImageViewer.txt | Dec. 7, 2008 |
| 5,050 | ImageViewer.Designer.cs | ImageViewer.Designer.txt | Dec. 7, 2008 |
| 1,636 | InfoFrame.cs | InfoFrame.txt | Dec. 4, 2008 |
| 2,036 | InstallFrame.cs | InstallFrame.txt | Jan. 28, 2009 |
| 14,682 | KLT.cs | KLT.txt | Apr. 24, 2009 |
| 3,857 | Line.cs | Line.txt | Sep. 2, 2009 |
| 2,722 | Matrix.cs | Matrix.txt | Nov. 5, 2009 |
| 2,221 | MeasureFrame.cs | MeasureFrame.txt | Jan. 28, 2009 |
| 6,393 | Part.cs | Part.txt | Sep. 14, 2009 |
| 297 | Pipeline.cs | Pipeline.txt | Dec. 22, 2008 |
| 10,986 | Plane.cs | Plane.txt | Aug. 28, 2009 |
| 3,867 | Point.cs | Point.txt | Sep. 2, 2009 |
| 647 | PointNormal.cs | PointNormal.txt | Feb. 10, 2009 |
| 1,835 | PointPair.cs | PointPair.txt | Nov. 10, 2008 |
| 3,129 | PointSet.cs | PointSet.txt | Nov. 10, 2008 |
| 4,762 | Polygon.cs | Polygon.txt | Aug. 28, 2009 |
| 4,582 | Polyhedron.cs | Polyhedron.txt | Sep. 2, 2009 |
| 1,385 | Process.cs | Process.txt | Aug. 28, 2009 |
| 3,890 | ProcessFrame.cs | ProcessFrame.txt | Sep. 1, 2009 |
| 485 | Program.cs | Program.txt | Feb. 12, 2008 |
| 9,097 | Project.cs | Project.txt | Sep. 2, 2009 |
| 4,546 | Rectangle.cs | Rectangle.txt | Nov. 5, 2009 |
| 424 | RefreshingListBox.cs | RefreshingListBox.txt | Sep. 1, 2009 |
| 611 | Results.cs | Results.txt | Feb. 3, 2009 |
| 2,828 | Results.Designer.cs | Results.Designer.txt | Feb. 3, 2009 |
| 9,777 | RTFEdit.cs | RTFEdit.txt | Jan. 8, 2009 |
| 17,936 | RTFEdit.Designer.cs | RTFEdit.Designer.txt | Jan. 8, 2009 |
| 3,799 | SegmentedLine.cs | SegmentedLine.txt | Mar. 6, 2009 |
| 1,762 | Sim.cs | Sim.txt | Dec. 18, 2008 |
| 18,845 | Solutions.cs | Solutions.txt | Dec. 22, 2008 |
| 574 | Splash Screen.cs | Splash Screen.txt | May 4, 2009 |
| 3,819 | Splash Screen.Designer.cs | Splash Screen.Designer.txt | May 4, 2009 |
| 2,886 | Spline.cs | Spline.txt | Nov. 5, 1999 |
| 14,009 | Test Projector Screen.cs | Test Projector Screen.txt | Aug. 28, 2009 |
| 13,326 | Test Projector Screen.Designer.cs | Test Projector Screen.Designer.txt | Feb. 3, 2009 |
| 4,557 | Text.cs | Text.txt | Aug. 28, 2009 |
| 3,948 | Texture.cs | Texture.txt | Sep. 14, 2009 |
| 149 | TextureListItem.cs | TextureListItem.txt | Jan. 10, 2009 |
| 347 | Toolbox.cs | Toolbox.txt | Jan. 13, 2009 |
| 1,179 | Toolbox.Designer.cs | Toolbox.Designer.txt | Jan. 13, 2009 |
| 183 | TreeNode2.cs | TreeNode2.txt | Feb. 12, 2008 |
| 7,837 | TreeNode3.cs | TreeNode3.txt | Aug. 28, 2009 |
| 1,648 | TreeNode4.cs | TreeNode4.txt | Aug. 28, 2009 |
| 4,223 | Triangle.cs | Triangle.txt | Sep. 2, 2009 |
| 602 | Triplet.cs | Triplet.txt | Dec. 15, 2008 |
| 2,209 | Tweaker.cs | Tweaker.txt | Aug. 17, 2008 |
| 16,819 | Tweaker.Designer.cs | Tweaker.Designer.txt | Aug. 17, 2008 |
| 1,000 | TweakFrame.cs | TweakFrame.txt | Dec. 2, 2008 |
| 17,926 | Type1Solution.cs | Type1Solution.txt | Dec. 15, 2008 |
| 165 | TypeList.cs | TypeList.txt | Aug. 28, 2009 |
| 397 | UIInput.cs | UIInput.txt | Dec. 4, 2008 |

-continued

Authoring Assembly Software Tool Files
(Filename: "Authoring_Assembly_Software_Tool_Files.txt," Size: 941,214 bytes)

| Size (Bytes) | File Name (C#) | File Name (.TXT) | Creation Date (C#) |
|---|---|---|---|
| 403 | UILabel.cs | UILabel.txt | Dec. 4, 2008 |
| 900 | UniqueIDClass.cs | UniqueIDClass.txt | Nov. 16, 2008 |
| 1,437 | UserInterfaceDisplay.cs | UserInterfaceDisplay.txt | Aug. 28, 2009 |
| 9,732 | Vector.cs | Vector.txt | Oct. 22, 2008 |
| 1,713 | VideoDisplay.cs | VideoDisplay.txt | Aug. 28, 2009 |
| 3,103 | View.cs | View.txt | Oct. 5, 2008 |
| 3,234 | ViewInfo.cs | ViewInfo.txt | Aug. 17, 2008 |
| 627 | ViewportInfo.cs | ViewportInfo.txt | Dec. 16, 2008 |
| 4,733 | ViewportInfo.Designer.cs | ViewportInfo.Designer.txt | Dec. 16, 2008 |
| 2,344 | VirtualGage.cs | VirtualGage.txt | Dec. 7, 2008 |
| 6,879 | VirtualGage.Designer.cs | VirtualGage.Designer.txt | Dec. 7, 2008 |
| 24,226 | VoxelSpace.cs | VoxelSpace.txt | Sep. 14, 2009 |
| 0 | ZPR.cs | ZPR.txt | Feb. 12, 2008 |
| 116 File(s) | 941,213 bytes | | |

Configurator Assembly Software Tool Files
(Filename: "Configurator_Assembly_Software_Tool_Files.txt;" Size: 116,085 bytes)

| Size (Bytes) | File Name (C#) | File Name (.TXT) | Creation Date (C#) |
|---|---|---|---|
| 1,174 | DSCSerialGage.cs | DSCSerialGage.txt | Apr. 20, 2009 |
| 2,619 | DSCUSBGage.cs | DSCUSBGage.txt | Apr. 21, 2009 |
| 39,507 | Form1.cs | Form1.txt | Aug. 28, 2009 |
| 42,148 | Form1.Designer.cs | Form1.Designer.txt | Aug. 18, 2009 |
| 850 | GageDefinition.cs | GageDefinition.txt | Apr. 21, 2009 |
| 707 | GageSelectionForm.cs | GageSelectionForm.txt | Apr. 20, 2009 |
| 3,899 | GageSelectionForm.Designer.cs | GageSelectionForm.Designer.txt | Apr. 20, 2009 |
| 878 | getFilename.cs | getFilename.txt | Jul. 8, 2009 |
| 4,130 | getFilename.Designer.cs | getFilename.Designer.txt | Jul. 8, 2009 |
| 365 | HelpForm.cs | HelpForm.txt | Jul. 3, 2009 |
| 2,106 | HelpForm.Design.cs | HelpForm.Design.txt | Jul. 3, 2009 |
| 2,578 | ProcessSelector.cs | ProcessSelector.txt | Aug. 17, 2009 |
| 8,056 | ProcessSelector.Desiner.cs | ProcessSelector.Desiner.txt | Aug. 17, 2009 |
| 275 | ProcessStep.cs | ProcessStep.txt | Aug. 28, 2009 |
| 496 | Program.cs | Program.txt | Nov. 13, 2008 |
| 1,091 | SelectProcessGroup.cs | SelectProcessGroup.txt | Aug. 17, 2009 |
| 5,205 | SelectProcessGroup.Designer.cs | SelectProcessGroup.Designer.txt | Aug. 17, 2009 |
| 17 File(s) | 116,084 bytes | | |

Operator Assembly Software Tool Files
(Filename: "Operator_Assembly_Software_Tool_Files.txt," Size: 229,517 bytes)

| Size (Bytes) | File Name (C#) | File Name (.TXT) | Creation Date (C#) |
|---|---|---|---|
| 20,149 | CalibrateControl.cs | CalibrateControl.txt | Sep. 14, 2009 |
| 4,022 | CalibrateControl.Designer.cs | CalibrateControl.Designer.txt | Nov. 20, 2008 |
| 183 | CalibrationRuntimeProcess.cs | CalibrationRuntimeProcess.txt | Nov. 20, 2008 |
| 447 | CountingString.cs | CountingString.txt | Sep. 01, 2009 |
| 314 | DisplayOutput.cs | DisplayOutput.txt | Dec. 02, 2008 |
| 145 | Gage.cs | Gage.txt | Dec. 24, 2008 |
| 6,335 | InfoControl.cs | InfoControl.txt | Jan. 09, 2009 |
| 16,941 | InfoControl.Designer.cs | InfoControl.Designer.txt | Jan. 09, 2009 |
| 176 | InfoRuntimeProcess.cs | InfoRuntimeProcess.txt | Nov. 20, 2008 |
| 7,352 | InstallControl.cs | InstallControl.txt | Sep. 02, 2009 |
| 3,668 | InstallControl.Designer.cs | InstallControl.Designer.txt | Sep. 02, 2009 |
| 179 | InstallRuntimeProcess.cs | InstallRuntimeProcess.txt | Nov. 20, 2008 |
| 8,654 | MeasureControl.cs | MeasureControl.txt | Sep. 02, 2009 |
| 4,053 | MeasureControl.Designer.cs | MeasureControl.Designer.txt | Dec. 08, 2008 |
| 179 | MeasureRuntimeProcess.cs | MeasureRuntimeProcess.txt | Nov. 20, 2008 |
| 589 | oglControl.cs | oglControl.txt | Sep. 14, 2009 |
| 30,850 | Operator Main Form.cs | Operator Main Form.txt | Sep. 08, 2009 |
| 11,524 | Operator Main Form.Designer.cs | Operator Main Form.Designer.txt | Jun. 23, 2009 |
| 9,527 | ProcessControl.cs | ProcessControl.txt | Sep. 02, 2009 |
| 13,520 | ProcessControl.Designer.cs | ProcessControl.Designer.txt | Sep. 01, 2009 |
| 492 | Program.cs | Program.txt | Nov. 13, 2008 |

-continued

| | Operator Assembly Software Tool Files (Filename: "Operator_Assembly_Software_Tool_Files.txt," Size: 229,517 bytes) | | |
|---|---|---|---|
| Size (Bytes) | File Name (C#) | File Name (.TXT) | Creation Date (C#) |
| 23,154 | Projector Screen.cs | Projector Screen.txt | Sep. 14, 2009 |
| 4,720 | Projector Screen.designer.cs | Projector Screen.designer.txt | Sep. 14, 2009 |
| 818 | RequestCalibrationForm.cs | RequestCalibrationForm.txt | Jul. 07, 2009 |
| 2,943 | RequestCalibrationForm.Designer.cs | RequestCalibrationForm.Designer.txt | Jul. 07, 2009 |
| 155 | RuntimeProcess.cs | RuntimeProcess.txt | Nov. 20, 2008 |
| 860 | SelectProcess.cs | SelectProcess.txt | Jul. 09, 2009 |
| 4,949 | SelectProcess.Designer.cs | SelectProcess.Designer.txt | Jul. 09, 2009 |
| 1,745 | TweakControl.cs | TweakControl.txt | Dec. 03, 2008 |
| 8,387 | TweakControl.Designer.cs | TweakControl.Designer.txt | Dec. 02, 2008 |
| 177 | TweakRuntimeProcess.cs | TweakRuntimeProcess.txt | Nov. 20, 2008 |
| 28,428 | USB4.cs | USB4.txt | Jul. 08, 2009 |
| 5,019 | USBGage.cs | USBGage.txt | Jul. 08, 2009 |
| 468 | VideoWindow.cs | VideoWindow.txt | Sep. 01, 2009 |
| 2,724 | VideoWindow.Designer.cs | VideoWindow.Designer.txt | Sep. 01, 2009 |
| 346 | WMP.cs | WMP.txt | Nov. 18, 2008 |
| 2,522 | WMP.Designer.cs | WMP.Designer.txt | Nov. 18, 2008 |
| 533 | WorkInstructionsWindow.cs | WorkInstructionsWindow.txt | Sep. 01, 2009 |
| 2,269 | WorkInstructionsWindow.Designer.cs | WorkInstructionsWindow.Designer.txt | Sep. 01, 2009 |
| 39 File(s) | 229,516 bytes | | |

| | STLModel - STLModel Software Tool File (Filename: "STLModel_Software_Tool_File.txt," Size: 137 bytes) | | |
|---|---|---|---|
| Size (Bytes) | File Name (C#) | File Name (.TXT) | Creation Date (C#) |
| 137 | Class1.cs | See above | Aug. 01, 2008 |
| 1 File(s) | 137 bytes | | |

| | STLModel - STLTools Software Tool File (Filename: "STLTools_Software_Tool_File.txt," Size: 9,886 bytes) | | |
|---|---|---|---|
| Size (Bytes) | File Name (C#) | File Name (.TXT) | Creation Date (C#) |
| 1,114 | Facet.cs | Facet.txt | Sep. 14, 2009 |
| 8,771 | Model.cs | Model.txt | Aug. 18, 2009 |
| 2 File(s) | 9,885 bytes | | |

| | ATMEGA128RFA1 Microcontroller File (Filename: "ATMEGA128RFA1_Microcontroller.txt," Size: 24,181 bytes) | | |
|---|---|---|---|
| Size (Bytes) | File Name (C#) | File Name (.TXT) | Creation Date (C#) |
| 24,181 | Main.c | See above | Sep. 13, 1920 |
| 1 File(s) | 24,181 bytes | | |

BACKGROUND OF THE INVENTION

1. Field of the Invention

The present invention is directed to automated apparatuses and methods for measuring, in connection with one or a plurality of pre-drilled or other fastener (or other) holes that are present in a workpiece, fastener hole depth, fastener length, countersink depth, workpiece thickness and/or hole diameters in an automated and very rapid, efficient and accurate manner. Because fastener hole depths and object thickness each correspond with fastener lengths, such apparatuses and methods enable a user to easily and rapidly identify and select a fastener having a correct length for a particular hole. The apparatuses may be operably connected with one or a plurality of computers (or other data collection devices) to provide them with hole depth, countersink depth, hole diameter measurement data and/or data and/or information each time that a hole is measured. Such data and/or information may be recorded, stored, organized, manipulated and/or otherwise used by the computers (or other devices) in any manner desired or required by an operator.

The invention is also directed to a method for measuring pre-drilled and other fastener hole depths, countersink depths and/or hole diameters, and to identifying and selecting corresponding fasteners having correct lengths for such holes.

The measurement apparatuses and methods of the present invention may be employed, for example, in conjunction, or connection, with computerized optical systems for the projection of three-dimensional text, images and/or symbols in a substantially or fully undistorted manner onto one or a plurality of surfaces of a variety of different three-dimensional objects, or parts thereof, regardless of their shape of size.

The invention is also directed to measurement apparatuses of the invention that are used in combination with computerized optical manufacturing guidance systems. Such systems can provide ordered step-by-step manufacturing instructions which instruct manufacturing personnel, assembly technicians and other system users how to manufacture, measure and/or assemble any three-dimensional objects or systems, which may be extremely complex, such as an aircraft, or a part thereof (a wing, a vertical stabilizer, or the like) in a very efficient, rapid and accurate manner, particularly in comparison with a manual manufacture or assembly of the same three-dimensional objects (or parts), which uses blueprints, plans, instruction manuals, other paper-based products and/or computer screens for teaching an assembly of the objects, and with laser-based assembly systems. The manufacturing or assembly instructions (or other optical projections) are in the form of calibrated three-dimensional text, symbols and/or images, and are projected by one or a plurality of optical projector that are operably connected with one or a plurality of computers onto the three-dimensional objects or systems, or components thereof. Uniquely, and very advantageously, the three-dimensional text, images and/or symbols, such as manufacturing instructions, have an ability to "wrap around" the three-dimensional objects or systems (or parts), and to appear thereon in a manner that is not distorted by the three-dimensional nature of the text, images and/or symbols, or of the objects or parts being manufactured, and/or by other potential distortions, such as curves or contours. The invention also provides methods for projecting three-dimensional text, images and/or symbols in a substantially or fully undistorted manner onto one or a plurality of surfaces of a variety of different three-dimensional objects, and methods for providing an ordered step-by-step assembly of three-dimensional objects, or parts thereof, which may be relatively or extremely complex, and which may be used, for example, on an assembly line, or in another manufacturing environment (or in some other environment).

Background

In an assembly, manufacture or other production process of a complex three-dimensional object, such as a workpiece, for example, on an assembly line or in a production facility, assembly workers, manufacturing technicians or others must typically assembly the object using a series of ordered step-by-step assembly or manufacturing guidance work instructions that teach, instruct or guide them as to how the object should be assembled, manufactured or produced. Such instructions may be provided to them via a set of blue prints including both illustrations and text (often thousands of pages in length), laser projection technology, optically assembly projection technology and/or the like. For example, a set of assembly instructions may direct that the following steps be performed by an assembly operator in the particular order listed: (i) remove a panel from an object; (ii) remove a clamp from the object; (iii) measure a depth, diameter and/or countersink depth of each of a series of pre-drilled fastener holes (potentially hundreds or thousands of them); (iv) insert a series of different sized and types of fasteners into the pre-drilled fastener holes in a manner that the characteristics of the particular fasteners selected (length, diameter and/or the like) accurately correspond with the particular measurements made of the corresponding holes into which they are to be installed; (v) remove a bolt from the object (before sliding an engine in); (vi) sliding an engine in: (vii) putting the clamp back onto the object; and (viii) put the panel back on the object.

Structural fasteners that may be used in an assembly, manufacture or production of three-dimensional workpieces, objects, and parts thereof, come in greatly varying lengths and widths to accommodate any thickness of the three-dimensional workpieces, objects, and parts thereof, and/or fastener hole lengths, diameters and counterskings present therein, such as complex and other structures, for example, the skins of aircrafts, submarines, automobiles, military vehicles, missiles and the like, which must generally be very securely attached to some type of a substructure of the workpiece, object or part. The thickness of a workpiece, structure, substructure, part or skin, and/or the diameters and countersink depths of fastener holes present therein, may vary widely. It is, thus, generally very important to measure the length, diameter and countersink depth of each of potentially hundreds, thousands or even tens of thousands of pre-drilled or other fastener holes that may be drilled or otherwise present therein, and into which some type of a fastener is to be passed or extended and installed, and to identify and record each particular fastener hole being measured, which permits corresponding fasteners having the correct length, diameter and countersink depth to be identified, selected, employed and installed therein. Such a process is often critical because the structural integrity of an object, or part, that is being assembled, produced or otherwise manufactured, such as a commercial or military airplane, boat or submarine, may be compromised (i.e., weakened or destroyed) if fasteners having an incorrect length, width and/or countersink depth are employed to attach various parts thereof together which, in turn, could very disadvantageously lead to a massive loss of human lives and/or substantial amounts of money resulting from objects that function in a sub-standard manner or that must have fasteners haring an incorrect length, width and/or countersink depth removed and replaced with correct fasteners (i.e. those having a correct length, width and countersink depth), which is extremely labor intensive and lime consuming. The latter may, additionally and very disadvantageously, result in damage to the workpiece or other object, potentially resulting in a large financial loss. Fastener length may also be critical in minimizing weight on certain types of assemblies. Various types of manual and automated measurement devices are, thus, available for measuring the lengths, widths and countersink depths of pre-drilled and other holes in which fasteners are to be extended and installed.

Grip gages, for example, are one such type of measurement devices, and permit users to determine proper bolt and/or fastener lengths for corresponding pre-drilled or other holes present in a workpiece of other object, or part thereof, manually or in an automated manner. A corresponding dual use scale can measure depth of holes in $\frac{1}{16}$" increments to $2\frac{1}{2}$", and + grip length of fasteners in $\frac{1}{16}$" increments to $2\frac{1}{2}$". These gages generally include a probe that has a configuration of a fish hook, which can be hooked on the back side of a fastener hole. The length of the fastener hole is typically indicated by a number provided by a linear scale that is present inside the grip gun. Manual grip gages are typically far less rapid, efficient and accurate than some automated grip gages, and often greatly extend assembly or manufacturing times in comparison with automated grip gages. Moreover, known automated grip gages very disadvantageously generally require a use of three hands to operate (i.e., hands of two different operators), rendering them extremely labor intensive, time consuming, awkward and difficult to use (since each operator only has two hands) and, thus, expensive to use (in terms of labor costs). Further, they are typically extremely slow and inefficient, generally performing steps of normalization, measurement, data recordation and the like in a series of separate steps that are not concurrent, but are consecutive, rendering such devices extremely inefficient, labor intensive, time consuming and, as a result, expensive to operate.

Further, current projection systems for manufacturing three-dimensional objects utilize laser projectors to project points or text onto a surface. The laser projectors emit highly amplified and coherent electromagnetic radiation of one or more specific frequencies in a form of an intense beam of nearly monochromatic visible or infrared light through a process of stimulated emission. The radiation emitted by the laser consists of a coherent beam of photons, all in phase and having the same polarization, and at any given time, a user will always see a moving dot. Very disadvantageously, laser systems, and their replacement parts, are extremely expensive (often prohibitively) and, thus, are not widely used in manufacturing processes and assembly lines.

Further, laser systems, very disadvantageously, are not capable of projecting images or symbols, such as graphics, pictures, illustrations or drawings, onto a surface, and cannot display large amounts of text or other drawn objects without severe flickering, blinking and/or other significant distortions, all of which generally are, at the least, annoying, and cause eye strain to the user. Further, when large amounts of text are projected by laser projectors, this causes the laser projectors to operate extremely slowly. In contrast with optical projections, laser projections work in the same manner in which one writes with a pen. The laser projections actually write out each letter of a word like one would using a pen. The laser itself is physically moving or has an internal mirror that moves. Consequently, the more text that is to be displayed by a laser projector, the longer it takes for the laser projector to make one complete projection. For example, if a user of a laser projector projects only the letter "A" onto a surface, the time between projection cycles would be very short. However, the time between "re-paints" (i.e. re-projecting the information) becomes significantly longer, and the laser projection very disadvantageously begins to flash, similar to how fluorescent lights start to flicker as they get older or are cold. The foregoing problems render laser projectors very difficult, and time consuming, to use in an assembly guidance system (in addition to being extremely costly).

Optical systems that can project three-dimensional text, images and/or symbols onto one or a plurality of surfaces of a variety of different three-dimensional objects, or parts thereof, in an undistorted manner currently do not exist. Laser systems are not capable of making such projections.

Description of Other Art

U.S. Pat. No. 4,216,585 describes a depth gage for indicating the depth of a hole through a workpiece which is to be attached to a nut-plate by a threaded fastener, which comprises a rod with a cylindrical portion adapted to pass through the hole and abut the nut-plate so that a forward section of the rod enters within the threads of the nut-plate. The '585 patent states that a sleeve slidable on the rod in front of the workpiece can be slid to abut the front surface of the workpiece, and that graduated markings on the rod indicate the depth of the hole.

U.S. Pat. No. 5,111,406 describes a fixture that is prepared with fixture holes arranged in a pattern that corresponds with the locations of fiducial pads that are located on a multilayer board. The fixture has tooling pins that engage with tooling holes in the panel to hold the panel in an absolute position relative to the fixture. An x-ray inspection system views a superimposed image of a selected fixture hole and a corresponding fiducial pad that is visible within the boundary of the fixture hole. A software routine is then used to compute the offset between the fixture hole and the fiducial pad. The process is then repeated for the remaining sample of fixture holes and fiducial pads. The results are then fitted and sent to a drilling machine to determine a position for the drilled holes in the panel that compensates for the registration of the solder pads.

U.S. Pat. No. 5,195,451 describes a projection of an image of a stitch pattern onto a workpiece. A projector is stated to project a full-sized image of the stitch pattern on the basis of image data read from RAM on a workpiece held by an embroidery frame.

U.S. Pat. No. 5,757,950 describes a process for cutting or stamping individual parts from an animal skin in which the contours of the individual parts are stored in a computer, and can be assembled to form a cutting pattern. For optimizing the cutting, the cutting pattern is established individually as a function of the quality of the skin, and is projected by a projection device onto the skin.

U.S. Pat. No. 6,192,777 describes an apparatus and method for cutting pieces of material from a workpiece, such as a web of patterned fabric, which includes irregularities or which is misaligned with respect to a coordinate system of the cutting apparatus. The workpiece is spread on a cutting table where it is cut by a numerically controlled cutter in accord with an electronic marker stored in the cutter controller. The marker is matched to the workpiece and appropriate adjustments are made to the marker before the workpiece is cut. A laser, operatively connected to the controller, projects a match target onto the workpiece at a point corresponding to a selected point on the marker. The marker is then adjusted such that the selected point coincides with a desired location on the workpiece. Adjustment is achieved by electronically displacing the match target from a non preferred location to a preferred one. Software in a controller translates this displacement into appropriate adjustments to the marker.

U.S. Pat. No. 6,205,370 describes a production of a nest of cuts for cutting blanks out of flat, irregular workpieces, wherein the contour and the flaws of the spread workpieces together with a workpiece characteristic are detected by means of a digitizing unit, and the corresponding data are read into a computer, which on the basis of these data, and the data stored in the computer concerning number, shape and quality requirements of the blanks, calculates and stores a nest of cuts, and utilizes the detected workpiece characteristics of the workpieces as a workpiece code for allocating the nests of cuts to the respective workpieces.

U.S. Pat. No. 6,304,680 describes a method and system for monitoring a process which determines a location of a product in three dimensional space with respect to a process monitoring system.

U.S. Pat. No. 6,314,311 describes a registration system for use in connection with an image guided surgery system. It includes a medical diagnostic imaging apparatus for collecting image data from a subject. An image data processor is stated to reconstruct an image representation of the subject from the image data. An image projector depicts the image representation on the subject.

U.S. Pat. No. 6,600,476 describes a video aid to an assembly system and methods of using the system for providing production personnel access to manufacturing drawing information with minimum user intervention. The system scrolls manufacturing drawings automatically as a monitor is moved relative to a workpiece, so that the manufacturing drawing corresponds with the identical location on the workpiece. The system is stated to eliminate the need to store, retrieve and maintain individual hardcopy drawings.

U.S. Pat. No. 6,731,991 describes a method and system of projecting light on a planar surface to produce an image for tracing. The system includes a projector that has a light source and a signal conditioner that is operably connected to the projector. A computer is operably connected to the signal conditioner, and a scanner is connected to the projector. A test pattern from the computer is projected from the projector through the scanners to visually align an image to a sector on a work surface. A grid is operably aligned with the work surface, and a geometric pattern from the computer is then projected by the projector on the planar work surface for tracing. The method comprises the steps of creating a pattern, tracing lines along the pattern on the planar work surface, cutting the pattern along the traced lines, discarding pieces of the planar surface outside the pattern, and placing edging along an outer edge of the pattern.

U.S. Pat. No. 6,813,035 describes a formation of a two-dimensional color pattern consisting of colored pattern elements that is stated to enable a particularly compact and fault proof color pattern for a coding. The '035 patent states that three dimensional data of an object point can be calculated by subsequent triangulation at a known position of a projector and a camera. Also described is a method for determining three-dimensional surface coordinates comprising an illumination of an object with a color pattern of known structure by a projector and recording an object image by a camera.

U.S. Pat. No. 7,016,052 describes "a quick, simple and accurate manner in which to measure the dimensions or characteristics of a hole without contacting the hole." The '052 patent states that the apparatus and method described therein also automatically detect different materials defining the hole and, therefore, the location of the interface where the materials meet. To measure the characteristics of the hole, the '052 patent states that the apparatus and method measure the intensities of light reflected off of the hole wall, and that the light directed toward the hole wall by the optical fiber may be of the type, such as collimated or focused, to provide distinct reflections that are received and measured by the optical receiver to supply accurate measurements of the hole characteristics.

U.S. Patent Application Publication No. 2010/0236087 describes an apparatus comprising a housing, a clamping unit associated with the housing, a biasing system, and a length indicator. This publication states that the clamping unit can be inserted through a hole in a structure into an interior of a nut that is positioned relative to a first surface of the structure, and that the clamping unit can engage the interior of the nut when a portion of the housing is positioned relative to a second surface of the structure. The first structure is stated to be substantially parallel to the second surface. The biasing system is stated to be capable of biasing the portion of the housing positioned relative to the second surface of the structure and the clamping unit towards each other, while the clamping unit is engaged with the interior of the nut. The length indicator is stated to be capable of indicating a length of a bolt when the biasing system has biased the portion of the housing and the clamping unit towards each other.

Other art includes published U.S. Patent Applications Nos. 2003/0207742, 2005/0121422, 2006/0007411, 2006/0176156, 2006/0290890, 2007/0206371, 2007/0127015 and 2008/0018740, and foreign patent documents numbers GB 2204397, EP 0027054, EP 0053501, EP 1288865, EP 1519575, WO 2004084547, WO 2005025199 and WO 9716015.

None of the above references, or others that are described herein, teach or suggest the novel, automated, very accurate and extremely rapid fastener hole measurement apparatuses or methods, or the computerized optical systems or methods, of the present invention.

There is a need in the assembly, manufacturing, production and other industries world wide for automated measuring apparatuses that perform very rapid, efficient and accurate measurements of the lengths of pre-drilled and other fastener holes, and of required or desired corresponding fasteners of a correct length for such holes, hole countersink depths and/or hole diameters, which may be operably connected with one or more computers or other data collection devices in a manner that data resulting from one or all of such measurements may be readily and rapidly transmitted (or otherwise transferred) to one or a plurality of computers and/or other data collection devices for recordation or other use each time that a hole is measured.

Further, there is a long-felt, but unsolved, need worldwide in the manufacturing and production industries for efficient, rapid and accurate guidance systems that have an ability to significantly reduce the amount of time, labor, manufacturing errors and paper products (blueprints, plans, instruction manuals and/or the like) that are typically required to manually assemble or otherwise manufacture complicated three-dimensional objects, such as aircrafts, submarines and automobiles, and that can be used on assembly lines and/or in other manufacturing and production environments.

SUMMARY OF THE INVENTION

The present invention provides automated measuring apparatuses in both a wired and a wireless form that perform extremely rapid, efficient and accurate measurements, typically of the exact depths, countersink depths and diameters of each of a series of pre-drilled and other fastener holes that are present in a workpiece (or other three-dimensional object, or part thereof), which correspond accurately with corresponding fasteners having particular lengths, hole countersink depths and/or diameters, in a continuous manner. These measuring apparatuses may also extremely rapidly and accurately measure skin and workpiece thicknesses, grip lengths and other measurements. The measuring apparatuses may be operably connected with one or more computers and/or other data collection devices in a manner that hole depth, countersink depth and/or hole diameter data may be readily and extremely rapidly transferred from the apparatuses to one or a plurality of the computers and/or other data collection devices each time that a hole measurement is made by the apparatus, where the data may be recorded, stored, manipulated, used to identify a corresponding fastener having particular measurements for a particular sized hole and/or the like (with potentially thousands of such measurements being made in connection with potentially thousands of holes that may be present in a single workpiece, object, or part, and with the measuring apparatuses typically continuously making measurements). The apparatuses of the invention enable an effective and correct determination and identification by a user of the correct or otherwise suitable fastener length and/or type for each particular fastener hole of a three-dimensional (or other) object, or part, that is being assembled, manufactured or otherwise processed (potentially out of thousands of different types and/or lengths of fasteners), such as pre-drilled holes that are present in a skin of an aircraft that is to be securely attached to an aircraft substructure. Very advantageously, the measuring apparatuses and related methods of the invention may be employed alone or in connection with computerized optical assembly systems and methods, as well as with any other type of projection system, such as a laser projection system, and other assembly, production and manufacturing devices, systems and methods, such as non-guided applications, to measure hole depths, hole diameters, object thickness, required fastener length and/or the like.

The automated measuring apparatuses of the present invention are a great improvement in the art in comparison with other apparatuses for performing measurements of the depths of pre-drilled and other holes, hole countersink depths and hole diameters. Extremely advantageously, using only one hand, and by only squeezing a trigger (or similar device) one time, and in one single action, an operator of an apparatus of the invention has an ability to successfully, very accurately and extremely rapidly (instantaneously or almost instantaneously) perform all three of the following functions (simultaneously or almost simultaneously):

(i) normalize the measuring apparatus onto one or a plurality of surfaces present on, or in, an object, or a part thereof (which itself is to be, or includes an item that is to be, measured, such as one or a plurality of pre-drilled holes);

(ii) perform one or a plurality of accurate measurements in regard to the item(s) to be measured; and (iii) transmit or otherwise transfer one or a plurality of measurement data and/or information procured or obtained in regard to the item(s) measured from the measuring apparatus to one or a plurality of computers, data collection devices and/or similar devices, where such measurement data and/or information may be recorded, stored, organized, manipulated and/or otherwise used in any required or desired manner by the operator (or another user).

The measurement apparatuses of the invention may be operably connected with one or a plurality of computers, data collection devices and/or similar devices using, for example, one or a plurality of serial ports. USB cables, Ethernet cables, wireless transmission or the like in order to communicate measured data and/or information back to one or a plurality of host (or other) computers, data collection devices or similar devices (or to otherwise supply data and/or other information to the computers, and/or receive data and/or other information from the computers).

In one embodiment, the measuring apparatuses and methods of the present invention may be employed in connection with computerized optical manufacturing and guidance systems, and related methods, for the optical projection of three-dimensional text, images and/or symbols in a substantially or completely undistorted manner onto one or a plurality of surfaces of a variety of different three-dimensional objects, or parts thereof. These systems and methods may be employed in any field, industry, application, location and/or environment in which it is necessary or desirable to project three-dimensional text, images and/or symbols in a substantially or fully undistorted manner onto one or a plurality of three dimensional objects, or parts, including, but not limited to, the manufacturing, building construction, automotive, aviation, maritime, military, medical, veterinary, entertainment, advertising, publishing and/or textile industries. Such computerized optical manufacturing guidance systems and methods enable assembly technicians and other manufacturing personnel to very efficiently, rapidly and accurately assemble any three-dimensional objects (without the use of lasers or laser technology), generally in a step-by-step order of a work process, whether having flat, curved, contoured and/or complex curved surfaces, including those objects that are relatively or very complex, such as aircrafts, submarines, missiles, military vehicles and automobiles, and objects that are not complex, such as cables, in a manner that tremendously reduces the amount of time, labor, paper products and/or computer screens that would otherwise typically be required to assemble or otherwise manufacture such objects manually, or using a laser system, and that significantly reduces or completely eliminates assembly errors, both of which result in tremendous cost savings (in time, labor, blueprints, plans, instruction manuals and/or the like). The resulting cost savings, which typically increase as the complexity of the particular object (or part) being assembled increases, can be millions of dollars for each object being assembled, such as an aircraft. Such cost savings are multiplied accordingly when more than one of the same object is being assembled. For example, if a cost savings of two million dollars is achieved in an assembly of one submarine, a cost savings of four million dollars will generally be achieved in an assembly of two such submarines, a cost savings of six million dollars will generally be achieved in an assembly of three such submarines, a cost savings of eight million dollars will generally be achieved in an assembly of four such submarines, and so forth.

The above manufacturing guidance systems and methods use optical projectors to optically project calibrated, three-dimensional assembly (or work) instructions in the form of text, images and/or symbols in one or a variety of different colors and/or patterns onto three-dimensional objects, or parts, that are being constructed, such as an aircraft, or a part thereof, such as a vertical stabilizer, or a component thereof, such as a skin of a vertical stabilizer, in a substantially or fully undistorted manner, even when the objects, or parts, include curved, contoured and/or complex curved surfaces, such as curved surfaces having bumps or other raised areas thereon, rather than flat surfaces, and even when the optical projectors are not positioned and/or located in a manner that is perpendicular to, or straight in front of, the object being assembled. The three-dimensional text, images and/or symbols are projected onto the three-dimensional objects, or parts, when they are needed by manufacturing technicians or other system users, where they are needed on the object, or part, and in the manner that they are needed (i.e., at any time, at any place on the surface of the object, or part, and in any manner). These systems and methods are pioneering, and are such an advance over the current state of the art that they may revolutionize the manner in which complicated three-dimensional objects are assembled or otherwise manufactured worldwide.

Three dimensional optical projection is a brand new technology that can display three-dimensional images of objects, as well as text and symbols, onto the surfaces of three-dimensional objects, or parts thereof, without distortion. When employed in the manufacturing industry, by sequencing in order (preferably the "best" order) a series or set of complicated assembly instructions or steps (i.e., in the order of a work process), very complex assemblies or other manufactures, for example, of aircrafts, jets, helicopters, missiles, submarines, ships, boats, tanks, automobiles and a wide variety of other objects or systems, or parts thereof, can be assembled with unprecedented speed and accuracy. Such technology is expected to cause a significant improvement for manufacturing in industrialized countries. By implementing three-dimensional optical projection technology on their assembly lines, and in other production environments, businesses in countries with high-cost labor can provide a new tool to their workforces that will allow the output from one individual to be enhanced considerably. Further, third world countries are improving their workforces, so that they are taking on ever increasing complex manufacturing tasks. Three-dimensional optical projection technology is expected to enhance the productivity of workers in industrialized countries to such a large extent that third world countries' current competitive advantage (inexpensive or less expensive labor) will be greatly mitigated, with the benefit to the industrialized countries of having production performed in those countries, rather than in foreign third world countries.

In one aspect, the present invention provides automated measuring apparatuses that can perform hole depth, countersink depth and/or hole diameter measurements in a very rapid, efficient and accurate manner.

In another aspect, the present invention provides a method for measuring a depth of a hole, a countersink depth and/or a hole diameter using an apparatus of the invention comprising:
  (a) inserting the probe of the apparatus into a hole present in an object, or part thereof, in a manner that at least one, and preferably all, of the feet of the probe are in contact with a surface of the object, or part;
  (b) squeezing the trigger of the apparatus;
  (c) optionally, reading the hole depth, countersink depth and/or hole diameter indicator to determine the depth of the hole, the countersink depth and/or the hole diameter, and
  (d) optionally, using the hole depth, countersink depth and/or hole diameter data provided to one or a plurality of computers to select a suitable fastener for the hole.

In another aspect, the present invention provides a measurement apparatus of the invention in combination with a computerized optical system for a projection of three-dimensional text, images and/or symbols onto one or a plurality of surfaces of a variety of different three-dimensional objects, or parts thereof, comprising:

(a) one or more computers including an operating system, one or a plurality of graphics cards that can support a three-dimensional graphics computer programming language, or a combination or hardware and software that performs an equivalent function, and one or a plurality of computer ports that are capable of outputting video signals which contain a representation (or definition) of text, images, symbols, or a combination thereof;

(b) one or a plurality of programs that can run on the operating systems, and that function separately or together in any suitable order to enable a user of the system to:

(i) create or import three-dimensional surface data (such as the output of a CAD program) that defines a geometric configuration of one or a plurality of surfaces of the one or a plurality of three-dimensional objects, or parts thereof, to be projected upon (Base Geometry);

(ii) create or import three-dimensional data (such as the output of a CAD program) that defines a geometric configuration of one or a plurality of text, images or symbols, or a combination thereof, to be projected upon the one or a plurality of surfaces of the three-dimensional objects, or parts thereof (Annotated Geometry);

(iii) optionally, organize the data of item (ii) into ordered steps or according to other desired criteria;

(iv) correlate into one coordinate system one or a plurality of projectors, the surfaces of the three-dimensional objects, or parts thereof, being projected upon (as defined by item (i)), and the data of item (ii), optionally, in the manner defined in item (iii); and (v) display the data of item (ii) using the correlation determined in item (iv) onto the one or a plurality of surfaces of the one or a plurality of the three-dimensional objects, or parts thereof, and, optionally, execute the ordered steps, other desired criteria, or both, identified in item (iii);

(c) one or a plurality of data files containing:

(i) three-dimensional surface data (such as the output of a CAD program) that defines a geometric configuration of one or a plurality of the surfaces of the three-dimensional objects, or parts thereof, to be projected upon (Base Geometry);

(ii) three-dimensional data (such as the output of a CAD program) that defines a geometric configuration of the one or a plurality of text, images or symbols, or a combination thereof, to be projected upon the one or a plurality of surfaces of the three-dimensional objects, or parts thereof (Annotated Geometry);

(d) one or a plurality of optical projectors operably connected with the computers, wherein the optical projectors function to project one or a plurality of the correlated three-dimensional text, images or symbols, or a combination thereof, originating from the computers, simultaneously or at different times, in a substantially or fully undistorted manner, onto the one or a plurality of the surfaces of the three-dimensional objects, or parts thereof, in one or a plurality of different colors, or combination of colors;

(e) optionally, one or a plurality of movable or stationary means for supporting the optical projectors;

(f) optionally, one or a plurality of movable or stationary means for supporting the computers; and (g) optionally, a means for taking measurements of portions, areas or components of the three-dimensional objects, or parts thereof, or a combination thereof, that is operably connected with the computers.

In another aspect, the present invention provides a method for projecting three-dimensional texts, images or symbols, or a combination thereof, onto one or more three-dimensional objects, or parts, in a substantially or fully undistorted manner comprising a step of, using the above computerized optical projection system to project the three-dimensional text, images or symbols, or a combination thereof, onto the three-dimensional objects, or parts thereof, simultaneously or at different times, in one or a plurality of different colors, or combination of colors.

In yet another aspect, the present invention provides a computerized optical projection system for guiding users in manufacturing one or a plurality of three-dimensional objects, or parts thereof, comprising:

(a) one or more computers including an operating system, one or a plurality of graphics cards that can support a three-dimensional graphics computer programming language, or a combination or hardware and software that performs an equivalent function, and one or a plurality of computer ports that are capable of outputting video signals which contain a representation (or definition) of text, images, symbols, or a combination thereof;

(b) one or a plurality of programs that can run on the operating systems, and that function separately or together in any suitable order to enable a user of the system to:

(i) create or import three-dimensional surface data (such as the output of a CAD program) that defines a geometric configuration of one or a plurality of surfaces of the one or a plurality of the three-dimensional objects, or parts thereof, to be projected on (Base Geometry);

(ii) create or import three-dimensional data (such as the output of a CAD program) that defines a geometric configuration of one or a plurality of text, images or symbols, or a combination thereof, to be projected upon the one or a plurality of surfaces of the three-dimensional objects, or parts thereof (Annotated Geometry);

(iii) organize the data of item (ii) into ordered steps or according to other desired criteria;

(iv) correlate into one coordinate system one or a plurality of projectors, the surfaces of the three-dimensional objects, or parts, being projected upon (as defined by item (i)), and the data of item (ii), in the manner defined in item (iii); and (v) display the data of item (ii) using the correlation determined in item (iv) onto the one or a plurality of the surfaces of the one or a plurality of the three-dimensional objects, or parts thereof, to be manufactured and execute the ordered steps, other desired criteria, or both, identified in item (iii);

(c) one or a plurality of data files containing:

(i) three-dimensional surface data (such as the output of a CAD program) that defines a geometric configuration of the one or a plurality of surfaces of the three dimensional objects, or parts thereof, to be projected upon (Base Geometry);

(ii) three-dimensional data (such as the output of a CAD program) that defines a geometric configuration of the one or a plurality of text, images or symbols, or a combination thereof, to be projected upon the one or plurality of the surfaces of the three-dimensional objects, or parts thereof, to be manufactured (Annotated Geometry);

(d) one or a plurality of optical projectors operably connected with the computers, wherein the optical projectors function to project the one or a plurality of the correlated three-dimensional text, images or symbols, or a combination thereof, originating from the computers, simultaneously or at different times, in a substantially or fully undistorted manner, onto the one or a plurality of the surfaces of the three-dimensional objects, or parts thereof, in one or a plurality of different colors, or combination of colors;

(e) optionally, one or a plurality of movable or stationary means for supporting the optical projectors;

(f) optionally, one or a plurality of movable or stationary means for supporting the computers; and (g) optionally, a means for taking measurements of portions, areas or components of the objects, or parts thereof, or a combination thereof, that is operably connected with the computers.

In still another aspect, the present invention provides a method for providing instructions for guiding users in manufacturing a variety of different three-dimensional objects, or parts thereof, comprising optically projecting using the above computerized optical projection system one or a plurality of three-dimensional text, images or symbols, or a combination thereof, in a substantially or fully undistorted manner, simultaneously or at different times, onto the three-dimensional objects, or parts thereof, in one or a plurality of different colors, or combination of colors.

In yet another aspect, the present invention provides a computer program product for use in a computerized optical system for projecting by one or a plurality of optical projectors operably connected with one or a plurality of computers three-dimensional text, images and/or symbols in a substantially or fully undistorted manner onto one or a plurality of surfaces of a variety of different three-dimensional objects, or parts thereof, comprising:

(a) a computer usable medium having computer readable program code physically embodied therein; and (b) computer readable program code that enables a user to:
  (i) create or import three-dimensional surface data (such as the output of a CAD program) that defines a geometric configuration of one or a plurality of surfaces of the one or a plurality of three-dimensional objects, or parts thereof, to be projected upon (Base Geometry);
  (ii) create or import three-dimensional data (such as the output of a CAD program) that defines a geometric configuration of one or a plurality of text, images or symbols, or a combination thereof, to be projected upon the one or plurality of surfaces of the three-dimensional objects, or parts thereof (Annotated Geometry);
  (iii) optionally, organize the data of item (ii) into ordered steps or according to other desired criteria;
  (iv) correlate into one coordinate system one or a plurality of projectors, the surfaces of the three-dimensional objects, or parts thereof, being projected upon (as defined by item (i)), and the data of item (ii), optionally, in the manner defined in item (iii); and
  (v) display the data of item (ii) using the correlation determined in item (iv) onto the one or plurality of the surfaces of the one or a plurality of the three-dimensional objects, or parts thereof, and, optionally, execute the ordered steps, other desired criteria, or both, identified in item (iii).

In yet another aspect, the present invention provides a computer program product for use in a computerized optical projection system for guiding users in manufacturing a variety of different three-dimensional objects, or parts thereof, in which one or a plurality of optical projectors operably connected with one or a plurality of computers project three-dimensional text, images and/or symbols in a substantially or fully undistorted manner onto one or a plurality of surfaces of the three-dimensional objects, or parts thereof, comprising:

(a) a computer usable medium having computer readable program code physically embodied therein; and (b) computer readable program code that enables a user to:
  (i) create or import three-dimensional surface data (such as the output of a CAD program) that defines a geometric configuration of one or a plurality of surfaces of the one or a plurality of three-dimensional objects, or parts thereof, to be projected on (Base Geometry);
  (ii) create or import three-dimensional data (such as the output of a CAD program) that defines a geometric configuration of one or a plurality of text, images or symbols, or a combination thereof, to be projected upon the one or plurality of surfaces of the one or a plurality of the three-dimensional objects, or parts thereof (Annotated Geometry);
  (iii) organize the data of item (ii) into ordered steps or according to other desired criteria;
  (iv) correlate into one coordinate system one or a plurality of projectors, the one or a plurality of surfaces of the one or a plurality of the three-dimensional objects, or parts, being projected upon (as defined by item (i)), and the data of item (ii), in the manner defined in item (iii); and
  (v) display the data of item (ii) using the correlation determined in item (iv) onto the one or a plurality of the surfaces of the one or a plurality of the three-dimensional objects, or parts thereof, to be manufactured and execute the ordered steps, other desired criteria, or both, identified in item (iii).

In another aspect, the present invention provides a programmed computer for use in an computerized optical system for projecting by one or a plurality of optical projectors operably connected with the computer three-dimensional text, images and/or symbols in a substantially or fully undistorted manner onto one or a plurality of surfaces of a variety of different three-dimensional objects, or parts thereof, comprising:

(a) a computer; and (b) a computer usable medium having computer readable program code physically embodied therein that enables a user to:
  (i) create or import three-dimensional surface data (such as the output of a CAD program) that defines a geometric configuration of one or a plurality of surfaces of the one or a plurality of three-dimensional objects, or parts thereof, to be projected upon (Base Geometry);
  (ii) create or import three-dimensional data (such as the output of a CAD program) that defines a geometric configuration of one or a plurality of text, images or symbols, or a combination thereof, to be projected upon the one or plurality of surfaces of the one or plurality of the three-dimensional objects, or parts thereof (Annotated Geometry);
  (iii) optionally, organize the data of item (ii) into ordered steps or according to other desired criteria;
  (iv) correlate into one coordinate system one or a plurality of projectors, the one or a plurality of surfaces of the one or a plurality of the three-dimensional objects, or parts, thereof being projected upon (as defined by item (i)), and the data of item (ii), optionally, in the manner defined in item (iii); and (v) display the data of item (ii) using the correlation determined in item (iv) onto the one or a plurality of surfaces of the one or a plurality of three-dimensional objects, or parts thereof, and, optionally, execute the ordered steps, other desired criteria, or both, identified in item (iii).

In another aspect, the present invention provides a programmed computer for use in a computerized optical projection system for guiding users in manufacturing a variety of different three-dimensional objects, or parts thereof, in which one or a plurality of optical projectors are operably connected with the computer project three-dimensional text, images and/or symbols in a substantially or fully undistorted manner onto one or a plurality of surfaces of the three-dimensional objects, or parts thereof, comprising:

(a) a computer; and
(b) a computer usable medium having computer readable program code physically embodied therein that enables a user to:
  (i) create or import three-dimensional surface data (such as the output of a CAD program) that defines a geometric configuration of one or a plurality of surfaces of one or a plurality of three-dimensional objects, or parts thereof, to be projected on (Base Geometry);
  (ii) create or import three-dimensional data (such as the output of a CAD program) that defines a geometric configuration of one or a plurality of text, images or symbols, or a combination thereof, to be projected upon the one or plurality of surfaces of the one or a plurality of the three-dimensional objects, or parts thereof (Annotated Geometry);
  (iii) organize the data of item (ii) into ordered steps or according to other desired criteria;
  (iv) correlate into one coordinate system one or a plurality of projectors, the one or a plurality of surfaces of the one or a plurality of the three-dimensional objects, or parts, being projected upon (as defined by item (i)), and the data of item (ii), in the manner defined in item (iii);
  (v) display the data of item (ii) using the correlation determined in item (iv) onto the one or a plurality of the surfaces of the one or a plurality of the three-dimensional objects, or parts thereof, to be manufactured and execute the ordered steps, other desired criteria, or both, identified in item (iii).

In still another aspect, the present invention provides a computerized method for correlating into one coordinate system (i) one or a plurality of optical projectors operably connected with one or a plurality of computers, (ii) one or a plurality of text, images and/or symbols being projected by the optical projectors, and (iii) one or a plurality of three-dimensional objects, or parts or surfaces thereof, being projected upon by the optical projectors, comprising, using one of the above computerized optical projection systems:

(a) creating or importing into the computer three-dimensional surface data (such as the output of a CAD program) that defines a geometric configuration of one or a plurality of surfaces of the one or a plurality of the three-dimensional objects, or parts thereof, to be projected upon (Base Geometry);
(b) creating or importing into the computer three-dimensional data (such as the output of a CAD program) that defines a geometric configuration of the text, images or symbols, or a combination thereof, to be projected upon the one or a plurality of the surfaces of the one or a plurality of the three-dimensional objects, or parts thereof (Annotated Geometry); and
(c) identifying at least three correlation points in the three-dimensional surface data of step (a), in the three-dimensional data of step (b), or both; and
(d) correlating the correlation points between the three-dimensional surface data of step (a) and the three-dimensional data of step (b).

In still another aspect, the present invention provides an automated apparatus for making one or a plurality of linear or rotary measurements on, against, in or through one or a plurality of three-dimensional objects, or parts thereof, or holes present therein, or of fastener lengths, or any combination thereof, which may be operated by a user using only one hand to perform multiple functions, comprising:

(a) a housing;
(b) a measurement device affixed to the frame capable of making linear or rotary measurements, or both types of measurements;
(d) a stationary reader head affixed to the measurement device having an ability to read one or a plurality of graduations or divisions present on a scale when one or a plurality of measurement are made by the apparatus, and connect resulting signal paths to a digital circuit card;
(e) a shaft that is slidable or moveable in a forwards direction, a backwards direction, or both directions, partially or fully through the frame and that optionally includes one or a plurality of threads at its forward in which a probe tip may be affixed;
(f) a scale affixed to the shaft including a plurality of graduations or divisions uniformly spaced apart thereon that is readable by the measurement device, wherein the scale is a linear scale or a rotary scale;
(g) a removable or non-removable probe, wherein the probe includes:
  (1) a hollow, stationary or non-stationary body having its aft end removably or non-removably affixed to the forward end of the frame, and having a diameter that is larger than the diameter of the shaft, through which the shaft may partially or fully slide or move;
  (2) optionally, one or a plurality of ball pads positioned between a forward end and an aft end of the body having an ability to remain in a continuous, or substantially continuous, contact with one or a plurality of exterior or other surfaces present on the three-dimensional objects, or part thereof, and spaced an equal distance, or substantially an equal distance, apart from one another; and
  (3) a tip having its aft end removably attached to a forward end of the shaft, having a diameter smaller than a diameter of a hole to be measured, and capable of making one or a plurality of linear or rotary measurements upon contact with the three-dimensional objects, or parts thereof, or holes;
(h) a encoder clip present in the frame that is mechanically coupled to the shaft, and is slidable or movable in a forwards direction, a backwards direction, or in both directions, along with the shaft, and that actuates or deactivates a trigger switch when a compression spring force is overcome by pressure applied on a common grip or end cap by a user of the apparatus;
(i) a T-foot positioned within an optional slot present in the frame that is slidable in a forwards direction, a backwards direction, or in both direction in the frame, having an upper end and a lower end;

(j) a grip clip connected to the upper end of the T-foot and affixed to one or a plurality of interior surfaces of the frame that is slidable or movable in a forwards direction, a backwards direction, or both directions, partially or fully in the frame, that guides the encoder clip;

(k) a compression spring positioned in the frame forward of the grip clip having an ability to forcibly couple the shaft and the grip clip together by applying a compressive force between the encoder clip and the grip clip;

(l) an extension spring positioned in the frame forward of the grip clip having an ability to apply a tension force between the grip clip and the frame that causes the shaft, tip of the probe, or both, to extend outwardly in a direction towards the forward end of the apparatus, wherein the amount of force exerted by the extension spring to extend the shaft, grip clip, encoder clip, tip of the probe or one or a plurality of connected fasteners, or any combination thereof, is less than the amount of force exerted by the compression spring to separate the encoder clip and the shaft from the grip clip, and wherein the extension spring becomes disrupted from an initial resting position upon an "activation" of the apparatus, thereby causing the scale to extend through, or by, the reader head of the measurement device;

(m) a trigger switch positioned in the frame near or adjacent with the aft end of the encoder clip, and affixed to the grip clip, including an actuator that becomes released upon a tension force being applied to the common grip by a hand or finger of the user, or upon a reactive force being applied to the tip of the probe by a mechanical impediment to its movement, or by both, thereby causing the trigger switch to be pushed away, and separate, from the encoder clip and a trigger screw, and the apparatus to become "activated," wherein such individual or combined forces are stronger than the force applied by the compression spring to couple the shaft and the grip clip together;

(n) a trigger screw positioned in the frame that mechanically actuates the trigger switch and can provide a degree of adjustment ranging from about 0 to about 0.10 to set a linear displacement between a position of accurate measurement and a position of the trigger action;

(o) a common grip operably connected to the T-foot, or an end cap, located externally to the apparatus including the trigger switch and having a size and shape that may be compressed, squeezed, or pushed, by the user using only one hand, or one or a plurality of fingers on one hand, and when compressed, squeezed or pushed one time in one single action, applies tension to the extension spring, force to the compression spring, and a reactive force to the trigger switch that "activates" the apparatus by overcoming the amount of force being applied by the compression spring between the grip clip and the frame, thereby causing the shaft, tip of the probe and scale to slide or move in a backwards direction towards the aft end of the apparatus, and the scale to slide or move past, or through, the reader head of the measurement device, and the measurement device to count the divisions or graduations present on the scale;

(p) optionally, an adjustment screw present in the frame that is operably connected with the compression spring, and that may be adjusted by a user to set a distance that the common grip may be compressed or squeezed;

(q) optionally, a calibration disk having a known thickness measurement positioned at the forward end of the tip of the probe;

(r) optionally, one or a plurality of buttons located externally to the apparatus that, when depressed, pushed or activated, cause the apparatus to: (i) repeat a measurement previously made by the apparatus; (ii) advance to a new or different measurement or hole, or both; or (iii) become calibrated to a known thickness of the calibration disk (s) a digital circuit card affixed to the frame that has an ability to process measurement data or information, or a combination thereof, and transmit the same to one or a plurality of computers or data collection devices, or a combination thereof; and (t) optionally, an internal or external battery that can provide electrical power to the apparatus or a power supply cord that can operably be connected with a power supply;

wherein the apparatus, when "activated," performs more than one, or all, of the following functions simultaneously or substantially simultaneously, and instantaneously or substantially instantaneously, in an automated manner, each time that a measurement is made, while optionally continuously making a plurality of measurements:

(i) normalizing the probe or the tip relative to one or a plurality of surfaces present on, or in, the object, or part thereof, or holes being measured;

(ii) making one or a plurality of measurements, wherein the measurements are made of a thickness of the three-dimensional objects, or parts thereof, of a hole depth, of a hole diameter, of a countersink depth, of a fastener length, of a grip length, of another measurement of the three-dimensional objects, or parts thereof, or holes, or of any combination thereof;

(iii) transferring data, information, or a combination thereof, resulting or procured from, or produced by, the one or plurality of measurements made by the apparatus in, or that identifies one or a plurality of holes measured, or both, to the one or a plurality of computers or data collection devices, or a combination thereof for recordation, storage, organization, manipulation, or other use, or any combination thereof.

In still another aspect, the present invention provides an automated method for simultaneously, or substantially simultaneously, and instantaneously, or substantially instantaneously, making one or a plurality of measurements of a thickness of one or a plurality of three-dimensional objects, or parts thereof, of a hole depth, of a hole diameter, of a countersink depth, of a fastener length, of a grip length, of another measurement of the three-dimensional objects, or parts thereof, or holes, or of any combination thereof, normalizing a probe employed to make such measurements relative to a plurality of surfaces present on, or in, the objects, or parts thereof, or holes being measured, and transferring data, information, or a combination thereof, resulting or procured from, or produced by, such measurements to one or a plurality of computers or data collection devices, or a combination thereof, comprising:

(a) contacting a probe of an apparatus of claim 1 with one or a plurality of surfaces of the three-dimensional objects, or parts thereof, or holes present therein;

(b) compressing, squeezing or pushing the common grip or end cap of the apparatus;

wherein the method may be performed by an operator of the apparatus using only one hand.

In still another aspect, the present invention provides an automated system for making one or a plurality of measurements, wherein the measurements are made of a thickness of one or a plurality of three-dimensional objects, or parts thereof, of a hole depth, of a hole diameter, of a countersink depth, of a fastener length, of a grip length, of another measurement of the three-dimensional objects, or parts thereof, or holes, or of any combination thereof, comprising an apparatus of claim 1 that is operably connected with one or a plurality of: (i) computers or data collection devices including software that enables a storage or manipulation of the measurements made, or a combination thereof; and (ii) power supplies.

In still another aspect, the present invention provides an automated apparatus for making one or a plurality of linear or rotary measurements on, against, in or through one or a plurality of three-dimensional objects, or parts thereof, or holes present therein, or of fastener lengths, or any combination thereof, which may be operated by a user using only one hand, comprising:

(a) a housing;
(b) a measurement device capable of making linear or rotary measurements, or both types of measurements;
(c) a reader head having an ability to read one or a plurality of graduations or divisions present on a scale when one or a plurality of measurement are made by the apparatus, and connect resulting signal paths to a digital circuit card;
(d) a shaft that is slidable or moveable in the housing;
(e) a scale including a plurality of graduations or divisions that is readable by the measurement device, wherein the scale is a linear scale or a rotary scale;
(f) a removable or non-removable probe, wherein the probe includes:
(1) a body; and
(2) a tip attached to the shaft;
(g) a encoder clip coupled to the shaft that actuates or deactivates a trigger switch;
(h) a grip clip that guides the encoder clip;
(i) a compression spring;
(j) an extension spring:
(k) a trigger switch enabling the apparatus to become activated;
(l) a common grip or an end cap including the trigger switch and having a size and shape that may be compressed, squeezed, or pushed, by the user using only one hand, or one or a plurality of fingers on one hand, causing the apparatus to become "activated"; and
(m) a digital circuit card having an ability to process measurement data or information, or a combination thereof, and transmit the same to one or a plurality of computers or data collection devices, or a combination thereof.

In still another aspect, the present invention provides a system for assembling, manufacturing or producing a three-dimensional object, or part thereof, including an apparatus of claim 1 operably connected to an optical or laser assembly system.

In still another aspect, the present invention provides a hand-operated measurement apparatus for automatically measuring a dimension of an aperture on an assembly object, the apparatus comprising:

(a) a housing;
(b) a frame located inside of, and affixed to, the housing;
(c) a detection device secured to the frame, the detection device having a read head configured to detect divisions on a scale when the scale passes within a predefined range of the read head, the detection device providing an output corresponding to the divisions detected by the read head; and
(e) a control module located within the housing and electrically connected to the detection device, the control module including:
(i) a decoder configured to receive the output from the detection device and provide a signal representing the divisions detected by the read head; and
(ii) a processor configured to receive the signal from the decoder and track a number of divisions detected by the read head, the processor further configured to calculate a value for a preselected dimension on the aperture of the assembly object based on the number of divisions detected by the read head;
(f) wherein the preselected dimension is selected from at least the following types of dimensions: hole depth, hole diameter, countersink depth, grip length, flushness, and gap.

In still another aspect, the present invention provides a hand-operated measurement apparatus for automatically acquiring dimensional data for an aperture on an assembly object, the apparatus comprising:

(a) a housing;
(b) a frame located inside of, and affixed to the housing;
(c) a detection device secured to the frame, the detection device having a read head configured to detect divisions on a scale when the scale passes within a predefined range of the read head, the detection device providing an output corresponding to the divisions detected by the read head; and
(e) a control module located within the housing and electrically connected to the detection device, the control module including:
(i) a decoder configured to receive the output from the detection device and provide a signal representing the divisions detected by the read head;
(ii) a processor configured to receive the signal from the decoder and count a number of divisions detected by the read head; and
(iii) an external communication interface configured to allow the control module to communicate with an external computing system;
(f) wherein the preselected dimension is selected from at least the following types of dimensions: hole depth, hole diameter, countersink depth, grip length, flushness, and gap; and
(g) wherein the processor is further configured to communicate the number of divisions detected by the read head to the external computing system for further processing.

In still another aspect, the present invention provides an automated apparatus for making one or a plurality of linear or rotary measurements on, against, in or through one or a plurality of three-dimensional objects, or parts thereof, or holes present therein, or of fastener lengths, or any combination thereof, comprising a pistol-grip style housing including a trigger mechanism, wherein the apparatus may be operated by a user using only one hand as a result of its ergonomic shape.

BRIEF DESCRIPTION OF THE DRAWINGS

The patent or application file contains at least one drawing executed in color. Copies of the patent or patent application publication with color drawing(s) will be provided by the United States Patent and Trademark Office upon request and payment of the necessary fee.

FIG. 7 is an illustration of a Demo Panel screen of an Annotated Geometry file of an Authoring Assembly Software Tool ("Authoring Tool") that may be employed in the systems and methods of the invention. In this example file, each row represents a pre-drilled hole on the Base Geometry surface of a three-dimensional object, or part, being manufactured.

FIG. 9 is an illustration of a Data_Import_Form screen of an Authoring Assembly Software Tool ("Authoring Tool") in which a user may define a column location for a pre-drilled hole ID and fastener part number for a three-dimensional object, or part, that is being manufactured.

FIG. 14 is an illustration of a User Interface screen of an Operator Assembly Software Tool ("Operator Tool") that is used to run the actual assembly sequence (series of ordered process steps) created using the Authoring Tool and the Configurator Tool for a three-dimensional object, or part, to be assembled or otherwise manufactured.

FIG. 20 is an illustration of a three-dimensional object being assembled having a fastener number (ZEW 8 9), and quantity of fasteners (34), required for illuminated holes being projected onto the three-dimensional object.

FIGS. 42A and 40B are illustrations of internal components of a measuring apparatus of the invention in a "Plunge Gun" style wherein the measurement mechanism present therein is present in an extended position.

DETAILED DESCRIPTION OF THE PREFERRED EMBODIMENTS

The present invention may be understood more readily by reference to the following detailed description of the preferred embodiments of the invention, and to the examples included therein.

DEFINITIONS

For purposes of clarity, various terms and phrases that are used throughout this specification and the appended claims are defined in the manner that is set forth below. If a term or phrase that is used in this specification, or in the appended claims, is not defined below, or otherwise in this specification, the term or phrase should be given its ordinary meaning.

Many of the computer software programs and hardware devices that are discussed in these definitions are commercially available from Microsoft Corporation (Redmond, Wash.), and a large amount of additional information about these products is available on the web site microsoft dot com.

The term "about" as is used herein means approximately, as is known, and may be determined, by those having ordinary skill in the art, and typically refers to a variation of plus or minus 0.2.

The term "accurate" as is used herein in connection with the measurement apparatuses of the invention mean that such apparatuses make measurements that are error free, being fully accurate (100% accurate and error free) or at least substantially accurate (substantially accurate and error free).

The term "adjacent" as is used herein means close to, lying near, next to, abutting or adjoining.

Figure 24:
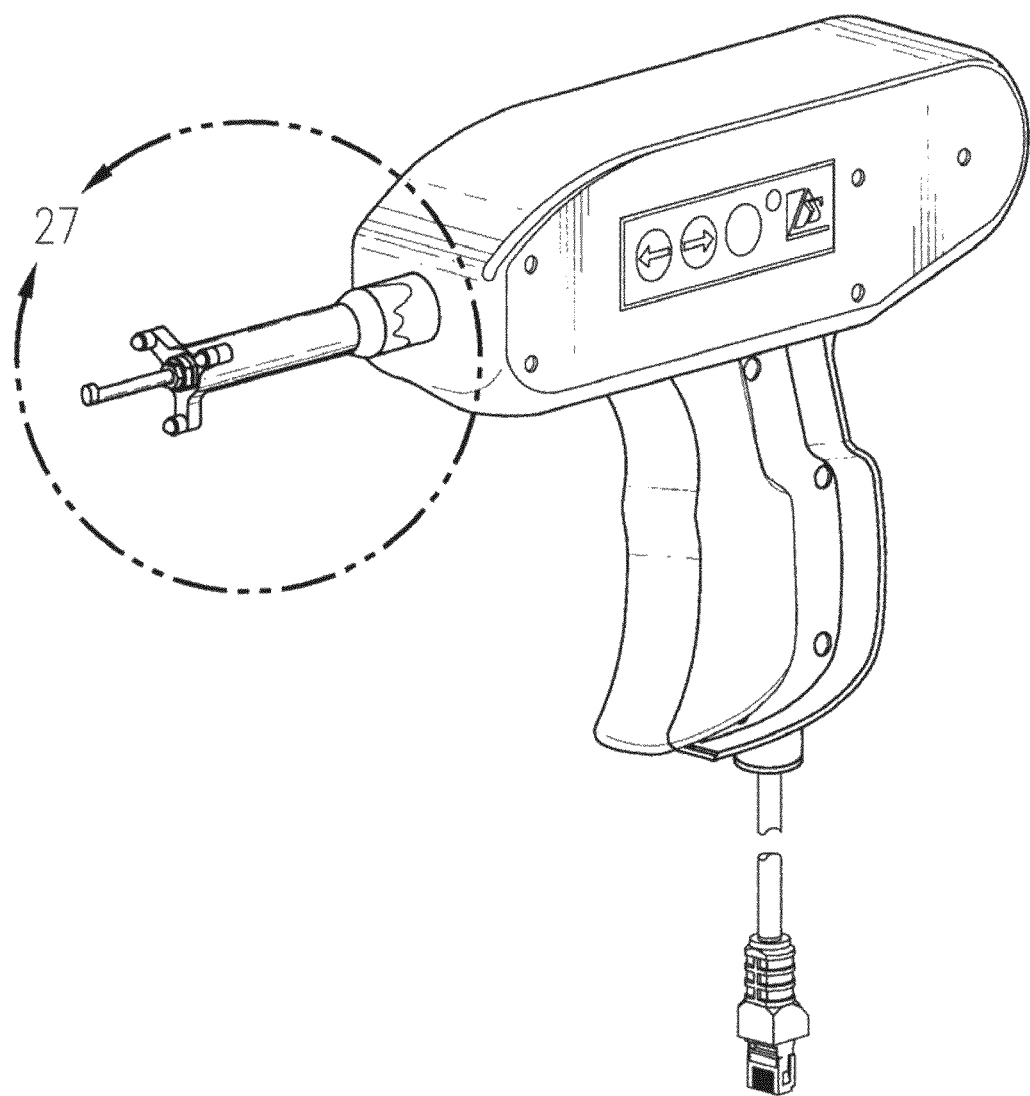
FIG. 24 is an illustration of a side view of one side of a preferred measurement apparatus of the invention.

The phrase "aft end" as used herein in relation with an apparatus of the invention, or with any of the components thereof, means that end of the apparatus, or of a component thereof, when it is positioned in the manner shown in FIG. 24, that is at the opposite end of the apparatus from the probe. When viewing FIG. 24 of the accompanying drawings, the aft end will be the right end of the apparatus, or of any of the components thereof. When viewing an object, or part thereof, or any other structure or device discussed herein, or any component of an object or part thereof, the phrase "aft end" refers to the right end thereof when viewing the same from the front. For example, in FIG. 1, the "aft end" of the airplane wing shown therein is the right end of the airplane wing.

The phrase "adaptor" as is used herein means a hardware device, such as a printed circuit board, that enables a computer to use one or more additional peripheral devices and/or hardware.

The term "almost instantaneously" as is used herein (often with respect to a speed of one or more functions performed by a measurement apparatus of the invention) means a period of time that is preferably about 5 seconds or less, and that is more preferably about 1 second or less, and that is still more preferably about 500 milliseconds or less, and that is even more preferably about 5 milliseconds or less, and that is still more preferably about 1 millisecond or less, and that is most preferably about 20 micro (µ) second or less.

The term "almost simultaneously" as is used herein (often with respect to a performance of one or more functions performed by a measurement apparatus of the invention, such as measuring, capturing and/or transmitting data) means existing, occurring or being completed within a period of time that is preferably about 5 seconds or less (often of one another or each other), and that is more preferably about 1 second or less (often of one another or each other), and that is still more preferably about 500 milliseconds or less (often of one another or each other), and that is even more preferably about 5 milliseconds or less (often of one another or each other), and that is still more preferably about 1 millisecond or less (often of one another or each other), and that is most preferably about 20 micro (µ) second or less (often of one another or each other).

The phrase "Annotated Geometry file" as is used herein means a data file that contains a three-dimensional (3D) representation of one or a plurality of text, images and/or symbols that will be projected onto one or a plurality of three-dimensional objects, or parts, that will be projected upon by one or more optical projectors. For example, if a user wanted to place a series of fasteners into a skin for an airplane door, the Annotated Geometry file would be the 3D representation of the fastener holes located on the airplane door, as well as any text, images and/or symbols added in the Authoring Tool. The Annotated Geometry file contains the 3D data that describes everything that gets projected onto the surface of a three-dimensional object, or part. While an image file (for example, a picture of a mountain) is not stored inside the Annotated Geometry, a reference to it is stored inside the Annotated Geometry. Thus, the foregoing is all considered to be data, because it is all a part of the data set. The Annotated Geometry contains the data that will be projected onto the one or a plurality of object, or parts, being projected upon by one or more optical projectors. The data is altered (transformed) prior to projection using the information from a calibration procedure, as is described in. The altering of this data is performed so that the text, images and/or symbols, or a combination thereof, that will projected by the optical projectors is distorted in such a way as to look correct to the person viewing it once it is on the three dimensional object, or part, on which it is being projected upon (regardless of where the optical projectors are placed, located and/or positioned in a manufacturing or other environment in relation to the three-dimensional object, or part, being projected upon).

The term "annulus" as is used herein refers to any ring or ring-like structure or part.

The phrase "application" as is used herein means software other than the operating system, such as Word processors, database managers, Web browsers and the like. Each application generally has its own user interface that allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse).

The phrase "anti-virus software" as is used herein means computer software that functions to prevent, detect and/or remove malware, such as computer viruses, worms and trojan horses. Such programs may also prevent and remove adware, spyware and/or other forms of malware. A variety of strategies are typically employed. Signature-based detection involves searching for known malicious patterns in executable code. However, it is possible for a user to be infected with new malware in which no signature exists yet. To counter such so called zero-day threats, heuristics can be used. One type of heuristic approach, generic signatures, can identify new viruses or variants of existing viruses for looking for known malicious code (or slight variations of such code) in files. Some antivirus software can also predict what a file will do if opened and/or run by emulating it in a sandbox and analyzing what it does to see if it performs any malicious actions. If it does, this could mean the file is malicious.

The phrases "Application Program Interface" and API as is used herein means a set of commands, functions and/or protocols which programmers can use when building software for a specific operating system. The API allows programmers to use predefined functions to interact with an operating system, instead of writing them from scratch. All computer operating systems, such as Windows, Unix, and the Mac OS, usually provide an application program interface for programmers. APIs are also used by hardware devices that can run software programs. While the API makes the programmer's job easier, it also benefits the end user, since it generally ensures that all programs using the same API will have a similar user interface.

The phrase "ARM-based device" as is used herein mean ARM microprocessors or similar products, which are often employed in embedded devices, as well as in portable devices, such as personal digital assistants (PDAs) and some phones. The Microsoft software that is described herein generally significantly improves the performance of executing ARM instruction-reducing cold-boot time and improving application execution speed. Such devices are commercially available from sources that are known by those having ordinary skill in the art, for example, from ARM, Inc. (Cambridge, England).

The terms "assembly," "assembly processes" and "assemble" as are used herein refer to an act of connecting, affixing and/or assembling together of pieces, parts, components or things to produce a partially or fully completed product, such as a machine, an apparatus, a device, an instrument, an airplane, a submarine, a boat, a helicopter, a jet, a vehicle (automobile, truck, military vehicle, camper, trailer or the like), an electrical circuit, or a portion thereof, such as a wing of an airplane, or the like, or to the product that has been assembled.

The phrases "assembly jig" and "tooling" as are used herein mean the structure(s) that hold and/or support an object (or part thereof) being assemble or manufactured, or worked on, usually in a repeatable and secure position, so that a finished product is consistent with other such projects.

The terms "automated" and "automatic" as are used herein mean to control or operate using automation (i.e., operating with minimal or no human intervention or manual labor and/or being independent of external control). For example, a measurement of a pre-drilled hole in an object may be made fully manually (using 100% manual labor), in a fully automated manner (using 0% manual labor) or in a partially automated manner (using more than 0%, but less than 100%, manual labor and automation). When this measurement is made in an "automated" manner, some part of the manual process has been replaced by electronic means. This results in a labor cost savings by reducing the length of time the measurement process takes. So, even if when a process is not fully automated (requires no manual labor) automation can reduce manufacturing costs by reducing labor costs (even if not reduced to zero). For an automation project, typically a reduction to about 50% of manual labor is involved, and preferably less than about 20% of manual labor is involved, and still more preferably less than about 10% of manual labor is involved, and even more preferably less than about 5% of manual labor is involved, and most preferably 0% manual labor is involved.

The phrase "Base Geometry file" as is used herein means a data file that contains a three-dimensional (3D) representation of a three-dimensional object, or part, that is being projecting on by an optical projector. For example, if a user wanted to place fasteners into a skin for an airplane door, the Base Geometry file would be the 3D representation of this door. This data file is typically output from a CAD computer software program, and is employed to in the calibrations that are performed by the systems and methods of the invention.

The terms "bolt" and "screw" as are used herein refer to a type of a fastener that is usually characterized by a helical ridge, known as an external thread or thread, that is typically wrapped around a cylinder, and often may operably engage, or be connected, with a "nut plate," and may also have a "shank" having a smooth section, which typically should not engage with a "nut plate." Some screw threads are designed to mate with a complementary thread, known as an internal thread, often in the form of a nut or an object that has the internal thread formed into it. Other screw threads are designed to cut a helical groove in a softer material as the screw is inserted. The most common uses of screws are to hold objects together and to position objects. Often screws have a head, which is a specially formed section on one end of the screw that allows it to be turned, or driven, using a tool such as a screwdriver or wrench (manual or electrical). The head is often larger than the body of the screw, which keeps the screw from being driven deeper than the length of the screw and to provide a bearing surface. There are exceptions; for instance, carriage bolts have a domed head that is not designed to be driven; set screws have a head that is smaller than the outer diameter of the screw; and J-bolts do not have a head and are not designed to be driven. The cylindrical portion of the screw from the underside of the head to the tip is known as the shank, and it may be partially (greater than 0% but less than 100%) or fully (100%) threaded. The majority of screws are tightened by a clockwise rotation, which is termed a right-hand thread. Screws with left-hand threads are typically used less often, but may used, for example, when the screw will be subject to anticlockwise forces (which would work to undo a right-hand thread).

The term "bushing" as is used herein means a fixed or removable cylindrical metal lining used to constrain, guide, or reduce friction for a shaft that slides (or otherwise moves) within it.

The term "byte" as is used herein refers to a unit of memory in a memory location or device of a computer. The storage capacity of a memory location or device, such as a main or secondary memory (hard disks, floppy disks, CD-ROMs, and the like) of a computer, is the total number of bytes that it can hold. Some computers can store thousands or millions of bytes. A large main memory permits large programs, or many programs, to run. On many personal computers, the hard drive can usually store between 40 GB and 120 GB. The table below shows the relation between bytes, number of bytes and symbols used to represent them.

| Unit | Symbol | Number of Bytes |
|---|---|---|
| Byte | None | $2^0 = 1$ |
| Kilobyte | KB | $2^{10} = 1024$ |
| Megabyte | MB | $2^{20} = 1,048,576$ |
| Gigabyte | GB | $2^{30} = 1,073,741,824$ |
| Terabyte | TB | $2^{40} = 1,099,511,627,776$ |

The terms "CAD" and "Computer-Aided Design" as are used herein mean the use of a computer software tool for a design of three-dimensional and other objects, or parts, real or virtual. CAD often involves more than just shapes, and CAD may be used to define assembly and dimensional manufacturing processes, both manual and automated. The output of CAD often must convey also symbolic information such as materials, processes, dimensions and tolerances according to application-specific conventions. CAD may be used to design curves and figures in two-dimensional (2D) space or curves, surfaces, or solids in three-dimensional (3D) objects. Additional information about CAD is present in G. Farin, *A History of Curves and Surfaces in CAGD, Handbook of Computer Aided Geometric Design* (North Holland, ISBN 0 444 51104-0). CAD software is commercially available from sources that are known by those having ordinary skill in the art.

The terms "CAE" and "Computer-Aided Engineering" as are used herein refer to computer software tools that are used by the electronic design automation industry to have computers design, analyze and/or manufacture products and processes. The software can analyze designs that have been created in a computer or that have been created elsewhere and entered into the computer. Different kinds of engineering analyses can be performed, such as structural analysis and electronic circuit analysis. CAE includes CAD (computer-aided design) for the use of a computer for drafting and/or modeling designs, and CAM (computer-aided manufacturing) for the use of computers for managing manufacturing processes. CAE software is commercially available from sources that are known by those having ordinary skill in the art.

The term "calibrate" as is used herein means to adjust, align, standardize, to make corrections in and/or to correlate. For example, in the optical assembly systems and methods of the invention, the following may be correlated into one common coordinate system: (i) one or a plurality of optical projectors: (ii) one or a plurality of text, images and/or symbols being projected by the optical projectors; and (iii) one or a plurality of three-dimensional objects, or parts thereof, being projected upon by the optical projectors, such as three-dimensional objects, or parts, that are being manufactured. For example, an instrument, device, apparatus or machine, or a component thereof, may be standardized by checking, adjusting or determining by comparison with a standard the deviation from the standard so as to ascertain the proper correction factors. Independent entities that can perform such calibrations for a variety of instruments, devices, apparatuses and machines are known by those having ordinary skill in the art, such as Davis Calibration Labs (Atlanta, Ga.) and Qual Tech Labs, Inc. (Exton, Pa.). As is also known by those having ordinary skill in the art, calibration software may also be employed to perform calibrations for a variety of instruments, devices, apparatuses and machines, and is commercially available from known sources, such as CAMA Software (Trabuco, Calif.), Fluke Corporation (Everette, Wash.) and ProCalV5 (West Chester, Pa.).

The terms "CAM" and "Computer-Aided Manufacturing" as are used herein refer to a software tool employed for an integration of designing and/or manufacturing by computer. Generally, the electronic image of products designed in CAD programs are translated into a numerical control programming language, which generates the instructions for the machine that makes it (numerical control). CAD designs are also generally converted into slices for rapid manufacturing. CAM software is commercially available from sources that are known by those having ordinary skill in the art.

The term "camera" as is used herein means a digital (or other suitable) camera and/or video camera that has an ability to capture and transfer relatively high resolution digital (or other) images to a computer for analysis by the computer system software including, but not limited to, those that are commercially available from Point Grey Research, Inc. (Richmond. BC, Canada) for machine vision, industrial imaging and computer vision applications, such as IEEE-1394 (FireWire) and USB 2.0 imaging, stereovision and spherical vision cameras (Chameleon, Dragonfly2, Dragonfly Express, Firefly MV, Flea2, Grasshopper, ProFUSION 25, Bumblebee2, Bumblebee XB3, Ladybug 2, Ladybug3, and the like). A variety of camera catalogs, computer software programs and software development kits, often for use with such cameras and corresponding computers, are present on the Point Grey Research, Inc. and other web sites.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The phrases "circuit board" and "card" as are used herein refer to a board that is typically insulated on which one or a plurality of typically interconnected circuits and/or electronic components, such as microchips, are, or may be, mounted and/or etched. Each chip often may contain from a few thousand up to hundreds of millions of transistors. The board is typically made of layers, typically from about 2 to about 10, that interconnect electronic components mounted on the board via copper (or other) electronically conductive pathways according to a circuit diagram of a functional subassembly for an electronic or radio apparatus. The main printed circuit board (PCB) in a system is called a "system board" or "motherboard." while smaller ones that plug into the slots in the main board are called "boards" or "cards," which expand a computer's ability to work with a peripheral device whose controlling electronics are not build into the motherboard. There are a wide variety of different known methods for making printed circuit boards including, but not limited to, photochemical, photoelectrochemical and offset-electrochemical methods. The methods typically differ in the means of producing the conductive coating or the form in which the pattern of the printed conductors is realized. More information about circuit boards and electronics generally is present in the books Douglas Brooks, *Signal Integrity Issues and Printed Circuit Board Design* (Prentice Hall, ISBN-10: 013141884X, 2003), R. Khandpur, *Printed Circuit Boards: Design, Fabrication and Assembly* (McGraw-Hill Electronic Engineering, McGraw-Hill Professional, 1st Edition, ISBN-10: 007146204, 2005) and Mark I. Montrose, *Printed Circuit Board Design Techniques for EMC Compliance: A Handbook for Designers* (IEEE Press Series on Electronics Technology) (Wiley-IEEE Press, 2nd Edition, ISBN-10: 0780353765, 2000).

The term "compiler" as is used herein means one or more computer program (alone or in a set) that transform human readable source code of another computer program into the machine readable code that a CPU can execute or source code written in a computer language into another computer language (the machine code or target language, which often has a binary form known as object code). The most common reason for wanting to transform source code is to create an executable program. For many compilers, source code is translated directly into a particular machine language. Java source code, for example, may be converted using a Java compiler into Java byte code, and another compiler could be employed, for example, to convert the Java byte code into a particular machine language for execution on a particular computer.

The term "complex" as is used herein means relatively complicated, and including interconnected parts, units, elements and/or things (usually many, and often scores, hundreds, thousands or even millions). Those having ordinary skill in the art may readily determine whether or not a particular assembly is complex. If a particular assembly requires written instructions and/or drawings to assemble it, then it can be considered to be complex. If, on the other hand, a person having ordinary skill in the particular art of the assembly can assemble it without referring to any documentation or drawings, then it can be considered to be non-complex.

The terms "computer" and "programmable computer" as are used herein mean a programmable, preferably multipurpose, electronic machine that accepts data, such as raw data, facts and/or figures, and processes, transforms and/or manipulates the data into information that can be used. It is typically operated under the control of instructions that are stored in its own memory unit, which can accept and store data (e.g. data entered using a keyboard), perform arithmetic and logical operations on that data without human intervention (e.g. process data into information) and produce output from the processing (e.g. view information on a screen). A computer may be a stand-alone unit or may consist of a plurality of interconnected units that are operably connected with each other.

The phrase "computer network" as is used herein means a plurality of interconnected computers. A computer network generally allows computers to communicate with each other and/or to share resources and information. Networks may be classified according to a wide variety of characteristics. Computer networks can also be classified according to the hardware and software technology that is used to interconnect the individual devices in the network, such as Optical fiber, Ethernet, Wireless LAN, HomePNA, Power line communication or G.hn. Ethernet generally uses physical wiring to connect devices, and frequently deployed devices include hubs, switches, bridges and/or routers. Wireless LAN technology is generally designed to connect devices without wiring, and use radio waves or infrared signals as a transmission medium. ITU-T G.hn technology generally uses existing home wiring (coaxial cable, phone lines and/or power lines) to create a high-speed (generally up to 1 Gigabit/s) local area network.

The phrase "computer programmer" as is used herein means a person or entity that designs, writes, develops and/or tests computer programs, or the like.

The phrase "computer programming" as is used herein means a process of writing, testing, debugging/troubleshooting and/or maintaining source code of computer programs. This source code is written in a programming language, and the code may be a modification of an existing source or something completely new. The purpose of programming is to create a program that exhibits a certain desired behavior (customization). The process of writing source code may require, depending upon the circumstances, knowledge of the application domain, specialized algorithms and/or formal logic.

The phrase "computer software" as is used herein refers to computer programs and/or a series of instructions that may be installed on a computer, and that the computer's hardware executes, generally one after another. It generally consists of lines of code written by computer programmers that have been compiled into a computer program. Software programs are generally stored as binary data (a 2-digit numerical system used by computers to store data and compute functions that consists of ones and zeros) that is copied to a computer's hard drive when it is installed. Since software is virtual and does not take up any physical space, it is generally easier, and often less expensive, to upgrade than computer hardware. Computer software is often continuously upgraded and improved. CD-ROMs, DVDs and other types of media can be used to distribute software. When one purchases a software program, it usually comes on a disc, which is a physical means for storing the software. Many software programs require that one first install them on a computer before using them. For example, if one purchases Microsoft Office, it needs to be installed on a computer before one can run any of the included programs, such as Word or Excel. The software can be installed from a CD or DVD, an external hard drive, or from a networked computer. A software program or software update can also often be installed using a file that is downloaded from the Internet. Installing a software program generally writes the necessary data for running a program on a computer's hard drive. Often the installer program will decompress the data that is included with the installer immediately before writing the information to a hard drive. Software updates, which are often downloaded from the internet, generally work the same way. When an update is run, the installer file generally decompresses the data, and then updates the correct program or operating system. Installing software usually involves double-clicking an installer icon, and then clicking "I Agree" when the license agreement pops up. A computer operator may have to choose what directory on a hard disk that the software should be installed in, but often the installer will even choose that for the computer operator. Some software can be installed by simply dragging a folder or application program onto a hard drive.

The term "computer port" as is used herein refers to a physical or wireless connection on a programmable computer, an optical projector and/or another peripheral device that functions to provide communication between two or more instruments or devices, usually by one or more communication cables being inserted into one or more of the ports present on the instruments or devices or wirelessly (using, for example. Wi-Fi, Bluetooth, 4610X and/or the like) in a manner that information (including data) may be transferred from one instrument or device to the other, or vice versa, or between each of the devices or instruments.

The phrase "computer usable medium" as is used herein means any portable or non-portable medium in which computer readable program code can be physically embodied, including, but not limited to, an optical disk, a CD, a CD-ROM, a CD-R, a floppy disc, a drive, a hard drive, a DVD, a USB memory key, a SD memory cards, or the like.

The phrase "configure" as is used herein means to design, arrange, set up and/or shape, generally with a view to specific applications or uses.

The phrase "configurator" as is used herein means a software application or tool that typically is employed to design products that fulfill or match the requirements, desired or needs of customers (or others).

The term "coordinate system" as is used herein means schemes for locating points in a given space by means of numerical quantities specified with respect to some frame of reference. These quantities are the coordinates of a point. To each set of coordinates there corresponds just one point in any coordinate system, but there are useful coordinate systems in which to a given point there may correspond more than one set of coordinates. A coordinate system is a mathematical language that is used to describe geometrical objects analytically that is, if the coordinates of a set of points are known, their relationships and the properties of figures determined by them can be obtained by numerical calculations instead of by other descriptions. It is the province of analytic geometry, aided chiefly by calculus, to investigate the means for these calculations. The most familiar spaces are the plane and the three-dimensional Euclidean space. In the latter, a point P is determined by three coordinates (x, y, z). The totality of points for which x has a fixed value constitutes a surface. The same is true for y and z, so that through P them are three coordinate surfaces. The totality of points for which x and y are fixed is a curve and through each point there are three coordinate lines. If these lines are all straight, the system of coordinates is said to be rectilinear. If some or all of the coordinate lines are not straight, the system is curvilinear. If the angles between the coordinate lines at each point are right angles, the system is rectangular. A Cartesian coordinate system is constructed by choosing a point O designated as the origin. Through it three intersecting directed lines OX, OY, OZ, the coordinate axes, are constructed. The coordinates of a point P are x, the distance of P from the plane YOZ measured parallel to OX, and y and z, which are determined similarly. Usually the three axes are taken to be mutually perpendicular, in which case the system is a rectangular Cartesian one. A similar construction can be made in the plane, in which case a point has two coordinates (x, y). A polar coordinate system is constructed in the plane by choosing a point O called the pole and through it a directed straight line, the initial line. A point P is located by specifying the directed distance OP and the angle through which the initial line must be turned to coincide with OP in position and direction. The coordinates of P are (r, $\theta$). The radius vector r is the directed line OP, and the vectorial angle $\theta$ is the angle through which the initial line was turned, + if turned counterclockwise, − if clockwise. Spherical coordinates are constructed in three-dimensional Euclidean space by choosing a plane and in it constructing a polar coordinate system. At the pole O a polar axis OZ is constructed at right angles to the chosen plane. A point P, not on OZ, and OZ determine a plane. The spherical coordinates of P are then the directed distance OP denoted by p, the angle $\theta$ through which the initial line is turned to lie in ZOP and the angle $\phi$=ZOP. Cylindrical coordinates are constructed by choosing a plane with a pole O, an initial line in it, and a polar axis OZ, as in spherical coordinates. A point P is projected onto the chosen plane. The cylindrical coordinates of P are (r, $\theta$, z) where r and $\theta$ are the polar coordinates of Q and z=QP). By means of a system of equations, the description of a geometrical object in one coordinate system may be translated into an equivalent description in another coordinate system. Additional information about coordinates is present in Shigeyuki Morita et al., *Geometry of Different Forms* (American Mathematical Society, ISBN 0821810456 (2001)); Fletcher Dunn et al. *3D Math Primer for Graphics and Game Development* (Jones & Bartlett Publishers, 2002, ISBN 1556229119, ISBN 9781556229114), A. V. Durrant, *Vectors in Physics and Engineering* (Chapman and Hall, 1996, ISBN 0 412 62710 8); Vincent Pisacane, *Fundamentals of Space Systems* (2nd Edition, Oxford University Press, 2005, ISBN 13-978-0-19-516205-9, ISBN 0-19-516205-6); and Paul Martz, *OpenG Distilled* (1st Edition, Addison Wesley, 2006, ISBN 0321336798, ISBN 9780321336798).

The term "controller" as is used herein means a device that sends information back and forth from a CPU and main memory to peripherals. Each device generally has its own way of formatting and sending data, and part of the controller's job is to handle this.

The term "correlate" as is used herein means a structural, functional, quantitative and/or qualitative correspondence and/or relationship between two or more objects, data sets, information and/or the like, preferably where the correspondence or relationship may be used to translate one or more of the two or more objects, data sets, information and/or the like so to appear to be the same or equal.

The terms "CATIA" and "Computer Aided Three-Dimensional Interactive Application" as are used herein refer to a multi-platform CAD/CAM/CAE commercial software suite. It was developed by Dassault Systemes (Vélizy-Villacoublay, Prance), and is commercially available from sources known by those having ordinary skill in the art, such as IBM Corporation (Armonk, N.Y.).

The term "countersink" as is used herein means a hole having its top part enlarged, so that the head of a screw or bolt (or other fastener) will lie flush with, or below, the surface.

The phrase "countersink depth" as is used herein means the depth of a countersink relative to a skin (or other) surface, for example, of a workpiece or other object, or part thereof.

The phrase "countersink depth gage" as is used herein means a measurement apparatus of the invention that measures very accurately and rapidly the depth of a countersink relative to the skin (or other) surface, for example, of a workpiece or other object, or part thereof, through which it typically penetrates.

The phrase "data transfer device" as is used herein means a peripheral, such as a modem, NIC (network interface card), wireless interface such as Zigbee or WiFi, that allows information to be sent and received between computers and/or data collection devices. A modem permits information to be sent across a telephone line, for example, at a rate of 56 kilobits (Kb) per second, or approximately 56,000 bits per second (bps).

The phrase "database engine" as is used herein refers to that part of a database management system (DBMS) that stores and/or retrieves data. Most DBMS's include an Application Programming Interface (API) that enables a computer operator to directly control the engine without going through the DBMS's user interface.

The term "measurement system" as used herein refers to a device, system or method for making a plurality of linear measurements. This may be done directly by use of a linear optical encoder, laser interferometer, RF interferometer, time-of-flight laser pulse, time-of-flight radar pulse, LVDT (linear variable differential transformer), magnetic strip, or the like; or by indirect means by use of a rotary measurement system such as a rotary optical encoder or synchro coupled with a device such as a rack- and pinion assembly to convert linear motion to rotary motion, all of which are known by those having ordinary skill in the art and are available from sources that are described herein or that are known by those having ordinary skill in the art.

The term "device" as is used herein means a unit of hardware that generally is outside or inside the case or housing for the essential computer (processor, memory and data paths), and that is capable of providing input to the essential computer, of receiving output, or of both. It may include, for example, keyboards, mouses, display monitors, hard disk drives, CD-ROM players, printers, audio speakers and microphones, projectors, cameras and other hardware units, which are known by those having ordinary skill in the art. Some devices, such as a hard disk drive or a CD-ROM drive, while physically inside the computer housing, are considered devices because they are separately installable and replaceable. With notebook and smaller computers, devices tend to be more physically integrated with the "non-device" part of the computer. The units of a computer to which the term device is generally not applied include the motherboard, the main processor and additional processors, such as numeric coprocessors, and random access memory (RAM). The term peripheral is sometimes used as a synonym for device or any input/output unit.

The phrase "Diameter Gage" as is used herein means a measurement apparatus of the invention that measures very accurately and rapidly the diameter of a hole that is present, for example, in a skin, a workpiece, another object, or part thereof, or components of any of the foregoing.

The term "dimension" as is used herein in connection with a space or object means the minimum number of coordinates that are needed to specify each point within it. A line has a dimension of one because only one coordinate is needed to specify a point on it. A surface, such as a plane, or the surface of a cylinder or sphere, has a dimension of two because two coordinates are needed to specify a point on it (for example, to locate a point on the surface of a sphere, both its longitude and latitude are required). Cubes, cylinders and spheres, for example, are three-dimensional because three coordinates are needed to specify a point on them (x, y and z).

The terms "display," "display screen," "monitor," "computer screen" and "projector" as are used herein, depending upon the context, mean the various devices that can display, show and/or illustrate a computer's user interface and open programs, allowing the user to interact with the computer, typically using a keyboard and mouse, such as an LCD monitor, or data, information and/or graphics, or a display itself (i.e., that which is shown on a screen or monitor). Other known devices may also include display-type screens and/or displays.

The term "distorted" as is used herein means improper, not sharp or unclear in appearance and/or a change in a shape of an image, such as text, images and/or symbols (as opposed to being proper, sharp, clear and same in shape). For example, three-dimensional text, images and/or symbols appear in a distorted manner when projected onto a three-dimensional object, or part, when the systems and methods of the present invention are not employed.

The terms "dock" and "docking stating" as are used herein mean a cradle for a portable device that serves to charge the unit and/or connect it to other sources or destinations. For example, it may be a base station for a laptop computer that turns the portable computer into a desktop system. It generally uses a large plug and socket to quickly connect the laptop, which duplicates all the cable lines for the monitor, printer, keyboard, mouse and the like. The docking station typically has one or two slots for expansion boards, and may house speakers and other peripherals such as an optical drive.

The phrase "Document Explorer" as is used herein refers to software that functions to access and/or display local and/or online Help. Microsoft Document Explorer, for example, has its own Help documentation that may be accessed by opening a Commerce Server 2007 Help system, clicking the "Help"

menu, and then clicking "Help on Help." Document Explorer typically provides a table of contents, an index, a full-text search and Help favorites for bookmarking topics, so that a computer operator may easily find information. When the computer operator browses the table of contents or uses the index, local Help is generally accessed. When the operator uses the full-text search feature, there becomes an option of searching local and online content. Using Document Explorer, an operator can see the table of contents or search results while viewing a Help topic. A "Help Favorites" tab may permit an operator to relatively quickly display topics and searches that are referred to frequently.

The term "download" as is used herein means to transfer (data or programs) from a server, host computer or other source to another computer or device.

The phrase "downstream" as is used herein means leading towards the aft end of an apparatus of the present invention, an object, or part thereof, of any other structure or device discussed herein, or of any component of any of the foregoing. Alternately, and depending upon the context, which may be determined by those having ordinary skill in the art, it means a process that occurs subsequent to another process. For example, if information is typed into a keyboard and that information is subsequently stored in some storage medium, the typing would be considered an upstream process of the storage, and the storage would be a downstream process of the typing.

The phrase "Device Drivers, Diagnostics and Technical Information" as is used herein means a program that serves as a resource for device drivers, diagnostics and technical information in the event that they are required or desired to resolve a problem with a computer system. It is generally compatible with a variety of different computers, and is supported by Dell Technical Support when it is provided by Dell Inc., and employed with a Dell system.

The terms "driver" and "device driver" as are used herein mean a program that controls a particular type of device that is generally attached to a computer. There are device drivers for printers, displays, CD-ROM readers, diskette drives and the like, and many device drivers may be built into an operating system or other computer-related product. However, if a new type of a device is subsequently purchased that such operating system did not anticipate, a new device driver may need to be installed. A device driver essentially converts the more general input/output instructions of an operating system to messages that the device type can understand. Some Windows programs are virtual device drivers, and these programs may interface with the Windows Virtual Machine Manager. There is usually a virtual device driver for each main hardware device in a system, including the hard disk drive controller, keyboard, and serial and parallel ports. They are generally used to maintain the status of a hardware device that has changeable settings. In Windows operating systems, a device driver file usually has a file name suffix of DLL or EXE, and a virtual device driver usually has the suffix of VXD.

The phrase "Driver Download Manager" as is used herein means a functionality which is available, for example globally across the support Dell dot com web site, to facilitate a downloading of files, for example, from Dell. Inc. Generally, the time taken to download files using this tool is significantly shorter than would occur otherwise, often up to a 30-40% reduction in time, depending upon the internet connectivity. It also may include one or more mechanisms to facilitate the process of downloading files, for example, from the foregoing web site. For example, it may permit a computer operator to pause and resume downloads, with the progress of a download being capable of being saved via an icon on the computer, which can often be restarted at any time. It may also permit the computer operator to restart a download in the event of an interruption or termination of an internet connection during a download, as the Driver Download Manager may save the progress. Additional information about Driver Download Managers is present on the foregoing web site.

The phrase "electromagnetic field" as used herein means a physical field that is produced by electrically charged objects, and affects the behavior of charged objects in the vicinity of the field.

The phrase "emulator" as is used herein means a hardware, software or a combination of the two that enables a computer to act like another computer, and run applications written for that computer. It may be, for example, a hardware add-on that actually contains an instruction execution module for the emulated computer or software that provides a translation layer from the emulated computer to the computer it is running in. The emulator may generally translate machine language, calls to the operating system or both.

The term "energy" as is used herein mean a physical quantity that describes the amount of work that can be performed by a force, an attribute of objects and systems that is subject to a conservation law. Different forms of energy include kinetic, potential, thermal, gravitational, light, sound, elastic and electromagnetic energy, with the forms of energy often named after a related force, and can be expressed in joules or ergs. According to the principle of the conservation of energy, any form of energy can be transformed into another form, but the total energy always remains the same.

The phrases "Enterprise software" and Enterprise application software" as are used herein mean software that is intended to solve an enterprise problem, rather than a departmental problem, and is often written using an Enterprise Software Architecture. Large enterprises often attempt to build enterprise software that models the entire business enterprise and/or is the core Information Technology (IT) system of governing the enterprise and the core of communication within the enterprise. As business enterprises have similar departments and systems in common, enterprise software is often available as a suite of programs that have attached enterprise development tools to customize the programs to the specific enterprise. Enterprise level software is software which provides business logic support functionality for an enterprise, typically in commercial organizations, which aims to improve the enterprise's productivity and efficiency. Services that are provided by enterprise software are typically business-oriented tools such as online shopping and online payment processing, interactive product catalogue, automated billing systems, security, content management, CRM, ERP, Business Intelligence, HR Management, Manufacturing, EAI, Enterprise Forms Automation and the like. Characteristics of enterprise software are performance, scalability and/or robustness. Enterprise software typically has interfaces to other enterprise software (for example LDAP to directory services) and is centrally managed. Enterprise software is often designed and implemented by an Information Technology (IT) group within an enterprise, but it may also be purchased from an independent enterprise software developer, that often installs and maintains the software for their customers. Another model is based on a concept called on-demand software, or Software as a Service. The on-demand model of enterprise software is made possible through the widespread distribution of broadband access to the Internet. Software as a Service vendors generally maintain enterprise software on servers within their own enterprise data center, and then provide access to the software to their enterprise customers via the Internet. Enterprise software is often categorized by the business function that it automates, such as accounting software or sales force automation software. The are enterprise systems devised for particular industries, such as manufacturing enterprises. Enterprise application software is application software that often performs business functions such as accounting, production scheduling, customer information management, bank account maintenance, and the like. It is frequently hosted on servers, and generally simultaneously provides services to a large number of enterprises, typically over a computer network. This is in contrast to the more common single-user software applications, which generally run on a user's own local computer and serve only one user at a time.

Figure 1:
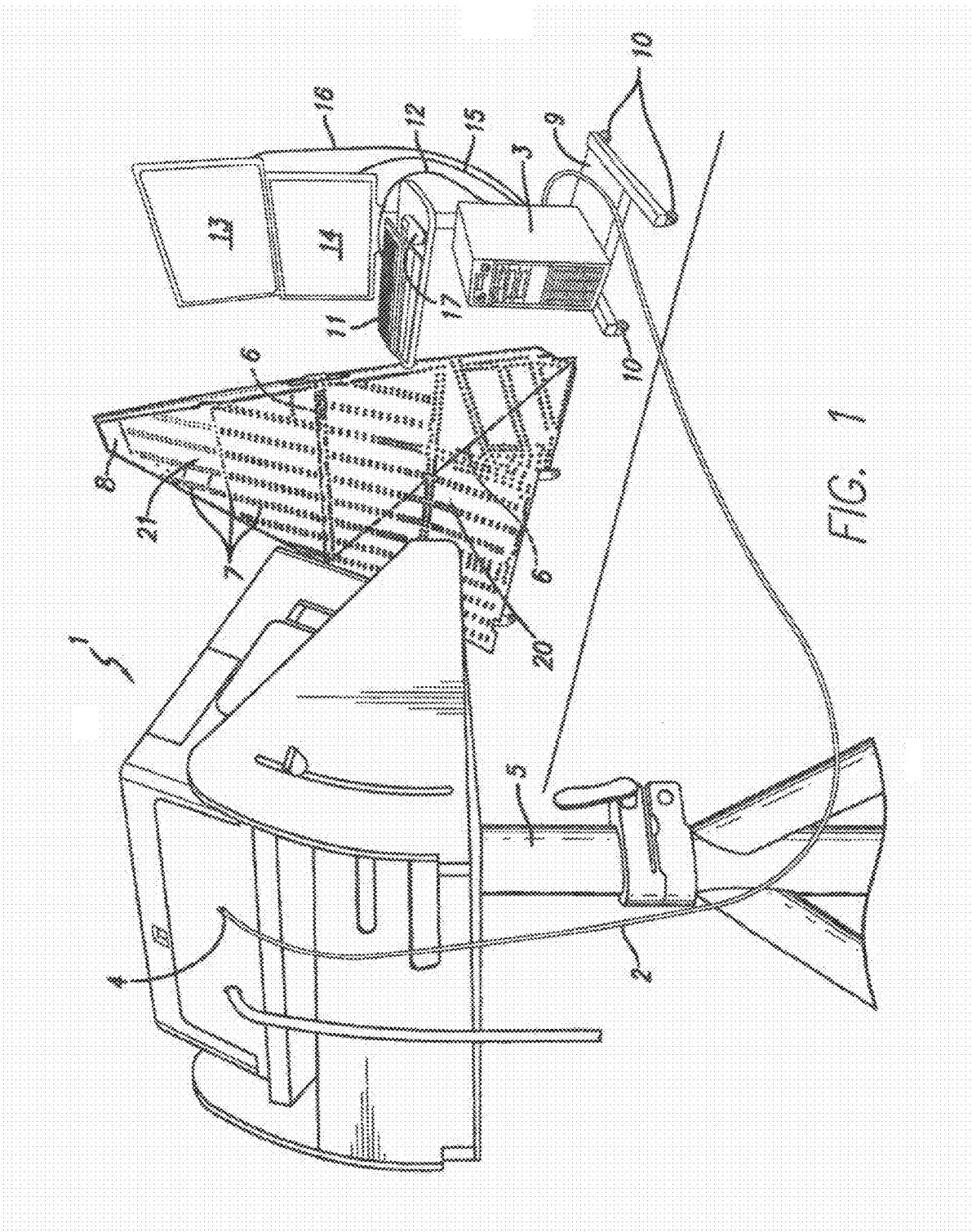
FIG. 1 is an illustration of an optical projection system for use in assembling, manufacturing or producing a three-dimensional workpiece or other object, or part thereof, and shows an optical projector that is operably connected with a computer using a video cable, and a three-dimensional object (airplane wing) that is being manufactured and projected upon by the optical projector.

The term "exterior" as used herein means a part or surface that is, or is facing, outside (away from the interior). For example, FIG. 1 shows one of the exterior surfaces of an airplane wing being assembled.

The phrase "executable file" as is used herein generally means a sequence of subroutine calls that cause a computer to perform indicated tasks according to encoded instructions, as opposed to a file that only contains data.

The phrase "far end" as used herein in relation with a fastener hole (or any other item, object, part, component or the like) means that end that is the farthest away. For example, a probe of a measuring apparatus of the invention may initially be inserted into a near end (generally closest to the operator) of a fastener hole and subsequently extend completely through the hole and out through its far end.

The term "fastener" as is used herein, depending upon the context, which may be determined by those having ordinary skill in the art, means an object, such as a screw, bolt, nail, pin, rivit, cable, clamp, connection, coupling, dowel, hook, joint, keeper, key, latch, lock, lug, nut, seam or other hardware device or apparatus, or the like, or a substance, such as glue (or another adhesive), tape or the like, that may be used to physically or mechanically attach, join, affix, couple or connect two or more items, objects, parts thereof, components, materials and/or the like together, such as two or more parts of a workpiece or two or more parts of a measuring apparatus of the invention. Depending upon the type of fastener employed, a fastener can, in some situations, be paired with a nut, such that manufactured or assembled parts may be sandwiched between a head of the fastener and the nut itself. Other alternative methods of joining materials together include crimping, welding, soldering, brazing, cementing and/or the use of force, such as with magnets, vacuum and/or friction.

The phrase "Fastener Flushness Gage" as is used herein means a measurement apparatus of the invention that measures very accurately and rapidly the surface of a fastener head relative to the skin (or other) surface, material, workpiece, structure or object, or parts thereof, through which the fastener penetrates.

The term "file" as is used herein means a set of related or other records (written, electronic or otherwise) that are kept together.

The phrase "forward end" as is used herein in relation with an apparatus of the invention, or with any of the components thereof, means that end of the apparatus, or of a component thereof, when it is positioned in the manner shown in FIG. 24, that is closer to the location at which the probe is present (or resides). When viewing FIG. 24 of the accompanying drawings, the forward end will be the left end of the apparatus, or of any of the components thereof. When viewing an object, or part thereof, or any other structure or device discussed herein, or any component of an object or part thereof, the phrase "forward end" refers to the left end thereof when viewing the same from the front. For example, in FIG. 1, the "forward end" of the airplane wing shown therein is the left end of the airplane wing.

The phrase "frequency" as is used herein means the number of occurrences of a repeating event per unit of time. The period is the duration of one cycle in a repeating event, so the period is the reciprocal of the frequency. Frequency has an inverse relationship to the concept of wavelength, and is inversely proportional to wavelength λ (lambda). The frequency f is equal to the phase speed v of a wave divided by the wavelength λ of the wave:

$$f = \frac{v}{\lambda}.$$

The term "graphics card" as is used herein means a mechanical device that is built into, or added to, a computer and enables a user to see graphics and/or video, preferably faster and/or clearer, on the computer.

The phrase "grip length" as is used herein in connection with a fastener typically means the smooth part of the fastener shank (i.e., that part that does not have threading), with a shank often having both a smooth section and a threaded section. It is important for the integrity of a structure that a fastener in connection with, or relative to, a particular fastener hole have a shank having a correct length for both the smooth section and the threaded section thereof (when it has both types of sections).

The phrase "Gap Gage" as is used herein means a measurement apparatus of the invention that measures very accurately and rapidly the linear spacing between two adjacent, or substantially adjacent, panels, materials, workpieces, structures or objects, or parts thereof.

The phrases "grip gage" and "grip gun" as are used herein refers to a device or instrument that can function to measure pre-drilled or other fastener hole depths, for example, in a component part of a three-dimensional object, or part, that is being assembled or otherwise manufactured, to enable a user to determine proper bolt and/or fastener lengths for the hole. A corresponding dual use scale can measure depth of holes in 1/16" increments to 2½", and + grip length of fasteners in 1/16" increments to 2½". Grip gages may be operably connected with computers using, for example, serial ports, USB cables, Ethernet cables, or the like in order to communicate measured data back to a host (or other) computer (or to otherwise supply data and/or other information to the computers, and/or receive data and/or other information from the computers). Grip gages are commercially available from sources that are known by those having ordinary skill in the art, such as AveryTools (Fort Worth, Tex.).

The phrase "Grip Gage, Reaction Type" as is used herein means a measurement apparatus of the invention that measures very accurately and rapidly the depth of a hole which completely penetrates through a material (100% penetration), workpiece, structure or other object, or part thereof, that is being measured.

The phrase "Grip Gage, Plunge Type" as is used herein means a measurement apparatus of the invention that measures very accurately and rapidly the depth of a hole which does not completely penetrate through a material (more than 0%, but less than 100%, penetration), workpiece, structure or other object, or part thereof, that is being measured. This is commonly a hole with a "nut-plate" attached.

The term "hard disk" as is used herein means a part of a unit (a "disk drive." "hard drive," or "hard disk drive") that stores and provides relatively quick access to large amounts of data on an electromagnetically charged surface, or set of surfaces. Today's computers typically come with a hard disk that contains several billion bytes (gigabytes) of storage (i.e. the place where data is held in an electromagnetic or optical form for access by a computer processor).

The phrase "hard drive" as is used herein means a unit that stores data on a computer. It generally houses a hard disk, where all of the computer files and folders are generally physically located. A typical hard drive can hold over 100 GB of data, and other hard drives can hold more data. The data is generally stored on a stack of disks that are mounted inside of a solid encasement. These disks generally spin extremely fast (often at either 5400 or 7200 RPM), so that data can be accessed immediately from anywhere on the drive. The data is stored on the hard drive magnetically, so it stays on the drive even after the power supply is turned off. In order to install new software on a computer, a user often needs to run an installer program. This program unpacks compressed data included with the installer and writes new information to a hard drive. While some installers do not use compressed data, most use some level of compression since it reduces the size of the files included with the installer. This is especially helpful when downloading programs or software updates from the Internet. RAID (Redundant Array of Independent (or Inexpensive) Disks) is a category of disk drives that employ two or more drives in combination for fault tolerance (an ability of a system to respond gracefully to an unexpected hardware and/or software failure) and performance. RAID disk drives are used frequently on servers, but are not generally necessary for personal computers. RAID allows a user to store the same data redundantly (in multiple paces) in a balanced way to improve overall performance.

The phrase "hardware" as is used herein means a physical aspect of computers, and distinguishes the "box" and the electronic circuitry and components of a computer from the program that is put into it to make it perform different functions. Hardware includes not only the computer proper (central processing unit, input/output devices, main memory, secondary memory devices, chips, boxes, wires, keyboards, speakers, disks, printers, mice, monitors and/or the like), but also the cables, plugs, connectors, power supply units and peripheral devices, such as the keyboard, mouse, audio speakers and printers.

The term "head" as is used herein in connection with a fastener, such as a nail or bolt, means a projection, weight, fixture or the like that is typically present or located at one end of an elongated object.

The phrase "header" as is used herein means: (i) a unit of information that precedes a data object; or (ii) part of a data packet that contains transparent information about the file or the transmission. The header can generally be accessed only by the operating system or by specialized computer programs.

The term "hole" as is used herein means an area or portion of an object (or part, surface or skin) that is partially (more than 0%, but less than 100%), substantially or fully (100%) void of material, regardless of shape or size, such that light or other objects, for example, a measuring probe, can either enter into it or pass completely through it. Holes in objects may be pre-drilled (or otherwise drilled or formed), and may be round, oval, slot-shaped, or in any other shape. Pre-drilled fastener holes are shown in the accompanying drawings.

The term "housing" as is used herein means something, such as a shaped piece or portion of metal, that covers, encloses, protects, supports and/or the like, such as an enclosing frame in which a shaft revolves, a bracket or box for holding or protecting, for example, one or a plurality of mechanical, electrical, computer-related and/or other types of parts, or components, or portions thereof, or the like.

The phrase "identity protection" as is used herein means a protection that is in addition to or enhanced, in comparison with conventional security software. It often may keep a computer safe from online crime, including identity theft. It is often specifically designed to help prevent thieves from using carefully-targeted attacks to steal passwords, bank account details, credit card numbers and other digital valuables. It often uses a technology called behavioral analysis to make sure that all of the programs running on a computer are operating the way that they should. Typically, if it spots something suspicious that could indicate an attempted ID theft attack, it shuts that activity down, preventing any possible theft from occurring. It generally may be used in addition to other security software programs from the same or different vendors, and runs alongside most or all other computer programs to keep a computer safer when it is online.

The phrase "images" as is used herein includes pictures, drawings, illustrations, graphics, and/or the like, or any combination thereof.

The term "information" as is used herein includes, but is not limited to, text, data, symbols, images, pictures, drawings, illustrations, other graphics and/or the like, for example, in the form of letters, numbers, symbols, words, phrases, sentences, paragraphs, pages, documents and/or the like.

The phrase "input device" as is used herein means any machine, device or instrument that can be used in connection with the systems and methods of the invention to perform a particular desired function, such as measuring one or more features of a three-dimensional object (or part thereof) being assembled or otherwise manufactured, preferably in a manner that permits one or more computers employed in the systems and methods to interface with the input devices, so that they can accept input information from the devices and/or that information can otherwise be transferred or exchanged between the computers and the input devices. Examples of such input devices include, but are not limited to, electronic measurement devices, such as grip gages and depth gages, continuity checkers and/or the like. For example, some of the measurement apparatuses that are described and/or illustrated herein are operably connected with the computers and have an ability to with one squeeze of a user's hand, align their probes into pre-drilled fastener holes, measure the depths of the pre-drilled holes and send the data resulting from such measurements to the computers (or other data collection devices).

The term "install" as is used herein in connection with a software program generally means writing the necessary data for running the program on a hard drive. Often, the installer program will decompress the data included with the installer immediately before writing the information to a hard drive. Software updates, which are often downloaded from the Internet, work the same way. When the update is run, the installer file generally decompresses the data and then updates the correct program or operating system.

The phrase "installer program" as is used herein means a computer program that has an ability to install a new program on a computer or update a program that is currently present on a hard drive. Generally, it can also update or add files to an operating system. Most installers can be run by double-clicking the installer icon and then choosing a folder into which the software should be installed. The installers generally decompress and write the data on the hard drive. Once the installer is finished, the new or updated software can often by used by a computer operator right away. If any system files have been installed, the computer operator may be asked to restart a computer before using the new software (because system files may only be able to be loaded during a computer's boot process).

The phrases "Intel MKL" and "Intel Math Kernel Library" as are used herein refer to a library of highly optimized, extensively threaded math routines for science, engineering, and financial applications that desire or require maximum performance. Core math functions include BLAS, LAPACK, ScaLAPACK, Sparse Solvers, Fast Fourier Transforms, Vector Math, and more. It can perform many of the math calculations that are used to determine how the annotated geometry should be altered based on the results of a calibration or correlation process, and can be used for any software that performs significant mathematical calculations. It is also optimized for Intel processors, so that it will perform these calculations more rapidly.

The term "instantaneously" as is used herein (often with respect to a speed of one or more functions performed by a measurement apparatus of the invention) means occurring or being completed without any perceptible duration of time or delay (by a human being) or at a specific instant in time.

The phrase "intensity" as is used herein means a measure of the time-averaged energy flux. To find the intensity, the energy density (the energy per unit volume) is multiplied by the velocity at which the energy is moving. The resulting vector has the units of power divided by area (W/m$^2$).

The term "interior" as is used herein means a part or surface that is, or is facing, inside (away from the exterior).

The term "Internet" as is used herein means a global network that connects multiple, and possibly millions, of computers together, often permitting exchanges of data, news and/or opinions. Unlike online services, which are generally centrally controlled, the Internet is decentralized by design. Each Internet computer (host) is generally independent. Its operators can choose which Internet services to use and which local services to make available to the global Internet community. There are a variety of ways to access the Internet, including online services such as America Online, and commercial Internet Service Providers.

The term "interpreter" as is used herein is a software program that functions like a compiler, but that performs a translation and execution in short bursts in which a small portion of source code, such as one statement, is translated and executed, and then another small portion of source code, such as a second statement, is translated and executed, and so forth.

The term "Java" as is used herein means one type of computer programming language that can be used to create computer software programs. It is not tied to any particular processor type and, thus, will work on many different types, and makes, of computers. It is typically is used worldwide, and permits software to be easily exchanged and executed via the World Wide Web (WWW or Web). Further, it includes a library of extra software that can be employed when a computer programmer is developing a program. The library permits the programmer to create graphics, communicate over networks, interact with databases, and the like. Typically, Java applications have a similar basic structure including, for example, comments (first few lines of the program that start with the symbols //, and help readers of the code understand the purpose of the program, and what it accomplishes), a class definition (which defines the Java program), a main method (location at which processing commences, with each programming statement (in the form of lines of code) in the main method being executed one at a time in order until the end of the method is reached, and is preceded by the words "class," "public," "static" and "void"), white space (spaces that separate the words and symbols that are used in a program, and include blanks, tabs and newline character), and println method (which prints specified characters to a screen in a character screen, and is enclosed in double quote characters (")). When the program is executed, it calls the PrintIn method to print the first statement, and then the second statement, and so forth. The program terminates with the last statement. Additional information about Java is present in John Lewis et al., *Java Software Solutions*, (2nd Edition, Pearson Education, Inc., 2007, ISBN 0-13-222251-5).

The term "juxtaposed" as is used herein means side by side, substantially side by side or otherwise close or near to one another in space.

The term "laser" as is used herein means a device that emits light through a process known as stimulated emission. Laser light is usually spatially coherent, which means that the light either is emitted in a narrow, low-divergence beam, or can be converted into one with the help of optical components, such as lenses.

The term "lens" as is used herein means a generally transparent optical device used to converge or diverge transmitted light and/or to form images.

The term "library" as is used herein means: (i) a collection of programs or data files; or (ii) a set of ready-made software routines (functions) for programmers. The routines are generally linked into the program when it is compiled.

The term "light" as is used herein means electromagnetic radiation, particularly radiation of a wavelength that is visible to the human eye (generally from about 380 to about 750 nm). Four primary properties of light are intensity, frequency or wavelength, polarization and phase. Light exists in tiny "packets" called photons, and exhibits properties of both waves and particles.

The phrase "linear offset" as is used herein means a spatial disparity between a reference surface and an unknown surface along a straight line that is finite and in this context within the range of the measurement device.

The phrase "lower end" as is used herein in relation with an apparatus of the invention, or an object, or part thereof, or with any other structure or device described herein, or any component of any of the foregoing, means that end thereof that is closest to the floor or ground when viewing the same from the front. For example, when viewing FIG. 24 of the accompanying drawings, the lower end of the measuring apparatus shown therein is the bottom of the trigger of the apparatus (which is shown to be connected with a cable). As another example, in FIG. 1, the "lower end" of the airplane wing shown therein is the end of the airplane wing that appears to be in contact with, or just above, the floor.

The term "lumen" as is used herein is a unit of measurement of the amount of brightness that comes from a light source. Lumens define "luminous flux." which is energy within the range of frequencies that human beings perceive as light. For example, a 100 watt bulb generates 1,200 lumens. An ANSI lumen is a measurement of light that has been standardized by ANSI (American National Standards Institute), and is commonly used to rate the brightness of a data projector. An ANSI lumen rating uses an average of several measurements taken across the face of the light source. A small room typically requires from 200 to 300 ANSI lumens, whereas a large room may require from 400 to 600, and a large auditorium may need 2000 or more.

The term "machined" as is used herein means that a device, apparatus, object, part thereof, component, part, or portion thereof, is produced with the use of a machine. For example, a handle that is machined into a metal housing is a handle that is produced in the housing with the use of a machine (a machine that has the ability to form a handle in metal).

The term "managed software" as is used herein means a collection of software elements that are generally grouped under a logical system. The purpose of a managed software system is to provide a logical container to organize a collection of software elements (database server, web server and the like), and its configuration is largely up to the user.

The term "manipulate" as is used herein in connection with information or data means to move, arrange, maneuver, control manage, negotiate, translate, make adjustments to, handle, transform, influence, overlay, use, alter and/or the like.

The term "manufacture" as is used herein means a production of a product, including, but not limited to all of the various steps that may be required to produce a particular product, such as assembly, measurement and/or quality assurance inspection, and/or the like.

The phrase "manufacturing area" as is used herein means any room (conference room, meeting room, office or the like), theater, plant (assembly plant, manufacturing plant or the like), business facility, line (assembly line or the like), or other area, location or environment, or combination thereof, in which, or on which, a three-dimensional object may be assembled or otherwise manufactured.

The term "mirror" as is used herein means a surface, such as polished metal or glass coated with a metal film, that is capable of reflecting sufficient undiffused light to form an image of an object placed in front of it.

The term "modem" as is used herein means a device or program that enables a computer to transmit data over, for example, telephone or cable lines. Computer information is generally stored digitally, whereas information transmitted over telephone lines is transmitted in the form of analog waves, and a modem may convert between these two forms.

The phrase "native software" as is used herein means software that generally is specifically written, compiled nod/or or assembled to run on a particular system. Native code generally uses all of the individual features of the target system with no regard for generality or portability.

The phrase "near end" as is used herein in relation with a fastener hole (or any other item, object, part, component or the like) means that end that is the closest. For example, a probe of a measuring apparatus of the invention may initially be inserted into a near end (generally closest to the operator) of a fastener hole and subsequently extend completely through the hole and out through its far end.

The term "network" as is used herein means two or more computers that are connected together in a manner that they can exchange information. Connecting two or more computers together can significantly increase the functions, and amount of functions, that can be performed by the computers. If a network includes a printer (or one or more other peripherals), any computer that is connected to the network can print a document on that printer (or communicate with the other peripherals). Networks may include point-to-point connections between computers, a local-area network (LAN) (designed to connect a relatively small number of computers that span short distances, such as all of the computers within one building), a wide-area network (WAN) (designed to connect two or more LANs, often across long distances) and the Internet (a WAN that spans the world).

The phrase ".NET Compact Framework" as is used herein means an environment that is generally hardware-independent, and supports building and/or running managed applications on resource-constrained computing devices. In such an environment, managed applications may run on devices. It provides access to the underlying features of the device, and the applications and components can interact on the device and/or over the Internet. Generally, every .NET Compact Framework application runs inside in a runtime construct (an application domain), which is similar to an operating system process. The .NET Compact Framework can ensures that all managed resources used by a running application are freed and/or returned to a host operating system when an application ends. Application domains offer many of the advantages of processes, such as fault isolation, improved robustness and security, but without requiring support from the underlying host operating system. An application domain host generally starts an instance of the common language runtime, and is itself native operating system code. The common language runtime can be statically or dynamically linked to the application domain host. The .NET Compact Framework does not place restrictions on the behavior of the application domain host, and the application domain host can be a simple extension to an existing interactive shell that is used to start and stop programs. On dynamic application systems like Windows, the application domain host can be an extension to the application loader, so that .NET Compact Framework applications can be started and stopped using the same mechanism as a native application.

The phrase "NET Framework" as is used herein means a software framework that can be installed on computers running Microsoft Windows operating systems. It generally includes a large library of coded solutions to common programming problems and a virtual machine that that manages the execution of programs written specifically for the framework. The .NET Framework is a Microsoft Corporation (Redmond, Wash.) offering, and is intended to be used by most new applications created for the Windows platform. The framework's Base Class library provides a large range of features including user interface, data and data access, database connectivity, cryptography, web application, development, numeric algorithms and network communications. The class library is generally used by programmers, who typically combine it with their own code to produce applications. Programs written for the .NET Framework generally execute in a software environment that manages the program's runtime requirements. Also part of the .NET Framework, this runtime environment is known as the Common Language Runtime (CLR), which provides an appearance of an application virtual machine, so that programmers need not consider the capabilities of the specific CPU that will execute the program. The CLR also provides other desirable services such as security, memory management and exception handling. The class library and the CLR together constitute the .NET Framework. Version 3.0 of the .NET Framework is included with Windows Server 2008 and Windows Vista. The current version of the framework can also be installed on Windows XP and the Windows Server 2003 family of operating systems. A reduced version of the .NET Framework, the .NET Compact Framework, is also available on Windows Mobile platforms. Version 4.0 of the framework was released as a public Beta in 2009.

The phrase "NET Framework 3.5" as is used herein refers to a redistributable package that builds on new features added in the .NET Framework version 3.0 program, for example, feature sets in Windows Workflow Foundation, Windows Communication Foundation, Windows Presentation Foundation and Windows CardSpace. (The .NET Framework version 3.0 redistributable package installs the common language runtime and associated files that are required to run applications that are developed to target the .NET Framework 3.0.) In addition, it contains the following features:

Deep integration of Language Integrated Query (LINQ) and data awareness. (This feature permits code to be written in LINQ-enabled languages to filter, enumerate and create projections of several types of SQL data, collections, XML, and DataSets by using the same syntax.)

ASP.NET AJAX permits a computer operator to create more efficient, more interactive, and highly-personalized Web experiences that generally work across all of the most popular browsers.

New Web protocol support for building WCF services including AJAX, JSON, REST, POX, RSS, ATOM, and several other WS standards.

Full tooling support in Visual Studio 2008 for WF, WCF and WPF, including the new workflow-enabled services technology.

The term "network file system" as is used herein means any computer file system that permits and/or supports a sharing of files, printers and/or other resources, generally as persistent storage over a computer network including, but not limited to, Network File System, Andrew File System, Apple Filing Protocol, NetWare Core Protocol, and Server Message Block, which is also known as Common Internet File System.

The phrase "non-laser" as is used herein in connection with the systems and methods of the invention means that a successful operation of such systems and methods is not based upon, or a result of, a use of laser technology. However, one or more laser technologies may, optionally, be added to the systems and methods of the invention.

The term "normalize" as is used herein means to partially (more than 0% but less than 100%) or fully (100%) align and/or abut with, on or in, or come into contact with, or any combination thereof, that is to become co-planar, often with little or no forward, rearward, sideward and/or other movement being possible, for example, one or more surfaces of, or holes present in, an object, or part thereof, such as feet of a probe being aligned on an exterior surface of a workpiece that is adjacent with the near (front) end of the hole in a manner that they remain stationary, or a probe being aligned within a hole being measured in a manner described herein.

The term "nut" as is used herein means a type of a hardware fastener having a threaded hole. Nuts are usually used opposite a mating bolt to fasten a stack of two or more objects, parts, components or materials together. The two partners are generally kept together by a combination of their threads' friction, a slight stretch of the bolt, and compression of the parts. In applications where vibration or rotation may work a nut loose, various locking mechanisms may be employed, such as adhesives, safety pins, lockwire, nylon inserts, slightly oval-shaped threads and/or the like. The most common shape is hexagonal, as the bolt head (having 6 sides) generally provide a good granularity of angles for a tool to approach from. Some other specialized shapes for nuts exist for certain needs, such as wing nuts for finger adjustment and captive nuts for inaccessible areas.

The phrase "nut plate" as is used herein means a stamped sheet metal nut that may be, or is, riveted or otherwise attached to a workpiece or other object, or part thereof, or component of the foregoing. It may be a "fixed nut plate" (typically a one-piece nut plate), a "floating nut plate" (typically including a floating nut or replaceable locking element), a "fluid tight nut plate" (typically having a fixed or floating nut that is covered by a fluid tight housing), and often has a long tube that is internally threaded and a plate with two clearance holes for rivets. Locknut types are available, which utilize a nylon locking element, much like a nyloc nut. Other types have a floating nut or replaceable locking elements. A floating nut plate is a nut plate having a nut that may float or move within the plate. A nut plate may be a metal sheet having one or a plurality of threaded holes that can be attached to, or is riveted to, an object, or part thereof, such as a workpiece, or a component of the foregoing, such as a portion of a wing of an aircraft. When using a nut plate along with an object being manufactured, typically a hole is drilled through the object in a diameter that can accommodate a bolt. An operator may employ the diameter of such a hole to identify and/or select a diameter of a threaded hole and select a corresponding nut plate. The diameter of the threaded hole in the nut plate will usually be the same, about the same, or substantially the same diameter as the hole through the object. The diameter of the hole, and the length of the bolt (or other fastener) that is required or desired to protrude through the hole of the object, and become threaded in a desired or required tightness in the nut plate, may be very rapidly and accurately determined using the measurement apparatus of the invention. It is generally desirable that the threaded end of the bolt protrude, or extend, a selected distance beyond the nut plate. Once a nut plate has been installed, and an object is positioned in a desired or required manner or place, a selected bolt (or other fastener) may be inserted into the hole and become engaged with the nut plate, so as to secure the object in position and/or together with the nut plate, which the two often being parallel, or substantially parallel, with each other.

The term "object" as is used herein means an item, a thing, a structure, a substructure, a workpiece, a device, an apparatus, an instrument, a machine, a manufacture, an assembly, a subassembly or the like. An object may be capable of being assembled or otherwise manufactured or produced from a plurality of component (or other) parts, including skins, such as an airplane, a jet, a helicopter, a submarine, a boat, an automobile, a truck, a trailer, a camper, a tank (or other military vehicle), a missile (or other weapon), or the like, or any component (or other) part thereof, such as a vertical tail or wing for an aircraft, a door for an automobile, a hull for a boat, and/or the like, or a surface of any of the foregoing.

The term "online" as is used herein means turned on and/or connected. For example, printers are online when they are ready to receive data from a computer. In contrast, when a printer is offline (not turned on and/or connected), certain tasks, such as advancing paper, may be performed, but data cannot be sent to the printer. Also, computer operators are generally considered to be online when they are connected to a computer service through a modem.

The phrase "OpenGL" as is used herein means OPEN Graphics Language, a three-dimensional graphics language. It was developed by Silicon Graphics International (SGI) (Fremont, Calif.), and has become a standard supported in Unix, Windows and Macintosh computers. OpenGL can be implemented as an extension to an operating system or to a windowing system such as X Window. Many three-dimensional display adapters include OpenGL drivers. OpenGL and Direct3D (Microsoft Corporation's DirectX) are presently the major three-dimensional graphics languages in use.

The phrase "operably connected with" as is used herein in connection with a plurality of instruments, devices, apparatuses, components, parts and/or the like, such as one or more computers and one or more measuring apparatuses, or a one or more computers and one or more peripheral devices, means that the instruments, devices, apparatuses, components, parts and/or the like, are connected with each other, usually by one or more communication cables inserted into one or more ports present thereon or wirelessly (using, for example, Wi-Fi, Bluetooth, 4610X and/or the like) in a manner that data and/or information may be transferred from one instrument, device, apparatus, component, part and/or the like, to the other, or vice versa, or between the same.

The phrase "operating system" as is used herein means software that generally communicates with computer hardware on a most basic level, and is the main software of a computer. Without an operating system, generally no software programs can run. The operating system generally allocates memory, processes tasks, accesses disks and peripherals, and/or serves as the user interface. For example, it provides a user interface that allows a user to interact with the machine, such as clicking on an icon to delete a file. It also manages computer resources such as the CPU and main memory. It generally decides when programs can run, where they are loaded into memory, and how hardware devices communicate. As a result of operating systems such as Windows, Mac OS and Linux, programmers can write code using a standard programming interface, or Application Program Interface. Without an operating system, programmers would often need to write about ten times as much code to get the same results. Other known operating systems include Windows 98, Windows NT, Windows 2000, Windows Server 2003, Windows Server 2008, Windows Vista, Windows XP and Windows 7.

The terms "optically" and "optical" as are used herein mean a projection of material, such as text, images and/or symbols, using a typically high intensity light bulb and a known and specially-shaped glass lens, so that when light is passed through, or on, the material, and through the lens, the material generally becomes much larger than the original on the surface or object that the projector is pointing at. Generally, one hundred percent of the material being projected is illuminated 100% of the time by the bulb when the full material is placed in front of the bulb and the entire image is continuously displayed. (In contrast, with a laser, the laser beam only displays a very small portion of the projected projection at any given point in time and moves, or sweeps, in order to project each individual point in the projected image. This results in flickering as the amount of points being displayed with a laser increases in number.)

The terms "ordered" and "sequenced" as are used herein in connection with a plurality of process steps being employed to assemble or otherwise manufacture a three-dimensional object, or part, or to perform a different process, means that the process steps occur in an appropriate, logical, methodical, prescribed and/or required arrangement and/or sequence, generally from start to finish in a step-by-step manner, for example, with respect to a particular three-dimensional object, or part, being assembled or otherwise manufactured, and the component parts thereof, such that a proper, desired and/or required appearance and/or function of the object, or part, are achieved, which may vary widely depending upon the particular object, or part, being assembled or manufactured (or otherwise being processed in some manner), and may be determined by those having ordinary skill in the art using the detailed information that is provided herein.

The phrase "other desired characteristics" as is used herein in connection with Annotated Geometry data means any other characteristics of the Annotated Geometry data that could be organized by a user of the systems and/or methods of the invention, and that would be suitable or desirable for the user, such as hole diameter, line width, minimum conductivity, minimum and/or maximum thickness, maximum step height, and/or the like.

The phrase "parallel to" as is used herein in a mechanical context means being an equal distance apart, or substantially an equal distance apart, everywhere, substantially everywhere or in one or more areas, or two or more planes, lines or objects, or parts thereof, or components, that do not intersect. When used in a electronic or software context, it means that two events occur at the same time, or during the same span of time (as opposed to "serial" which means that two events must happen at different times, typically in a sequence).

The terms "peripheral" and "peripheral device" as are used herein means any external, internal and/or other device that generally is not part of the essential computer (the memory and microprocessor) and provides input and/or output in connection with a computer. For example, a keyboard, a mouse and a CD-ROM drive are input peripherals, while a monitor, a printer and a projector are output peripherals. Peripheral devices typically operate at the periphery, or outer edges, of a system, and can be external, such as a mouse, keyboard, printer, monitor, external Zip drive, scanner, CD-R drive, audio speaker, touch screen, plotter or goggle, or internal, such as a CD-ROM drive, CD-R drive or internal modem. Some peripherals, such as external hard drives, provide both input and output for the computer.

The term "phase" as is used herein in connection with an oscillation or wave is the fraction of a complete cycle corresponding to an offset in the displacement from a specified reference point at time t=0. Phase is a frequency domain concept, and as such, can be readily understood in terms of simple harmonic motion. The same concept applies to wave motion, viewed either at a point in space over an interval of time or across an interval of space at a moment in time.

The phrase "plunge-triggered measurement" as is used herein means a measurement that is triggered when a probe is moving in the outbound direction—the probe tip is extending out from the probe body or foot ("plunging into the hole").

The term "plurality" as is used herein means more than one, for example, two, three, four, five, six, seven, eight, nine, ten, eleven, twelve, thirteen, fourteen, fifteen, twenty, twenty-five, thirty, thirty-five, forty, forty-five, fifty, seventy-five, one hundred, two hundred, three hundred, four hundred, five hundred, one thousand, two thousand, three thousand, four thousand, five thousand, and so forth.

The term "polarization" as is used herein means a property of waves, such as light, that describes the orientation of their oscillations. By convention, the polarization of light is described by specifying the direction of the wave's electric field. When light travels in free space, in most cases it propagates as a transverse wave (i.e., the polarization is perpendicular to the wave's direction of travel). In this case, the electric field may be oriented in a single direction (linear polarization), or it may rotate as the wave travels (circular or elliptical polarization). In the latter cases, the oscillations can rotate rightward or leftward in the direction of travel, and which of those two rotations is present in a wave is known as the wave's chirality or handedness.

The term "photon" as is used herein means an elementary particle, the quantum of the electromagnetic field, and the basic "unit" of light and all other forms of electromagnetic radiation. It is also the force carrier for the electromagnetic force. Photons are governed by quantum mechanics and will exhibit wave-particle duality (i.e., they exhibit properties of both waves and particles). For example, a single photon may be refracted by a lens or exhibit wave interference, but also act as a particle giving a definite result when quantitative mass is measured.

The phrases "power source" and "power supply" as are used herein mean a device that supplies electrical energy to one or more electric loads. Every power supply typically obtains the energy it supplies to its load, as well as any energy it consumes while performing that task, from an energy source. Depending on its design, a power supply may obtain energy from:
- Electrical energy transmission systems. Common examples of this include power supplies that convert AC line voltage to DC voltage.
- Energy storage devices such as batteries and fuel cells.
- Electromechanical systems such as generators and alternators.
- Solar power.
- Others that are described herein or are known by those having ordinary skill in the art.

The term "probe" as is used herein means a device or apparatus, or a component thereof, that functions to investigate, obtain, mechanically transmit or otherwise transmit a measurement (or other) information and/or data in, on and/or around a particular region or area, such as in a hole present in an object, for example, a pre-drilled hole present in an airplane skin or the like.

The terms "processor," "microprocessor", "CPU" and "Central Processing Unit" as are used herein mean the logic circuitry of a computer, which responds to, and processes, the basic instructions that drive a computer, which are generally provided by one or a plurality of computer programs. The processor is on a chip (a microprocessor), a part of the main circuit board of a computer.

The term "project" as is used herein means to cause one or more text, images, symbols and/or the like, such as words, instructions and/or the like, to appear on a surface, such as a surface of a three-dimensional object, or part, or to cast or extend forward out into space, such as a room, for example, a beam of light.

The term "projector" as is used herein means a device, apparatus, instrument or the like that is capable of projecting, for example, displaying, one or more text, images, symbols and/or the like, or a combination thereof, such as words, instructions and/or the like, onto one or a plurality of surfaces, objects and/or parts, such as a surface of a three-dimensional object, which preferably may be viewed by one or more individuals and/or entities. Projectors typically includes a lighting unit that concentrates light within a limited solid angle by means of one or more mirrors and lenses, and provides a high value of luminous intensity in one direction. A wide variety of projectors are commercially available from sources that are known by those having ordinary skill in the art, including, but not limited to, LCD projectors, CRT projectors, DLP projectors, LCOS projectors, stationary projectors, transportable projectors, handheld projectors, and the like.

The term "protocol" as is used herein means a set of rules about the manner in which two or more things communicate.

The term "RAM" as is used herein means random access memory, a type of computer memory that can generally be accessed randomly, that is, generally any byte of memory can be accessed without touching the preceding bytes. RAM is the most common type of memory found in computers and other devices, such as printers. It also refers to main memory, the memory available to computer programs. For example, a computer with 8 MB RAM has approximately 8 million bytes of memory that programs can use. A typical computer may come with 256 million bytes of RAM, and a hard disk that can hold 40 billion bytes. RAM generally comes in the form of "discrete" (separate) microchips, and also in the form of one or more modules that may plug into holes in a computer's motherboard. These holes connect through a bus or set of electrical paths to the processor. The hard drive, on the other hand, stores data on a magnetized surface that looks like a phonograph record. Most personal computers are designed to allow a user to add additional RAM modules up to a certain limit. Having more RAM in a computer generally reduces the number of times that the computer processor has to read data in from a hard disk, an operation that generally takes much longer than reading data from RAM.

The phrase "Remote Control" as is used herein means an apparatus of the invention that has all, or substantially all, of the features of one or more of the measurement apparatuses of the invention for program manipulation, but does run include a measurement mechanism. It typically uses the same, or substantially the same, circuit board(s) as the wireless devices, and is beneficial for use particularly, for example, in conjunction or connection with a three-dimensional optical (or other) projection system for assembly tasks that do not include a measurement, such as system calibration, selecting processes to perform, stepping through process steps, initiating inspection prompts, and the like. It offers beneficial use because it is usually smaller, lighter and/or more economical in production and/or cost in comparison with various measurement devices and apparatuses.

The phrase "retraction-triggered measurement" as is used herein means a measurement that is triggered when a probe is moving in the inbound direction—the probe tip is retracting into the probe body or foot.

The term "rivet" as is used herein means a generally permanent mechanical fastener. On installation, a rivet is usually placed in a punched or pre-drilled hole, and the tail is upset, or bucked (i.e. deformed), so that it expands, for example, to about 1.5 times the original shaft diameter, thereby holding the rivet in place. Typically, because there is effectively a head on each end of an installed rivet, it can support tension loads (loads that are parallel to the axis of the shaft). However, it is usually much more capable of supporting shear loads (loads that are perpendicular to the axis of the shaft). Bolts and screws are usually better suited for tension applications.

The terms "run" and "execute" as are used herein mean to perform an action, a command, an instruction and/or the like, or to be in partial or full operation (typically in full operation), for example, computer software that runs on a computer, or a computer software program that is executed.

The phrase "run time" as is used herein refers to the actual execution of a program. "At runtime" means while a program is running.

The term "scanner" as is used herein means an input device that converts text, photographs and/or graphics into machine readable form.

The terms "screen" and "screen shot" as are used herein mean a picture or illustration of that which is displayed on a computer, projector, monitor, other screen and/or the like.

The term "server" as is used herein means a computer or device on a network that manages network resources (generally any item that can be used). For example, a file server is a computer and storage device that is dedicated to storing files. Any user on the network can store files on the server. A print server is a computer that manages one or more printers, and a network server is a computer that manages network traffic. A database server is a computer system that processes database queries (requests for information from a database). Servers are often dedicated, meaning that they perform no other tasks besides their server tasks. On multiprocessing operating systems, a single computer can execute several programs at once. A server in this case could refer to the program that is managing resources rather than the entire computer.

The phrase "service pack" or "patch" as are used herein means an orderable, downloadable or other update or enhancement to a software that typically corrects one or more existing problems and, in some cases, delivers or provides product enhancements. A service pack is typically a collection of updates and fixes for an operating system or a software program. Many of these patches are often released before the larger service pack, but the service pack generally allows for an easy, single installation. Service packs also often include new features in addition to fixes. IBM and Microsoft are examples of companies that use these term to describe their periodic product updates. When a new product version comes out, it usually incorporates the fixes from the service packs that have been shipped to update the previous product version. A wide variety of service packs are commercially available from sources that are known by those having ordinary skill in the art, such as IBM Corporation (Armonk, N.Y.) and Microsoft Corporation (Redmond, Wash.).

The term "simultaneously" as is used herein (often with respect to a performance of one or more functions performed by a measurement apparatus of the invention) means existing, occurring or being completed at the same time.

Figure 39:
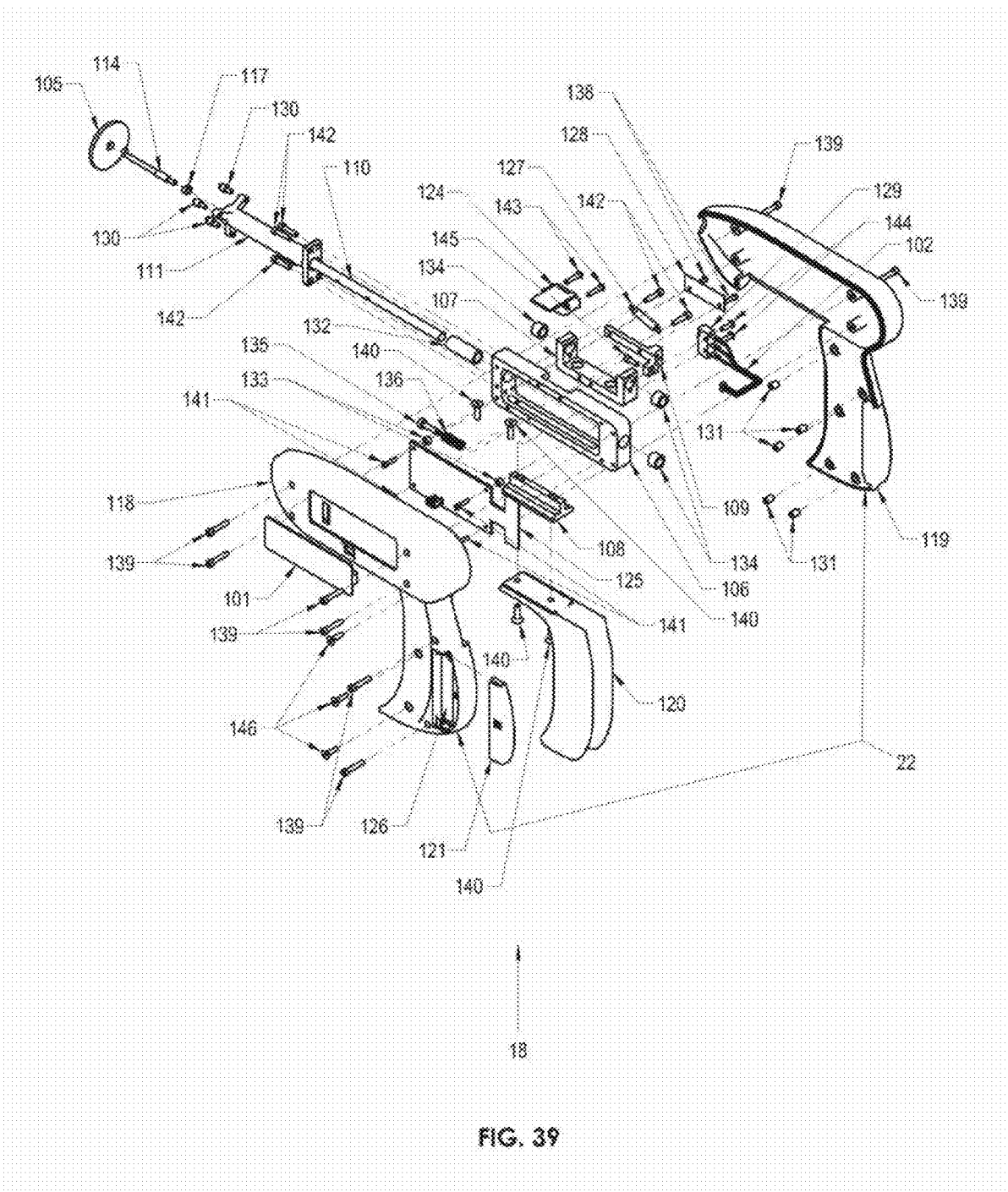
FIG. 39 is an exploded view of the measuring apparatus of the invention shown in FIG. 36.

The term "shaft" as is used herein refers to any relatively long and relatively thin component that is preferably slidable or movable, such as the cylindrical component that is shown in FIG. 39 (110).

The term "skin" as is used herein refers to an exterior surface, sheathing, casing and/or the like of an object, part, component, structure, sub-structure, workpiece, assembly, subassembly, person, animal, place, or any combination thereof, or the like. The skin of an object typically can either be: (i) load-bearing (i.e., it provides at least some structural support for the object, such that the object would possibly fall apart, or not be structurally sound, if the skin were removed); or (ii) non-load-bearing (i.e., the object would typically remain intact, and would not fall apart, if the skin was removed therefrom). Typically, the skin of an object is the visible exterior surface of the object that has an exterior finish applied to it. Skin can also serve to provide a smooth surface that greatly reduces drag on an object, such as the skin of an aircraft, automobile, truck, ship or boat.

The phrases "software application" and "application software" as are used herein mean a computer software that is designed to help a user perform a particular task and include, for example, word processors, spreadsheets, media players, database applications and/or the other tasks that are described herein, or any combination thereof. An application can typically manipulate text, numbers, graphics, or a combination of these elements. An application suite generally comprises multiple applications bundled together. They usually have related functions, features and/or user interfaces, and may be able to interact with each other, e.g. open each other's files. Business applications often come in suites, e.g. Microsoft Office, OpenOffice dot org and iWork, which bundle together a word processor, a spreadsheet, and the like. Suites also exist for other purposes, such as graphics and/or music. Enterprise software addresses the needs of organization processes and data flow, often in a large distributed environment. Examples include Financial, Customer Relationship Management, and Supply Chain Management. Departmental Software is a sub-type of Enterprise Software, with a focus on smaller organizations or groups within a large organization. Examples include Travel Expense Management, and IT Helpdesk. Enterprise infrastructure software provides common capabilities needed to support Enterprise Software systems. Examples include Databases, Email servers, and Network and Security Management. Information worker software addresses the needs of individuals to create and manage information, often for individual projects within a department, in contrast to enterprise management. Examples include time management, resource management, documentation tools, analytical, and collaborative. Word processors, spreadsheets, email and blog clients, personal information system, and individual media editors may aid in multiple information worker tasks. Content access software is software that is used primarily to access content without editing, but may include software that allows for content editing. Such software addresses the needs of individuals and groups to consume digital entertainment and published digital content. Examples include Media Players, Web Browsers and Help browsers. Educational software is related to content access software, but has the content and/or features adapted for use in by educators. For example, it may track progress through material or include collaborative capabilities. Simulation software are for simulation of physical or abstract systems for either research, training or other purposes. Media development software addresses the needs of individuals who generate print and electronic media for others to consume, most often in a commercial or educational setting. This includes Graphic Art software, Desktop Publishing software. Multimedia Development software, HTML editors, Digital Animation editors, Digital Audio and Video composition, and many others. 3D computer graphics software refers to programs that are used to create 3D computer-generated test, imagery, symbols and/or the like. 3D modelers typically allow users to create and alter models via their 3D mesh. Users can generally add, subtract, stretch and/or otherwise change the mesh to their desire, and models can be viewed from a variety of angles, usually simultaneously, and rotated, with the view being capable of being zoomed in and out. Product engineering software is used in developing hardware and software products. This includes computer aided design (CAD), computer aided engineering (CAE), computer language editing and compiling tools, Integrated Development Environments, and Application Programmer Interfaces. Additional information about software applications is present in Paul E. Ceruzzi, *A History of Modern Computing* (MIT Press., 1998) and Kelly Martin Campbell, *Computer: A History of the Information Machine*, (Basic Books, 1996).

The term "software development kit" as is used herein means a kit including one or a plurality of software programs that function to facilitate one or more functions and/or activities of a device, such as a digital and/or video camera, often when associated or operably connected with a computer, including, but not limited to sensory optics, interface mechanisms, image acquisition, image processing and/or camera and device control. A wide variety of software development kits, such as FlyCapture 2.0, Beta 06, Censys3D, Ladybug, Triclops, Digiclops and Compass3D software development kits, are commercially available from sources that are known by those having ordinary skill in the art, for example, Point Grey Research, Inc. (Richmond, BC, Canada) and other camera manufacturers and/or distributors.

The term "SolidWorks" as is used herein refers to a commercially available 3D mechanical CAD program that can run on Microsoft Windows. It was developed by Dassault Systèmes SolidWorks Corp. (Concord, Calif.).

The phrase "source code" (commonly just source or code) as is used herein means any collection of statements, declarations or instructions written in some human-readable computer programming language. Such programming languages are known by those having ordinary skill in the art and include, but are not limited to, C#, C++, Java and other programming languages that are described herein. Source code is the mechanism that is typically most often used by programmers to specify the actions to be performed by a computer. The source code which constitutes a program is usually held in one or a plurality of text files (ending in .txt), or other files, for example, C#files (ending in .cs), sometimes stored in databases as stored procedures, and may also appear as code snippets printed in books and/or other media. A large collection of source code files may be organized into a directory tree, in which case it may also be known as a source tree. A computer program's source code if often the collection of files that is typically needed to convert from human-readable form to some kind of computer-executable form. The source code may be converted into an executable file by a compiler, or executed on the fly from the human readable form with the aid of an interpreter, or the like.

The term "spot" as is used herein refers to a relatively small mark or image that may be placed or displayed on a three-dimensional object, for example, one that is being assembled, manufactured or otherwise processed, or part, surface or skin thereof, or on some other surface, skin or part, and that is partially or fully distinguishable in, for example, color, size, shape, outline, filling, brightness and/or the like from the three-dimensional object, or part, surface, or skin, or items or projections appearing thereon. A spot may be present in a wide variety of different colors, patterns, sizes, brightness and/or configurations, such as an outline of, or a filled in, circle, oval, triangle, square, rectangle, polygon (pentagon, hexagon, octagon, and so forth) and/or the like. In the systems and methods of the invention, a type of spot that is employed may be dictated by a user by, for example, using the Authoring Assembly Tool Software, and the spot may be projected, for example, on a three-dimensional object, part, surface and/or skin, preferably along with some text that informs and/or shows a user the location at which to insert a nail, a screw or similar item, and/or to take some other action.

The phrase "SQL Server" as is used herein refers to software that functions to provide data management and analysis solutions that generally deliver increased security, scalability and/or availability to enterprise data and/or analytical applications, while generally making them easier to create, deploy and/or and manage. For example, building on the strengths of the Microsoft SQL Server 2000, SQL Server 2005 provides an integrated data management and analysis solution that help organizations of any size to: (i) build and deploy enterprise applications that are more secure, scalable and/or reliable; (ii) maximize the productivity of IT by reducing the complexity of creating, deploying and managing database applications; (iii) empower developers through a rich, flexible, modern development environment for creating more secure database applications; (iv) share data across multiple platforms, applications and/or devices to make it easier to connect internal and external systems; (iv) deliver robust, integrated business intelligence solutions that help drive informed business decisions and increase productivity across entire organizations; and/or (v) control costs without sacrificing performance, availability or scalability.

The phrase "SQL Server Compact 3.5" as is used herein refers to a relatively small footprint in-process database engine that allows developers to build robust applications for Windows Desktops and Mobile Devices.

The Phrase "SQL Server Compact 3.5 Design Tool" as is used herein refers to computer software that installs SQL Server Compact 3.5 (or other) design-time components with Visual Studio 2008 (or other programs), such as the user interface, dialog boxes and design-time environment. It may be used to write applications for SQL Server Compact 3.5. The SQL Server Compact 3.5 design-time components generally include design-time environment dialogs under the Server Explorer to design applications that use SQL Server Compact 3.5 (or other programs).

The Phrase "SQL Server Compact 3.5 ENU" as is used herein refers to computer software that permits a computer operator or programmer to create compact databases that can be deployed on desktop computers, smart devices and/or Tablet PCs. When applications are built using such software, one of the .NET programming languages (Microsoft Visual Basic or Microsoft Visual C#) and a .NET Framework or .NET Compact Framework may be employed to create a managed application. Alternatively, Visual C# or Visual C++ may be employed for devices to create a native application.

The phrase "SQL Server Database Publishing Wizard" as is used herein refers to a program that enables a deployment of SQL (or other) Server databases into a hosted environment on, for example, a SQL Server 2000 or 2005 server. It can generate an SQL script file that can be used to recreate a database (both schema and data) in a shared hosting environment where the only connectivity to a server is through a web-based control panel with a script execution window. If supported by a hosting service provider, it can also directly upload databases to servers located at the shared hosting provider. Optionally, it can integrate directly into Visual Studio 2005 and/or Visual Web Developer 2005 (and other programs) allowing easy publishing of databases from within a development environment.

The phrase "SQL Server Native Client" as is used herein refers to computer software that contains the SQL OLE DB provider and SQL ODBC driver in one native dynamic link library (DLL) supporting applications using native-code APIs (ODBC, OLE DB and ADO) to Microsoft SQL Server. It can be used to create new applications or enhance existing applications that need to take advantage of SQL Server features, such as Multiple Active Result Sets (MARS), Query Notifications. User-Defined Types (UDT) and/or XML data type support.

The phrase "SQL Server Setup" as is used herein refers to a computer program that installs the following software components: (i).NET Framework 3.5 SP1; (ii) SQL Server Native Client; and (iii) SQL Server Setup support files.

The phrase "stainless steels" as is used herein means high-alloy steels that generally have superior corrosion resistance in comparison with other steels because they contain large amounts of chromium (generally from about 4 to about 30%, and usually around 10%). Stainless steels can be divided into three basic groups based on their crystalline structure: (i) austenitic, (ii) ferritic and (iii) martensitic.

Figure 3:
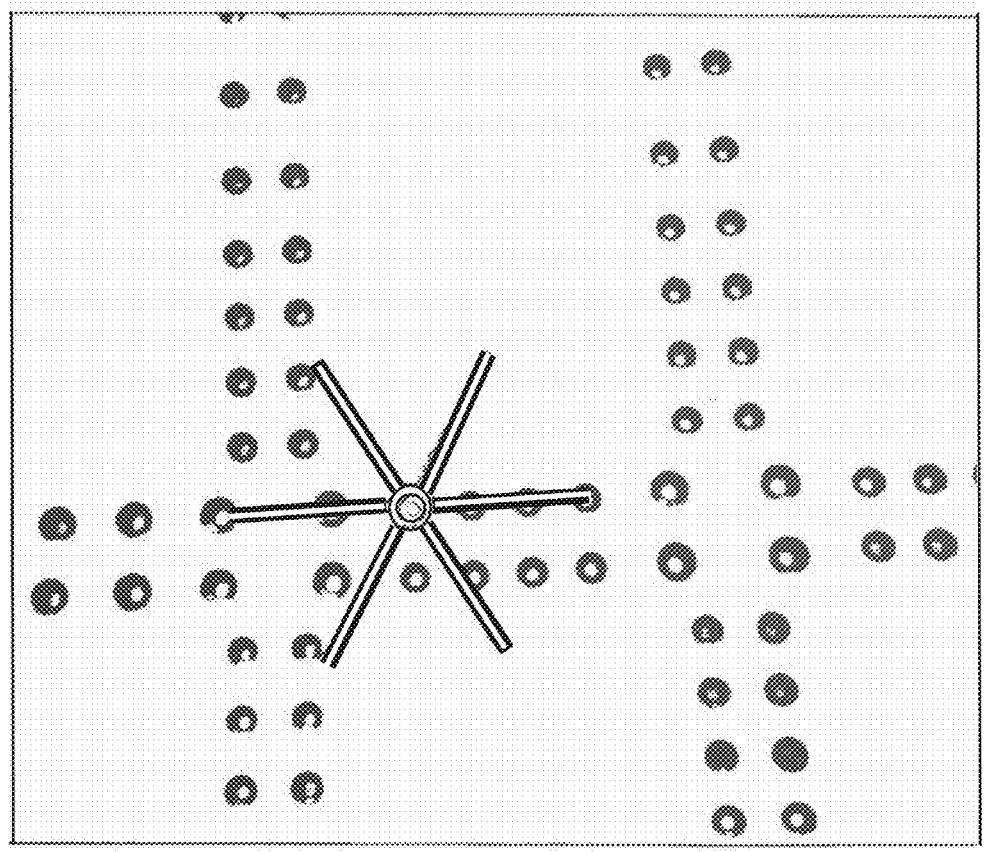
FIG. 3 is a photograph of a starburst pattern that is projected by an optical projector that may be employed with the measurement apparatuses and methods of the invention onto a pre-drilled fastener hole to be measured (its depth, diameter and/or countersink depth) that is present in a three-dimensional workpiece or object that is being manufactured.

The phrase "starburst pattern" as is used herein refers to a pattern that may be displayed on a three-dimensional object, workpiece, part, component, surface, skin and/or the like, and that has some characteristics of a star. It can be, for example, projected by an optical projector onto a three-dimensional object, or part, that is being assembled or otherwise manufactured, for example, when a measurement of a pre-drilled fastener hole present therein is being made, or when some other measurement is being made. One such pattern is shown in FIG. 3.

The phrase "Step Gage" as is used herein means a measurement apparatus of the invention that measures very accurately and rapidly the linear offset between two adjacent, or substantially adjacent, panels, materials, workpieces, structures or objects, or parts thereof.

The phrase "stereolithograph" as is used herein means an additive manufacturing process for producing models, prototypes, patterns and/or production parts. It uses liquid UV-curable photopolymer resin and a UV laser to build parts a layer at a time. On each layer, a laser beam typically traces a part cross-section pattern on the surface of the liquid resin. Exposure to the UV laser light generally cures or solidifies the pattern traced on the resin and adheres it to the layer below. After a pattern has been traced, the stereolithograph's elevator platform may descend by a single layer thickness, typically from about 0.05 mm to about 0.15 mm (0.002" to 0.006"). Then, a resin-filled blade generally sweeps across the part cross section, re-coating it with fresh material. On this new liquid surface, the subsequent layer pattern may be traced, adhering to the previous layer. A 3-dimensional part may be formed by this process.

The phrases "stereo lithography format" and "STL" as are used herein mean a file format native to the stereolithography CAD software created by 3D Systems (Rock Hill, S.C.). This file format is typically supported by many other software packages, and may be employed for prototyping and/or computer-aided manufacturing. STL files typically describe only the surface geometry of a three-dimensional object without any representation of color, texture or other common CAD model attributes. The STL format generally specifies both ASII and binary representations. An STL file can describe a raw unstructured triangulated surface by the unit normal and vertices (ordered by the right-hand rule) of the triangles using a three-dimensional Cartesian coordinate system.

The phrase "stimulated emission" as is used herein in connection with lasers means a process by which an electron, perturbed by a photon having the correct energy, may drop to a lower energy level resulting in the creation of another photon. The perturbing photon is seemingly unchanged in the process, and the second photon is created with the same phase, frequency, polarization and direction of travel as the original. If the resultant photons are reflected so that they traverse the same atoms or gain medium repeatedly, a cascade effect is produced.

The word "subroutine" or "subprogram" as are used herein mean a portion of code within a larger program, which generally performs a specific task, and is relatively independent of the remaining code. A subroutine generally behaves in much the same way as a computer program that is used as one step in a larger program or another subprogram. It is often coded so that it can be started ("called") several times and/or from several places during a single execution of the program, including from other subroutines, and then branch back (return) to the next instruction after the "call" once the subroutine's task is done. Subroutines are a programming tool, and the syntax of many programming languages includes support for writing and using them. Judicious use of subroutines (for example, through the structured programming approach) often substantially reduces the cost of developing and maintaining a large program, while increasing its quality and reliability. Subroutines, often collected into libraries, are an important mechanism for sharing and trading software.

The term "substantially" as is used herein means almost, extensive, considerable or ample, for example, in importance, value, degree, amount, extent and/or the like, depending upon the context, which may be determined by those having ordinary skill in the art, and is generally about 85% or greater (out of a total of 100%), and is often about 90% or greater, about 95% or greater, about 96% or greater, about 97% or greater, about 98% or greater, or even about 99% or greater, but is less than about 100%. It may also refer to any fractional or decimal number, such as 99.1%, 99.2%, 99.3%, 99.4%, 99.5%, 99.6%, 99.7%, 99.8% or 99.9%.

The term "suitable" as is used herein means satisfactory, operable or capable of producing a desired result.

The term "symbol" as is used herein means a shape or the like, including, but not limited to, a square, a rectangle, a pentagon, a hexagon, an octagon, another polygon, a circle, an oval, a triangle, a point, a curvilinear or straight line, punctuation (period, comma, semi-colon, colon, hyphen, dollar sign, percent sign, asterisk, parentheses, and/or the like) and/or the like. It, as well as text and images, typically can be any color between, and including, black and white on the color scale, and can either be drawn unfilled (outlined in that color) or filled (filled with one or more colors, patterns and/or the like).

The term "system software" as is used herein means software that is involved in integrating a computer's various capabilities, but typically does not directly apply them in the performance of tasks that benefit the user, such as an operating system.

The phrase "Tao Framework" as is used herein means a C#library giving .NET and Mono developers (and others) access to popular graphics and/or gaming libraries, like OpenGL and SDL. It was originally developed by the C#OpenGL programmer, and since its start many developers have contributed to the project. The latest version of Tao is version 2.1 released on May 1, 2008. Additional information about Tao Framework is present on the web site tao framework dot com.

The phrase "text" as is used herein mean letters, numbers, symbols (plus signs, minus signs and/or the like), words, instructions, directions and/or the like.

The phrases "three-dimensional" and "3D" as are used herein mean having three or more dimensions. Three-dimensional objects generally have, or appear to have, extension in depth, and have height, width and depth.

The term "transverse" as is used herein means situated or lying across or crosswise.

The term "trigger" as is used herein means a lever (or similar device) that is typically pressed by one or a plurality of fingers, or a hand, of a user (via an application of pressure or other force to the trigger) to discharge, release and/or activate a mechanism, such as the measurement apparatuses described herein.

The phrases "two-dimensional" and "2D" as are used herein mean having two dimensions. Two-dimensional objects do not have, or appear to have, extension in depth, and have height and width, but not depth.

The term "undistorted" as is used herein means that projected text, graphics, symbols and/or the like as viewed by the average human eye appear in a same or similar manner when projected onto objects with three-dimensional features and/or shapes as they would appear if projected onto a two-dimensional object, such as a flat screen or wall.

The phrase "upper end" as is used herein in relation with an apparatus of the invention, or an object, or part thereof, or with any other structure or device described herein, or any component of any of the foregoing, means that end thereof that is closest to the ceiling (or sky) when viewing the same from the front. For example, when viewing FIG. 24 of the accompanying drawings, the upper end of the measuring apparatus shown therein is the exterior surface of the housing that is facing upwards and is located above the probe area (i.e. the opposite end from the location at which the cable is to be connected with the bottom end of the apparatus). As another example, in FIG. 1, the "upper end" of the airplane wing shown therein is located above the numeral "8" (closest to the ceiling).

The phrase "upstream" as is used herein means leading towards the forward end of an apparatus of the present invention, an object, or part thereof, of any other structure or device discussed herein, or of any component of any of the foregoing.

The term "viewer" as is used herein means a program that generally displays the contents of an electronic (digital) file.

Viewers may generally be stand-alone programs or components within a larger program. They are widely used to display images downloaded from online services and the Internet. Viewers for sound and video files are also available. A viewer typically displays or plays one type of file, whereas a file viewer is a program that supports many different formats.

The phrases "video card" and "video adaptor" as are used herein mean a display adapter, such as a printed circuit or other board that plugs (or may otherwise be inserted) into a computer to generate images for a computer's screen (i.e., to give it display capabilities). Many different types of video adapters are available for computers, most of which conform to one of the video standards defined by IBM or VESA. Each adapter usually offers several different video modes, such as text and graphics. In text mode, a monitor can generally display only ASCII characters, whereas in a graphics mode, a monitor can display any bit-mapped image. Modern video adapters contain memory, so that the computer's RAM is not used for storing displays. In addition, most adapters have their own graphics coprocessor for performing graphics calculations.

The phrase "video signals" as are used herein in connection with text, images, symbols and/or the like are the data definition of the of text, images, symbols, or a combination thereof, including, for example, color, hue, saturation, and all other visual characteristics of the text, images, symbols, or a combination thereof, as well as the data that describes the physical characteristics of the text, images, symbols, or a combination thereof, such as size, shape, location, and the like. This data is in a format that is understandable by the computer monitor(s) and/or optical projector(s), so that the computer monitor(s) and/or optical projector(s) can display it.

The terms "virus" and "computer virus" as are used herein mean a computer program that generally can copy itself and/or infect a computer. Generally, a virus spreads from one computer to another (in some form of executable code) when its host is taken to the target computer, for instance because a user sent it over a network or the Internet, or carried it on a removable medium such as a floppy disk, CD, DVD or USB drive. Viruses can increase their chances of spreading to other computers by infecting files on a network file system or a file system that is accessed by another computer. The term "computer virus" may also mean all types of malware (computer viruses, worms, trojan horses, most rootkits, spyware, dishonest adware, crimeware, and other malicious and unwanted software, including true viruses). A worm can exploit security vulnerabilities to spread itself to other computers without needing to be transferred as part of a host, and a Trojan horse is a program that appears harmless but has a hidden agenda. Worms and Trojans, like viruses, may cause harm to either a computer system's hosted data, functional performance and/or networking throughput, when they are executed. Some viruses and other malware have symptoms noticeable to the computer user, but many are surreptitious. Additional information regarding computer viruses is present in Deborah Russell et al., *Computer Science Basics* (O'Reilly, ISBN 0937175714).

The phrases "Visual Studio" and "VS" as are used herein refer to a suite of programming languages and development tools that are designed to help software developers create innovative, next-generation applications, and are commercially available from known sources, for example, from Microsoft Corporation (Redmond, Wash.). This language product includes, for example, Visual Basic, Visual C++, Visual C#, Visual FoxPro, Visual J++ and Visual InterDev. The Visual Studio development system is a comprehensive suite of tools. Its features may include: (i) leveraging of local storage and local resources, such as peripherals, for high-performance and occasionally-connected applications; (ii) through LINQ, performing query, set, and transform operations using familiar object-oriented languages, such as Visual C# and Visual Basic; (iii) creating client applications that utilize Web services or offline tools that are complementary to Web-based applications; (iv) providing, via a .NET Framework, a wide variety of pre-built services that aid a computer operator in working more efficiently; (v) enhancing efficiency by providing inline code guidance right in the editor (without paging back and forth to documentation); (vi) collaborating more effectively and efficiently with designers through integration between Visual Studio and Microsoft Expression; and (vi) using integrated debugging and static code analysis to improve quality early and often.

The abbreviation "VSTO" as is used herein refers to Visual Studio Tools for Office, which are commercially available from Microsoft Corporation (Redmond, Wash.).

The term "wave" as is used herein means a disturbance that propagates through space and time, usually with transference of energy. Waves travel and transfer energy from one point to another, often with no permanent displacement of the particles of the medium (that is, with little or no associated mass transport); they consist instead of oscillations or vibrations around almost fixed locations.

The term "wavelength" ($\lambda$) as is used herein in connection with a sinusoidal wave:

$$y(t) = A \cdot \sin(\omega t + \theta)$$

means is the spatial period of the wave (the distance over which the wave's shape repeats). It is usually determined by considering the distance between consecutive corresponding points of the same phase, such as crests, troughs, or zero crossings, and is a characteristic of both traveling waves and standing waves, as well as other spatial wave patterns. Assuming a sinusoidal wave moving at a fixed wave speed, wavelength is inversely proportional to frequency: waves with higher frequencies have shorter wavelengths, and lower frequencies have longer wavelengths. Light is one example of wave-like phenomena, and in light and other electromagnetic radiation, the strength of the electric and magnetic field vary. Wavelength is a measure of the distance between repetitions of a shape feature such as peaks, valleys, or zero-crossings, not a measure of how far any given particle moves.

The terms "web" and "World Wide Web" as are used herein mean a system of Internet servers that generally support specially formatted documents. The documents are generally formatted in a markup language (HTML or HyperText Markup Language) that supports links to other documents, as well as graphics, audio and/or video files. Generally, one may move from one document to another by clicking on hot spots. Not all Internet servers are part of the World Wide Web, and there are several applications (Web browsers) that make it easy to access the World Wide Web, two of which are Netscape Navigator and Microsoft's Internet Explorer.

The term "wired" as is used herein means being plugged into an electrical outlet.

The term "wireless" as is used herein means not plugged into an electrical outlet, and powered by some other means, such as a battery. A communication path with other devices on a common wireless network, such as Zigbee or WiFi, is via radio transmission or in some cases infrared transmission.

The phrase "wireless USB adaptor" as is used herein means a network adapter (a network or communications controller) that plugs into a computer via a USB port.

The term "workpiece" as is used herein means a piece of work that is in the process of being assembled, manufactured or otherwise produced or a piece of metal (or other material) that is in the process of being worked on, or made, or has actually been cut or shaped by a hand tool, machine and/or the like. One example of a workpiece is shown in FIG. 1.

General Description and Utility

Optical Projection Systems and Methods

The present invention is directed to pioneering and very advantageous computerized optical systems for the projection of three-dimensional text, images and/or symbols in a substantially or fully undistorted manner onto one or a plurality of surfaces of a variety of different three-dimensional objects, or parts thereof.

In one embodiment (out of many), the present invention provides unique, very rapid, efficient, substantially or fully error-free and successful systems and methods for assembling or otherwise manufacturing any type of a three-dimensional object (or part thereof), including those that are relatively or very complex, such as an aircraft, a submarine, a helicopter, a missile, a tank, a military vehicle, an automobile, or the like.

In this embodiment, the systems of the invention significantly facilitate an assembly or other manufacture process, for example, on an assembly line or in a production facility, by providing ordered step-by-step assembly or manufacturing guidance work instructions that teach or guide one or a plurality of person or entities that are to assemble or manufacture any three-dimensional object or system, or component part, surface or skin thereof (hereinafter collectively referred to as "object"), which may be relatively or very complex, the manner in which object may properly be assembled or manufactured step by step with a series of ordered steps, generally in the "best" manner. For example, a set of assembly instructions may direct that the following steps be performed in the order listed: (i) remove a panel from an object; (ii) remove a clamp from the object; (iii) measure a depth of a series of pre-drilled holes; (iv) insert a series of different sized and types of fasteners into the pre-drilled holes; (v) remove a bolt from the object (before sliding an engine in); (vi) sliding an engine in; (vii) putting the clamp back onto the object; and (viii) put the panel back on the object.

Using the systems and methods of the invention to optically project any text, images and/or symbols onto any three-dimensional objects, parts, or skins, or even onto people, animals or locations, three-dimensional geometric data can be created in, or imported into, one or a plurality of computers using a software program, such as Catia, SolidWorks, Word, or the source code provided herein, or the like. A drawing can then be created on the computer(s) (in a wide variety of different colors, patterns, shapes, and/or the like, such as lines, squares, triangles, rectangles, circles, ovals, polygons, trapezoids and the like). The systems will accept as input the output files from most three-dimensional CAD (or other) programs. The drawing can then be incorporated into the imported three-dimensional geometric data, and the resulting product (text, images, symbols and/or the like, for example, that provide process instructions, such as assembly or manufacturing instructions) can then be optically projected onto any three-dimensional object to be assembled or manufactured, or otherwise, using three-dimensional optical projection. Such process instructions can be fully implemented on a computer (or other) screen before the images are ever projected onto the three-dimensional object. Process steps (text), other text, images of object component parts (or of the object itself), symbols and/or the like, are optically projected by one or a plurality of optical projectors as three-dimensional text, images and/or symbols that are displayed directly onto the three-dimensional object, or part of skin, for example, in an assembly process, at a location at which an attachment of two or more component parts is to be made (by bolting, fastening, gluing and/or the like). The projected material has an ability to wrap around the three-dimensional object, part or skin, for example, that is being assembled, manufactured or otherwise processed, permitting one or a plurality of assembly workers, manufacturing technicians and/or other system users to assemble or manufacture the object, part or skin, or to carry out some other desired process, and have control over such processes. Very advantageously, text, images and/or symbols to be displayed on the three-dimensional object, part or skin may be very rapidly calibrated in a manner that they can be projected in a substantially, and usually fully, undistorted manner onto one or a plurality of surfaces of the three-dimensional object, part or skin, which may be curved, contoured, complex curved, complex and/or flat, even when the optical projector(s) employed in the systems are not perpendicular to, or straight in front of and/or centered in connection with the objects, parts or skins (as is discussed in detail hereinbelow). The three-dimensional text, images and/or symbols may be, for example, three-dimensional images of the object that is being assembled, written assembly, manufacturing and/or other process steps or instructions, symbols and/or the like. For example, written instructions that instruct individuals that are assembling the object, such as a description of which of thousands of pre-drilled holes present in a skin of the object that specified fasteners fit within, and may be used with, may be projected directly onto the object.

In a preferred embodiment of the invention, a first computer program called an "Authoring Assembly Software Tool," which may be run on the computer's operating system, such as Windows XP, allows a user to put all of the required or desired components for a particular project into a computer, with a wide variety of annotation, pictures, video, symbols, drawings, audio and/or the like without concern for the number of optical projectors and/or computers that are being employed and/or their location within a particular assembly, manufacturing, work or other area or environment. A second computer program called a "Configurator Assembly Software Tool," which may also be run on the computer's operating system, allows a user to decide where within a particular assembly, manufacturing or other work area or environment the optical projectors being employed can be located, the number of optical projectors that are required for a particular assembly, manufacture, process or situation to have a good (preferably 100%) coverage of an object, part or skin, or a portion thereof, that is being projected upon, the number of workers that may be required or desired for executing one or more concurrent processes, for example, four different assembly technicians working simultaneously on the same aircraft wing, and/or other such information. This tool creates a file that can be run by an assembly, manufacturing or other technician each time that a particular assembly, manufacture or other process is being built or carried out. A third computer program called an "Operator Assembly Software Tool," which may also be run on the computer's operating system, guides a user through a process, such as an assembly of a three-dimensional object, or part or skin, step-by-step in an ordered manner using the file created by the Configurator Assembly Software Tool along with a wide variety of optional programming aids, such as annotation, pictures, video, symbols, drawings and/or audio, to aid the workers throughout the assembly, manufacturing or other process. For example, a video tutorial may be projected by one or more optical projectors directly onto a three-dimensional object that is being worked on, or with, such as on the surfaces of a vertical stabilizer that is being manufactured.

The systems of the invention use one or more optical projectors that are operably connected with one or a plurality of computers to project text, images, symbols and/or the like in a calibrated form in a manner that they appear substantially undistorted, and typically fully undistorted, when projected by the optical projectors onto a non-flat and/or non-perpendicular three-dimensional surface, generally regardless of where the optical projectors are positioned in relation to the three-dimensional surface. A dataset for the optical projectors that is created and/or provided by a user becomes calibrated by software that is present on the computer, and the resulting calibrated dataset becomes projected onto the 3-dimensional projection surface in a manner that projected text and images appear on the surface in a manner that generally is undistorted. The position of the optical projector in space relative to a coordinate system can be determined while simultaneously calibrating the projector optics. This allows a user to project three-dimensional geometry, such as from a CAD system (CATIA, SolidWorks, or the like) directly onto complex three-dimensional surfaces, which can be of virtually any shape and/or size. The optical projection system automatically compensates and "wraps" the projected material onto the surface(s) of the three-dimensional object, or part of skin, preserving its true shape. Text, images, symbols and/or the like, and/or any other projected matter, wrap around curved, contoured, complex, slanted and/or otherwise non-flat surfaces in an undistorted manner and appear in the same manner that the would if they had been projected directly onto a flat surface.

Figure 2:
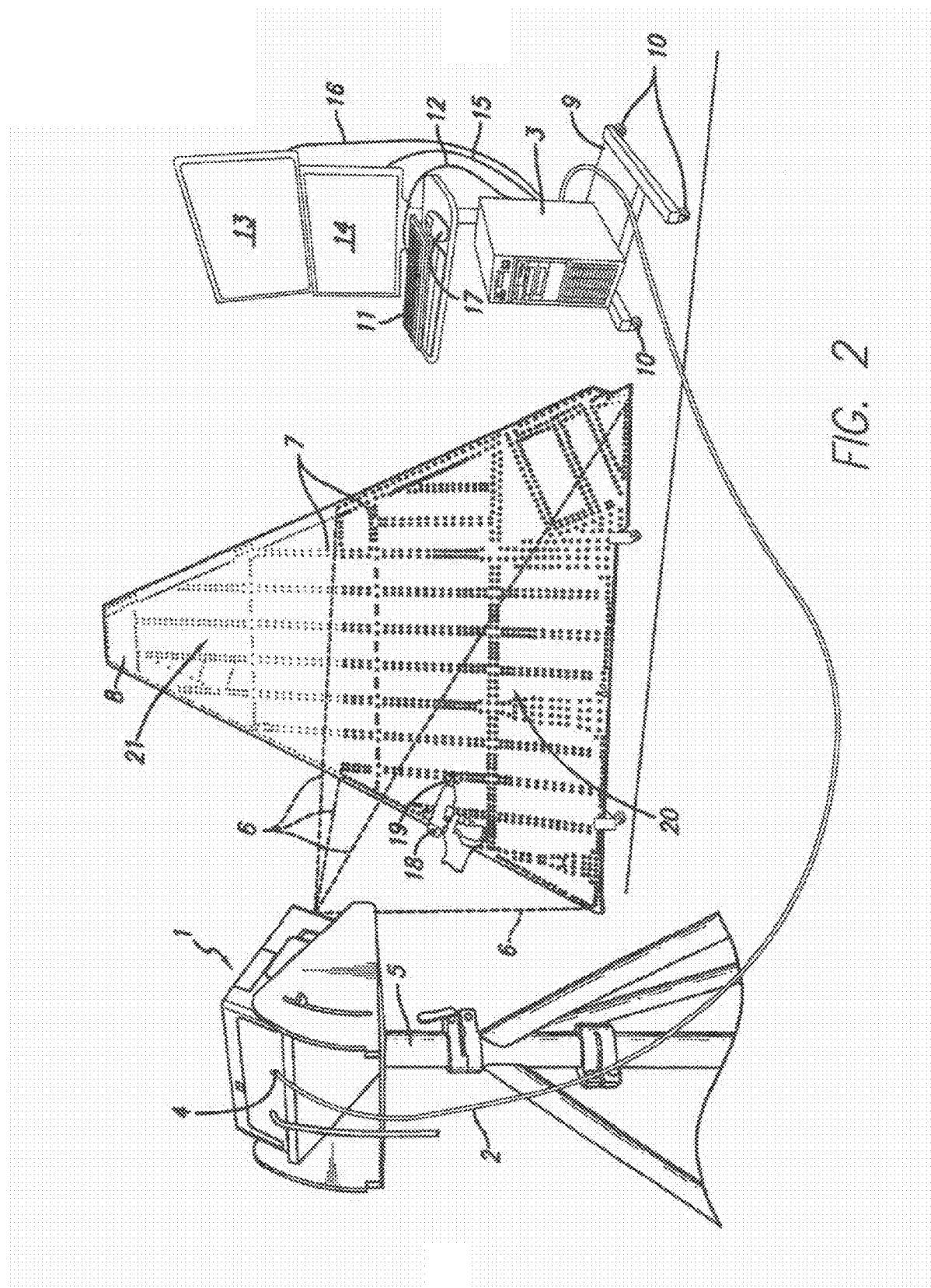
FIG. 2 is also an illustration of an optical projection system for use in assembling, manufacturing or producing a three-dimensional workpiece or other object, or part thereof, and in addition to the same features of the system that are shown in FIG. 1, shows the use of a measuring apparatus of the invention to measure the depths of a series of pre-drilled fastener holes that are present in the object (airplane wing) that is being manufactured.

The measurement apparatuses and methods of the present invention permit assembly workers, manufacturing technicians and other users to determine and/or catalog the lengths, diameters, countersink depths and/or other measurements of various fasteners that are desired or required, as a result of their length, diameter or other measurement or characteristic, to be inserted into or partially or fully through particular (corresponding) pre-drilled fastener (or other) holes, as is shown in FIGS. 2 and 3, in an assembly or subassembly that is being manufactured using a measurement device, such as an electronic grip gage (or similar device) that is operably connected with one or a plurality of computers or other data collection devices being employed in the systems. The measurement apparatuses and methods have an ability to utilize data and/or information that they collect upon an insertion into a fastener (or other) hole can be used to coordinate data collection sequences, so that large data sets can be collected in one sequence, with measurement values that correlate to specific positions on a three-dimensional object, part or skin that is being assembled, manufactured, or otherwise worked with. This data is used at a subsequent time to project proper assembly, manufacturing or other instructions based on measured data.

The methods of the invention provide guidance in connection with an optical projection of three-dimensional text, images, symbols and/or the like in a substantially or fully undistorted manner onto three-dimensional objects, parts, skins or systems. In one embodiment, they also provide assembly and/or other manufacturing guidance and instructions for an assembly or other manufacture of three-dimensional objects parts, skins and/or systems.

Three-dimensional workpieces and other objects, or parts thereof, that may be assembled using the measurement apparatuses and methods of the invention include, but are not limited to, cables, aircrafts (commercial, military, jets, props, helicopters, or the like) submarines, ships, missiles, tanks, boats, heavy machinery, earth moving equipment, automobiles, trucks, buses, trains, trailers, campers, military and other vehicles, or the like, or a part or skin thereof, such as a wing of an airplane, a tail of an airplane, an electrical panel, a control panel, a cableway and/or the like.

The measurement apparatuses and methods of the invention are extremely useful, among other things, for an assembly or other manufacture of workpieces, objects, parts or skins that are complex, in other words, those that take a significant amount of time and/or labor to assemble or otherwise manufacture, as one example, two weeks while one technician is working on such assembly in a full-time manner, that are difficult to assemble or otherwise manufacture and/or that would normally have numerous pages of associated blueprints, plans, other assembly or manufacturing instructions and/or drawings (sometimes many hundreds, thousands, or hundreds of thousands of pages).

Measurement Apparatuses and Methods

The present invention is directed to very advantageous automated wired and wireless apparatuses permitting or enabling an operator to extremely rapidly, efficiently, accurately and continuously (i.e., without an interruption or a substantial interruption) measure the depths, diameters, countersink depths and/or other measurements in connection with one or a plurality of pre-drilled and/or other fastener holes that may be present in three-dimensional for other) workpieces, objects, and/or parts thereof, such as the skins and/or substructures of aircrafts. Such items may be in a process of being assembled, manufactured or otherwise processed, may be riveted or otherwise attached to one or a plurality of nut plates, and may include hundreds, thousands or even hundreds of thousands of fastener holes possibly having different depths, diameters, countersink depths and/or other measurement which need to be rapidly and accurately measured, so that corresponding fasteners for each such hole having a correct length, diameter, countersink depth and/or other measurement may be readily and properly identified and selected for use which such holes. The apparatuses, which may have a "pistol grip," "barrel" or other required or desired body style or design for a particular application or assembly, and which enable an operator to make retraction-triggered, plunge-triggered and/or other styles of measurements, also perform countersink depth, hole diameter and/or other measurements in this manner. The fastener hole depth measurements enable an operator to select suitable fasteners for the measured holes (i.e., fasteners that would be of the correct type and/or length for the particular holes measured), which is very advantageous because many objects, and parts, that are being assembled or manufactured have areas that vary in thickness. Pre-drilled fastener holes present in such areas would likely have different depths, and require fasteners of different lengths and/or types. Further, because the apparatuses of the invention can operate to measures material or object thickness, they can be employed in the same manner to measure fastener length. Fastener length is determined by measuring the material or object thickness.

Measurement apparatuses within the present invention include, but are not limited to, the following different types of measurement apparatuses, which make, take or perform different types of measurements and/or perform one or a plurality of measurements in different manners:

Grip Gages (Generally);
Grip Gages, Reaction Type;
Grip Gages, Plunge Type;
Step Gages;
Gap Gages;
Countersink Depth Gages;
Fastener Flushness Gages;
Diameter Gages; and
Remote Controls.

The measurement apparatuses of the invention preferably are optionally, but preferably, operably connected with a power source and/or one or a plurality of computers and/or other data collection devices to rapidly and efficiently provide them via transmission and/or other transfer with fastener hole length, countersink depth and/or hole diameters measurement data and/or information, preferably each time that a fastener hole is measured (i.e., right away, and before a subsequent fastener hole is measured). Each fastener hole that is measured has its measurement data and/or information documented by the computer(s) and/or other data collection devices, as well as the particular fastener hole (possibly out of hundreds of thousands of different fastener holes having varying depths and/or diameters) that has been measured. This provides a significantly more rapid, efficient and accurate method for recording fastener hole depth, countersink depth and/or hole diameter measurement data and/or information in comparison with a manual system, in which an operator uses a writing instrument, such as a pen, to manually record, for example, in a notebook or logbook, such data for each of the various holes, and implements some manual system of keeping track of which types of measurements were taken, which measurement corresponds with which hole (possibly out of hundreds of thousands of holes), and the like. Such a manual system often results in numerous human errors, which are reduced or completely eliminated by the apparatuses of the present invention, which are typically 100% accurate. Further, such manual processes are significantly less efficient, and significantly more time-consuming, in comparison with the apparatuses of the present invention. Using fastener hole depth measurement apparatuses of the invention, fastener hole depths, corresponding fastener lengths, and structure thickness (to identify a fastener length) may be measured and recorded significantly more rapidly, efficiently and accurately in comparison with manual methods for making the same measurements. The same is true with respect to countersink depth measurements and hole diameter measurements. Thus, such apparatuses significantly facilitate an assembly or other manufacture process, for example, when employed on an assembly line or in a production facility, for example, for aircrafts or submarines, by providing rapid and accurate fastener hole depth, countersink depth and/or hole diameter measurements.

Also very advantageously, the measurement apparatuses of the invention operate to perform a plurality of tasks or functions with only one single squeeze of the trigger thereof by an operator or other user (i.e., automatically and generally instantaneously) once it is powered by a power source, and using only one hand, including:

(a) properly aligning their measuring probe with respect, or relative, to one or a plurality of fastener holes being measured, surfaces present on a workpiece (or other object, or part thereof, or component thereof), or both;

(b) making a fastener hole depth, countersink depth and/or hole diameter measurement of one or a plurality of the fastener holes being measured; and (c) transmitting (or otherwise transferring) the resulting or procured fastener hole depth, countersink depth and/or hole diameter measurement data and/or information, and fastener hole identifying information for the particular holes that have been measured to one or a plurality of host or other computers and/or other data collection devices for recording, storing, organizing, manipulating and/or otherwise using such information, and future use of such information, for example, for a selection of a proper fastener for the particular fastener hole.

Further, such information can be employed to manipulate different types of computer software that is installed in the computer.

The fastener hole depth measurement apparatuses of the invention can measure, for example, the depths of holes that light or a probe may pass through fully (100%), as well as holes that light or a probe is not permitted to pass though (more than 0%, but less than 100%), such as a hole that has one end partially or fully closed off with, for example, some type of an enclosure or bottom (like a can that has one of its ends removed by a can opener). In the first case, when the trigger of the apparatus is squeezed, its probe typically extends or protrudes fully through the front and back ends of the hole, with the hook of the probe resting on the back surface (of an object including the hole) that is adjacent with the back of the hole. When the probe contacts such surface, the depth measurement is made by the apparatus. In the second case, when the trigger of the apparatus is squeezed, its probe typically extends into the hole as far as it is permitted by the enclosure, which may vary widely, and may be determined by those having ordinary skill in the art. Once the end of the probe contacts the enclosure enclosing the bottom of the hole, a depth measurement of the hole is taken by the apparatus. The countersink depth and hole diameter measurements may be performed in a similar manner.

The invention also provides a method for measuring the depths of pre-drilled and other fastener hole lengths, countersink depths and/or hole diameters very rapidly and efficiently, and in a manner that is substantially or fully (100%) error-free.

The measurement apparatuses and methods of the invention can measure the depths, diameters and/or countersinks of fastener holes, and grip (or other) lengths of fasteners, of virtually any size. This includes a depth ranging from about 0.001 to about 2.00 inches (or corresponding metric units) and from Grip 1 to Grip 64, a diameter ranging from about 0.100 to about 1.000 inches (or corresponding metric units), and a countersink ranging from about 0.001 to about 2.000 inches, in virtually any increments (0.0001, 0.0005, 0.001, 0.002, 0.005, and so forth) and at virtually any angle, to determine, for example, proper fastener lengths (or other lengths). Grip length calculations may made by a host (or other) computer based on measurement data supplied by measurement apparatuses of the present invention, or computed in the on-board processor that is included on the circuit card. The conversion from the hole depth measurement to grip length may be by a look-up table using tables and sources thereof that are known by those having ordinary skill in the art, in software or firmware or by calculation. All four cases (calculations in software or firmware, by look-up table or by algorithm) will yield identical results if properly implemented. Countersink depth measurements include a depth ranging from about 0.001 to about 2.00 inches (or corresponding metric units), and hole diameter measurements include hole diameters ranging from about 0.100 to about 1.000 inches (or corresponding metric unit).

The apparatuses and methods of the invention advantageously may be employed to perform measurements in connection with, or relative to, virtually any type of a three-dimensional object (or part thereof), including those that are relatively or very complex, such as an aircraft, a submarine, a helicopter, a missile, a tank, a military vehicle, an automobile, or the like, or a part thereof (including skins). Three-dimensional objects that may have their pre-drilled or other fastener hole depths, countersink depths and/or hole diameters measured by the apparatuses and methods of the invention include, but are not limited to aircrafts (commercial, military, jets, props, helicopters, or the like) submarines, ships, missiles, tanks, boats, heavy machinery, earth moving equipment, automobiles, trucks, buses, trains, trailers, campers, military and other vehicles, or the like, or a part thereof (including a skin or substructure), such as a wing of an airplane, a tail of an airplane, an electrical panel, a control panel, a cableway and/or the like.

The measurement apparatuses and methods of the invention are extremely useful, among other things, for an assembly or other manufacture or production of objects, parts or skins that are complex, in other words, those that take a significant amount of time and/or labor to assemble or otherwise manufacture and/or include a large number of pre-drilled or other fastener holes that must be properly measured in order to identify and select corresponding hole fasteners of the proper type and/or length. They may be used to perform any or all of the measurement functions that are described herein alone, or in connection or combination with any of a wide variety of one or more other or different devices, apparatuses, systems and/or methods, in English (or in any other language (including, but not limited to any type of an assembly, production and/or manufacturing device or system, such as the computerized optical assembly system that is described in Provisional patent application U.S. Ser. No. 61/281,108 and in U.S. patent application Ser. No. 12/590,500 and its corresponding international patent application under the Patent Cooperation Treaty.

Advantages of Invention in Connection with Manufacturing

Optical Projection Systems and Methods

In addition to the advantages that have been described above, the assembly or manufacturing guidance systems and methods of the invention have numerous additional very important and significant advantages associated with them, which result in a significant increase in an efficiency of an assembly or other manufacture, and a corresponding savings of a significant amount of time, labor, paper products and money, in comparison with known methods for assembling or otherwise manufacturing three-dimensional objects, parts or skins, such as manual systems and methods, and laser systems and methods. Such advantages are also provided in connection with other uses or applications of the systems and methods of the invention.

First, such systems and methods significantly reduce, and usually completely eliminate, a need for persons or entities that are assembling or manufacturing a relatively complicated three-dimensional object, part or skin to continuously or otherwise use, and refer to blueprints, plans, drawings and/or other paper instructions or computer displays for the assembly or manufacture, which are often several dozens, hundreds, thousands, or even hundreds of thousands of pages or screens in length (i.e., several inches thick) to learn and understand how to assemble such items. For example, a typical aircraft may have more than 100,000 pages of blueprints and/or written instructions to teach and guide an assembly technician how to assemble the aircraft (which components go where, which order of steps should be followed, how various parts are connected together and the like). In contrast, using the systems and methods of the invention, a set of step-by-step assembly or manufacturing instructions in the "best" or most logical order may be prepared very rapidly in an automated manner. This, in turn, eliminates the extensive amount of time and labor that is associated with reading, understanding and implementing the information that is present in such lengthy and complicated blueprints, drawings, plans, other paper instructions or computer displays, and the high labor fees that would be associated with paying workers or employees to carry out such tasks, renders these assembly and manufacturing processes tremendously more rapid. They tremendously reduce the labor and time required to perform an assembly or manufacturing process in comparison with assembly or manufacturing processes for assembling the same three-dimensional object, part or skin, but using blueprints, plans, drawings, other paper instructions or computer displays. Such time and labor may be, and is often, reduced by at least about 10%, 20%, 30%, 40% or 50%, or even a higher percent, depending upon the complexity of the particular object, part of skin being assembled or manufactured. Typically, the more complex an item is that is being assembled or manufactured, the more time and labor savings will be achieved with the systems and methods of the invention. Further, a much larger quantity of particular items being assembled or otherwise manufactured can be assembled or manufactured within a given period of time in comparison with assembly or manufacturing processes that employ blueprints, plans, drawings, other paper instructions or computer displays, to produce the same items, rendering an assembly or manufacturing process or line tremendously more efficient.

Second, the systems and methods of the invention greatly improve the accuracy of assembly or other manufacture of a three-dimensional object, part or skin in comparison with other assembly methods, such as those that employ blueprints, plans, drawings and/or other paper instructions or computer displays, usually providing error-free assemblies and manufactures. In the systems and methods of the invention, step-by-step instructions in a logical or required order, and usually the "best" order if more than one order is possible, for an assembly of a particular three-dimensional item are provided to an operator, and improve the accuracy of the assembly or other manufacture by highlighting specific points on the item being assembled or otherwise manufactured, and detailing specific instructions, which very advantageously reduce or eliminate assembly and manufacturing errors, which errors can be extremely costly. Typically, the systems and methods of the invention result in one or a plurality of assemblies or other manufactures of a three-dimensional object, part or skin that is substantially or fully error-free (i.e., 100% accurate). For example, if in assembling a particular object, part C cannot be fastened to part B until part B is fastened to part A, the step of fastening part C to part B will be ordered by the systems and methods of the invention in a manner that is subsequent to the step of fastening part B to part A (i.e., the steps will occur in a logical or proper order for an assembly or other manufacture of this particular object). An error in assembly can result in large quantities of wasted costs relating to raw materials, machine time, labor time, interruption of assembly process, rework and/or scrap disposal.

Third, the systems and methods of the invention provide an extraordinarily effective means to pass information from highly skilled and/or experienced workers to less experienced, or even inexperienced, individuals to readily be able to assemble or otherwise manufacture, or carry out some other process in connection with, a three-dimensional object, part of skin the second, third and subsequent times (i.e., after the first time). Once a complex object is assembled or otherwise manufactured using the systems and methods of the invention a first time, the second, third, fourth, fifth, sixth and subsequent times that the same complex object is assembled generally become less complicated, and less time-consuming, generally permitting a less experienced individual to readily be able to assemble or otherwise manufacture the object the second, third and subsequent times in a rapid, efficient and error-free manner. This is because the system generally only needs to be set up one time for each different object, part or skin being assembled (using the computer software and other items that is described herein). Once all of the data is entered by a user into the Authoring Tool, Configurator Tool and Operating Tool computer software programs that are described herein, and the various resulting files are created, in connection with one type of Item to be assembled, such as an airplane vertical stabilizer, the user typically does not need to do this again (even though than more than one of the same object will likely be assembled). Thus, the second, third, fourth, fifth, sixth and subsequent times that the same object, part or skin is assembled using the system, no initial set up of the system typically needs to be performed, resulting in a tremendous savings in time and labor and, consequently, cost.

When assembling the same exact type of object, part or skin, the Authoring Tool and the Configurator Tool will not need to be re-run by the user. The Operator Tool will be re-run because it contains all of the ordered assembly or other manufacturing sequence instructions. Further, the calibration step in the Operator Tool may not have to be re-run if the object, part of skin being assembled or manufactured is placed in the same place, position and orientation as the previous objects, parts or skins that were assembled with respect to their locations and orientations in connection with the optical projector(s). In these cases, the Tweak screen could be used to make a final alignment between the three-dimensional object, part or skin, and the projected text, images and/or symbols, so that the latter appears in an undistorted manner on the former. If the object, part of skin cannot be placed in the same spot and orientation, then the calibration step wilt usually need to be re-run. Thus, it is preferred that an assembly line reliably place the object, part of skin to be assembled or manufactured in the same place, position and orientation each time that another one is being assembled or manufactured, which can avoid re-running the calibration step.

As an example, a complex three-dimensional object that takes approximately thirty hours to assemble the first time that it is assembled using the systems and methods of the invention may take only eighteen hours to assemble (by the same or a different individual) the second, third, fourth, fifth, sixth and subsequent times that it is assembled. The foregoing advantages result in an additional increase in efficiency for assembling the object, and a corresponding additional savings of time and money. Labor savings of 30% and greater have been demonstrated during testing of these systems.

Fourth, the systems and methods of the invention do not depend upon the particular type of lens that is used in an optical projector employed therein (regular lens, fixed local lens, wide angle lens, wide short throw lens, zoom lens, or the like) and, thus, can operate successfully using a wide variety of different types of optical projector (or other) lenses, regardless of how close that a three-dimensional object, part, skin being assembled or manufactured is to the optical projector(s) being employed. For example, typically, with other types of projection-based processes, a wide angle lens would be required when projecting from a projector that is physically located close to a screen being projected upon, and a different lens would be required if the projector were moved a great distance from the screen. This is not the case with the systems and methods of the invention, which can use any type of a suitable lens, whether close or far from an object being projected upon.

Fifth, the systems and methods of the invention have an ability to operate successfully in daylight and/or in other types of bright light that is typical in production environments (i.e., they do not need to operate in a dimly-lit or dark room in order to properly operate).

Sixth, in contrast with laser assembly guidance systems for assembling objects, which very disadvantageously can only project a limited quantity of a single color onto an object, cannot project images (pictures, drawings, illustrations, figures, tables or other graphics), shapes or video onto an object, must write out each letter of a word or text individually, which is extremely time consuming, and often have accompanying severe flashing or blinking with their laser projections, the systems and methods of the invention have an ability to very rapidly project virtually unlimited quantities of a wide variety of texts, images, shapes and video onto a three-dimensional object, part or skin that is being assembled, otherwise manufactured or processed (without having to write out each letter of a word being projected), such as dots, lines and/or a wide variety of shapes, or a combination thereof, and in any color or combination of colors in an unlimited quantity, and without flashing, blinking and/or other distortions. Virtually an unlimited pallet of a wide variety of different colors, or combination of colors, from black to white, can be displayed on a three-dimensional object, part or skin at the same or different times, including, but not limited to, orange, red, maroon, pink, purple, cyan, violet, fuchsia, blue (royal, navy, aqua or the like), green (lime green, olive green, light green, dark green or the like), teal, yellow, brown, black, white, grey, silver, gold and/or the like. The systems and methods of the invention provide a user with an option of using a standard windows (or other) color pallet that is available in many Microsoft Windows (and other) computer software programs, and all of the various colors provided therein. Such color pallets typically show a rainbow of color that start with black and ends with white. The user can lace a mouse over the rainbow to select a color or can enter RGB (Red, Green, Blue) values using a text box to define an exact color. As can be seen from the foregoing, the systems and methods of the invention are significantly more rapid, versatile and efficient in comparison with laser assembly guidance systems, and do not project projections that are distorted, like laser projection systems often project.

In order to present an image to observers, laser projectors move a laser beam quickly over the surface using computer-controlled mirrors. This laser beam, when not moving, is a simple point of light, and looks like a line when it is moving at a fast enough rate of speed. From the point at which a laser projects the start of an image to the point at which the laser projects the last point in an image before starting over again is called a "frame." How many of these frames can be displayed per second is referred to as frames per second (fps). This can be thought of as being equivalent to hertz (cycles per second).

For the human eye to perceive no flickering, and for images to seem fluid, a laser must generally project an image at a rate of at least 24 frames-per-second. Consequently, if the image a laser is projecting can be fully "painted" 24 times per second, the human eye shouldn't see any flickering. However, as the size of the image being displayed by the laser increases, so does the amount of time that it takes to paint an entire frame, since the mirrors in the laser cannot be sped up. Therefore, flickering will begin at less than 24 frames per second, and will get progressively worse as this number decreases.

An optical projector is different from a laser projector in that an optical projector contains a relatively high intensity light bulb inside that typically operates at from about 50 to about 60 hertz. This light shines through an image, then through the projectors lens, and onto the projection surface. The entire image is projected at the same time, and not one point at a time, as occurs with a laser. In addition, the laser projects only in one color, whereas an optical projector projects in whatever color each point of an image being projected is since the light shines "through" it. Because the light is generally on continuously, and generally projects an entire image continuously, there is no flickering, no matter how big the image gets.

The above features, and other features described herein, along with tremendous time and labor savings, which result in tremendous cost savings, significantly increase the utility of the system and methods in comparison with similar laser systems, and render them significantly more advantageous and desirable.

Seventh, in stark contrast with a standard Power Point or laser projection, due to their three-dimensional calibrations (described herein), the systems of the invention may be placed anywhere within a given assembly or work area, such as a conference room, a factory, an assembly line, a theater or the like (on one side, on the other side, in the front, in the back, in the middle, and the like), and retain an ability to project a picture (or other image), text, or both onto a three-dimensional object that is undistorted regardless of projector placement and/or surface contours of the object. Standard projections do not have such an ability. Software employed in the system includes a calibration routine that guides an operator through a sequence of steps that determines the relative positions and orientations of the optical projector(s) and the three-dimensional object, part or skin being illuminated. The system software then projects the image in a manner that orientation appears correct regardless of the projector-to-object (or part of skin) orientation.

Eighth, there is no system limit regarding the quantity of information that can be included in one or more assembly, manufacturing or other process steps (although practical limits may vary by application), or the number of such steps that may be programmed.

Ninth, the same systems and methods of the invention very advantageously can be used to assemble any three-dimensional object, part or skin, regardless of the complexity or non-complexity of the object, part or skin, and can project text, images and/or symbols upon any three-dimensional object (or part) in a substantially or fully undistorted manner. They are not limited to assembling, manufacturing or projecting upon, only one (or two, three, four, five, six, seven, eight, nine, ten and so forth) particular type of three-dimensional object, part or skin. The same systems and methods can be used to assemble, manufacture, process and project upon a wide variety of different three-dimensional objects, parts, skins or systems, having a varying complexity.

Tenth, the systems and methods of the invention very advantageously can be calibrated in the manner described herein very rapidly, generally in about three minutes or less, and usually in about two minutes or less, and often in about one minute or less, while producing very accurate alignments.

Eleventh, the three-dimensional optical projection technology of the systems and methods of the invention allow an assembly, manufacturing or other business to record (have inputted into the computer) its "best" practices (i.e., the "best" method for assembling, manufacturing or otherwise processing a particular three-dimensional object, part or skin, rather than just any one or more different ways out of a variety of different possible ways), so that there is an assurance that every worker knows the "best" way to assemble, manufacture or process any, object, any time that such assembly, manufacture or process is being performed, even if they have never done this particular assembly, manufacture or process (or task thereof) before.

Twelfth, the systems and methods of the invention significantly reduce, often by as much as 50% or greater, assembly, manufacturing or other process errors made by workers when manually assembling, manufacturing or processing a three-dimensional object, part or skin (i.e., using blueprints, plans, instructions manuals, other paper products and/or computer screens to learn and understand how to assemble, manufacture or process a particular three-dimensional object, part or skin). For example, if an "L" shaped part needs to be mounted to another part in a configuration in which the "L" should face to the right and upwards (as opposed to the left and downwards), an assembly technician would typically mount the "L" shaped piece in an incorrect configuration about 50% of the time, greatly reducing the efficiency and accuracy of the assembly, resulting in large additional and unnecessary assembly costs. This problem is solved by the systems and methods of the invention, which can project an "L" in a desired color directly onto the three-dimensional object, part or skin being assembled in the exact orientation in which it is to be configured (facing to the right and upwards), very advantageously eliminating any possibility of assembly errors, and associated assembly costs.

Thirteenth, in stark contrast with laser projection systems and methods employed in an assembly of an object which operate in a completely different manner from the optical systems and methods of the present invention, such laser systems are extremely expensive (often about $250,000.00 or more per system). In contrast, the optical systems of the invention currently cost much less than corresponding laser systems, often up to eight times less or more. Further, when a laser burns out, it is extremely expensive to replace. In contrast, when a light bulb employed in an optical projector burns out, it is relatively inexpensive to replace.

Fourteenth, unlike laser based projection systems, which only have an ability to illuminate one relatively small dot on a screen or object at one time, which may be moved by the operator to attempt to form a shape of a letter, the systems and methods of the invention very advantageously can illuminate a large area at one time, such as an entire aircraft.

Fifteenth, the systems of the invention can generally be installed and set up for operation in an assembly environment very rapidly by only one person, usually in about four hours or less, and more usually in about two hours or less, and still more usually in about one hour or less, and even still more usually in about thirty minutes or less. In some cases, it takes only one person about twenty minutes to install the system (take all of the steps that are necessary to make the system run to operate an assembly, manufacturing or other process). Further, the components of the systems can properly be calibrated in the manner described herein very rapidly by only one person at a very low cost (often at no cost), usually in about twenty minutes or less, and more usually in about ten minutes or less, and still more usually in about five minutes or less, and even still more usually in about one minute or less.

Sixteenth, in contrast with laser-based systems and methods, the systems and methods of the invention typically do not produce any blinking, flickering, or other phenomena that can cause eye strain for the user (or otherwise be annoying to the user).

The foregoing advantages will likely make American and other industrialized country's assembly lines, manufacturing environments and systems significantly more efficient, resulting in tremendous time and cost savings.

Measurement Apparatuses and Methods

In addition to other advantages that are described herein, the measurement apparatuses and methods of the invention have numerous novel and extremely important and advantageous characteristics and benefits associated with them, which result in a significant increase in an efficiency of an assembly or other manufacture, and a corresponding savings of a significant amount of time, labor and money, in comparison with manual and other automated measurement apparatuses and methods.

The measurement apparatuses and methods of the present invention tremendously reduce the labor and time required to perform an assembly or manufacturing process in comparison with assembly or manufacturing processes for assembling the same three-dimensional workpiece, object, or part, but using manual or other automated measuring apparatuses. Such time and labor may be, and is often, reduced by at least about 10%, 20%, 30%, 40% or 50%, or even a higher percent, depending upon the complexity of the particular workpiece, object, part of skin being assembled or manufactured. Typically, the more complex an item is that is being assembled or manufactured, the more time and labor savings will be achieved with the measuring apparatuses and methods of the invention. Further, a much larger quantity of particular items being assembled or otherwise manufactured can be assembled or manufactured within a given period of time in comparison with assembly or manufacturing processes that employ manual or other automated measurement apparatuses to produce the same items, rendering an assembly or manufacturing process or line tremendously more efficient.

The measurement apparatuses and methods of the present invention also tremendously increase the accuracy of assembly or other manufacture of a three-dimensional workpiece, object, part or skin in comparison with assembly or manufacturing processes for assembling the same three-dimensional workpiece, object, part or skin, but using manual or other automated measuring apparatuses, in a manner that is usually fully (100%) accurate (error-free), or at least substantially accurate (error-free), which very advantageously reduces or eliminates assembly and manufacturing errors, which errors can be extremely costly. An error in assembly can result in large quantities of wasted costs relating to raw materials, machine time, labor time, interruption of assembly process, rework and/or scrap disposal. The measurement apparatuses and methods of the present invention significantly reduce, often by as much as 10%, 20%, 30%, 40% or even 50% or greater, assembly, manufacturing, production or other process errors made by workers when making fastener hole measurements manually or using other automated measurement apparatuses.

Measurement apparatuses within the invention, including those that are specifically identified herein, include the numerous advantageous characteristics and benefits that are set forth below.

Figure 25:
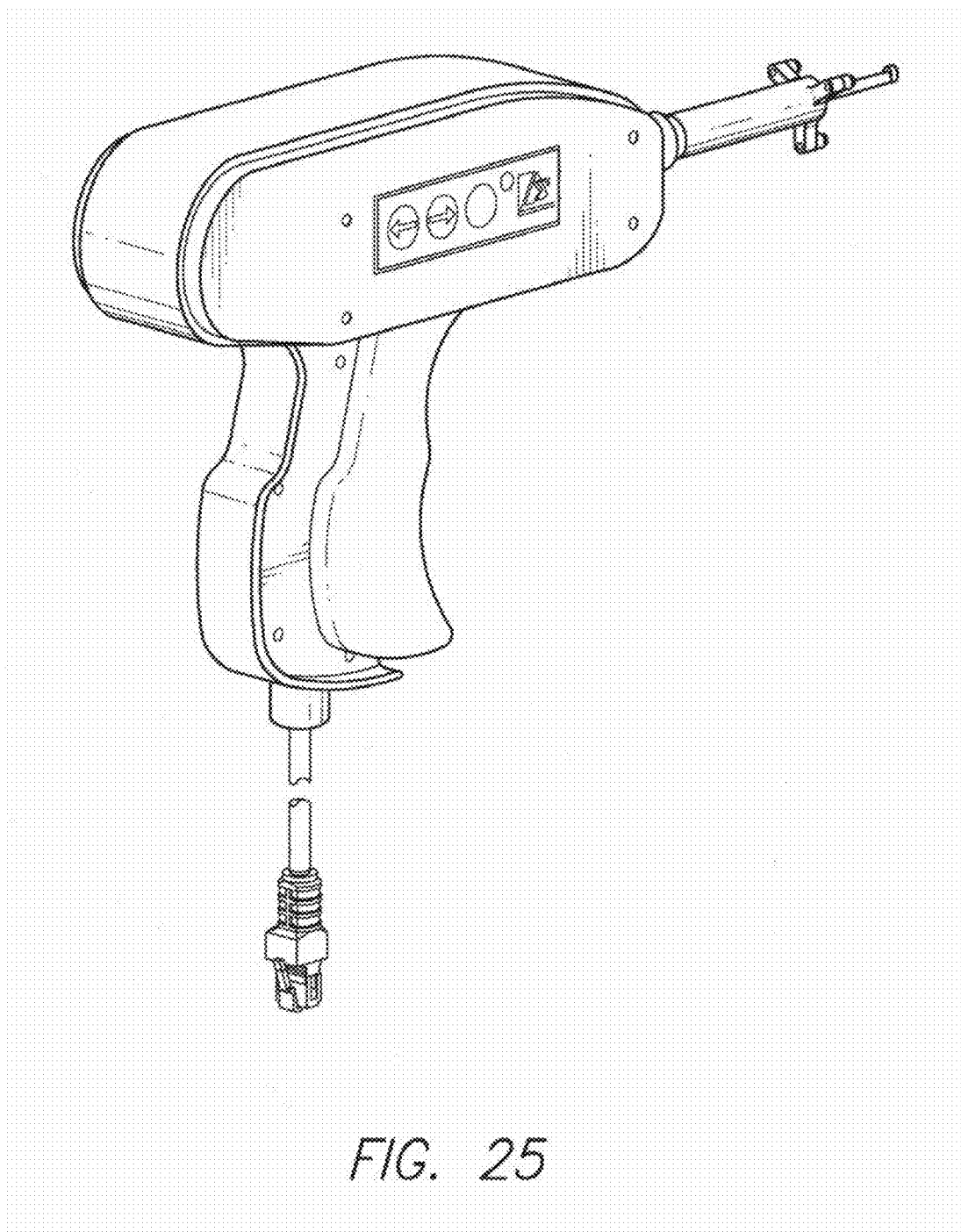
FIG. 25 is an illustration of a side view of the other side of a preferred measurement apparatus of the invention.
Figure 26:
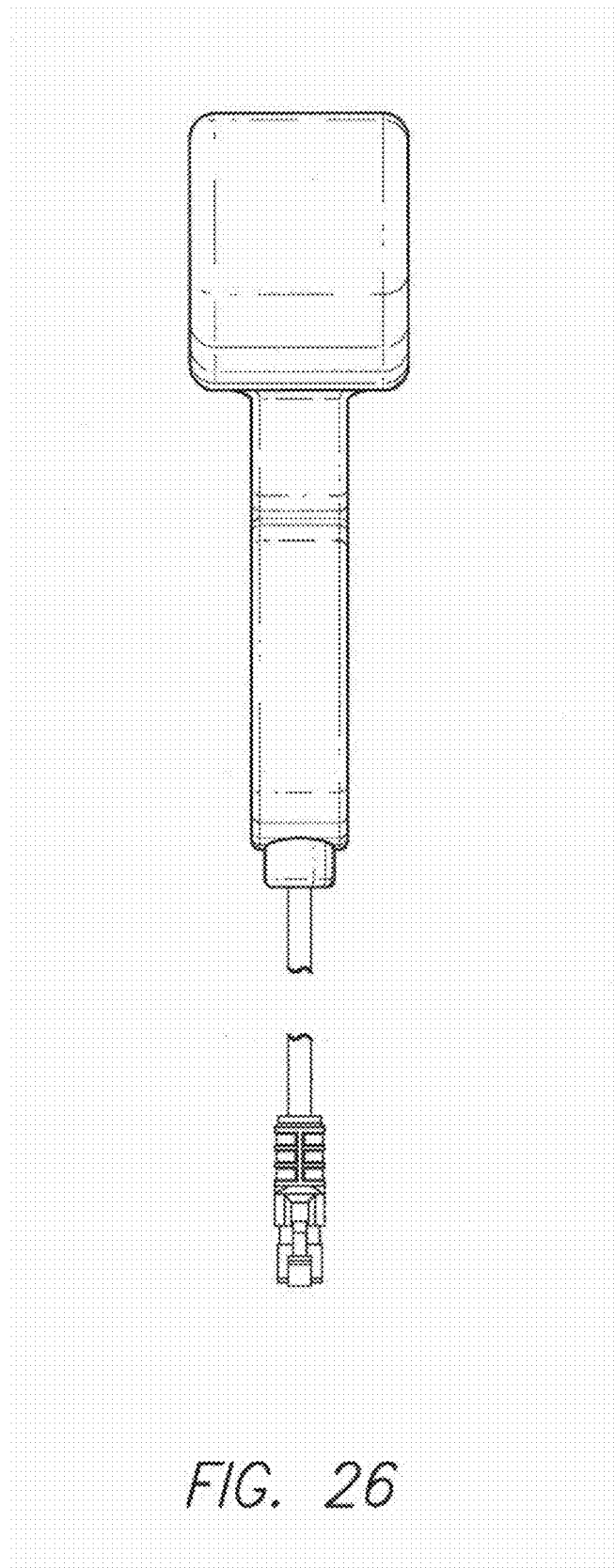
FIG. 26 is an illustration of a rear view of a preferred measurement apparatus of the invention.
Figure 27:
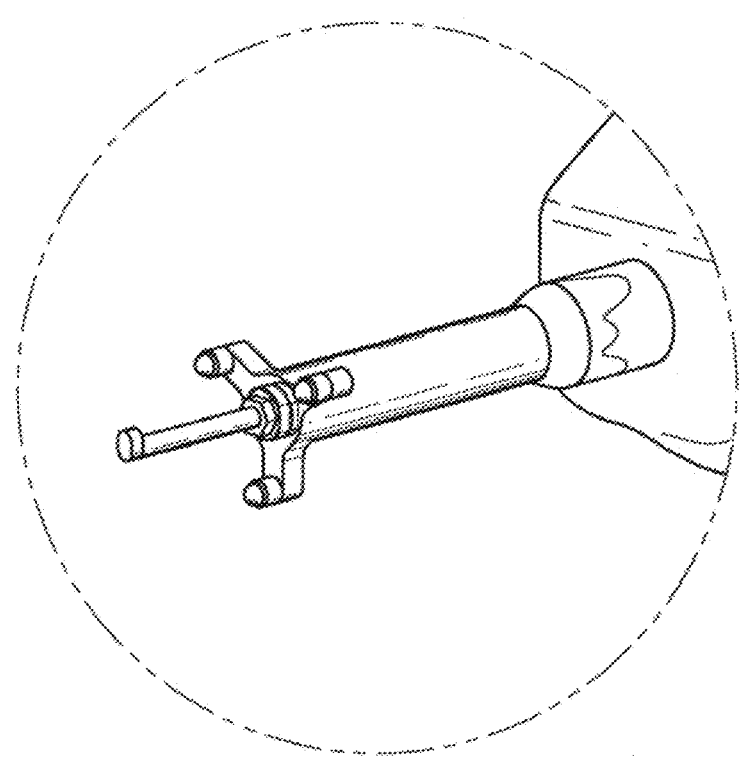
FIG. 27 is an illustration of a side view of a probe of a measurement apparatus of the invention.
Figure 28:
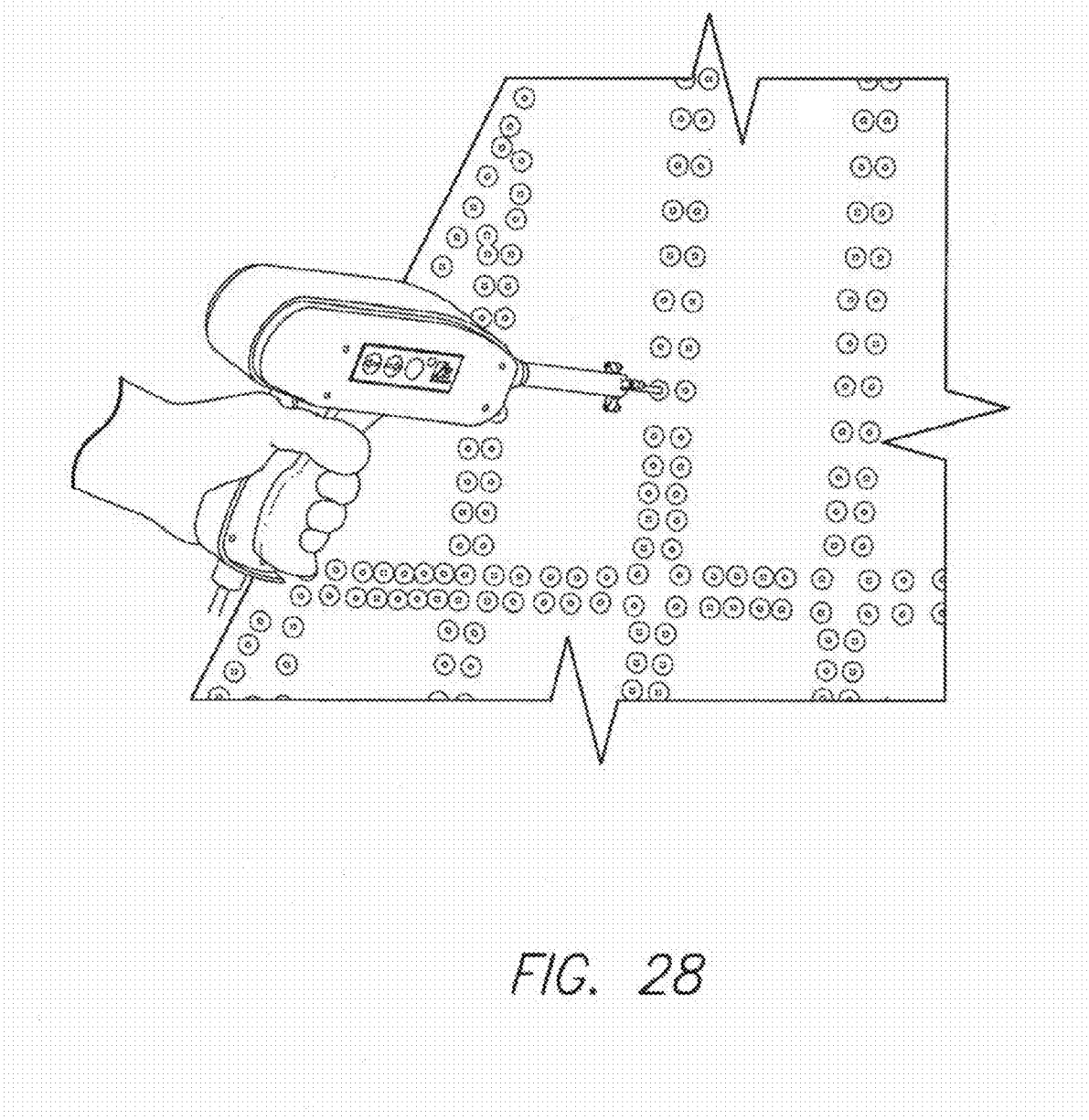
FIG. 28 is an illustration of a measurement apparatus of the invention that is being inserted into a pre-drilled fastener hole that is present in the skin of an object that is being manufactured.
Figure 29:
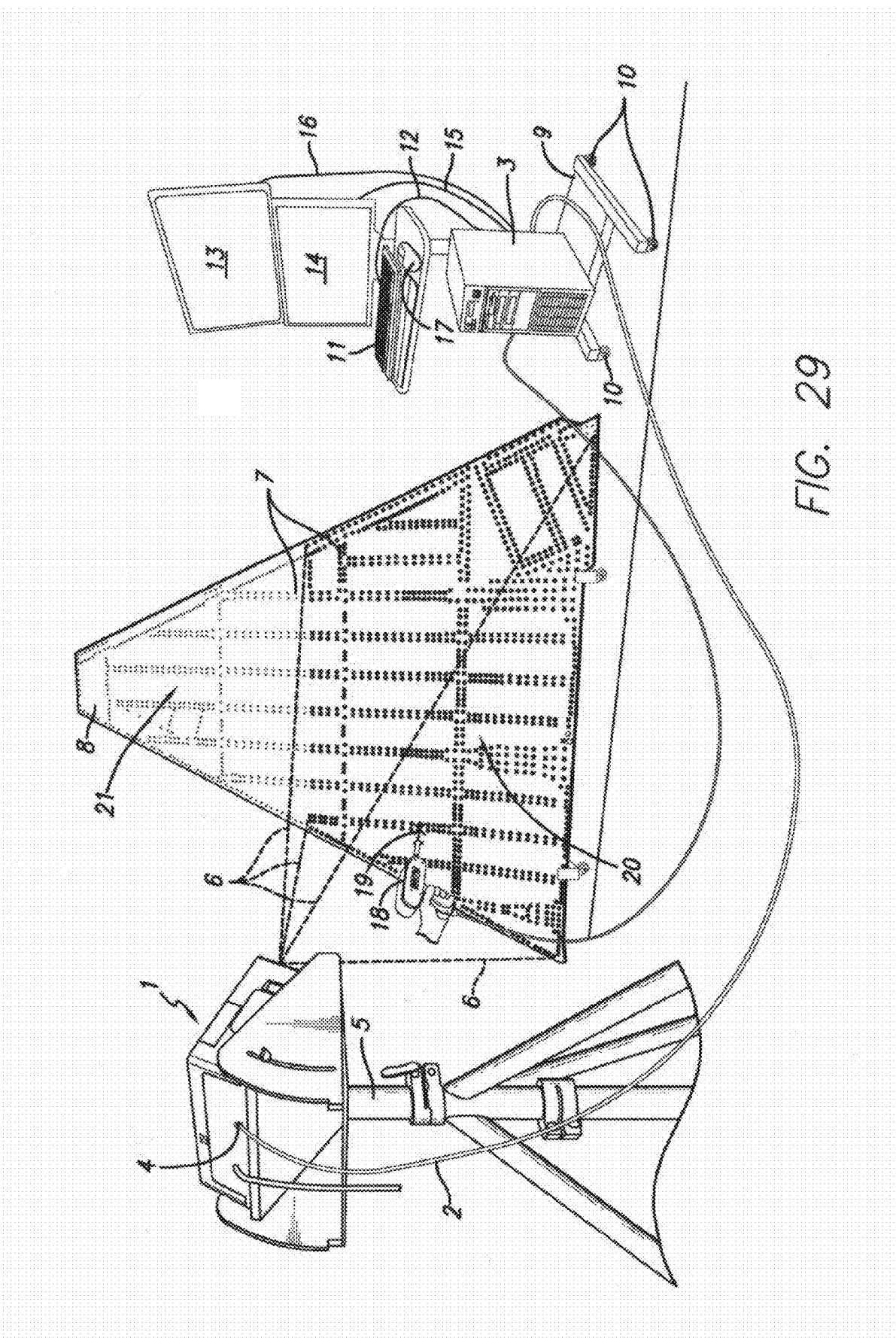
FIG. 29 is an illustration of a measurement apparatus of the invention that is being employed to measure the depths of a series of pre-drilled fastener holes that are present in the skin of a vertical stabilizer, showing its operable connection with a computer.
Figure 38:
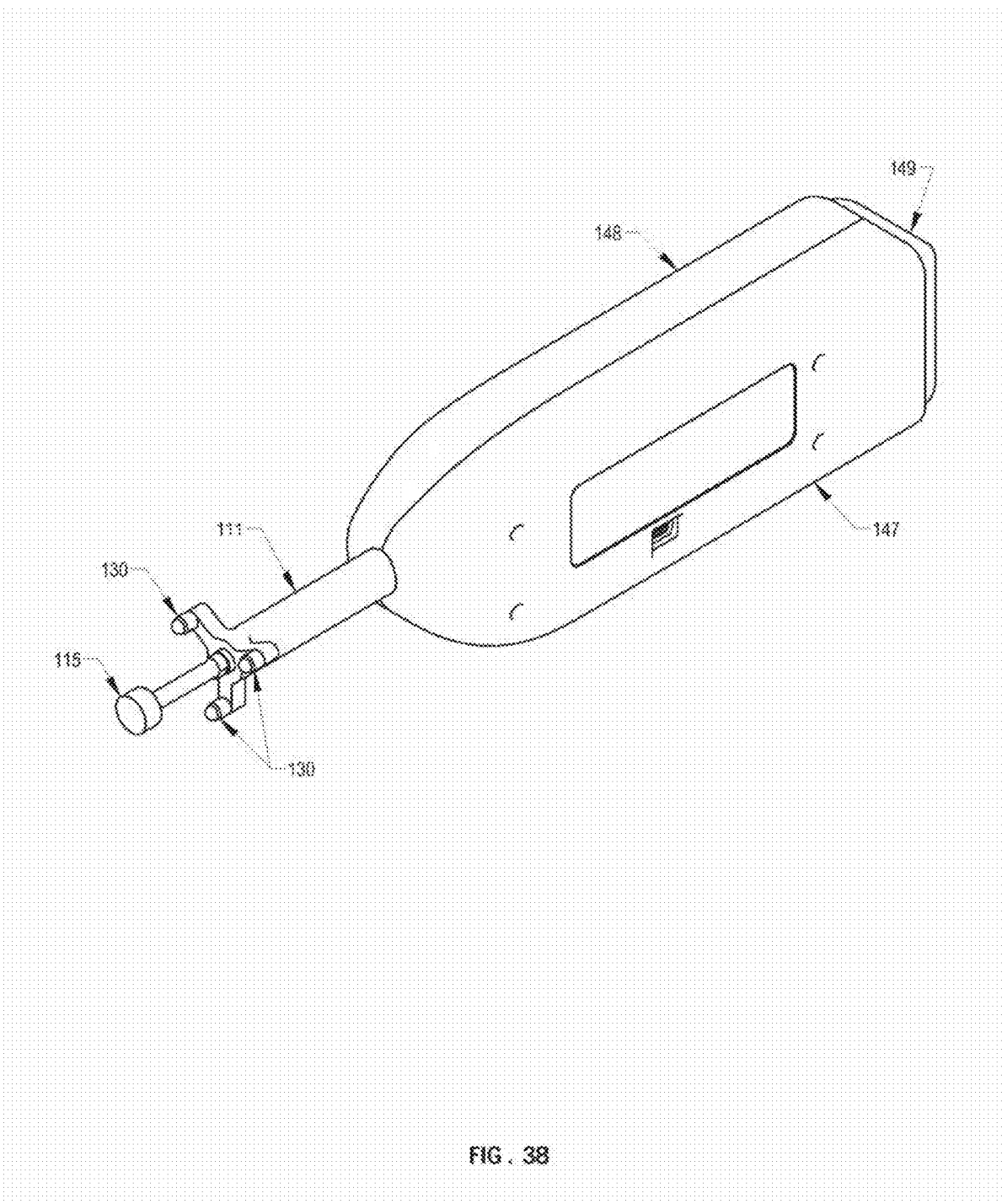
FIG. 38 is an illustration of a side view of a wireless "plunge" type measurement apparatus of the invention.

They typically have a common measurement mechanical structure that allows for a variety of different measurement types to be made by an operator, such as those that are described herein, from a common platform on which a workpiece (or other object, or part thereof, or component thereof) is present;

They typically have a common set of electronics (i.e., the same set of electronics typically works in all of them), which are generally employed for all of the different measurement types to be made by an operator, such as those that are described herein;

They typically have, or can accommodate or use therewith, a wide variety of different user selectable probe tips that may be employed for many different measurement types and/or applications, such as those that are described herein and, depending upon the particular type or style of probe selected by an operator, may perform any one of several different functions and, thus, act as a gage for a particular measurement;

Those that have a "Pistol Grip" style body, for example, the measurement apparatuses that are illustrated in FIGS. 24, 25 and 26, enable an operator to make retraction-triggered measurements;

Those that have a "Barrel" style body, for example, the measurement apparatuses that are illustrated in FIG. 38, enable an operator to make plunge-triggered measurements;

They are very easy for an operator or other user to learn how to operate them correctly, and to operate them correctly, thereby enabling them to make extremely accurate measurements (often with 100% of measurements within the desired tolerance band);

An operator or other user having an average skill may often learn how to operate them correctly within a very short period of time, such as a period of about 15 minutes or less, and usually in a period of about 10 minutes or less;

As a result of their automated nature of making a wide variety of very accurate measurements, assembly workers, manufacturing technicians and other users that have less skill and/or less experience than would otherwise be required to make the same or similar measurements in an accurate manner using a manual or other automated measuring apparatus may be employed, saving substantial labor costs.

They operate in a manner that enables one operator using only one hand to automatically perform a plurality of tasks or functions with only one single squeeze of a trigger thereof extremely rapidly (generally instantaneously and simultaneously, or substantially instantaneously and substantially simultaneously) once it is powered by a power source, including normalization, measurement and data transmission to one or more computers and/or data collection devices, rending them much more efficient, and much less awkward and labor intensive and, therefore, much less expensive, to operate in comparison with manual and other automated measurement devices;

They are extremely rapid, and commonly enable an operator to measure many hundreds of fastener holes continuously (i.e., with no interruptions) within a single measurement session (typically lasting from about 10 to 60 minutes);

They are extremely accurate, often being error-free (having an accuracy substantially better than the required tolerance of the hole being measured);

They are very reliable, and have a strong design and fabrication that can withstand their rigorous use in a factory (or other) production- or assembly-line environment, for field maintenance operations and for field repair use;

Most or all of their components are removably connected with one or more other components, thereby enabling their various components to be easily repaired and/or replaced, when necessary or desired;

They have an ability to communicate with one or a plurality of host and/or other computers and/or data collection devices via an Ethernet cable, such as the cables shown in FIGS. 24, 25 and 26, a wireless network and/or the like;

They typically have program manipulation controls built into the measurement apparatuses. Operator selectable switches that are included on the device allow the operator to handle the periodic exceptional cases. For example, the operator can choose to accept a measurement that lies outside of engineering tolerances because that is in fact the depth of the hole. Back stepping through a sequence can be accomplished by switch selection to repeat a known or suspected bad measurement.

They can be used to assemble, manufacture or produce any three-dimensional workpiece, object, part or skin, regardless of the complexity or non-complexity of the workpiece, object, part or skin. They are not limited to a use in assembling, manufacturing or producing only one (or two, three, four, five, six, seven, eight, nine, ten and so forth) particular type of three-dimensional workpiece, object, part or skin.

The automated measuring apparatuses and methods of the invention are much more rapid and accurate in comparison with a manual measurement of fastener hole depths, countersink depths and hole diameters with the result that time and labor associated with an assembly or manufacturing process is often significantly reduced, with the amount of reduction depending upon the complexity of the particular workpiece, object, part of skin being assembled, produced or manufactured. Typically, the more complex an item is that is being assembled, produced or manufactured, the more time and labor savings will be achieved with the apparatuses and methods of the invention. Further, a much larger quantity of particular items being assembled or otherwise produced or manufactured can be assembled, produced or manufactured within a given period of time in comparison with assembly or manufacturing processes that employ manual or other automated fastener hole depth, countersink depth and hole diameter measurements, rendering an assembly, production or manufacturing process or line tremendously more efficient and less costly.

Further, the apparatuses and methods of the invention greatly improve the accuracy of assembly, production or other manufacture of a three-dimensional object, part, workpiece or skin in comparison with assembly methods that employ manual and other automated methods for measuring fastener hole depths or lengths, countersink depths and/or hole diameters. The apparatuses of the invention improve the accuracy of the assembly or other manufacture by making very accurate fastener hole depth, countersink depth and hole diameter measurements in an automated manner. Again, errors in assembly can result in large quantities of wasted costs relating to raw materials, machine time, labor time, interruption of assembly process, rework and/or the like.

Additionally, the apparatuses and methods of the invention can be employed to measure fastener hole lengths and fastener lengths, as well as countersink depths and hole diameters in connection with any three-dimensional workpiece, object, part or skin, regardless of the complexity or non-complexity of the workpiece, object, part or skin.

Various advantages also may exist between wireless and wired (Power over Ethernet) measuring apparatuses of the invention. Very advantageously, the wireless measuring apparatuses typically have a very easy mobility and a reduced opportunity to become damaged as a result of a cable becoming caught on, or wrapped around, an item, such as a computer or projector stand or a chair. However, their battery lives may terminate within a finite period of time, for example, a period of about eight hours, and certain high security areas do not permit wireless transmission data. Power over Ethernet measuring apparatuses, in contrast, advantageously have an unlimited operation time, and are typically permitted in highly classified areas. They, however, are typically less mobile, and include one or more cables that can become caught on, or wrapped around, a different item, potentially causing damage to the apparatuses and surrounding items.

The above features, and other features described herein, along with tremendous time and labor savings, which result in tremendous cost savings, significantly increase the utility of the measuring apparatuses and methods of the present invention in comparison with manual and other automated measuring apparatuses, and render them significantly more advantageous and desirable. The foregoing advantages will also likely make American and other industrialized country's assembly lines, manufacturing environments and systems significantly more efficient, resulting in tremendous time and cost savings.

Preferred Embodiments

For the purpose of illustrating the measuring apparatuses, systems, processes, uses and methods of the present invention in a manufacturing application, there are shown in the drawings, which form a material part of this disclosure, various illustrations, schemes, apparatuses and flowcharts of preferred embodiments thereof. However, the measuring apparatuses, systems and methods of the present in invention are in no way limited to manufacturing applications, and may be employed in any application, process, situation and/or environment in which it is desired or required to project three-dimensional text, images and/or symbols in a substantially or fully undistorted manner onto one or a plurality of three-dimensional objects, parts, skins, persons, animals and/or the like and/or to take fastener hole depth, countersink depth and/or hole diameter (or other) measurements.

After very extensive experimentation and testing with complex three-dimensional workpieces and other objects, such as aircraft vertical stabilizers, and development, the inventors discovered how to accurately and successfully optically project three-dimensional text, images and/or symbols in an undistorted manner onto one or a plurality of three-dimensional objects, parts or skins to provide a series of logically ordered assembly instructions (steps) for an assembly or other manufacture of the object having the numerous advantages that are described herein, which was extremely difficult and challenging, and which is completely different from the manner in which laser projection systems operate. They also determined how to very rapidly and accurately measure structure thickness, grip lengths, fastener hole depths, countersink depths, hole diameters and other measurements in an automated manner. Because mistakes in an assembly or other manufacture of many complex three-dimensional objects (military and other aircrafts, vehicles, ships, trains, missiles, and the like) cannot be made without producing potentially very dire consequences, including a massive loss of human lives, an extensive amount of testing was required to perfect the measuring apparatuses, systems and methods of the present invention, and to have them operate extremely accurately.

While preferred embodiments of the measuring apparatuses, systems and methods of the invention are describe herein, and illustrated herein, these are only specific examples of how the apparatuses systems and methods of the invention can be successfully configured, set up and employed to operate, and there are many other ways that such apparatuses, systems and methods can be configured, arranged, set up and employed to operate and/or programmed by a computer programmer or electrical worker having ordinary skill in the art using the information, drawings, equations and source code that are all taught, or provided herein, in very great detail. The inventors solved hugely important, and long-felt, but unresolved needs worldwide in the manufacturing, production, assembly, and three-dimensional projection industries, which is expected to revolutionize the manner in which three-dimensional objects, parts, skins and/or the like are assembled, manufactured or processed, particularly complex three-dimensional objects, such as airplanes, jets, helicopters, submarines, ships, boats, automobiles, trucks, trains, military vehicles, missiles, tanks, cables, heavy industrial machinery, and the like, and parts thereof. They developed solutions to very large problems, and their solutions are not limited to any particular type, size, shape, number or brand of optical projectors, computers, computer software programs, computer code, measurement apparatuse, or components thereof, mounts and/or the like and/or to any particular arrangement of parts or components of the apparatuses. Using the information, drawings, equations and source code that are taught by the inventors herein in very great detail (i.e., the information that was discovered and developed by the inventors), any computer programmer or electrical worker having ordinary skill in the art can write and develop a wide variety of one or a plurality of computer software programs and/or pieces of computer code, and circuit boards, that can act alone or together in a wide variety of different combinations, and use such software programs and circuit boards in the manner described by the inventors herein with a wide variety of different optical projectors, computers, measurement apparatuses, mounts and/or the like to produce the systems, measuring apparatuses and methods of the present invention.

The various components of the preferred embodiments of the measuring apparatuses and systems of the invention may be generally arranged in the manner shown in the drawings, and/or described herein, or otherwise, as may be desired or required in a particular situation and/or for a particular application. The present invention is in no way limited to the precise parts, components, number of parts or components, arrangements, configurations, dimensions, instrumentalities, angles, codes, circuit boards, electrical components, cards, softwares, programs, computer programming languages, user interfaces, display screens, frames, calibrations, correlations and/or conditions that are shown in these drawings, or are described herein. These parts, components, arrangements, configurations, dimensions, instrumentalities, angles, codes, circuit boards, electrical components, cards, softwares, programs, computer programming languages, user interfaces, display screens, frames, calibrations, correlations and/or conditions may be varied widely, as circumstances, industries, environments, applications, individuals, entities and/or locations require, or as is desired. Further, one or a plurality of these parts and/or components may be present and arranged in a wide variety of different manners. One item may be positioned relative to another item in a number of different ways. For example, a nut may be positioned relative to a surface by being adjacent to, touching, or some distance away from the surface. The location of the various components or parts of the measuring apparatuses and systems, and parts thereof, and the means employed for attaching or connecting one or more components or parts of the measuring apparatuses or systems with one or more other components or parts thereof, may also be varied, Still further, various components or parts of the systems may be either permanently, or removably, attached with other components or parts thereof, and may be movable or stationary. Removably attached components and parts are often preferable because such components and parts may generally be replaced in a simpler and more cost effective manner in the event that they become worn, damaged or destroyed.

Specific and preferred embodiments of the systems of the invention, as they are employed in a manufacturing application and/or environment, will now be described with reference to the drawings.

In the different advantageous embodiments, one component may be associated with another component in a number of different ways. For example, the measuring probe may be associated with the housing by being attached to, bonded to, welded to, or otherwise being secured to the housing. Further, the measuring probe may be associated with the housing by being an extension or part of the housing. As another example, when one component is associated with another component, the component may be moveably or non-movably attached to the other component.

Optical Projection Systems and Methods

Referring now to FIGS. 1-23, there is shown in FIGS. 1 and 2 an optical projection assembly system being employed in a manufacturing application, which includes an optical projector 1 that is connected via a cable 2 with a computer 3. The cable 2 permits information to be transferred to the computer 3 from the optical projector 1, and information to be transferred to the optical projector 1 from the computer 3, and is connected with the optical projector 1 via a port 4 located in the back of the device 1, and with the computer 3 via a port (not shown) located in the back of that device 3. The optical projector 1 is mounted onto an adjustable tripod 5, and is optically projecting a projection 6 of a plurality of small circles onto pre-drilled holes 7 present in a three-dimensional object 8 that is being assembled (a vertical stabilizer of an aircraft). The computer 3 is sitting on a movable stand 9 including wheels 10, permitting the computer 3 and stand 9 to readily be moved from one location to another location within an assembly or manufacturing area. A keyboard 11 is connected to the computer 3 with another cable 12, and two monitors 13 and 14 are connected with the computer 3 with cables 15 and 16 that are connected to ports (not shown) that are located at the back of the computer 3 and of the two monitors 13 and 14. The cable 12 that connects the computer 3 with the keyboard 11 permits information to be transferred between the computer 3 and the keyboard 1, and the cables 15 and 16 permit information to be transferred between the computer 3 and the two monitors 13 and 14. A mouse 17 sits next to the keyboard 11 on the stand 9. FIG. 2 additionally shows a measurement apparatus 18 having its probe 19 inserted into a pre-drilled hole 7 that is present in the three-dimensional object 8 being assembled. In FIG. 1 and FIG. 2, the pre-drilled holes 7 that are darker in color represent those holes 7 that are being projected upon by the optical projector 1, and the pre-drilled holes 7 that are lighter in color represent holes 7 that are not being projected upon by the optical projector 1. In both FIG. 1 and FIG. 2, the portion of the object 8 (vertical stabilizer) being projected upon 20 has its pre-drilled holes 7 illuminated by the projection 6, and the portion of the object 8 that is not being projected upon 21 includes pre-drilled holes 7 that are not illuminated.

The measurement apparatuses and methods of the invention may be employed with optical projection assembly systems, which are discussed below, as well as with any other types of an assembly, manufacturing, production and/or similar system, in particular laser projection systems.

Projectors

The optical projection assembly systems and methods include one or a plurality of optical projectors (or similar devices that function in the same or a similar manner) that function to: (i) provide an amount of illumination in an assembly, manufacturing or other area, such as on a production line or inside an assembly building, that is effective for permitting optically projected text, images and/or symbols to be partially or fully visible to an average sighted user (preferably fully visible), preferably in any of a wide variety of different lighting conditions and/or situations ranging from no natural or other light (0% light) to full natural and/or other light (100% light), which typically depend upon a variety of factors, such as the size of a work or other area, the number of windows present therein, the number of lights present therein, the type of light bulbs employed in the lights, and/or the like (for example, a large fully dark room having no windows and no lights, a partially dark room having one or a plurality of windows and/or one or a plurality of lights turned on, ambient light, a room that is bright as a result of having one or a plurality of windows and/or one or a plurality of lights turned on, and a small room that is as bright as possible, for example, having many windows with sun shining through and a plurality of high wattage fluorescent or sodium vapor lights turned on), and preferably in ambient light; and (ii) provide an amount of coverage by such text, images and/or symbols on a three-dimensional object (or part, or skin thereof) being projected upon (in terms of height, width, depth, perimeter, circumference, diameter and/or the like) that is effective for permitting one or a plurality of workers or other system users to properly assemble, manufacture or process the object (or part, or skin thereof) (from greater than about 0% to about 100%), which coverage may be partial (less than 100%), as is shown in the drawings, or full (100%), but is preferably full. For example, if an entire automobile is present in an assembly area, and the part being assembled is a handle of the automobile, or the handle is being affixed to another part on the automobile, it is preferable that the entire handle be covered by the projected text, images and/or symbols, but the remainder of the automobile need not have any text, images and/or symbols projected thereon.

The optical projectors that are employed in these systems and methods of the invention should have a luminosity that is sufficient to overcome the amount of light that is present in a particular assembly, manufacturing, work or other area, such as ambient light, which may vary widely depending upon the situation and area, and which often ranges from about 1500 lumens (in dark assembly areas) to about 5,000 lumens (in bright assembly areas with a lot of natural light or auxiliary lighting), with at least about 4000 lumens being preferred. An effective amount of coverage of an object (or of a part, portion or area thereof) being projected upon generally ranges form about 50% to about 100%, and preferably ranges from about 90% to about 100%, with about 100% coverage being most preferred, but may vary. The type (natural light, sunlight, light from light (or other) bulbs and/or the like) of light and/or the amount of light that is present when the optical projectors are being employed generally ranges from about full brightness (100% light) to about complete darkness (0% light), with ambient light being in between.

A "lumen" is a unit of measurement of the amount of brightness that comes from a light source. Lumens define "luminous flux," which is energy within the range of frequencies that human beings perceive as light. For example, a wax candle generates 13 lumens and a 100 watt bulb generates 1,200 lumens.

When choosing an optical projector, the lumen rating is an important specification to be considered, and is greatly influenced by the available surrounding light. The standard lumen rating of a projector is the average of photometer readings at several points on a full white image on a screen.

While the intensity of an optical projector is rated in lumens, the power density on the object being illuminated is measured in foot-candles. Power density is defined as follows:

$$P=I/A$$

in which:
P=Power Density in foot candles;
I=Light Intensity at source (optical projector) in lumens; and
A=area illuminated in square feet.

The ambient light in a typical production (assembly) area ranges from about 20 to about 100 foot candles, with from about 30 to about 70 foot candles being typical, and about 40 being ideal. The optical projection system setup preferably is at least about 80% of ambient light, preferably no more than about 150% of ambient light. An even match of 100% is ideal. For example, with ambient light of 40 foot candles and a projector of 4000 lumens, the ideal illumination would mean the projected area would be 100 square feet, or 10×10 feet.

While a user of these systems and methods having ordinary skill in the art may generally readily be able determine what size of optical projectors to use for a particular assembly, manufacture or other process, and in a particular environment, the user may, optionally, use a calculator to help make this decision. One calculator that the user may use for this purpose is present at the web site infocus dot com. Other such calculators are known by those having ordinary skill in the art, and are often provided by manufacturers of optical projectors.

Using the information that is provided herein, those having ordinary skill in the art can readily select a suitable or desirable optical projector, an amount of ambient light, and a size of a work area that are suitable or required for properly using the systems and methods of the invention to assemble, manufacture or otherwise process a particular three-dimensional object, part or skin.

The optical projectors that are used in these systems and methods may be of any brand, model or type, as long as they can perform the functions that are described herein. As is known by those having ordinary skill in the art, component parts of optical projectors typically include a lamp, a cross dichroic prism, dichroic mirrors, LCD panels, reflection mirrors, lenses, polarizing converters and/or a projector lens. Additionally, they may include mounts, screens, digital or other zooms, magnifiers, fans, mouses (remote control or other), cameras, laser pointing devices, computers, VGA, RGB IN and/or other ports and/or cables, RGB1, RGB2, video and/or other inputs, computer connections and/or the like. Such components typically work together to affect light that is emitted from the lamp, and may facilitate a connection of the projector with a computer.

LCD optical projectors that are employed in these systems and methods generally project very tiny dots of light that produce red, blue and green lights on an object, surface of projector screen. By combining these primary colors, more interesting colors and tones are typically created. Red and blue light is combined to make purple, while green and red creates yellow. Transparent light is created by combining the three primary colors (red, blue, and green) with equal brightness. The colors of light are mixed into varying combinations to produce natural looking colors before the light exits the projector lens.

With most projectors, lighting conditions play a significant role in projecting an image onto a screen (or other surface or object). A dark room will work well for most LCD and other projectors, but there are times when it is not possible or desirable to have a room be dark, such as when a projection is being made in a well-lit room. LCD projectors may work differently in regards to brightness. Highly lighted areas, such as a room with many windows may require an LCD projector with a brightness of 5,000 lumens or more ANSI, whereas a room that does not include windows may require an LCD projector with a brightness as little as 1500 lumens.

When choosing a projector, the lumen rating may be an important specification to consider. In a darkened room, 1,000 lumens may be ample, but in a typical production environment with normal lighting, 4,000 lumens may be more desirable. In a room with daylight, greater than 5,000 lumens may be preferred. The standard lumen rating of a data projector is the average of photometer readings at several points on a full white image on the screen.

There are four variables that dictate what lens a user should use for a particular situation:
(i) the distance to the three-dimensional object, part or skin from the optical projector;
(ii) the size of the three-dimensional object, part of skin;
(iii) the amount of ambient light that is present in the particular work or other area;
(iv) the position of the optical projectors in relation to workers on a project, and to other objects, such as drilling machines, ladders and other objects that may normally be used in the area where the optical projectors are to be used, such as a work area.

With respect to the first variable, there are some lenses that are capable of projecting an image that may be 10' wide by 10' high when the projector is 8' away. There are other lenses that would only project an image that is 5' wide by 5' high from the same 8' distance. Therefore, the user needs to determine how close to the three-dimensional object, part or skin he can situate the optical projectors, and how far he can move them back, if needed. It is preferable that the optical projectors be as close as possible to the three-dimensional object, part or skin in order to get it to fully (100%) cover the object with the projected text, images and/or symbols. The larger the image, the dimmer the image will get. For example, a 4000 lumen projector will generally look the same with an 8'×8' projection area if the projector is 6 feet or 60 feet (different lenses) away. No matter what lens is chosen, the user has the same amount of light coming out of the optical projector. So, if the user chooses a lens that provides a 5'×5' image from 8' away, its picture will be much brighter than if the user chooses a lens that provides a 10'×10' image from 8' away. (The concept is similar to that of a flashlight. The closer that one is to an object, the smaller the light "spot" will be on its surface, but the brighter it will be. The farther back that one gets, the "spot" gets bigger, but dimmer.)

With respect to the second variable, if a three-dimensional object is so large that an optical projector cannot be moved far enough back to cover it, or there is no lens available that will project an image that is large enough to cover it, then at least two optical projectors will generally be required. Using all of the guidelines discussed in the following paragraph, the first optical projector would generally be placed with the optimal lens, and then the second optical projector would be placed in order to project an image over all of the areas that are not covered by the first optical projector. Additional optical projectors (and associated projector lens) may need to be added if coverage is not sufficient using just two of them. For example, if a computer having a plurality of video outputs specifically includes eight video outputs, typically up to eight monitors and optical projectors may be connected with the computer, such as one monitor and up to seven optical projectors (using various cables). A plurality of optical projectors, computers, monitors and/or associated equipment, each of which may have a plurality of inputs and outputs and associated cables, may be operably connected with each other in a manner that data may be transferred from one to the other, or vice versa, or both. The number of optical projectors needed or desired, and their placement within a particular assembly, manufacturing, work or other area, may be estimated, and often ranges from about 2 to about 4 per part of an object that is being assembled. For example, in one manufacturing environment, a manufacturer could have, for example, one hundred different stations in which various different three-dimensional component parts of one three-dimensional object are separately being assembled or otherwise manufactured, with each station using from about 2 to about 4 optical projectors, and a total of 200 to 400 optical projectors being employed. However, the most accurate method for ensuring that the appropriate number and placement is to try it. The user should first determine the size of the three-dimensional object (or part) being assembled.

Optical projector placement may be directed by many variables, the most important being that it needs to be placed in a manner that it is not in the way of anything, such as workers, or objects, such as aisles. Once this is determined, the type of lens to be used in the optical projector can readily be selected by those having ordinary skill in the art based on an analysis of "throw ratio." Throw ratio is defined as a distance to target divided by the width of the three-dimensional object, part or skin being projected upon, or assembled or manufactured. For example, if a three-dimensional object being assembled is 5 feet wide, and the optical projector is going to sit 10 feet away from the object, that means that the throw ratio should be 10/5, which is a throw ratio of 2. The optical projector and lens may then be placed in position and powered up (by electricity, a battery and/or the like). If a user then determines that the object (or part) is not fully covered by one optical projector, a second optical projector should be added, generally off of either side of the first optical projector. If the user then determines that the object (or part) is still not fully covered by two projectors, then a third optical projector should be added, generally off of either side of the first or second optical projector, and so forth. All optical projectors should be placed in locations within an assembly or work area so as to minimize any interference with workers, aisles, and the like. Further, if an object (or part) can be covered width wise with one optical projector, but the height of the object (or part) is such that one optical projector cannot cover it, a second optical projector will typically be needed. In this situation, the second optical projector will most likely need to be placed above the first optical projector, and high enough to cover the top of the three-dimensional object (or part).

With respect to the third variable, the ambient light plays a factor because the brighter the work or other area, the harder it is to see the projected text, images and/or symbols. Therefore, a user will generally have to move the optical projector closer or use a lens that projects a smaller image in a brighter environment (as opposed to a darker environment).

Projector sizing calculators may be employed in, or to carry out, the systems and methods of the invention, and are available on, or from, sources that are known by those having ordinary skill in the art, such as the web site infocus dot com. Data regarding image size, projection distance (distance from the optical projector to the three dimensional object or part being assembled), optical projector model and/or other variables typically may be input into the calculator, and the calculator will typically provide corresponding data, such as how large a particular image will be, or how far back from an object that a optical projector should be located.

The number, type, size and capacity of optical projectors, optical projector lens, computers, monitors, inputs, outputs, cables, associated equipment, and the like, and their placement within a particular assembly, manufacturing, work or other area, and in relation to one another, that would be suitable, or desirable for a particular project, object (or part) and/or situation may readily be determined by those having ordinary skill in the art using the information that it taught herein.

Some optical projectors have interchangeable lenses, but others do not. The following list of InFocus optical projectors that may be employed in these systems and methods include interchangeable lenses.

described herein may be employed in these systems and methods. A wide variety of projectors are commercially available from sources that are know by those having ordinary skill in the art, such as Barco (Rancho Coldova, Calif.). Preferred optical projectors for use in these systems and methods are those that are available from InFocus (Wilsonville, Oreg.) having Model Nos. IN5102, IN5104, IN5106, IN5108 or XS1 with integral ultra short throw lens, or equivalent. Preferred optical projector lens for use in these systems and methods, and in the foregoing optical projectors, are those that are available from InFocus (Wilsonville, Oreg.) having Model Nos. LENS-037 (Short Throw lens [0.8]). LENS-038 (Short Throw lens [1.2-2.0]), LENS-039 (Long Throw lens [1.9-3.9]) or LENS-040 (Ultra Long Throw lens [3.9-7.4]), or equivalent.

The one or more optical projectors that are employed in these systems and methods may be operably connected with one or a plurality of computers that are also employed therewith, for example, a video cable or other means for transferring data, information and/or graphics between the two types of devices.

Very advantageously, these systems and methods permit the optical projectors employed therein to be placed virtually anywhere within a particular work or other environment, such

| Throw Model | Lens Type | Throw Ratio | Zoom Ratio | Supported Projectors |
|---|---|---|---|---|
| LENS-022 | Short Throw Fixed | 0.8:1 | 1.0 | LP840, LP850, and LP860, C440, C450, and C460 |
| LENS-023 | Short Throw Zoom | 1.5:1 | 1.1 | LP840, LP850, and LP860, C440, C450, and C460 |
| LENS-024 | Long Throw Zoom | 2.2:1/4.1:1 | 1.0 | LP840, LP850, and LP860, C440, C450, and C460 |
| LENS-025 | Ultra Long Throw Zoom | 3.9:1/7.3:1 | 1.0 | LP840, LP850, and LP860, C440, C450, and C460 |
| LENS-026 | Short Throw Fixed | 0.64:1 | 1.0 | SP777 |
| LENS-028 | Short Throw Zoom | 1.44:1 | 1.2 | SP777 |
| LENS-029 | Long Throw Zoom | 3.6:1 | 1.0 | SP777 |
| LENS-030 | Extra Long Throw Zoom | 2.4:1 | 1.33 | SP777 |
| LENS-031 | Ultra Long Throw Zoom | 5.6:1 | 3.6 | SP777 |
| Lens-039 | Long Throw Zoom | 1.9-3.9:1 | 2.0 | IN42, IN42+, C445, C445+, IN5100 Series |
| Lens-037 | Fixed Short Throw | .8:1 | 1.0 | IN42, IN42+, C445, C445+, IN5100 Series |
| Lens-038 | Short Throw Zoom | 1.2-2.0:1 | 1.6 | IN42, IN42+, C445, C445+, IN5100 Series |
| Lens-040 | Ultra Long Throw Zoom | 3.9-7.4:1 | 1.85 | IN42, IN42+, C445, C445+, IN5100 Series |
| Lens-050 | Short Throw Fixed | 1.5:1 | 1.2 | IN5502, IN5502L, IN5504, IN5504L, IN5532, IN5532L, IN5534 and IN5534L |
| Lens-051 | Short Throw Zoom | 0.8:1 | 1.0 | IN5502, IN5502L, IN5504, IN5504L, IN5532, IN5532L, IN5534 and IN5534L |
| Lens-052 | Long Throw Zoom | 3.8:1 | 2.0 | IN5502, IN5502L, IN5504, IN5504L, IN5532, IN5532L, IN5534 and IN5534L |
| Lens-053 | Ultra Long Throw Zoom | 7.22:1 | 3.8 | IN5502, IN5502L, IN5504, IN5504L, IN5532, IN5532L, IN5534 and IN5534L |
| Lens-WUXGA-STD | Standard | 1.5-2.2:1 | 1.0 | IN5504, IN5504L, IN5534 and IN5534L |
| Lens-WXGA-STD | Standard | 1.5-2.0:1 | 1.0 | IN5502, IN5502L, IN5504, IN5504L, IN5532, IN5532L |

Any optical projectors, and associated optical projector lens, that have an ability to perform the functions that are as an assembly line, even often at extreme angles, thereby permitting workers to see projected data sets of text, Images, and/or symbols from virtually any work station in that environment. Because multiple optical projectors can be used, and each is projecting the appropriate calibrated text, images and/or symbols, if one optical projector gets obscured by a worker, the projected data sets of text, images and/or symbols from the other optical projectors will still generally be visible on the three-dimensional object.

FIG. 1 illustrates schematically a setup of an optical projection assembly system as it relates to a three-dimensional part that is being assembled, or worked on, by a user. In this configuration shown, the optical projector used to project the work instructions, assembly sequences, part outlines, or the like, on the surface of the object is shown mounted to a tripod stand.

Projector Mountings

Preferably included in the optical projection assembly systems and methods is one or a plurality of means for supporting the optical projectors and/or maintaining the optical projectors stationary and/or steady, in place and/or at a desired height and/or other position while in use, and so that any calibrations that are made using these systems and methods do not change. Such means may be any device or apparatus that performs such function(s), such as a tri-pod (or other stand), a table on which the optical projector may sit or rest, a fixed, pivot-arm or other wall mount, a flush, suspended or other ceiling mount, a table mount, a universal mount, or any similar configuration. A wide variety of such devices, which may be stationary or transportable, and associated mount kits, brackets, extendable or non-extendable extensions, clamps, stands, shelves, tilts, plates, tri-pods and the like are commercially available from sources that are known by those having ordinary skill in the art, such as CDW (Vernon Hills, Ill.). It is preferred that an optical projector that is employed in these systems and methods be mounted on a tri-pod, for example, in a conventional manner, or in a manner recommended by a manufacturer. Preferred tri-pods for such use are those that are commercially available from Delta Sigma Corp. (Kennesaw, Ga.) (Part No. PWHDPS1) or Vitccgroup Italia SpA (Via Sasso Rosso, 19 36061 Bassano del Grappa (VI). Italy) (Manfrotto Part No. 161MK2B), or equivalent.

Computers

The measuring apparatuses of the invention and optical assembly systems and methods also include, or may be operably connected with, one or a plurality of computers or data collection devices (or devices that function similarly thereto), which may be operably connected with each other and/or with other devices that are described herein, which function in the manners that are dictated by system software installed therein (discussed hereinbelow). There is generally no limit to the number of computers that may be employed in connection with these measuring apparatuses, systems and methods.

Any type and/or brand of computer that has an ability to perform the functions that are described herein, from any source, and whether present in or out of a computer network, or used with or without the Internet or the World Wide Web, may be employed in connection with the measuring apparatuses, systems and methods of the invention. Examples of computers that may be employed include, but are not limited to, personal computers, business computers, desktop computers, laptop computers, notebook computers, personal digital assistants and other handheld computers, pocket computers, general purpose computers, special purpose computers, and the like, such as those that are sold by Dell, Inc. (Round Rock, Tex.) at the web site Dell dot corn or at 1-800-www-dell, Apple Computer, Inc. (Cupertino, Calif.) at the web site store apple dot coin or 1-800-my-apple, Hewlett Packard Company (Palo Alto, Calif.) at the web site hp dot coin or 1-800-buy-myhp, Delta Sigma Corp. (Kennesaw, Ga.) at the web site deltasigmacorp dot corn or 770-975-3992, or similar companies, all of which are hereby incorporated herein by reference in their entireties. Preferred computers for used in the measuring apparatuses, systems and methods of the invention are a Dell Precision WorkStation T3400 or a Dell IBU Americas (Dell Inc., Round Rock, Tex.).

The computers that are employed in connection with the measuring apparatuses, systems and methods of the invention preferably include one or a plurality of means for enabling a user to view graphics and/or video, on a computer and/or display screen, such as an internal or external graphics card, or similar device. When more than about four display screens are being employed in connection with such measuring apparatuses, systems and methods, the graphics card may need to be upgraded from that of a conventional graphics card. Such an updated graphics card is commercially available from sources that are known by those having ordinary skill in the art, such as Delta Sigma Corp. (Kennesaw, Ga.) (Part No. PWHDGU1) or ProjectionWorks, Inc. (Kennesaw, Ga.).

As is known by those having ordinary skill in the art, a computer network can be a public network, and typically includes a central processing unit (CPU) or processor that executes the individual demands of a program, that has an ability to add, subtract, multiply and/or divide a multitude of numbers, and is connected to a system memory, which typically contains an operating system, a hard drive (for storing data), RAM (a chip that holds data), one or more application programs, one or more input devices (permitting a user to interact with the computer), such as a mouse or a keyboard, one or more output devices (also permitting a user to interact with a computer), such as a printer, a display monitor, and a communications interface, such as an ethernet card, to communicate to an electronic network, for example, via a Wide Area Network (WAN) or as an inter-network, such as the Internet. Many other similar configurations are known by those having ordinary skill in the art, and it is contemplated that all of these configurations could be used in connection with the measuring apparatuses, systems and methods of the present invention. Furthermore, using the information that is provided herein, it is within the abilities of those having ordinary skill in the art to program and configure a computer system to implement one or more of the steps of the present invention, as are discussed herein. Moreover, the present invention contemplates providing computer readable data storage means with program code recorded thereon for implementing the method steps that are described herein.

A wide variety of computer accessories may be employed with the computer that are used in connection with the measuring apparatuses, systems and methods of the invention. Such accessories include, but are not limited to, computer drives (hard drives, DVD media drives, CD media drives and/or other drives), monitors, screens, mice, keyboards, batteries, printers, storage units, docking stations, USB (and other) ports and cords, memories, memory upgrade kits, modems, wireless (and other) adaptors, routers, cables, remote controls, surge protectors, power supplies, servers, mounts, stands, speakers, headsets, headphones, web cams, DVD and CD media and media cases, carrying cases, and the like. These and other computer accessories are commercially available from sources that are known by those having ordinary skill in the art, such as Dell, Inc. (Round Rock, Tex.), Apple Computer, Inc. (Cupertino, Calif.), Hewlett Packard Company (Palo Alto, Calif.) and similar computer supply companies.

Computer systems can be configured to receive inputs from a user, such as a query as to whether an action has been performed, and output the status or lack of status of the action. Still other embodiments could be configured to output reminders, form schedules based on actions associated with the present invention, and the like, to assist in the practice of the invention and/or to manage the practice of the invention.

Embodiments within the scope of the present invention include program products on computer-readable media, and carriers for carrying or having computer-executable instructions or data structures stored thereon. Such computer-readable media can be any available media which can be accessed by a general purpose or special purpose computer, for example, RAM, ROM, EPROM, EEPROM, CD-ROM or other optical disk storage, magnetic disk storage or other magnetic storage devices, or any other medium which can be used to carry or store desired program code in the form of computer-executable instructions or data structures, and which can be accessed by a general purpose or special purpose computer. When information is transferred or provided over a network or another communications connection (generally hardwired, wireless, or a combination of hardwired or wireless) to a computer, the computer properly views the connection as a computer-readable medium. Thus, any such connection is properly termed a computer-readable medium. Computer-executable instructions comprise, for example, instructions and data which cause a general purpose computer, special purpose computer, or special purpose processing device to perform a certain function or group of functions.

The present invention is described in the general context of method steps which may be implemented in one embodiment by a program product including computer-executable instructions, such as program modules, executed by computers in networked environments. Generally, program modules include routines, programs, objects, components, data structures, and the like, that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention is suitable for being operated in a networked environment using logical connections to one or more remote computers having processors. Logical connections may include a local area network (LAN) and a wide area network (WAN). Such networking environments are commonplace in office-wide or enterprise-wide computer networks, intranets and the Internet. Such network computing environments typically encompass many types of computer system configurations, including personal computers, handheld devices, multi-processor systems, microprocessor-based or programmable consumer electronics, network PCs, minicomputers, mainframe computers, and the like. The invention may also be practiced in distributed computing environments where tasks are performed by local and remote processing devices that are linked (by hardwired links, wireless links, or by a combination of hardwired or wireless links) through a communications network. In a distributed computing environment, program modules may be located in both local and remote memory storage devices.

The order of the steps that are described herein may generally be varied, and two or more steps may generally be performed separately, concurrently and/or with partial concurrence. Such variation will depend on the software and hardware systems chosen and on designer choice. All such variations are within the scope of the present invention. Also, software and web implementations of the present invention could be accomplished with standard programming techniques with rule based logic and other logic to accomplish the various steps thereof.

The preferred system features for computers that are employed in connection with the measuring apparatuses, methods and/or systems of the invention are as follows:

Processor: Core 2 Duo E8200 processor (or equivalent or better), with a Dual Core Intel Xeon W3503 2.40 GHz, 4M L3, 4.8 GT/s being more preferred;

RAM: at least about 4 MB, and more preferably at least about 8 MB;

Hard Disk: at least about 50 GB, and more preferably at least about 320 GB:

CD or DVD Drive: a 40X CD (or equivalent or better), but a DVD is preferred;

Hard Disk Drive: at least 1 hard disc drive, and more preferably a dual disk drive RAID system;

Graphics Card: at least one graphics card that can support the OpenGL or DirectX 3D graphics language;

Operating System: an operating system for the computer(s), preferably the Microsoft Corporation desktop operating system known as "Windows XP";

For measuring apparatuses and/or systems of the invention that are employed on an assembly line or a production line, which generally cannot afford to have hard drive crashes, or other hardware and/or software problems, it is preferably to employ a dual disk drive RAID system.

The preferred Precision WorkStation T3400, for example, includes the following components and/or characteristics that are described below (and also on the Dell Inc. web site):

| Quantity | Part No. | Part Description |
| --- | --- | --- |
| 1 | RU100 | INSTRUCTION . . . , DEVIATE L6 TO L5.5, 525 W |
| 1 | MT920 | Intel Processor, E8200, 2.66 GHz, 6 MB Wolfdale, 65 W, C0 |
| 1 | 5120P | Cord, Power, 125 V, 6 Feet, SJT . . . , Unshielded |
| 1 | C158J | KIT . . . , DOCUMENTATION . . . , SERI/WSI, ENGLAND/ENGLISH . . . , DAO/BCC |
| 1 | DJ310 | Palmrest, Keyboard, Plastic Entry, Liteon, Board Lock |
| 1 | DR972 | Assembly, Digital Video Disk Drive, 16X, Serial ATA, Half Height, TOSHIBA SAMSUNG STORAGE TECHNOLOGY . . . , Black |
| 1 | DC094 | Assembly, Cable, Serial Ata Optical, Matrix, smith, mini Tower |
| 1 | J229H | KIT . . . , Software, VB32SP1A, Digital Video Disk Drive, Multiple, 5 |
| 1 | R662K | Kit, Software, Overpack, WXPPSP3 Compact Diskette W/documentation, English |

| Quantity | Part No. | Part Description |
| --- | --- | --- |
| 1 | K123H | Kit, Software, Power dvd, 8.1-00 Digital Video Disk Drive |
| 1 | XT213 | Hard Drive, 250G, S2, 7.2K, 8M SGT-SH |
| 4 | J8461 | Assembly, Cable, Video, Lead Free |
| 4 | W579C | Dual In-Line Memory Module, 1 GB 800, 128 × 72, 8.240, 1RX8 |
| 2 | RN034 | nVidia Quadro FX 1700 Graphics Card, 512, Fix, 1700 MRGA14L, Dual Monitor DVI or VGA |
| 1 | XN966 | Kit, Mouse, Universal Serial Bus, 2BTN, Optical, Logitech |
| 1 | H026G | Kit, Software, Roxio, Creator 9.0-01, Business |
| 1 | 7797R | System Integration, Fee Integration, #9 |
| 1 | D568C | Assembly, DVD +/− RW . . . , 16X Half Height, Serial Ata, PLDS |
| 1 | CD011 | Kit, Compact Diskette, Driver Resource Compact Disk Precision Workstation, V2 |
| 1 | DJ331 | Keyboard, 104, Universal Serial Bus, United States, Entry Liteon, Black |
| 1 | JT147 | Assembly, Heatsink, Shroud, CEL MTD |
| 1 | RW118 | ASSEMBLY . . . , CHASSIS . . . , PWA INTEGRATED . . . , 525 W, T3400 |

The Dell Precision WorkStation T3400 includes the following features:

It supports duel-core and quad-core Intel processors as follows:
  Dual-core Intel Core2 Extreme with 1333 MHz FSB, 4 MB L2 Cache, XD, VT, EIST;
  Dual-core Intel Core2 Duo with 1066 MHz FSB, 4 MB L2 Cache, XD, VT, EIST;
  Quad-core Intel Core2 Quad with 1066 MHz FSB, 2×4 MB L2 Cache, XD, VT, EIST It supports the following Operating Systems:
  Genuine Windows 7 Professional 32-Bit;
  Genuine Windows 7 Professional 64-Bit;
  Genuine Windows 7 Professional 32-Bit with Downgrade Rights Service to Windows XP Professional;
  Genuine Windows 7 Professional 64-Bit with Downgrade Rights Service to Windows;
  XP Professional x64 Edition;
  Genuine Windows 7 Ultimate 32-Bit;
  Genuine Windows 7 Ultimate 64-Bit:
  Genuine Windows 7 Ultimate 32-Bit with Downgrade Rights Service to Windows XP Professional;
  Genuine Windows 7 Ultimate 64-Bit with Downgrade Rights Service to Windows XP
  Professional x64 Edition;
  Genuine Windows Vista Business 32-Bit;
  Genuine Windows Vista Business 64-Bit;
  Genuine Windows Vista Business with Downgrade Rights Service to Windows XP Professional;

In includes an Intel X38 Express chipset (for computing power);

It includes Dual Channel DDR2 SDRAM System Memory (Four DIMM slots support up to 16 GB dual-channel DDR2 667 or 800 MHz non-ECC and ECC memory);

It support Dual PCI Express x16 graphics cards up to 300 watts, and with up to 768 MB discrete graphics memory, with all graphic cards supporting dual monitor configurations;

It provides serial attached SCSI (SAS) and supports up to four hard drives in the tower orientation, and up to three hard drives in the desktop orientation, for potential capacities of 4 TB and 3.5 TB, respectively. With RAID 0, 1, 5 and 10 options, storage can be configured to meet a user's needs, whether for storing huge files, backing them up or helping to improve performance with data-striping:
  SATA 3.0 Gb/s 7200 RPM with 16 MB DataBurst Cache up to 750 GB;
  SATA 3.0 Gb/s 7200 RPM with 8 MB DataBurst Cache up to 250 GB;
  SATA 3.0 Gb/s 10K RPM with 16 MB DataBurst Cache up to 160 GB;
  SAS 15K RPM up to 300 GB (requires controller card);

It includes an Integrated SATA 3.0 Gb/s controller with support for RAID 0.1, 5 and 10 Optional SAS 6i/R PCI Express controller card with support for SAS RAID 0 or 1;

It includes the following power supply:
  375 watt manual selection power supply;
  525 watt Wide-ranging Power Supply;

It includes the following slots:
  2 PCI-e x 16 graphics slots;
  1 PCI-e x 8 slot wired as x 4;
  3 PCI 32 bit/33 MHz slot with support for 5v cards It includes the following bays:
  2 internal 3.5" hard disk drive bays;
  2 external 5.25" optical bays;
  1 external 3.5" drive bay (Flex Bay) in desktop orientation, or 2 external 3.5" drive bays (Flex Bays) in tower orientation;

It includes the following standard I/O Ports:
  11 USB 2.0 (2 front, 6 back, 3 internal for uDOC/Flex-bay connectors;
  1 serial (optional 2nd connector), 1 parallel, 2 PS/2, 1 RJ-45, Stereo line-in and headphone line-out on back panel.
  Microphone and headphone connector on front panel, IEEE 1394a connector available on front panel with add-in card.

For security, it includes a Setup/BIOS Password; I/O Interface Security; Chassis intrusion switch; Biometric Fingerprint Reader; Kensington lock; and A Network Controller of an Integrated Broadcom 5754 Gigabit Ethernet controller with Remote Wake Up and PXE support.

Any computer which is equivalent, or is similar in function, to the computer that includes the hardware and software configurations that are described herein may be employed in the measuring apparatuses, systems and/or methods of the invention, such as a standard desktop computer with an external monitor and an extra video output for connecting it to a projector, and a laptop computer with an integral monitor and one external video port. Such computers, for example, include Dell Inc, model numbers T3400, T3500, T5500, T7400, T7500 and RS400 (as well as a wide variety of other computers marketed by the same or other manufacturers or distributors). The invention can support a plurality of video displays, such as eight, which can be in any combination of, for example, projectors and external/integral monitors.

The computer is preferably connected with a means for controlling the movement of a cursor or pointer on a display screen, such as a mechanical, optomechanical or optical mouse and its connecting wire, which may be connected to the computer in a variety of manners, such as via a an RS-232C serial port or a PS/2 port, or may be cordless, and rely on infrared or radio waves to communicate with the computer. It preferably is also connected with a means for displaying data, information and/or graphics, such as a display screen or monitor, and a means for entering or inputting data into the computer, such as an internal or external keyboard, and includes one or more means for connecting it with a monitor, such as a video port, graphics port, VGA port or other socket on the back (or other portion) of a computer that is used to connect a monitor. The computer is also preferably connected with one or a plurality of internal or external means for permitting data to be exchanged between the computer's components and one or more peripherals and/or measuring apparatuses, such as cables or cords, for example, power cables (for electrically or otherwise powering the computer), VGA or DVI video cables (for transferring video signals between devices, such as a monitor and a computer). IDE and SATA cables (for transferring data between a computer's internal components and the motherboard), USB and Firewall cables (for permitting peripherals to connect to a computer and transfer data, generally at high speeds), Ethernet cables (for joining two network devices, and permitting data to be transferred, generally at high speeds between the devices in the form of a series of electrical pulses), and the like.

The one or plurality of computers may be operably connected with one or a plurality of optical projectors and/or measuring apparatuses, that are being employed in the systems and methods of the invention with, for example, video cables.

Additional information regarding computers and computing is present in the following books, each of which is hereby incorporated herein in its entirety by reference: (i) Douglas E. Corner, *Computer Networks and Internets with Internet Applications* (5th Edition, Prentice Hall, 2008); (ii) M. Morris Mano and Charles Kime, *Logic and Design Computer Fundamentals* (4th Edition, Prentice Hall, 2003); (iii) Randal E. Bryant and David R. O'Hallaron, *Computer Systems: A Programmer's Perspective* (Prentice Hall, 2002); (iv) William Stallings, *Data and Computer Communications* (8th Edition, Prentice Hall, 2008); (v) Harold Abelson, Gerald Jay Sussman and Julie Sussman, *Structure and Interpretation of Computer Programs*, (2nd Edition, McGraw-Hill, 1996); (vi) J. Stanley Warford, *Computer Systems* (4th Edition, Jones & Bartlett Pub, 2009); and (vii) John Lewis et al., *Java Software Solutions*, (2nd Edition, Pearson Education. Inc., 2007, ISBN 0-13-222251.5).

Display Screens

The systems and methods of the invention preferably include one or a plurality of means for displaying data, information and/or graphics, such as a computer's user interface and open programs, allowing the user to interact with the computer, and the data, information and/or graphics appearing thereon, for example, display screens that are internal and/or external to the computer(s) being employed. Any type and/or brand of such means that has an ability to perform the functions that are described herein, from any source, may be employed in the systems and methods, and with the measuring apparatuses, of the invention. Preferred display screens for use in the systems and methods, and with the measuring apparatuses, of the Invention are a Dell LCD Flat Panel E2209Wc or a Dell LCD Flat Panel E207WFPc (Dell Inc. Round Rock, Tex.) or equivalent.

Cables

The measuring apparatuses, systems and methods of the invention preferably include, or are operable connected with, one or a plurality of means for transferring information, data, graphics and/or the like between computers, optical projectors, monitors, keyboards, mouse(s), printers, drives, measurement apparatuses, grip gages, adaptors and/or other peripherals, such as cables, colds or the like, for supplying electrical (or other) power to the foregoing devices, and/or for performing similar or other functions, which means are commercially available from sources that are known by those having ordinary skill in the art. Using the detailed information that is provided herein, those having ordinary skill in the art may readily determine which type, and the number and suitable length, of such means that should be used for a particular project, and would know how to connect such means between the foregoing and/or other devices. Preferred cables for use in the systems and methods of the invention, and with the foregoing items, include a 50-foot cable set that is commercially available from Delta Sigma Corp. (Kennesaw, Ga.) (Part No. PWHDCB50), projector power cables (typically one per optical projector) that are usually supplied with projectors (InFocus, Wilsonville, Oreg.), power cables (typically one per computer) that are usually supplied with computers (Dell Inc., Round Rock, Tex.), power cables (typically one per monitor) that are usually supplied with monitors (Dell Inc., Round Rock, Tex.) and video cables (typically one per monitor) that are usually supplied with monitors (Dell Inc., Round Rock, Tex.).

Computer Mountings

The systems and methods of the invention optionally may include one or a plurality of movable or non-movable mountings, stands, tables and/or the like for the computers (or similar devices) and/or peripherals (keyboard, mouse, monitors and/or the like), which function to provide support therefore, and a place for them to rest at a position, height and/or location that renders them convenient for a user to use, and preferably out of the way of any projections being projected upon a three-dimensional workpiece, object, part or skin being assembled, otherwise manufactured or processed in some way. It is preferable that the mounting be movable, for example, having wheels (as is shown in FIG. 1 and FIG. 2), so that the user can conveniently move the computer, measuring apparatuses and/or peripherals around to a variety of different locations within an assembly, manufacturing, work or other area, location and/or environment.

Measurement (and Other Input) Devices and Fasteners

Function

Various means may be employed in connection with the measuring apparatuses, systems and methods of the invention to connect or attach various component parts and/or surfaces of a three-dimensional workpiece, object, part or skin that is being assembled, manufactured or processed in some way together, such as, various glues (and other adhesives or bonds), cements, fasteners, including bolts with nuts or nut plates, nails, screws and/or the like, of various sizes, diameters, lengths, types and/or configurations, which may vary widely according to a particular workpiece, object, part or skin being produced or processed, and which may readily be determined by those having ordinary skill in the art using the information that is provided herein.

When a three-dimensional workpiece, object, or part thereof is being assembled or manufactured using, for example, bolts with nuts, or nut plates (nuts that are generally glued to an internal surface or structure of an object being assembled), or fasteners, optical projection, laser and other assembly systems and methods of the invention preferably include one or a plurality of means for measuring fastener hole depths of pre-drilled or other holes that may be present in the workpiece, object, part or skin to determine proper bolt and/or fastener lengths, for example, a manual or other known grip gage (grip gun), which is commercially available from sources that are known by those having ordinary skill in the art, a wired or wireless measuring apparatus of the present invention, or the like. Some preferred measuring apparatus of the present invention, and corresponding cables and hardware, for use in the foregoing systems and methods are commercially available as of the effective filing date hereof from Delta Sigma Corp. (Kennesaw, Ga.) (Part No. PWHDGG1—POE Grip Gage with cables and all necessary hardware, or Part No. PWHDPG1—POE Plunge-Style Grip Gage with cables and all necessary hardware). One of these types of measuring apparatuses of the invention may be operably connected to one or a plurality of computers with the use of a serial cable by plugging the serial cable into a serial port of the computer, and typically requires that a serial card also be inserted into the computer (which generally comes from the manufacturer or distributor along with a measuring apparatus). The other of these types is generally connected with a computer by plugging a connecting cable into the computer's USB port. Another type of a measuring apparatus that may be employed in the foregoing systems and methods is one that performs the same function, but that uses a Power-Over-Ethernet connection (cable) to connect to the computer, which could use a commercially-available CAT6 network cable, rather than a serial or USB port. Yet a further type of measuring apparatus that could be employed is one that performs the same function, but that is wireless and, thus, requires no cables attached to the measuring apparatus (or otherwise), which cables are often tripping hazards for workers. Such a measuring apparatus generally would not have any cables attached to the device (or otherwise), and would have a wireless adapter installed in the computer. As is apparent from the foregoing, a wide variety of grip gages and similar devices, and measuring apparatus of the invention, may be employed in the optical projection assembly systems and methods that are described herein.

While a known grip gage or measuring apparatus of the invention is an optional feature of the optical projection assembly systems and methods that are described herein, they are typically required when fasteners are to be installed into a workpiece, object, part or skin that is being assembled or otherwise manufactured (to connect various component parts of the workpiece, object, part or skin together). The maximum fastener size that typically may be employed is about ½" diameter×about 1" long, and the minimum fastener size that typically may be employed is about ¼" diameter×¼" long, with the use of smaller or larger fasteners also being possible. The head configuration of such fasteners generally has no restrictions and can be, for example, a hex head, a socket head cap screw, a countersunk, or the like, all of which work well, and do not affect grip gages or measurement apparatuses of the invention.

When a three-dimensional workpiece, object, part of skin is being assembled using nails and/or screws, generally there would not be a grip gage or measurement apparatuses of the invention involved in the process. In such a situation, a spot would most likely be projected by the one or plurality of optical projectors on the workpiece, object, part or skin along with some text informing, illustrating or showing a user the location(s) at which to insert a nail or screw (or similar device), and there generally would not be any restrictions on diameter and/or length of the nail or screw.

When a three-dimensional workpiece, object, part of skin is being assembled using glue (or the like), generally a line that is a specific length, width and shape (i.e., straight, curvilinear, wiggly, curved and/or the like) would be projected on the workpiece, object, part or skin that shows the user the location at which to apply a bead, strand or other application of the glue, and a grip gage or measurement apparatuses of the invention would not need to be used.

Further, if it is desired or necessary to measure the conductivity of one or a plurality of surfaces of a three-dimensional workpiece, object, part or skin, or the thickness of a coating that is present thereon, the "spots" projected on the workpiece, object, part or skin and the text would generally inform a user of the location at which to place the applicable measurement device (thickness or conductivity). When the user places it at the indicated location and triggers the measurement apparatus, a reading would generally be sent back to the computer. Some aircraft parts have a conductive coating sprayed on them and, for quality assurance reasons, a conductivity meter (gage) is used to ensure that the coating is conductive and, therefore, thick enough. These measurements are typically made in the same location for each of the same workpiece, object, part of skin that is made. This tool could project a "spot" onto the part where the measurement should be made.

Operation

A general discussion of the operation of the measuring apparatuses of the invention is set forth below, and a more detailed discussion regarding such operation is set forth in a subsequent section of this document.

Figure 4:
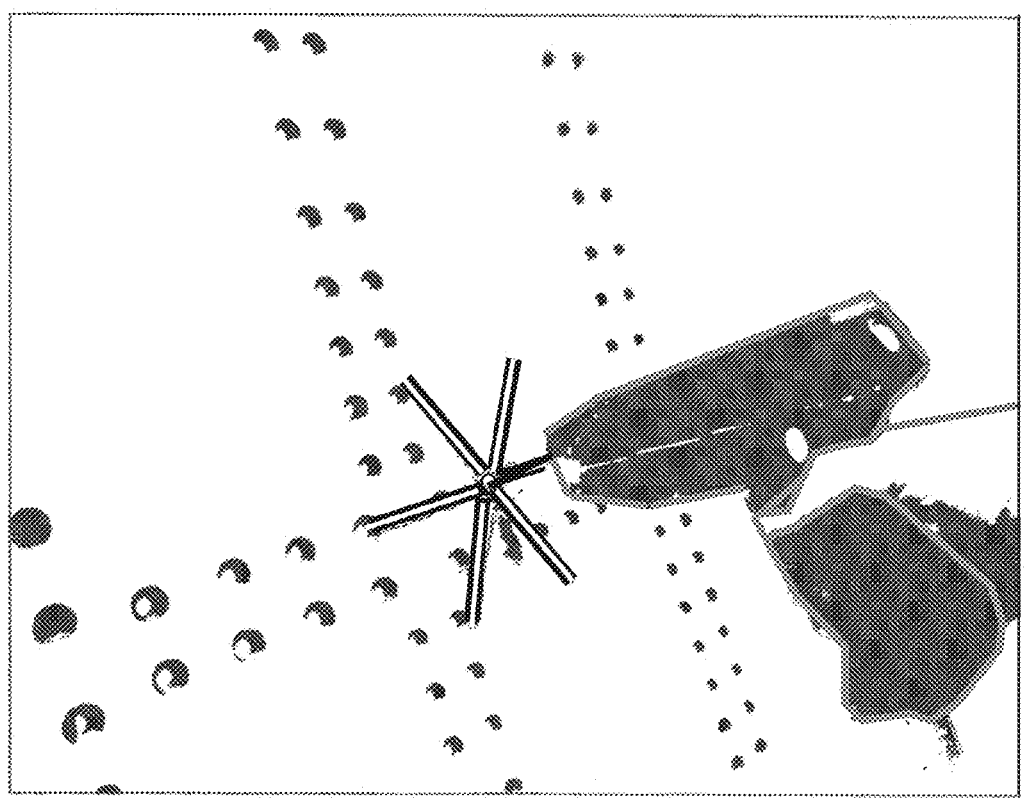
FIG. 4 is a photograph of a measurement apparatus of the invention being inserted into a pre-drilled fastener hole shown in FIG. 3.

Measuring apparatuses of the invention generally operate in the optical projection assembly systems and methods of the invention in the manner that is shown in FIGS. 2-3. FIG. 3 shows a starburst pattern that is projected by an optical projector onto a pre-drilled fastener hole (present in an object or part) that is to be measured, and FIG. 4 shows a measuring apparatus that is placed into a hole shown in FIG. 3 in a manner that its three "feet" are in contact with a surface of an object being assembled.

A measuring apparatus of the invention generally includes a relatively long probe, for example, one that is about 1.5" inched long, having a relatively blunt hook on its end that is placed partially (greater than 0% but less than 100%) or fully (100%) through the hole, extending through it and out its back or far end when extending fully through the hole.

For a "retraction trigger type" of measuring apparatus of the invention, in operation, a user typically squeezes a handle and/or trigger that is present on the apparatus until the hook on the probe is pulled inward and contacts the back of the object. Typically, once the handle "clicks," the computer(s) that the measurement apparatus is connected, and can exchange data, with reads circuitry that is present inside of the measurement apparatus to procure a thickness reading of the skin of the object (or other surface or part of the object), which typically correlates with fastener length, and/or some type of a hole measurement (hole depth, diameter, countersink depth and/or the like). If the thickness or measurement reading is within a particular tolerance band (as opposed to not being within the tolerance band), the starburst pattern shown in FIG. 3 generally advances to the next pre-drilled hole, and the measurement apparatus is moved to that location to measure the skin thickness (fastener length) and/or perform one or more hole measurements in connection with that hole. If the measurement is out of the tolerance band, the starburst typically turns red, and does not advance to the next hole. (Many product manufacturers will specify to assembly technicians that the thickness of a skin of a particular product (or component or surface thereof) must be at least about X inches, but no thicker than about Y inches, which is a "tolerance band" for the particular product.) When a user measures fastener length in this step, the user is effectively measuring skin thickness. Because the skin on, for example, the vertical tails of F-22 aircrafts is typically a graphite composite layup, its thickness can vary, and should be accurately measured. (A composite layup is made up of numerous layers of fiberglass, graphite, or other cloth and resin, which typically gets compressed and heated into a rigid skin. Because it is a layup, it can have a thickness variation.) Thus, if the thickness that is measured falls within this tolerance band, it is said to be intolerance. If it is outside this tolerance band, it is out of tolerance. The user can then push a yellow (or other) button that may be present on the measurement apparatus to repeat the measurement. Alternatively, the user can press the red (or other) button that may be present on the measurement apparatus to advance to the next hole, and the Operator Assembly Software Tool that is described herein will automatically save this out-of-tolerance hole information to the computer. The user can subsequently view all of the holes that were out of the tolerance band (i.e., at the time that the user starts to insert fasteners into the holes).

A wide variety of measurement apparatuses of the invention and/or input devices can, optionally, be employed in the optical projection assembly systems and methods of the invention, preferably in a manner that permits the computer (s) to interface with the devices (i.e., to be able to transfer information between the two), so that they can accept input information from the devices and/or that information can otherwise be exchanged between the programmable computers and the devices. Examples of such devices include devices that measure weight, depth, angles, size, shape, width, and the like, for example, continuity checkers, depth gages and/or the like.

The present invention is equally beneficial when used with laser projection systems for similar assembly applications.

Computer Software

The computers that are included in, or employed with, the measuring apparatuses, systems and methods of the invention may include one or more different computer software programs, which function in the manner that is described herein, and which may be procured from sources that are known by those having ordinary skill in the art and/or written by computer programmers having ordinary skill in the art using the information, drawings and source code that is described, and provided, herein in great detail.

When writing a computer program, a programmer typically tries to solve a particular problem by, for example, understanding the problem, breaking the problem into manageable units, designing a solution, considering alternatives to the solution, refining the solution, implementing the solution (by writing a program in the form of code), and testing the solution, fixing any problems. When developing software, separate pieces are generally designed that are responsible for different parts of the solution, and then are subsequently put together. A program is written in a particular programming language, such as Java (an object-oriented programming language in which objects are the basic pieces that make up a program), Ada, C++, C#, Pascal or Smithtalk, which typically employ specific words and symbols to express the problem solution. Different programming languages define different sets of rules that determine exactly how a programmer can combine the words and symbols of the language into programming statements (instructions that are carried out when a program is executed).

Four general categories of programming languages currently exist, and include machine language, assembly language, high-level languages and fourth-generation languages. In order for a particular program to run on a computer, the program must be in the computer's machine language. Each type of a CPU typically has its own machine language. Because machine language code is expressed as a series of binary digits, such code is difficult for human beings to read and write. While assembly language, which employs relatively short words that represent commands or data, is significantly easier for programmers to use, a program in this language cannot be executed directly on a computer. It first needs to be translated into machine language. Most programmers employ high-level language, such as Java, Ada, C++, C# and Smithtalk, to write software, which employs phrases, and is relatively easy for programmers to read and write, but must also be translated into machine language before it can be executed, for example, using a compiler and/or interpreter. A wide variety of commercially available Software Development Kits (SDKs) are often used by programmers to develop software, such as the Java Software Development Kit, which includes a compiler, an interpreter, and several other software tools that may be useful for a programmer, and may be downloaded at no cost from the Sun Microsoft web site java dot sun dot com. In addition, Integrated Development Environments (IDEs), programs that combine an editor, compiler and other Java support tools, may be used by programmers to support a development of Java programs. One of these programs, known as NetBeans, incorporates the development tools provided by Java Software Development Kits, into one convenient GUI-based program, and may be downloaded at no cost from the web site netbeans dot org. A similar Integrated Development Environment (IDEs) that is called Eclipse, and is promoted by IBM, may be downloaded at no cost from the web site eclipse dot org.

A wide variety of computer software programs and operating systems that may be employed in connection with the measurement apparatuses, systems and/or methods of the invention are commercially available from sources that are know by those having ordinary skill in the art, such as Microsoft Corporation (Redmond, Wash.). Dell, Inc. (Round Rock, Tex.), Apple Computer. Inc. (Cupertino, Calif.), Hewlett Packard Company (Palo Alto, Calif.). Delta Sigma Corp. (Kennesaw, Ga.), and similar computer software supply (or other) companies, and/or may be written by computer programmers having ordinary skill in the art using the information, drawings and computer source code that are provided herein. The present in invention is not limited to any particular type, number or version of computer software programs or operating systems, or to any particular manufacturer or distributor of computer software or operating system. As is well known by those having ordinary skill in the art, more than one computer software program, or version thereof, and often a wide variety of computer software programs, and versions thereof, or combined software programs, may be used to perform the same function on, or in connection with, a computer. Also, computer software programs that may retain the same function are often routinely or continuously updated or enhanced, sometimes with the use of "plug-in" or "add-in" computer code and/or with other enhancements, additions, deletions and/or substitutions to existing code. Thus, any type and number of computer software programs and/or operating systems may be employed in connection with the measurement apparatuses, systems and/or methods of the present invention, as long as they have an ability to perform the functions that are described herein, and such computer software and operating system may be procured from any known (or other) computer software manufacturer or distributor or store or generated by a computer programmer having ordinary skill in the art. Further, additional computer programs may be employed in connection with the measurement apparatuses, systems and/or methods of the invention, as long as they are compatible with computer programs that are required for the invention to properly operate, which may be determined by those having ordinary skill in the art.

There are several general categories of computer software that may be employed in connection with the measurement apparatuses, systems and methods of the invention. Programming software generally come in forms of tools that assist a programmer in writing computer programs (sets of logical instructions that make a computer system perform certain tasks). The tools that help the programmers in instructing a computer system include text editors, compilers and interpreters. System software helps in running the computer hardware and the computer system, and is a collection of operating systems: devise drivers, servers, windowing systems and/or utilities. System software helps an application programmer in abstracting away from hardware, memory and other internal complexities of a computer. Application software enables the end users to accomplish certain specific tasks. Business software, databases and educational software are some forms of application software. Different word processors, which are dedicated for specialized tasks to be performed by the user, are other examples of application software. Inventory management software helps an organization in tracking its goods and materials on the basis of quality, as well as quantity. Warehouse inventory management functions encompass the internal warehouse movements and storage. Inventory software helps a company in organizing inventory and optimizing the flow of goods in the organization, thus leading to an improved customer service. Utility software helps in the management of computer hardware and application software, and performs a relatively small range of tasks, such as disk defragmenters, systems utilities and virus scanners. Data backup and recovery software provides functionalities beyond simple copying of data files. This software often supports user needs of specifying what is to be backed up and when. Backup and recovery software generally preserve the original organization of files, and allow an easy retrieval of the backed up data. Installation software functions to prepare an application (software package) to run in a computer. Typically combined with the application it is installing, the install program creates a folder with a default hame on the hard disk and copies the application files to that folder. The complete installation package is generally either an Internet download or on a CD-ROM, DVD-ROM or a diskette. Application files are generally compressed in the package, and the install program decompresses them into their original format and respective folders. With Windows applications, the install program often adds or updates extensions to Windows that reside in the Windows folder. It is also customary for the install program to deposit an uninstall option so the application can be easily removed later on. Install programs may also be used to attach a measuring apparatus or a new peripheral device to a computer. The install program may add the device's driver to the operating system, or it may be used to set or reset parameters in an updatable memory (flash memory, EEPROM, etc.) on the expansion board that has been plugged in. Security software provides some measure of security from attack to a an individual computer, or a computer that forms part of a network, and the data present therein. Document display software functions to display text documents on a display screen, so that they can be read and/or modified. Networking software, such as Microsoft Outlook and Internet Explorer, function to permit communication over a network via email, internet and/or the like, and/or allow a user to perform network maintenance, troubleshooting and/or setup. Computer configuration software functions to configure a computer for usage, for example, setting up graphics cards, performing maintenance, such as cleanup and/or error detection on hard drives, and/or to install, configure and/or uninstall other hardware components on the computer. Database software development software functions to create, maintain and/or query databases that can be used as standalone databases and/or have them incorporated into one or more other software programs. Software development software functions to permit a user to write one or more software programs that will run (execute) on one or a plurality of different software programs, such as the Authoring, Configurator and/or Operator Assembly Software Tools that are described herein, which were written using Microsoft Visual Studio 2008.

The computer software that is employed in connection with the measuring apparatuses and/or optical projection assembly systems and methods of the invention performs necessary or desired adjustments, translations and/or transformations to data, for example, so that a projected image onto a three-dimensional object, part or skin preferably appears undistorted, or so that measurement data can be recorded, stored, manipulated and/or used in some other manner, and often should be installed on a programmable computer. One preferred embodiment of this software for an optical projection assembly system includes three separate software tools (or software components) as are described below, and as are illustrated in the flowcharts that are present in FIGS. 21, 22 and 23. The source code for these three separate components is described herein, and is provided herewith. Detailed information about this source code is present towards the end of this document.

(i) an Authoring Assembly Software Tool ("Authoring Tool")—Used to define what needs to be done, such as design a particular assembly, manufacture or other process in a step-by-step manner. For example, this tool permits a user to initially set the system up by inputting a series of manufacturing or assembling steps into the computer(s), creating the steps that are required to manufacture or assemble a particular three-dimensional workpiece, object, part or skin;

(ii) a Configurator Assembly Software Tool—Used to define how to do it. For example, this tool permits a user to properly configure the system by putting the manufacturing, assembling or other process steps created in the Authoring Tool into a logical, proper or "best" order for a particular manufacturing, assembly or other process (i.e., into a proper workflow), as well as to assign one or a plurality of optical projector(s) to the appropriate graphics output ports on the computer(s)); and (iii) an Operator Assembly Software Tool—Used by an operator to direct the optical projection process. For example, this tool permits an operator to execute the manufacturing, assembly or other process steps that were put into the logical, proper or "best" order using the Configurator Tool, by operating the system to optically project a series of ordered manufacturing, assembly or other instructions in the form of steps using text, images and/or symbols onto a three-dimensional object, part or skin being manufactured, assembled or otherwise processed.

One of the key features of the optical projection assembly systems and methods of the invention is that when an assembly or other manufacture is being designed, all the details about how it will be assembled or manufactured are not needed. The Authoring Tool allows an engineer or other user to put all of the components into the project with all of the associated text, images and/or symbols, and without having to be concerned with, determine or evaluate, the number of optical projectors that will be required, where they will need to be located or positioned within a particular area, or even how many systems it will take for a particular job, such as manufacturing an entire aircraft.

The production department of a manufacturer (or other business) typically will take the project file from the Authoring Tool and load it into the Configurator. In the work cells for a particular process, a user will decide where optical projectors can be located, how many are needed to get a desired or good coverage of a three-dimensional object, part or skin, how many technicians will be used executing concurrent or separate process steps, and other such information. The Configurator Tool creates a file that can be run, for example, by a technician each time that the sane three-dimensional workpiece, product, or part thereof, is assembled, manufactured or otherwise processed.

The Operator Tool is very easy to run and requires practically no computer knowledge. An operator (system user) is led through, for example, a manufacturing, assembly or other process step-by-step in a logical or "best" order of steps with all of the programmed aids to help along the way, such as a video tutorial, and typically cannot change any step of the process.

The three software tools can be present in one computer program, in a series of two or more computer programs (in any manner desired), or the like, and can be installed together or separately on a single computer, or on separate computers. If installed on separate computers, the necessary or desired files can be transferred between the two or more computers using a means for transferring data and/or files between computers, such as a memory stick, a CD, a DVD or a floppy disc, or transferred over a network, if the computers are linked together.

Included herein is computer source code written in Microsoft Visual Studio C# that shows one solution for projecting three-dimensional projections using one or a plurality of optical projectors onto three-dimensional objects, parts or skins. The solution that is described below is one way of achieving such results, and these results could also be achieved by a computer programmer having ordinary skill in the art using different algorithms and/or computer languages, such as C, C++, Java, Fortran, Visual Basic, and the like, and is not limited to that which is shown below. The computer language selected was based primarily on the inventors' experience and preference, as none of these computer languages hold significant advantages over all of the other computer languages.

In order for the systems and methods of the invention to work, in addition to the computer hardware, peripheral devices, and optical projectors that are described herein, there must be a specialized software program written specifically for this purpose (or otherwise procured). An example of one such program (referred to as "code," or "source code") is included herein. This code is to be compiled from the source code into an executable code to be run on a computer using the computer operating system for which it is compiled.

The details of every aspect of how to accomplish the task of projecting three-dimensional text, graphics and/or symbols, and a combination thereof, onto three-dimensional objects, parts or skins in a substantially or fully undistorted manner, as is described herein, is included in the source code that is described herein, and provided herewith. Additionally, the following paragraphs provide a high level overview of that which is being accomplished in the programs. The necessary functions have been divided into three separate programs in this implementation, but all of those functions could have been put into one or two programs, or perhaps more than three. This is one example that is a matter of programming preference, and what is expected to be the most convenient to the particular user.

Define Geometry of Surface to Project on (Base Geometry)

It is first required that the three-dimensional geometry dataset of the surface(s) that will be projected upon by the optical projector(s) be supplied in a format that can be consumed by the computer code. This format is dictated by the source code author and programming language, and can vary depending upon how the source code is written. The contents of this three-dimensional geometry is created or generated by a third party (or other) three-dimension modeling tool, such as Catia (Computer Aided Three-dimensional Interactive Application) or SolidWorks. This file is preferably exported from the three-dimensional modeling software in an .STL format, but the format required is dictated solely by how the source code requires it. The software also provides a means to create simple planar surfaces to use as projection surfaces if CAD (or similar) data is not available or required.

Define Geometry of What to Project (Annotated Geometry)

The second dataset that is needed in this example of three-dimensional projection using optical projectors is what is referred to as the "Annotated Geometry" file. This dataset file contains all of the information that is necessary to define what is projected onto the three-dimensional surface(s). This dataset can be built and then imported from a CAD (or similar) system, or it can be built within the software here. In examples used herein, fastener hole locations are being projected onto the three-dimensional surface. Holes are used only as an example. The projected features can be any desired geometry. The Annotated Geometry file for this type of dataset contains the X, Y, and Z location (point) in space of the hole, as well as the I, J, K orientation in space (normal vector) for each hole, which can be thought of as the definition of which direction the hole is facing. The format for this file is dictated by the source code Authoring Assembly Software Tool, and can vary for different implementations. The annotated geometry can be created or modified within the software tool.

Define Spatial Relationships Between Projectors and Objects (Calibration Step)

After these datasets are consumed or created within the source code described, and provided, herein, the next step in performing a three-dimensional projection is to determine where the three-dimensional workpiece, object, or part, to be projected upon is located in a manufacturing, or any other, environment or location with respect to the one or plurality of optical projectors being employed. This is accomplished using a "Calibration" step. In this step, a series of points must be chosen from the Annotated Geometry file or the Base Geometry file that can be used as calibration points. These points are chosen in such a way as to insure that all geometric variances of the three-dimensional object, part or skin are calibrated. In other words, these points are chosen so that all of the visible corners and/or visible edges of the object, part or skin are calibrated, as well as any variances in depth. The example source code that is included herein has algorithms that require a minimum of 8 calibration points (8 or more calibration points, with no upper limit).

While it could be possible in other calibration methods that may be employed in connection with the systems and methods of the invention that as few as 3 calibration points could possibly be employed, it is typical in most calibration methods for most three-dimensional objects, parts or skins to employ from about 8 to about 10 calibration points, 3 calibration points can generally only be employed if the optical parameters are already known. If a user knows nothing about the target position, optical projector position, or optics, generally about 7 or more calibration points (and usually 8 or more) need to be employed. Some ambiguities can exist with 7 calibration points, and 8 calibration points will usually work over 99% of the time, and is thus preferred. However, if the optics were calibrated in a prior step, and there were certain constraints on the target position, it could be resolved in as little as 3 calibration points. In other words, 8 or more calibration points generally always work, but a lesser number of calibration points could work given the right set of conditions. The number of calibration points needed in a particular situation, and with respect to a particular three-dimensional workpiece, object, part or skin, being projected upon varies in accordance with the complexity of the surfaces of the workpiece, object, part or skin, being projected on (i.e., the greater the complexity (more variations) of the surface of the object, part, or skin, the more calibration points that typically may be desired or required). Thus, for some more complex three-dimensional workpieces, objects, parts, or skins, for example, 20 to 30 calibration points may be desired or required. Typically, the greater number of calibration points that are employed, the longer that the systems and methods of the invention take to operate, but the less distorted a projected three-dimensional text, image or symbol, or combination thereof, will appear to the human eye when projected onto a three-dimensional workpiece, object, part or skin (up to a certain number of calibration points). At some point, additional calibration points will not make much or any difference in the appearance of the projected material. Using the information that is set forth herein, a person having ordinary skill in the art can determine a suitable number of calibration points to employ in connection with a particular situation and three-dimensional workpiece, object, or part, to be projected upon.

To perform the calibration, the optical projector is set up to illuminate the area of interest on a three-dimensional workpiece, object, part or skin. The projector is essentially a second computer display (hereinafter referred to as the "Projector Display"), while the first display shows the software User Interface (hereinafter referred to as the "User Display"). The geometry to be calibrated is shown on the User Display. The software sequentially steps through the calibration points, highlighting each point. In the projected view, the user moves the cursor to the corresponding point on the actual three-dimensional object, part or skin, and clicks the mouse. The software captures the x, y screen position of the mouse click (hereinafter referred to as "the projected point"). This point represents the projection of the actual three-dimensional point onto the projector's image plane, and it's conversion into the digital graphics coordinate system.

The projected point, along with the three-dimensional coordinates of the actual point, define a point correspondence. Using a set of these point correspondences (minimum of 8), it is possible to calculate the location and orientation of the projector (or multiple projectors) within the geometry's coordinate system, and to calibrate the projector's optics, including focal length, lens distortion, optical center and scaling. The result of this calibration is a graphical transformation matrix, which can then be used to accurately draw within the geometry's coordinate system.

This transformation is now applied to the projected annotated geometry dataset and projected onto the actual three-dimensional workpiece, object, part, or skin in true scale. If the projected image was viewed on a standard LCD type monitor, the geometry would appear to be distorted due to the transformation, but on the three-dimensional workpiece, object, part or skin, the geometry is drawn accurately, undistorted and in true scale.

The calibration procedure that is described herein for a use with the optical projection assembly systems and methods of the invention may be performed very rapidly (often in one minute or less by a few clicks of a mouse), and can last, for a particular optical projection, for a very long period of time, for example for a period of at least 2 years (and sometimes longer).

Further, in contrast with a manual calibration system, a user could use a vision calibration system with the optical projection assembly systems and methods of the invention, which uses, for example, one or more machine vision cameras. It would work by using the cameras to identify known points or features on the three-dimensional object. Machine vision software packages, such as Cognex VisionPro, are commercially available, and have utilities built into them in which a Machine Vision Camera would take an image of a known object, and determine its orientation in space with respect to the camera by locating predefined features on the part. With this information, it is able to determine where in space, i.e. the coordinate system, the object is located and provide back to the systems and methods of the invention the same information determined by using a mouse method of calibrating. Other calibration systems could also be employed.

Provide Input Measurement Data (Optional Step)

At this point, the optical projection assembly system of the invention now allows a user to collect information about the three-dimensional workpiece, object, part or skin, based upon the points in the Annotated Geometry file. Examples of the type of information that can be collected about these points can include, but are not limited to, skin thickness at each projected point on the three-dimensional workpiece, object, or part, surface conductivity at each point, coating thickness at each point, and/or the like. This information is collected, for example, using an external measurement apparatus of the invention that is operably connected with the computer. Information that is sent from this collection device may be stored along with the point geometry for future use by the source code. In the source code that is described, and provided, herein, this information is used to indicate to an assembly technician (or other system user) what type of fastener (out of possibly many different fastener types and/or lengths that may be used to manufacture a particular three-dimensional object, or part) should be placed into each of a series of pre-drilled or other holes (of any number) that are present in the three-dimensional object's or part's surface, and how long this fastener should be. Other implementations of this source code could use this information to perform various other tasks, and are not limited to fastener installation. Examples of additional or other implementations could include quality control for surface conductivity or coating thickness, application of external coatings, both visible and non-visible, locations for surface decals or paint features, installation of specific components, and/or the like.

Project Desired Information

After all of the inputs have been gathered, the data is processed and made ready to be displayed by the optical projector(s). The algorithms used are similar in concept to those used for making three-dimensional measurements with a camera, with an exception that the process is reversed. Rather than viewing the image of a physical object through a lens onto a CCD (charge coupled device), or another type camera image sensor, and then transforming that into a three-dimensional computer model, the optical projection assembly system of the invention uses a similar process, but inverted, to take a three-dimensional computer model and place that on a LCD (liquid crystal display), or on another type device in an optical projector where it will be backlit and pass through a lens, such that it will conform to the physical three-dimensional workpiece, object, or part, of the computer model.

Information that is helpful in understanding the discussion above, and the source code described, and provided, herein is present in Dave Schreiner, *OpenGL Reference Manual, The Official Reference Document to OpenGL, Version* 1.4 ($4^{th}$ Edition, Addison Wesley, 2004. ISBN: 0-321-17383-X); Dave Schreiner et al., *OpenGL Programming Guide, The Official Guide to Learning OpenGL, Version* 2.1 ($6^{th}$ Edition, Addison Wesley, 2008, ISBN-13: 978-0-321-48100-9, ISBN-10:0-321-48100-3); Tom McReynolds et al., *Advance Graphics Programming Using OpenGL* (Morgan Kaufman Publishers, 2005, ISBN: 1-55860-659-9); Richard J. Wright Jr., et al., *OpenGL SuperBible* (Waite Press Group, 2000, ISBN: 1-57169-164-2); Robert M. Haralick et al., *Computer and Robot Vision, Volume* 2 (Addison Wesley, 1993, ISBN: 0-201-56943-4); Berthold Klaus Paul Horn, *Robot Vision* (The MIT Press and McGraw-Hill Book Company, 1986. ISBN-13: 978-0-262-08519-7, ISBN-13: 978-007-030349-2); Matthew MacDonald. *Pro .NET 2.0 Windows Forms and Custom Controls in C#*(Apress, 2006, ISBN: 1-59059-439-8); Leonid Yaroslavsky et al., *Fundamentals of Digital Optics* ($1^{st}$ Edition, Birkhauser Boston, 1996, ISBN-10: 0817638229, ISBN-13: 978-0817638221); E. R. Davies, *Machine Vision, Third Edition: Theory, Algorithms, Practicalities (Signal Processing and its Applications)* (Morgan Kaufmann; 3rd Edition, 2005, ISBN-10: 0122060938 ISBN-13: 978-0122060939); Daniel Malacara, *Optical Shop Testing* (3rd Edition, John Wiley and Sons, 2007, ISBN: 978-0-471-48404-2); Karl Dieter Moller, *Optics Learning by Computing, with Model Examples Using MathCad, MATLAB, Mathematica, and Maple* Springer 2007 (2nd Edition. Springer, 2006, ISBN: 978-0-387-26168-3); Nikos Paragios, et al., *Handbook of Mathematical Models in Computer Vision* (1st Edition, Springer, 2006, ISBN: 0-387-26371-3): E. R. Davies, *Machine Vision: Theory, Algorithms, Practicalities* ($2^{nd}$ Edition, Academic Press, 1997, ISBN: 0-12-206092-X); Robert E. Fischer et al., *Optical System Design* (2nd Edition. SPIE Press, 2008, ISBN: 978-0-07-147248-7); Eric White, *Pro .NET 2.0 Graphics Programming* (Apress, 2006. ISBN: 1-59059-445-2): Wilfried Linder, *Digital Photogrammetry* ($2^{nd}$ Edition, Springer, 2006, ISBN: 3-540-29152-0); Paul R. Wolf et al., *Elements of Photogrammetry with Applications in GIS* ($3^{rd}$ Edition. McGraw-Hill, 2000, ISBN-13: 978-0-07-292454-1, ISBN-10: 0-07-292454-3); Gary Bradski et al., *Learning OpenCV* (1st Edition. O'Reilly); Gene Golub et al. *Matrix Computations* (2nd Edition, John Hopkins); and Gerald Farin. *Curves and Surfaces for CAGD, a Practical Guide* (1st Edition, Academic Press).

Authoring Assembly Software Tool

In the optical projection assembly systems and methods of the invention, the actual assembly, production or manufacture instructions for assembling or otherwise manufacturing a particular three-dimensional workpiece, object, part or skin (i.e., an assembly or manufacturing process in a logical step-by-step order, preferably of the "best" way to assemble a particular object, part or skin), such as an aircraft, or a wing or tail of an aircraft, are typically initially provided by the technicians that normally assemble or otherwise manufacture the particular workpiece, object, part of skin, or by the engineers (or others) that designed the particular object, part of skin, and then programmed as a sequence of ordered assembly instructions (steps) into the computer. These instructions are used to initially (only the first time that an object, part or skin is assembled) setup the systems of the invention, using the Authoring tool, and must generally be provided by individual(s) that have knowledge about the particular item being assembled. In contrast, if the item were to be assembled manually (i.e., using blueprints, plans, instruction manuals, other paper documentation and/or computer screens), which may be hundreds of thousands of pages in length, such documents must be re-read each time that the item is assembled or manufactured, whether performed by a skilled technician or an unskilled technician, rendering such process extremely time-consuming, difficult, inefficient, and subject to a significant amount of human error.

Someone with no knowledge of the particular object being assembled in connection with the optical projection assembly systems and methods of the invention would not have the knowledge required to design and create an assembly process for that object. Further, the person(s) who create the assembly, manufacturing or other process for a particular object will generally be one who is already skilled with respect to the particular object. The goal of this software is not to take someone who knows nothing about assembling, manufacturing or processing the object and have them create an assembly or manufacturing process for the object, but rather to have someone who has never assembled or otherwise manufactured the object execute the assembly or manufacturing process created, and perform the associated assembly or manufacture in much less time than would otherwise be required if the process was performed manually (i.e., without the optical projection assembly systems, measuring apparatuses and methods of the invention). For example, a workpiece or other three-dimensional object (or part) being assembled or manufactured may include several thousands of pre-drilled holes having a variety of different depths, and thirty different fastener part numbers may be required for use in various groups of different holes. The process assembly instructions can, thus, be set up to specify which fastener parts are to be used in which pre-drilled holes, and which fastener parts are to be used with specified groups of pre-drilled holes before other fasteners (i.e., steps and an order of assembly).

The Authoring Tool is used to create or read into the computers employed in the optical projection assembly systems and methods of the invention the Base Geometry and Annotated Geometry for a particular three-dimensional workpiece, object, or part, to be projected upon, and then create various frames that are needed to perform a single or multiple-step assembly, manufacturing or other process, with the number of frames being created corresponding with the number of assembly, manufacturing or other steps to be performed, for example, in the manufacture of the three-dimensional object, or part, and each frame describing a separate step. The Authoring Tool generally does not perform any data manipulation (which generally does not occur until the calibration step in the Operator Tool).

Figure 5:
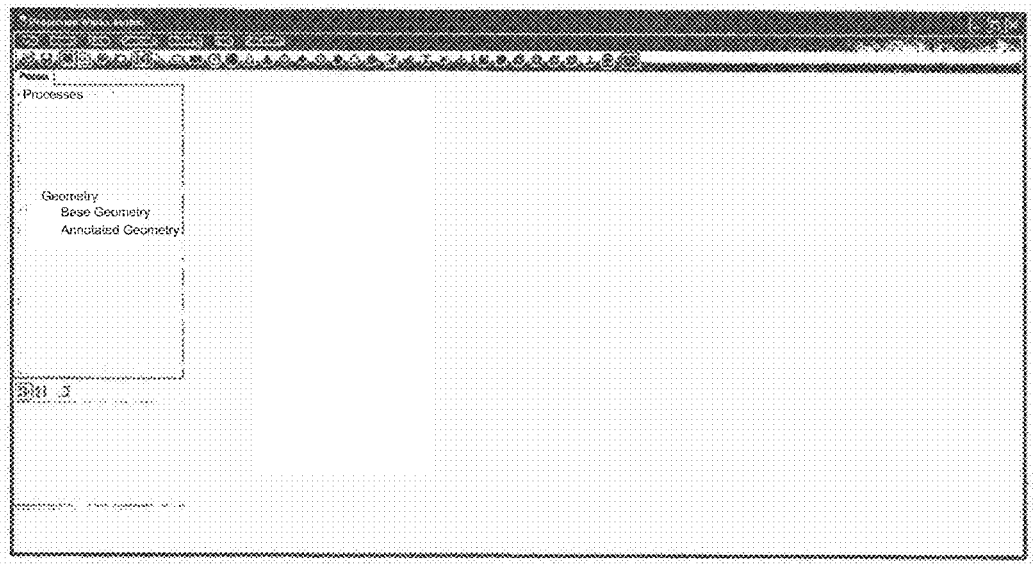
FIG. 5 is an illustration of a User Interface screen of an Authoring Assembly Software Tool ("Authoring Tool") that may be employed in the systems and methods of the invention. This screen shows "Base Geometry" and "Annotated Geometry" geometry options, as well as a series of icons at the top of the screen that permit different functions.

FIG. 5 is an illustration of a User Interface for an Authoring Assembly Software Tool (hereinafter "Authoring Tool") that may be employed in the optical projection assembly systems and methods of the invention.

To start, the user launches the Authoring Tool by selecting on the main computer screen "Start," and then "All Programs," and then "Authoring Tool" (or by using a desktop short cut). The User Interface of the Authoring Tool is then used to create processes that may be needed or desired to assemble, manufacture, measure, or otherwise process a particular part.

Figure 6:
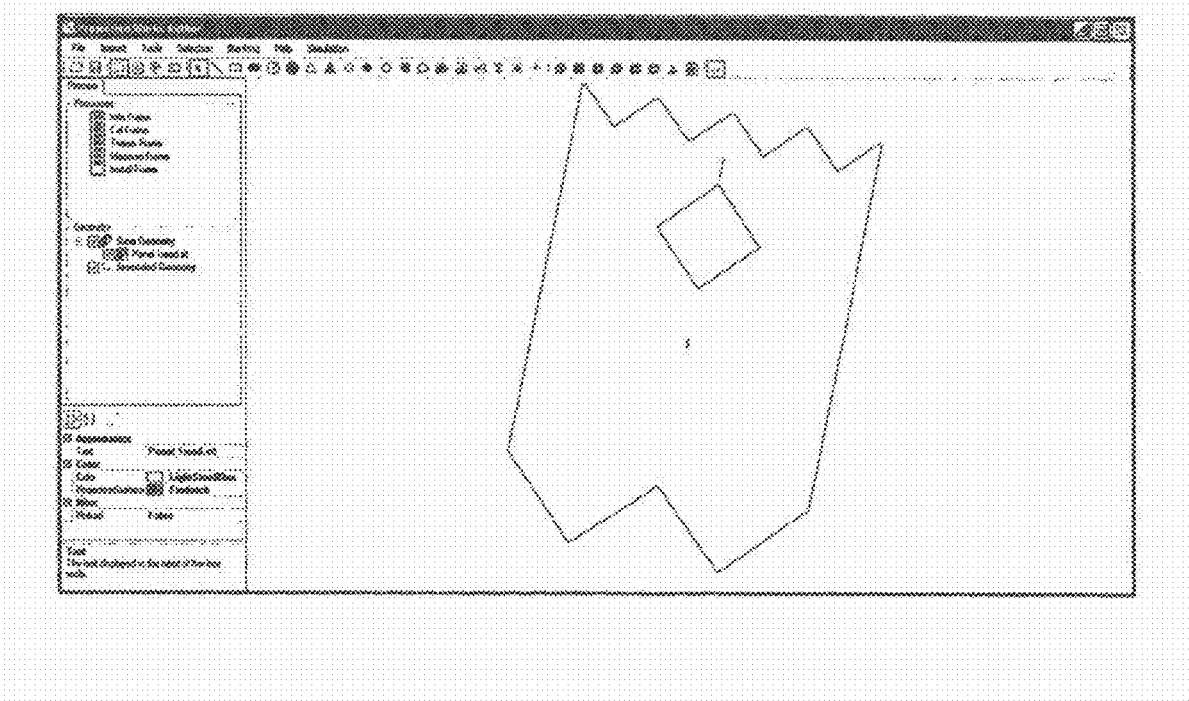
FIG. 6 is an illustration of a User Interface screen of an Authoring Assembly Software Tool ("Authoring Tool") showing a Base Geometry for use in manufacturing a three-dimensional object, or part. This figure shows schematically a setup of the system of the invention as it relates to a three-dimensional object, or part, that is being manufactured by a user.

A Base Geometry file should first be imported into the Authoring Tool. This may be performed by selecting, from the top level menu, "Import" and "Base Geometry." The Base Geometry file is a stereo lithography formatted file of the three-dimensional object, part or skin that will ultimately be used as the projection surface. This file is created or generated by a third party three-dimensional modeling tool, such as Catia (Computer Aided Three-dimensional Interactive Application) or SolidWorks. This file is preferably exported from the three-dimensional modeling software in .stl format for use by the Authoring Tool. Once imported into the Authoring Tool, the Base Geometry file will be displayed on the User Interface of the Authoring Tool, as is shown in FIG. 6.

Figure 7:
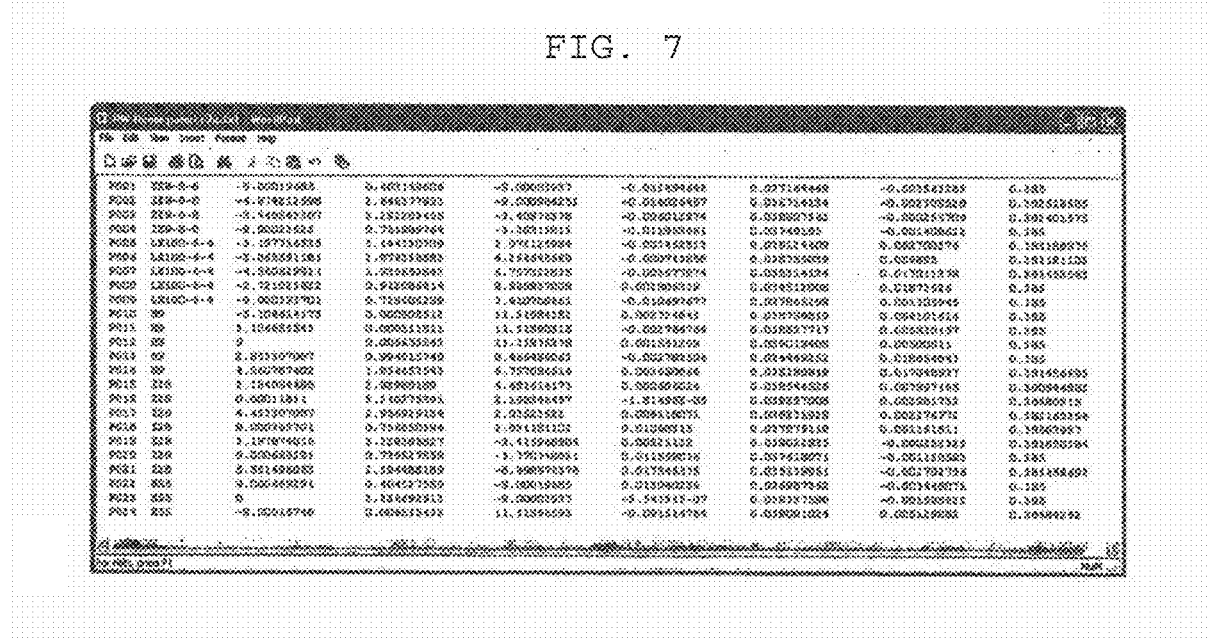

After importing the Base Geometry file into the Authoring Tool, an Annotated Geometry file should be imported into the Authoring Tool using "Import" and then "Annotated Geometry." The Annotated Geometry file is preferably generated by the same person who generated the Base Geometry file, but may be generated by a different person. The Annotated Geometry file format should be a comma, tab or whitespace delimited format. An example file is shown in FIG. 7. In this example file, each row represents a hole into which the Base Geometry panel (i.e., the actual part that will have a fastener inserted into it) should ultimately have a fastener inserted. Because the Base Geometry panel is three-dimensional, each hole in the annotated file should be defined in 3D. In this example file, the columns are defined as is shown in the table below.

| Column # | Definition |
|---|---|
| 1 | Hole ID |
| 2 | Fastener Part # |
| 3 | X Location of hole |
| 4 | Y location of hole |
| 5 | Z location of hole |
| 6 | I Component of normal vector of hole |
| 7 | J Component of normal vector of hole |
| 8 | K Component of normal vector of hole |
| 9 | Hole diameter |
| 10 | Additional Identifier |

The Annotated Geometry file should be a comma, tab or whitespace delimited and each line should define an object to be displayed. The order of the columns is not particularly important, but should be consistent from line to line.

Figure 11:
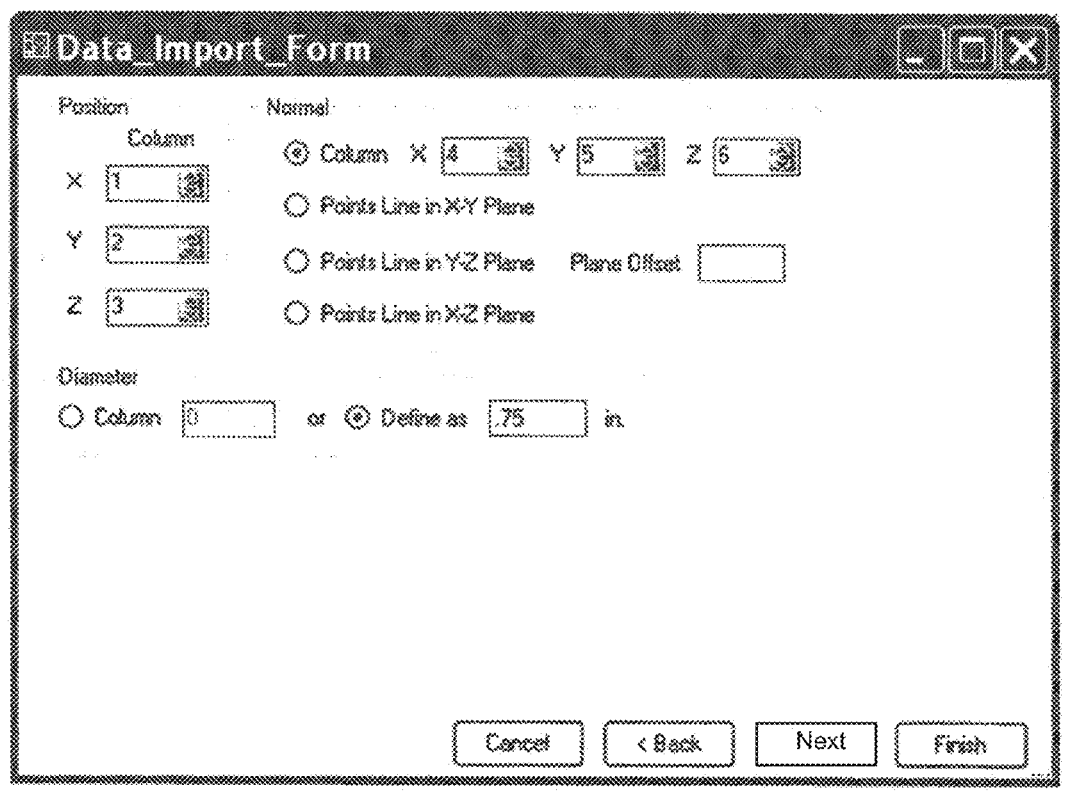
FIG. 11 is an illustration of a Data_Import_Form screen of an Authoring Assembly Software Tool ("Authoring Tool") in which a user may specify the columns in which the x, y and z position data for pre-drilled holes located in a three-dimensional object, or part thereof, to be assembled.

After "Import" and "Annotated Geometry" is selected, the user should be prompted to enter the delimiter type that is used in the file, as shown in FIG. 11. The example is a tab delimited file so the user would select "Tab" and then "Next". The user should then see the screen shown in FIG. 9. In this screen, the user should define the column location for the hole ID and fastener part # of the three-dimensional workpiece, object (or part) being assembled or manufactured. In this example, these are located in columns 1 and 2 of the file, respectively. This information should be entered using a drop list marked "Column" located next to the ID and fastener part # label on the screen in FIG. 9. The user should set this drop list to the correct value that reflects the column location for each of these items.

Figure 9:
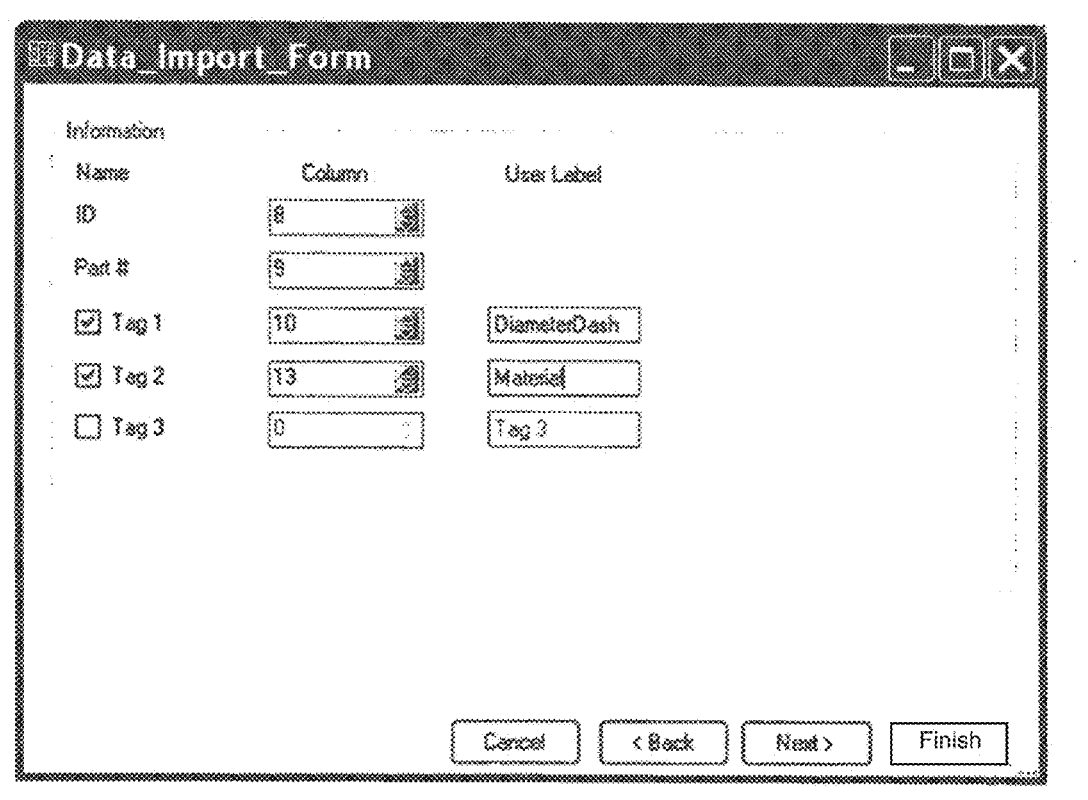

Additional fields may be supplied, as are shown in FIG. 9 to specify optional information that the user may have included in the Annotated Geometry file. The optional fields can be activated, for example, by selecting the checkbox next to tag 1, 2, or 3. When checked, the Column and User label field should become active. As before, the user should then specify the column in which this optional data should be located by setting the drop list to the appropriate column value. The user should also specify the User Label to be used when this data is displayed. If this data is to be used by the Authoring Tool as a default value for a fastener length or other variable, the "Default Measured Value" check box should be selected. This indicates to the Authoring Tool that the specified column contains a default value that should be used for the specified item unless it is overridden by a measured value. When the user has supplied all of the necessary information on FIG. 9, the "Next" button should be selected.

Figure 10:
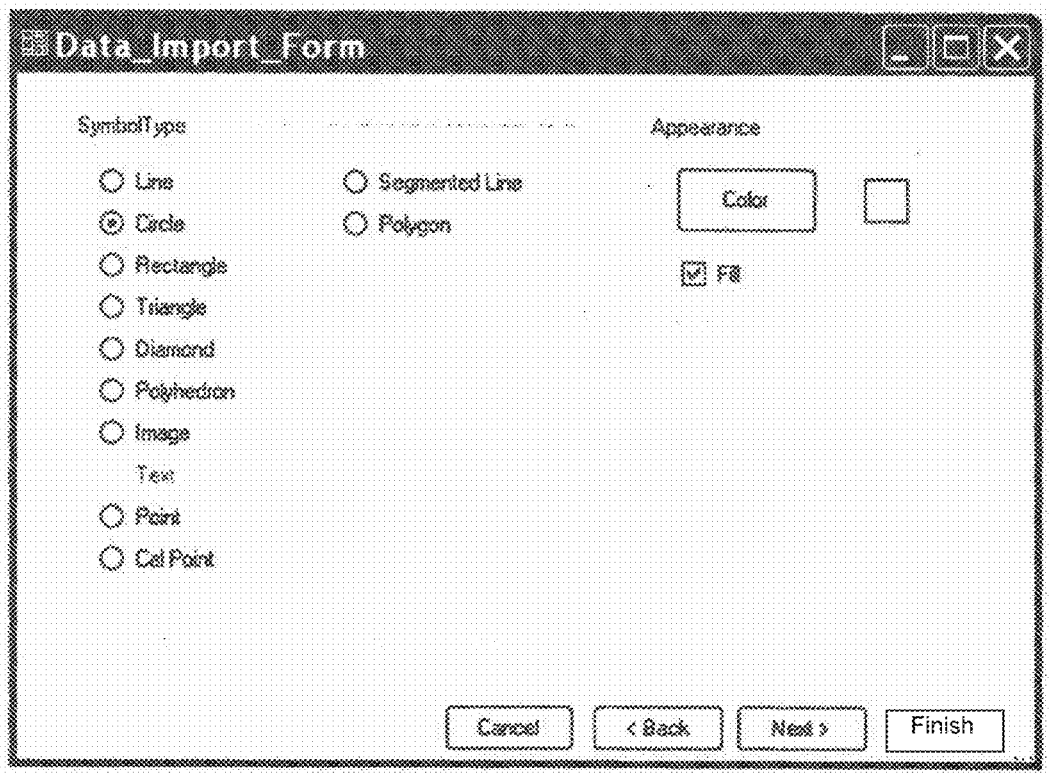
FIG. 10 is an illustration of a Data_Import_Form screen of an Authoring Assembly Software Tool ("Authoring Tool") in which a user may specify how the Annotated Geometry should be displayed in the systems and methods of the invention, for example, a circle in the color yellow.

The screen in FIG. 10 should be displayed next and allows the user to specify how the Annotated Geometry should be displayed. The user should select one of the options available within the "Symbol Type" area of the screen by selecting the push button next to the desired symbol type. Preferably, only one selection is allowed. The user also has an ability to select the color that should be used when displaying the symbol, and whether the symbol should be filled with color by selecting the "Fill" checkbox or whether it should be outlined by leaving the "Fill" checkbox unchecked. The "Fill" option should have no effect upon Lines, Segmented Lines or Cal Points. Once the user specifies the "Symbol Type" and the color, the "Next" button should be selected.

At this point the screen in FIG. 11 should be displayed. The user may use this screen to specify the columns that the x, y, and z position data for the hole are located in. As in the previous screen, the user should select the column location using the drop lists that correspond to each position variable on the "Position" frame of the window in FIG. 11. The user should also specify the column location for the normal vector of the hole on the "Normal" frame of this same window. The user should also have an option of specifying if the 3D data should be displayed in a 2D plane. If the X-Y Plane option is selected, all points should be projected onto an XY plane. If the Y-Z Plane option is selected, all points should be projected onto an YZ plane. If the X-Z Plane option is selected, all points should be projected on the XZ plane. The user can also specify an offset for the plane, which should indicate that the selected Plane will be offset from its zeroed location by the amount entered into the "Plane Offset" text field. Once the user has entered all of the data for each required field, the "Finish" button can be selected. This should finish the Annotated Geometry input, and pull all of the data into the Authoring Tool, and the User Interface for such software should be displayed.

Figure 12:
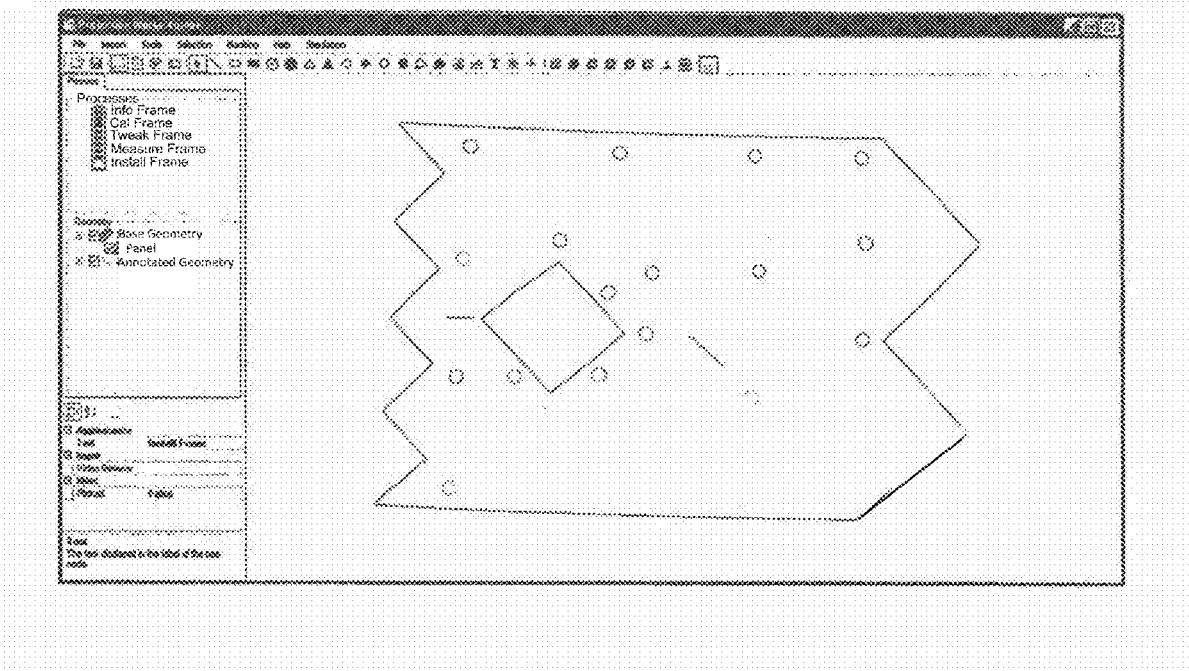
FIG. 12 is an illustration of a User Interface screen of an Authoring Assembly Software Tool ("Authoring Tool") showing a Base Geometry having Annotated Geometry data displayed over the top of it (i.e., having the Annotated data overlayed onto the Base Geometry), for use in assembling a three-dimensional object, or part.
Figure 13:
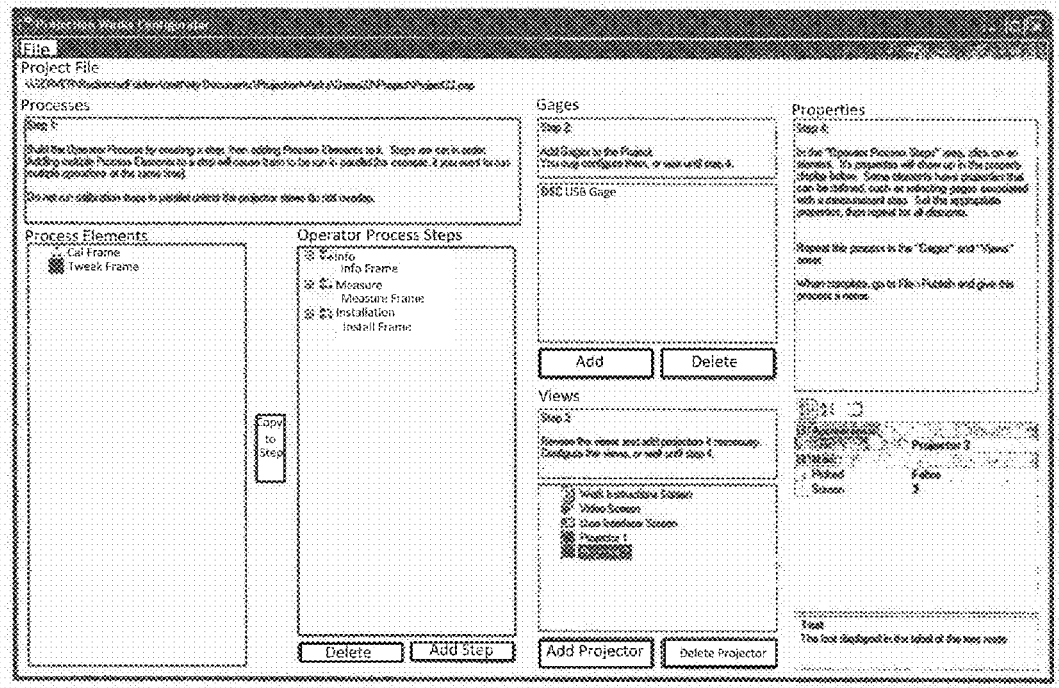
FIG. 13 is an illustration of a User Interface screen of a Configurator Assembly Software Tool ("Configurator Tool") that permits process elements to be placed together to form a series of ordered process steps, such as a series of assembly steps in a step-by-step logical order for conducting an assembly or other manufacture (or other process).
Figure 14:
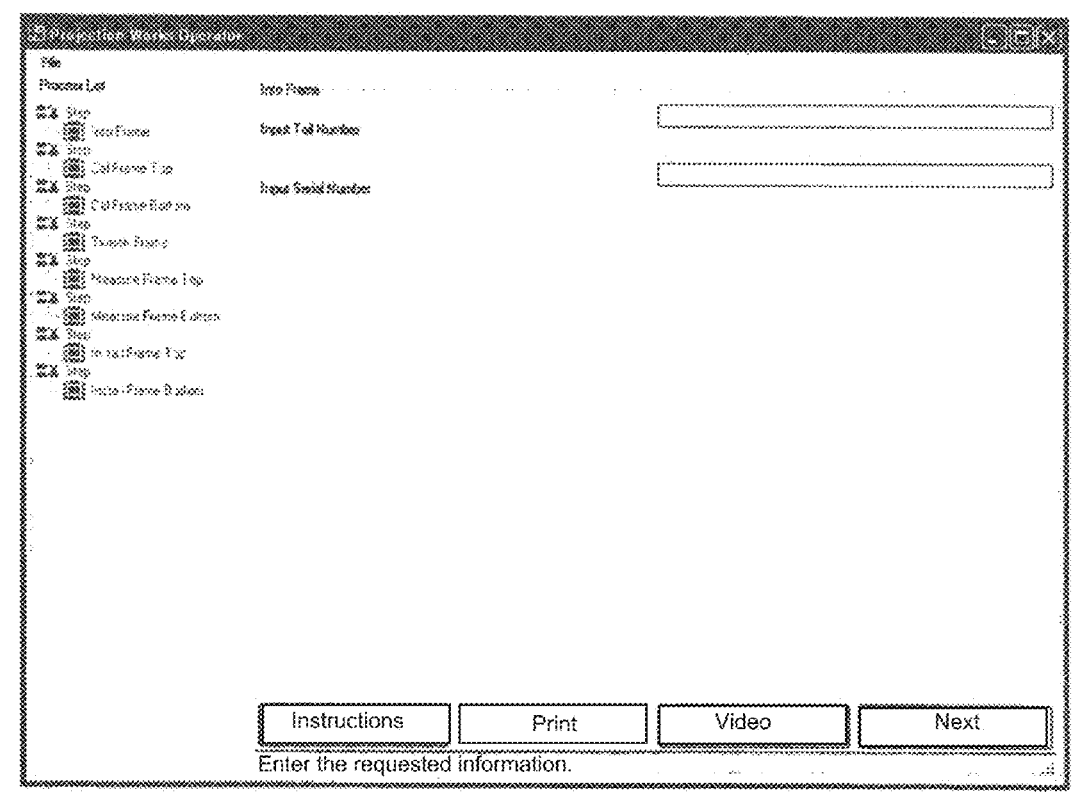

All of the data import screens that are illustrated in FIGS. 11, 12, 13 and 14 preferably have a "Cancel" button located on them. If a user selects this button, the import operation should be canceled and the window should close. In FIGS. 12, 13 and 14, the user has an option of selecting a "Back" button, which should close the current screen and take the user back to the previous screen. At that point, the user should be able to change the selections if needed before proceeding forward.

At this point, the screen shown in FIG. 12 should be shown, which is typically the main User Interface screen of the Authoring Tool. The Base Geometry should be shown with the Annotated data displayed over the top of it. At this point, the user should now be able to start to enter a plurality of process frames that are needed or desired to perform a particular assembly, manufacture or other process.

Along the left hand side of the User Interface of the Authoring Tool (FIG. 12), there is a framed panel called Processes. By right (or other) clicking a mouse in this window, the user is able to add a process frame to an assembly process being created. Preferably, there are five types of process frames that can be added as follows: (i) Information; (ii) Calibration: (iii) Tweak, (iv) Measurement; and (v) Installation. Multiple frames of each type preferably can be added. A description of the purpose of each frame type follows below, while details of the actual usage of each frame will be discussed in the Operator Assembly Tool sections.

The "Information" frame should prompt the end user running an assembly, manufacturing or other process to enter a wide variety of desired information about a workpiece of other three-dimensional object that is being assembled, otherwise manufactured or processed. For example, if a vertical tail for an aircraft is being assembled, information such as the aircraft vertical tail serial (or other) number, and assembly information for the object, such as date, and the like, may be entered. This information may be used, for example, for creating a log, preferably of all of the objects that are made whenever a final assembly process is executed using the Operator Assembly Tool.

The "Calibration" frame may be used to specify the calibration points that are used to perform the software alignment of the imported data, so that the projected image of the annotated points correctly line up with the actual points on the projection surface. Preferably, a plurality of calibration points are employed for performing a successful calibration, with a minimum of eight calibration points being more preferred. The number of calibration points that should be employed may vary (be smaller or larger) in accordance with a complexity of a 3D projection surface being employed. Calibration points should be chosen so that they are spread out over the entire surface of the object, and are not all concentrated in one area. These points should also be selected so that they are not all linear, and they should be chosen in such a way as to ensure that depth of the object is adequately covered. Thus, on relatively complex surfaces, it is entirely possible to have 20 or more calibration points. Typically, the more points that are selected, the better the calibration will be. Care should be taken to select an appropriate number of calibration points, which may readily be determined by those having ordinary skill in the art. The actual calibration step, which is preferably performed in the Operator Assembly Tool (discussed hereinbelow), will preferably finish by displaying all of the annotated points after they have been calibrated. At that point, if these points align with the actual points satisfactorily, then a suitable number of points have been selected. If they do not, it may be necessary to come back to the User Interface of the Authoring Tool and select additional calibration points.

The "Tweak" frame will preferably allow the end user using the Operator Assembly Tool to perform relatively minor adjustments to the projected image by shifting it up/down or left/right in order to align the projected image of the annotated points to line up with the actual points on the projection surface. The reason that this may be required is that a part locator that is used to hold a part in front of the projector(s) does not always index in the exact same location each time.

The "Measurement" Frame is preferably used to guide the user in the measurement process. This frame contains the information regarding which holes should be measured. The holes which require measurement will be identified in this frame for later use in the Operator Tool (discussed hereinbelow).

The "Final Process" frame that is preferably available for use is an Installation Frame. This frame preferably uses data that is collected in the measurement process to guide the user through the installation of the appropriate fasteners.

Along the top of the User Interface of the Authoring Tool (FIG. 12) is preferably a plurality of buttons including various icons. These buttons preferably provide shortcuts and/or additional functionality for the user. The first one shown is the standard "File Open" windows icon, which should display the standard Windows file open dialog box, used to open files stored on a disk (or otherwise). The second one preferably is a standard Windows save file icon which appears as a computer floppy disk (or otherwise). This should save the contents of the currently opened file to disk (or otherwise) when selected. The third button, whose icon preferably is the xyz axis with a part displayed, is for showing the geometry screen in the User Interface of the Authoring Tool. The fourth button should display a "work instructions" screen when selected. The fifth button should display a video screen, while the sixth button should display the user interface.

The following nineteen buttons shown in the User Interface of the Authoring Tool (FIG. 12) are drawing related buttons. The first of these buttons, which is shown as the $7^{th}$ button in the row, preferably is the standard Windows pointer button which, when selected, will change the cursor back to the standard Windows arrow shaped pointer used for selecting items on the screen. The second of these buttons (the 8th button shown) preferably will allow the user to draw a line on the screen where the geometry is displayed. The next two buttons ($9^{th}$ and $10^{th}$ buttons shown) preferably will draw an outlined and filled rectangle. The following two buttons (the $11^{th}$ and $12^{th}$ buttons shown) preferably will draw an outlined and filled circle. An outlined or filled triangle preferably is drawn using the next two buttons ($13^{th}$ and $14^{th}$ buttons shown), and the following two buttons ($15^{th}$ and $16^{th}$ buttons shown) preferably draw an outlined and filled diamond. The following two buttons ($17^{th}$ and $18^{th}$ buttons shown) preferably draw outlined and filled hexagons, while the following two buttons ($19^{th}$ and $20^{th}$ buttons shown) preferably draw an outlined and filled polygon.

Additional items that may be placed on the projection surface are preferably made available as buttons next to the shape drawing buttons. For example, the $21^{th}$ button shown preferably allows the user to place an image onto the geometric surface, and the $22^{th}$ button shown preferably allows a user to place a video onto any one or more of the display screens that are connected with the computer(s). The video can, for example, be placed on the projector screen to get projected onto the object, or onto one or more monitor screens. This may be performed by adding the video, using this button, to one of the frames. When the displays are assigned in the Configurator Assembly Tool (discussed below), the video will be shown on whatever display was assigned. Usually, the Work Instruction or User Interface are assigned to one of the computer monitor displays. Text preferably can be placed onto the projection surface by selecting the $23^{rd}$ button shown, and calibration points are preferably placed on the projection surface using the 24$^{th}$ button shown. A point shape preferably can be placed onto the projection surface using the 25$^{th}$ button shown.

The properties for some or all of the foregoing items preferably can be changed once they have been placed onto the projection surface by using, for example, an Appearance window, which in FIG. 12 is located in the lower left corner of the User Interface of the Authoring Tool. Parameters that preferably can be changed include fill color, text, filenames for images, video and/or the like.

The next seven buttons that are shown in FIG. 12 preferably allow the user to choose to display the base geometry on the User Interface of the Authoring Tool. When displayed using, for example, the first six of these buttons, the image is preferably displayed as a 3D object. The first of these buttons (the 26$^{th}$ in the row shown) preferably displays the object as if the user is looking at it from the front. The next button (the 27$^{th}$ in the row shown) preferably displays the object as if viewed from the back. The next button (the 28$^{th}$ in the row shown) preferably shows a view of the object from the right, and the next button shown (the 29th in the row shown) preferably shows a view of the object from the left. Top and bottom 3D views are preferably shown using the next two buttons, the 30$^{th}$ and 31$^{st}$ buttons, respectively. The next button (32nd shown) preferably displays the 3D object in 2D, collapsing it onto a flat plane along the Z-Axis.

Along the top of the User Interface of the Authoring Tool preferably are a series of menu options (as is shown in FIG. 12). The first menu preferably is the standard Windows File menu which, when selected, preferably allows the user to perform one or more (and preferably all) of the following standard set of operations:
New: create a new file
Open: open an existing file that has been saved to non-volatile memory (NVM) (or otherwise)
Save: save the currently opened file to NVM (or otherwise)
Save As: save the currently opened filed to NVM (or otherwise) with the specified name
Export: creates and saves to NVM (or otherwise) the file which will be opened and used in the Configurator
Close: closes the currently opened file
Exit: terminate die application The next menu that is preferably available to the user is the Import menu (FIG. 12), which preferably allows the user to perform one or more (and preferably all) of the following Import operations:
Base: imports the Base Geometry (i.e., the 3D model to be projected upon)
Annotated: import the Annotated points (the points that get projected onto the Base Geometry)
Images: import images that are to be displayed as a part of the projected image with the Annotated Points The following Tools menu option (FIG. 12) preferably allows the user to:
Displays: identifies the Windows display number on the screen for each of the connected displays.
The Displays option allows the user to define which graphics port should be assigned to which "display." (The graphics ports are generally the number of video outputs on the computer(s).)

The following Selection menu option (FIG. 12) preferably allows the user to identify which of a following list of objects are selectable when they are present on the projection screen. These objects can be placed on the Base Geometry, as described, using the drawing buttons. Preferably, all objects are selectable by default, and selection can be disabled by un-checking the objects below on the Selection Menu:

STL: The Stereo Lithography Model
Plane
Line
Rectangle
Circle
Triangle
Diamond
Hexagon
Polygons
Image
Calibration Point
Point (The term "selectable," as is used above, means that the user can select an object with, for example, a mouse by clicking on it, then changing its properties, moving it and/or deleting it. If the user has placed any of the above items onto the screen and made them un-selectable (by un-checking the checkbox next to them on the menu), then they generally cannot be modified, moved and/or deleted.)

The next menu option preferably is Blanking (FIG. 12). This menu option preferably give the user an ability to hide (i.e. not display) the same set of objects that are listed under the Selection menu option. All of these objects preferably are not blanked by default. To blank them, the user preferably checks the box to the left of the desired item in the menu.

The next menu option (FIG. 12) preferably is the standard Windows Help menu, which preferably provides the user with one or more (and preferably all) of the following menu options:
Contents: displays a table of contents for the Help file
Index: displays an index of the Help file
Search: allows a user to search the Help file
About: provides a user with information about the User Interface of the Authoring Tool, such as version number, release date, and copy write and patent information.

The following menu option is the Simulation option (FIG. 12). When selected, this screen preferably displays a simulated screen of how the currently selected frame will look in the Operator tool (discussed below).

While, as is discussed hereinabove, there are only five different choices in the "Processes" frame of the preferred embodiment of the Authoring Tool (Info, Calibration, Tweak, Measurement and Install), a user of the system may have numerous measurement steps, numerous install steps, and the like. Thus, if a user is employing this system to assemble a vertical stabilizer for an airplane, for example, the user could make a set of frames that cover those ordered steps that are required for assembling the top half of the vertical stabilizer (preferably in the best manner), and another set of frames that cover those ordered steps that are required for assembling the bottom half of the stabilizer (also preferably in the best manner). Then, using the Configurator tool, the user could make an assembly process that is for the top of the vertical stabilizer only, or make an assembly process that is for the bottom of the vertical stabilizer only, or make an assembly process that is for both the top and the bottom of the vertical stabilizer. All of this could be achieved by the user using only the two sets of frames that were originally created in the Authoring tool. In this manner, a user can make an assembly process for any object, any part thereof, or any portion or area of such object or part (top portion, bottom portion, side (left or right) portion, center portion and/or the like).

Configurator Assembly Software Tool

FIG. 13 is an illustration of a User Interface for a Configurator Assembly Software Tool ("Configurator Tool") that may be employed in the optical projection assembly systems and methods of the invention. This User Interface can be employed by a user to create all of the process steps that may be required to perform a particular object assembly, manufacture or other operation, for example, to partially or fully assemble an entire object, or a part thereof, and preferably uses the process frames that are created by the user using the Authoring Tool.

To start, the user launches the Configurator Tool by selecting on the main computer screen "Start," and then "All Programs," and then "Configurator Tool" (or by using a desktop short cut).

The User Interface for the Configurator Tool show in FIG. 13 contains only one menu option along the top of the screen, which is "File." When the user selects "File," the user will be provided with four choices by this menu option:
1. Open Process Group
2. Publish Process
3. Edit Published File
4. Exit The Open Process Group choice allows a user to open a Process Group file that has been created and exported using the Authoring Tool.

The Publish Process Group choice allows a user to "Publish" a completed assembly or other process (in the form of a file). The resulting published file contains all of the necessary ordered steps that are required to assemble an object (or part), and can be used by the Operator Tool (as is discussed hereinbelow).

The Edit Published File choice provides a user with an option to edit a previously published Process. Changes made to the processed file typically do not get migrated back into the original file that was exported by the Authoring Tool. In order for changes to be included in this original file, the user should edit the original exported file using the User Interface of the Configurator and re-publish the completed process.

The Exit choice performs a normal Windows style of software exit, and terminates the User Interface of the Configurator.

As is shown in FIG. 13, four of the main frames that are present on the User Interface of the Configurator are:
1. Processes
2. Gages
3. Views
4. Properties Other frames include "Process Elements" and "Operator Process Steps."

Processes

The Processes frame, located in the upper left area of the User Interface, is used to build an assembly or other manufacturing or other process for a particular assembly, manufacture or other processing of a particular workpiece, object (or part) using the Process Frames created in the Authoring Tool. When the user clicks on "File" and then "Open Process Group," the file exported by the Authoring Tool is then read into the Configurator Tool. All of the frames that were added in the Authoring Tool will typically then be displayed in the Processes frame.

The user should now decide: (i) what order the assembly or other process steps for the workpiece or other object being assembled or processed should follow (see "Operator Process Steps"); and (ii) the particular information that it should contain (see "Process Elements"). Typically, an assembly or manufacturing process (a sequence of steps in order) contains, at a minimum, the following information: Calibration, Tweak, Measure and Install steps. (There are types of steps that can be added in the Authoring Tool: Information. Calibration, Tweak, Measurement, and Install. These steps are created inside the Authoring Tool. A user can add as many of these steps as is desired in the Authoring Tool, and then only select, and use, the ones that the user wants when building the Assembly Process in the Configuration Tool.)

To begin to construct the particular assembly or other process (series of steps in order), the user should select the "Add Step" button along the bottom of the "Operator Process Steps" frame on the User Interface of the Configurator Tool. This should result in a "step" being added to the "Operator Process Steps" frame. The user should now select, for example, using a mouse, the first frame (step) to use in the assembly or other process. This frame is then assigned to a step by selecting the desired step in the "Operator Process Steps" frame and clicking the "Copy to Step" button between the "Process Elements" and "Operator Process Steps" frames. This should copy this process frame to the selected step. If one or a plurality of additional steps are needed or desired, the "Add Step" button should be used to add the next step (or the user can right click on "Add Step"). The user should continue to add steps and assign "Process Element" frames to these steps until the full assembly or other process (all steps in order) is complete. The final assembly or other process, when executed using the Operator Tool, will then execute the steps in the order that they are in on the "Operator Process Steps" frame.

If needed, the user can delete one or a plurality of steps by clicking on the step to be deleted, and then selecting the "Delete" button under the "Operator Process Steps" frame (or by right clicking on "Delete"). This will remove the step from the Operator Process Steps frame.

Measurement Apparatuses

Once all of the assembly, manufacturing or other process steps have been created and ordered in the "Operator Process Steps" frame, if one or more measurement apparatuses of the invention (or otherwise), such as one of the grip gages that are discussed herein, is going to be employed during the object assembly, manufacturing or other process, the user should now create one or a plurality of measurement gages in the "Gages" frame of the User Interface of the Configurator Tool. This can generally be accomplished by selecting the "Add" button on the "Gages" frame. The user will then generally be presented with a window used to select a type of gage to add, such as a "Serial Port" gage, a "USB" gage, or some other type of a gage. The type of gage selected by the user should match the physical gage that is to be used with the system (if one will be used). Further, the number of gauges created using the "Add" button must generally also match the total number of gages that will be used with the system.

Views and Properties

Once gages have been added, the user should configure the "Views" that will be used for the particular assembly, manufacturing or other process being employed (define which graphics output (or other) part(s) present on the computer monitor(s) that the Work Instructions, Videos, User Interface, optical projector(s) and/or the like will be assigned to and/or displayed). (The graphics output ports may include video card outputs, USB ports for video output, or the like.) This will depend upon the number of optical projectors and computer monitors that are being employed in a particular assembly, manufacturing or other process, and can be accomplished using the "Views" frame located in the lower middle area of the User Interface of the Configurator Tool. On the "Views" frame, the user will typically be presented with four items:
1. Work Instructions
2. Video Screen
3. User Interface Screen
4. Projector 1.

To configure which graphics output ports that each of the four above items is assigned to, the user should select each one, one at a time, and then use the "Display" property located to the right on the "Properties" frame. This "Display" property will typically show all of the available graphics output port numbers that can be used in connection with a particular assembly, manufacturing or other system (depending upon the number of computer monitors and optical projectors that are being employed). Typically, for a system using one computer monitor and one optical projector, the Work Instructions. Videos and User Interface will be assigned to display number 0, and the Projector will be assigned to display number 1. If more than one projector is needed on the system, for each additional projector, the user should select "Add Projector," which will add a projector to the "Views" list. The user should then select this newly added projector and assign it to one of the unused "Displays." For example, for a computer that is configured to have up to eight graphics output ports, a total of eight optical projectors and monitors may be employed with the computer, as follows:

| Monitors | Projectors |
|---|---|
| 1 | 7 |
| 2 | 6 |
| 3 | 5 |
| 4 | 4 |
| 5 | 3 |
| 6 | 2 |
| 7 | 1 |

However, depending upon the number of graphics card slots that are available inside of the computer, additional graphics cards could be added, with the upper limit presently only resulting from a Microsoft Windows limitation.

Each time a user assigns a "Display" value to a "View," the monitor(s) and projector(s) 1 will have their graphics port value(s) displayed on the "Control Panel" screen present on the monitor(s) or projector(s), for example, as a giant "1," "2," "3" or the like, across the entire screen, so that the user can verify that the "Display" value that they assigned is indeed the correct one. If the Projector is set to display 0 and the number "0" gets displayed on the computer monitor(s), then the user should change the Projector to display 1. If set incorrectly, the images that should be sent to the optical projector for projection onto the assembly object will be displayed on the computer monitor instead.

After the user is satisfied that all of the required assembly, manufacturing or other steps have been created, and created in the correct order, all required gages have been added, and the necessary "Views" have been properly assigned, the user can now "Publish" this process by selecting "File" at the top of the User Interface of the Configurator Tool, and then "Publish Process." This will typically create the file that will be used by the Operator Tool to guide the particular assembly process. The user can now exit the User Interface by selecting "File" and then "Exit."

Operator Assembly Software Tool

FIG. 14 is an illustration of a User Interface screen of an Operator Assembly Software Tool ("Operator Tool") that is used to run the actual assembly, manufacturing or other sequence (series of ordered steps) created using the Authoring Tool and Configurator Tool for an object to be assembled.

The User Interface of the Operator Tool shown in FIG. 14 contains five main features:
1. The standard Windows program "File" menu, which gives the user two options:
   a. "Select Process"—This option allows the user to open a previously created process that was "published" using the Configurator tool when selected.
   b. "Exit"—This option performs a standard Windows program exit when selected.
2. The "Process List" frame, located along the left hand side of the User Interface screen, shows all of the process steps in order that are included in the current assembly process.
3. The current process step frame, which in FIG. 14 is titled "Info Frame." The title of this frame changes to reflect the current step of the assembly process. This frame title will be the same as the ones shown in the "Process List" frame for each step.

Control Buttons along the bottom of the User Interface screen allow the user to display work Instructions and videos, print the measured fastener information, or proceed to the next step by selecting "instructions." "Print," "Video" or "Next," respectively.

To start, the user launches the Operator Tool by selecting on the main computer screen "Start," and then "All Programs," and then "Operator Tool" (or by using a desktop short cut). Once the User Interface appears on the computer screen, the user will use the menu option "File" and then "Select Process" to open the desired assembly, manufacturing or other process file (out of the typically more than one, or many, process files present) that was published in the Configurator Tool. Once the file has been opened, a screen similar to the one shown in FIG. 14 will be displayed on the main computer monitor.

At this point, the user should enter the information being displayed on the "info Frame" in the User Interface (FIG. 14). For example, the tail number for the aircraft, and the serial number for the part being assembled (part of the aircraft tail), are entered in the text fields shown in FIG. 14. Once entered, the user should select the "Next" button to proceed to the next step.

Figure 15:
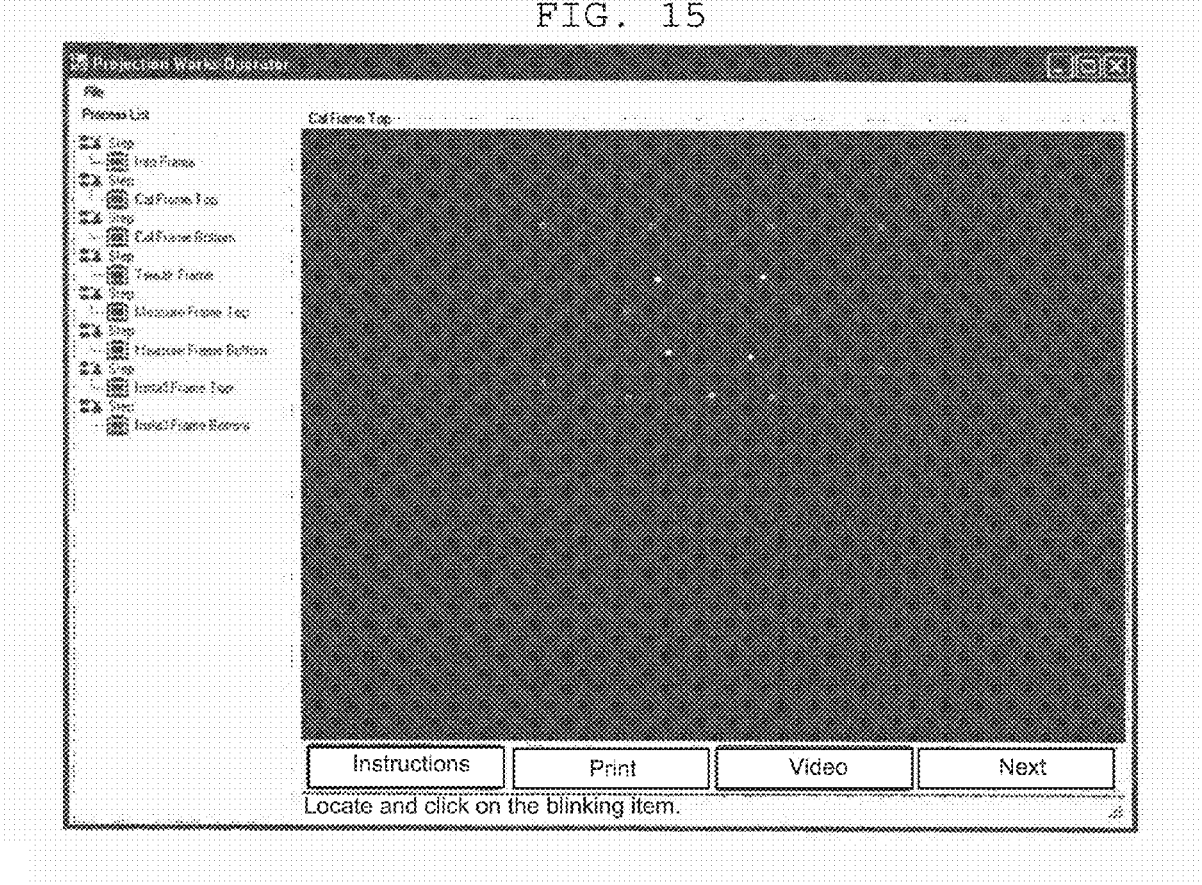
FIG. 15 is an illustration of a Cal Frame of an Operator Assembly Software Tool ("Operator Tool") that may be used in the systems and methods of the invention for a calibration, and that shows a series of calibration points and a series of non-calibration points that may be employed in the calibration.
Figure 16:
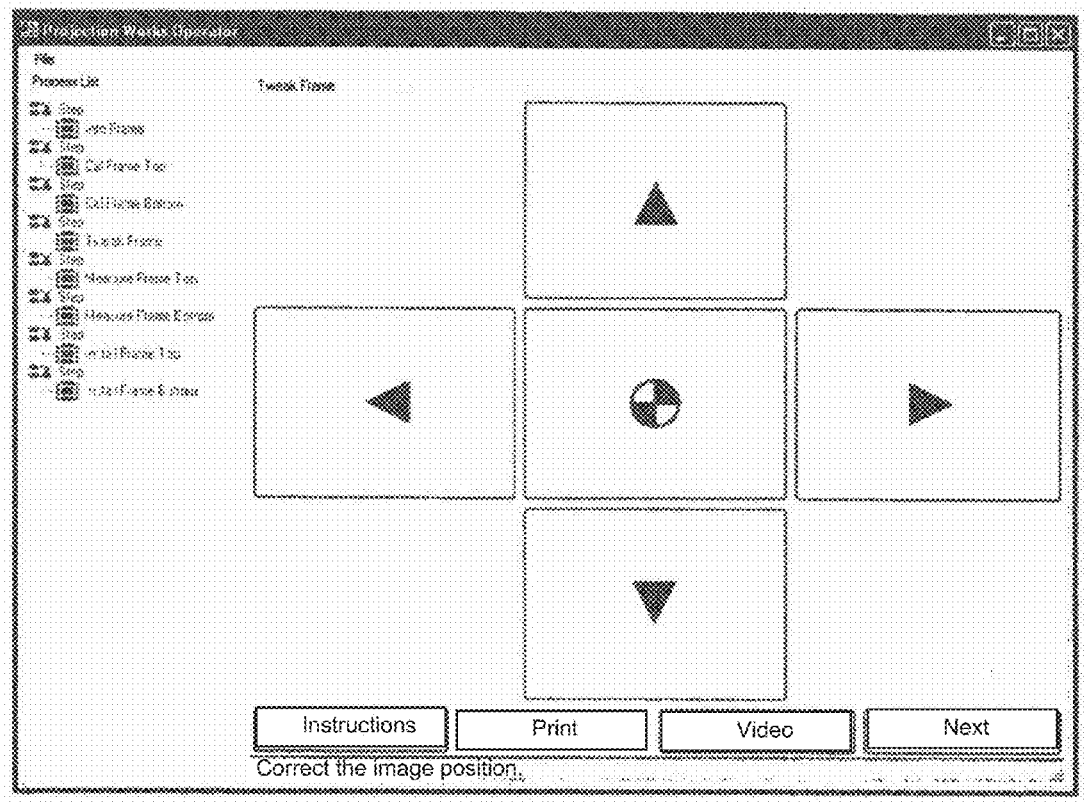
FIG. 16 is an illustration of a Tweak Screen of an Operator Assembly Software Tool ("Operator Tool") used for a calibration of datasets of pre-drilled hole locations for fasteners.

The user will now be presented with a Cal Frame, as is shown in FIG. 15, which will show all of the points (calibration points and non-calibration points) that will be projected onto the object (or part) being assembled, manufactured or otherwise processed as is also shown in FIG. 15. In FIG. 15, the red points indicate calibration points and the yellow points indicate non-calibration points. One of the calibration points will generally be flashing on/off about once each second. The user will now guide the mouse crosshair (plus sign, +) over the object (or part thereof) being assembled, manufactured or processed until the crosshair is directly over the pre-drilled hole in the object that corresponds to the flashing point on the screen. At this point, the user will click the left mouse button and the next calibration point will begin flashing on the screen. The user will align the crosshair over the next hole in the object (or part thereof) being assembled, manufactured or processed and depress the left mouse button again. These steps will be repeated until there are no longer any flashing red calibration points being displayed on the computer screen. The "Next" button will then become enabled, and the user will select it. This will bring up the Tweak screen shown in FIG. 16.

The system software will use the data collected in the calibration step to calibrate the Annotated Geometry, and then display it onto the projected surface. By calibrating the Annotated Geometry using this data, the system software adjusts the original Annotated Geometry to compensate for distortions caused by imperfections in the projector lens, and the location of the part relative to the projector. The system takes into account the particular orientation of the object being assembled, manufactured or processed which is determined by the calibration point mouse clicks that are described in the preceding paragraph, and "adjusts" the internal datasets to compensate for how the object is oriented with respect to the optical projector(s). The orientation of the object (or part) being assembled, manufactured or processed versus the optical projector needs to be quantified so that the three-dimensional image can be adjusted in the system software to compensate for the fact that the optical projector(s) may not be pointing directly at the object. An example is the projectors that are typically employed in conference rooms. These projectors only project a proper image when pointed normal (perpendicular) to a surface. If they are off to one side, the image on the screen becomes distorted. The system software of the present invention determines where the projector is with respect to the screen during the calibration step, and adjusts the image. Thus, the system software distorts the image in a manner that, when it is projected by the projector, it appears in an undistorted manner on the object (or part) being assembled or otherwise manufactured.

In addition, the system calibrates out the effects of any distortions in the projector lens at this time. The distortions are caused by imperfections in the projector lens which occur during the manufacturing process. Examples of imperfections would be the shape of the lens, which may vary from lens to lens, misalignments between the lens and the area in the projector generating the image, "swirling" or "bubbles" in the glass used to make the lens, scratches, and the like.

Figure 17:
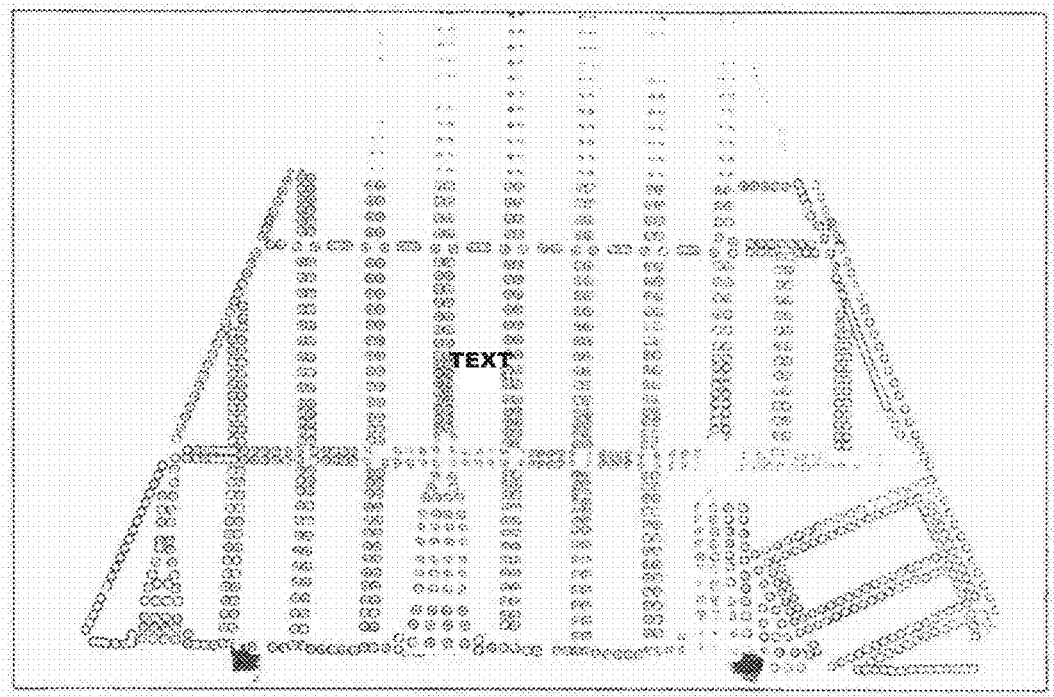
FIG. 17 is an illustration of a projection of calibrated data sets from the Tweak Screen of the Operator Assembly Software Tool ("Operator Tool") onto the three-dimensional object being manufactured (a vertical stabilizer (tail) of an F22 aircraft).

The calibrated data sets of all of the fastener hole locations will now be projected as yellow circles onto the object being assembled or manufactured (or part thereof), as is shown in FIG. 17. (When the user is finished calibrating and proceeds to the next step, these points will be displayed. So, it is a result of the user leaving the calibration step that causes this to occur.) If a sufficient number of calibration points were chosen using the Authoring Tool, the projected yellow circles should line up directly over the pre-drilled (or other) holes in the object (or part thereof) being assembled, as is shown in FIG. 17 (a vertical stabilizer (tail) of an F22 aircraft). If, on the other hand, the alignment is not sufficient (i.e., the projected yellow circles and the holes do not line up closely or exactly), the calibration step in the Operator Tool should be re-run. If the alignment is still not sufficient, then the user should go back to the Authoring Tool and add additional calibration points to the calibration step.

Once the calibrated points (data sets) are projected onto, and displayed, on the object (or part thereof) being assembled or otherwise manufactured, as shown in FIG. 17, minor adjustments can be made to the left/right and up/down location of the points. These adjustments are made to ALL the points by selecting the appropriate button on the screen in FIG. 16, which corresponds to the direction the points need to be moved (left, right, up or down). The center button in FIG. 16 removes any manual adjustments that have been made, and places all of the projected points back to the original calibrated position. Once the user is satisfied with the alignment of the calibrated points and the actual fastener holes in the object (or part thereof) being assembled, the "Next" button should be selected to proceed to the next step.

Figure 18:
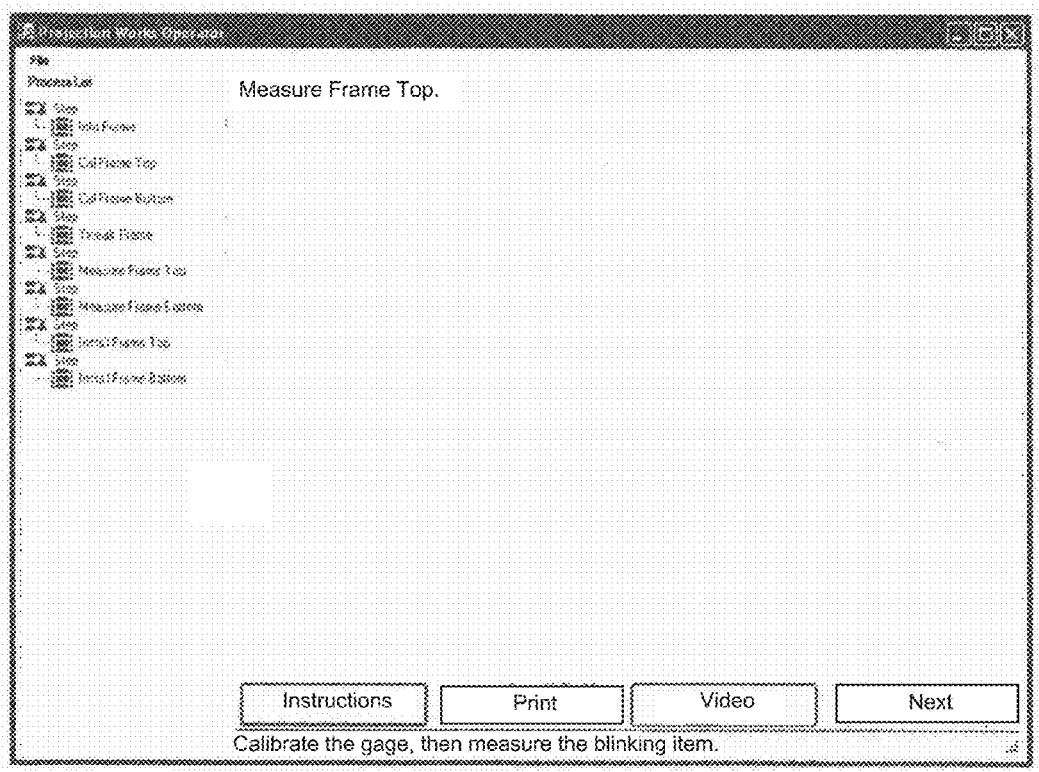
FIG. 18 is an illustration of a Measure Frame (which is empty) of a User Interface of an Operator Assembly Software Tool ("Operator Tool").

At this point in the process, the "Measure Frame" screen will be displayed in the User Interface. Since all of the data required by the user will be projected onto the object being assembled, this frame on the User Interface screen will have no information displayed thereon, as shown in FIG. 18. However, there will be a starburst pattern (as is shown in FIG. 3) displayed on the object in the location of the first hole that needs to be measured using an input or measurement device of the invention (or otherwise), such as a grip gage or other measurement apparatus (as is shown, for example, in FIGS. 4, 24, 25, 26 and 28). The user will take the measurement apparatus and place it into the hole that is illuminated by the starburst pattern as shown in FIG. 4, so that the 3 "feet" are in contact with the objects surface. (There are three blunt "points" that are located near the tip of the grip gage. The feet are preferably spaced an equal distance apart around the grip gun's tip.) There is a long probe that is preferably about 1.5" inches long with a blunt hook on the end that goes through the hole and out the back of the hole. The user squeezes the handle of the gun until the hook on the probe is pulled inward and contacts a surface present on the back of the object. Once the handle "clicks." the computer reads the circuitry inside the gun to get a thickness reading. If the thickness reading is within the tolerance band, the starburst patter advances to the next hole, and the gun is moved to that location to measure the skin thickness (fastener length). If the measurement was out of tolerance, the starburst turns red and does not advance. The user can then push the yellow button (or similar structure) on the measuring apparatus to repeat the measurement or can press the red button (or similar structure) (not visible, but just like the yellow one on the other side of the gun) to advance to the next hole. If the user chooses this, the hole that was out of tolerance it kept track of by the optical projection assembly system, so the user can view all out of tolerance holes at a subsequent time when the user goes to insert or install fasteners into the predrilled (or other) holes present in the object being assembled. This preferably happens automatically when the user selects the red button on the measuring apparatus, and this data is stored internally by the system software (or by other computer software).

Figure 19:
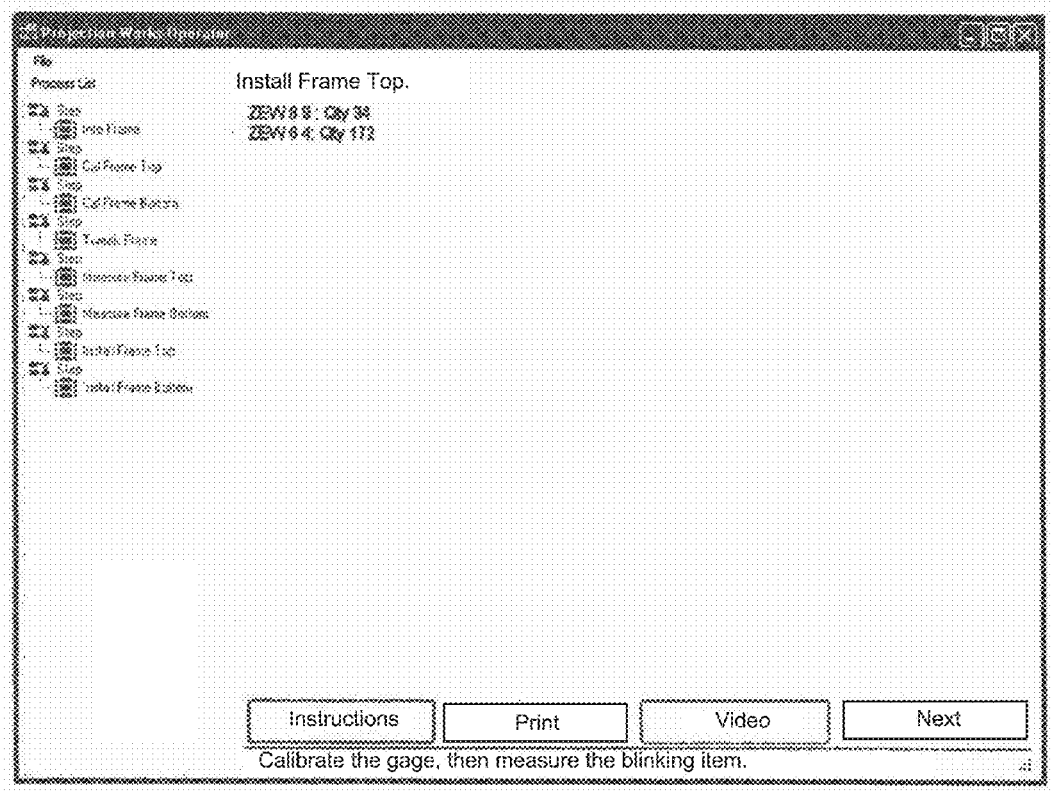
FIG. 19 is an illustration of an Install Frame of a User Interface of an Operator Assembly Software Tool ("Operator Tool"), which lists the part numbers, and quantities, for each type of fastener that needs to be installed into the three-dimensional object, or part, being manufactured.
Figure 21:
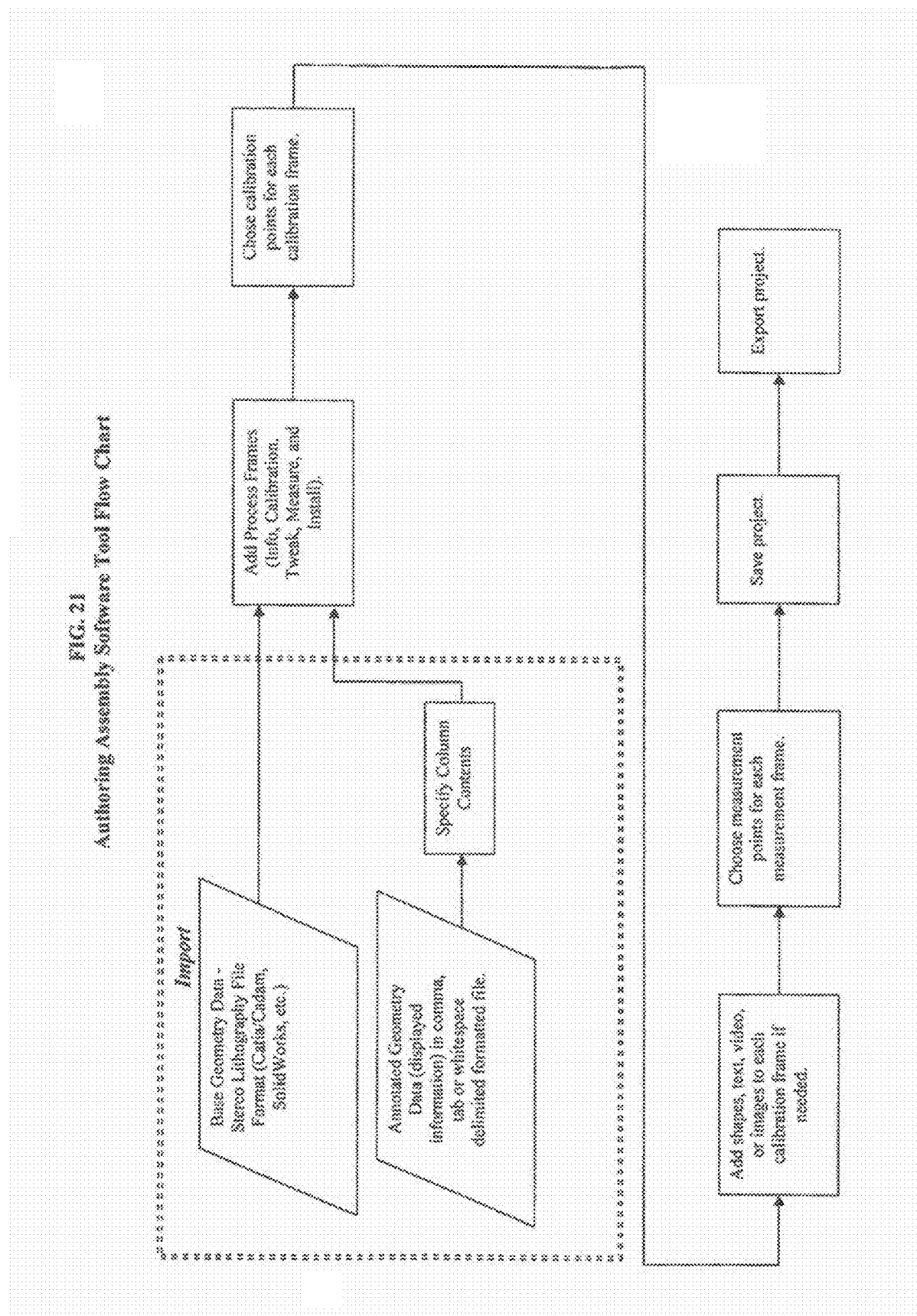
FIG. 21 is a flowchart illustrating the functions of the Authoring Assembly Software Tool ("Authoring Tool").
Figure 22:
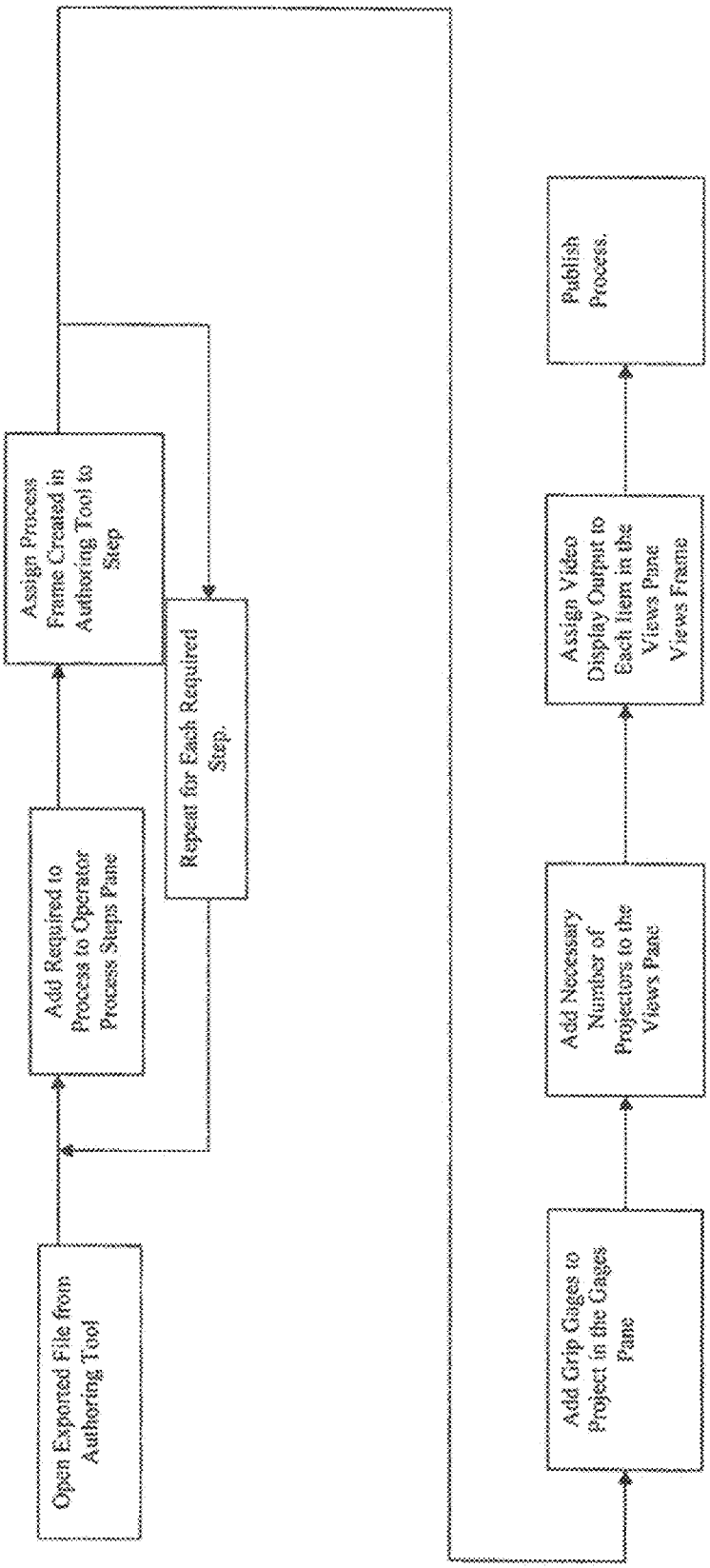
FIG. 22 is a flowchart illustrating the functions of the Configurator Assembly Software Tool ("Configurator Tool").
Figure 23:
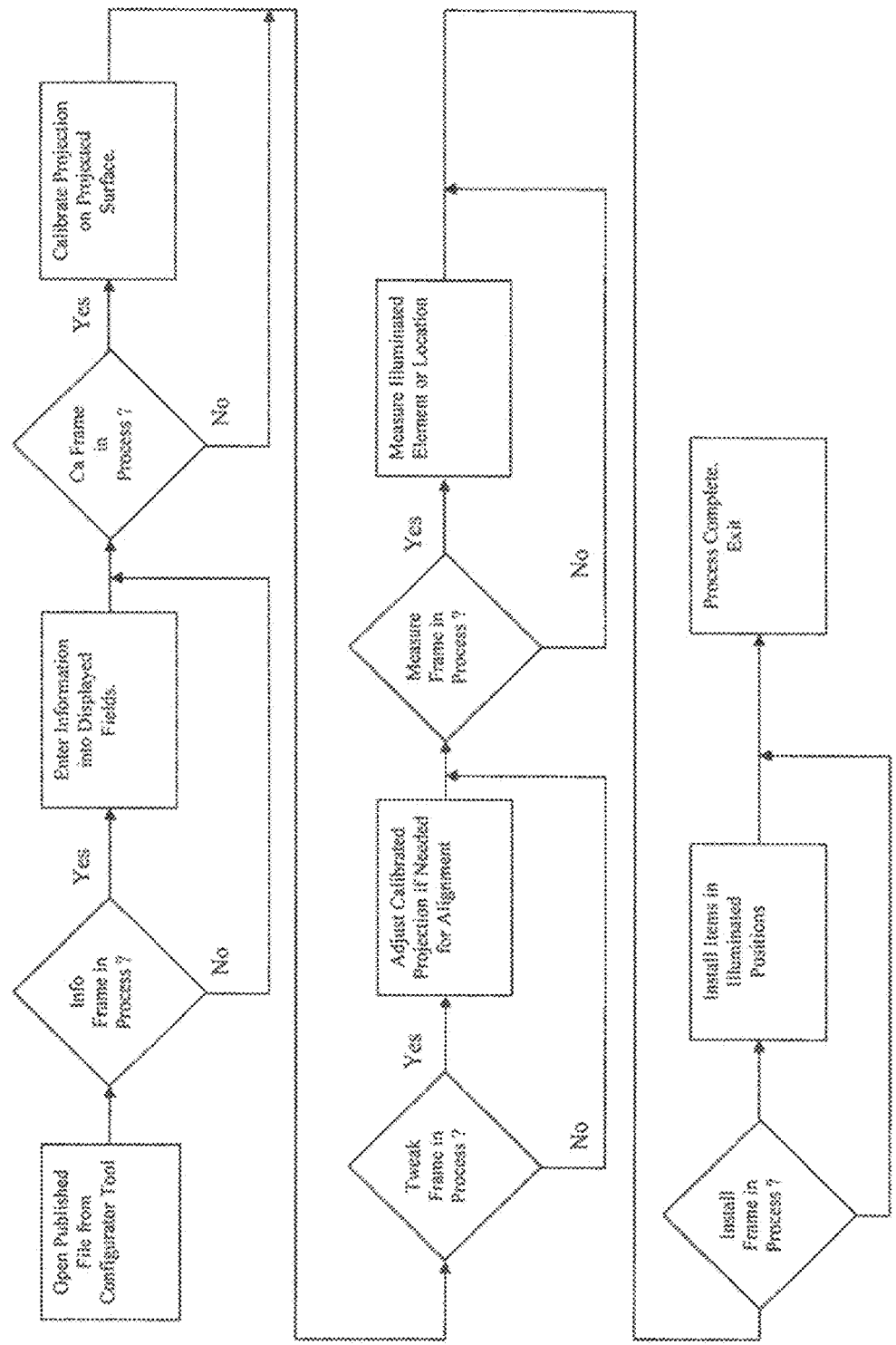
FIG. 23 is a flowchart illustrating the functions of the Operator Assembly Software Tool ("Operator Tool").

Once the last hole in the object being assembled (or part thereof) has been measured using the measuring apparatus (or other measurement or input device), the "Next" button on the User Interface of the Operator Tool will become enabled. The user will then select the "Next" button, and the User Interface will now display the "Install Frame" screen, as is shown in FIG. 19.

Preferably listed in the "Install Frame" screen are the part numbers and quantities for each type of fastener that needs to be installed into pre-drilled or other holes present in the object being assembled or otherwise manufactured (or part thereof). The part number for the first type of fastener that needs to be installed into the object will also preferably be projected onto the object. In addition, each hole currently being displayed that requires one of these fasteners will preferably be illuminated with a yellow circle. The user (or another user or worker) will now preferably retrieve the required fasteners, for example, from a parts bin, along with their corresponding nuts, and manually install these fasteners into all of the illuminated holes. Once all of the illuminated holes have fasteners installed in them, the user will preferably select, using the mouse, the next fastener on the list shown on the User Interface screen in FIG. 19. The user will now preferably repeat the installation process for all these fasteners, and so forth.

When all of the fasteners have been installed into the holes present in the object, or part, the assembly is complete. The user can now exit the Operator Tool by using the "File" and "Exit" menu option on the User Interface. The assembled object can be removed from an assembly jig and replaced with the next three-dimensional object needing fasteners to be installed therein (the same type of object), and the user can simply re-run the "Operator Tool" using the corresponding process file. For the next three-dimensional object being assembled, and all subsequent three-dimensional objects of the same type, none of the steps prior to the use of the Operator Tool need to be performed, as the computer is already all set up, and has all required data for the assembly entered therein. As a result, and very advantageously, the time and labor that are required to perform a second, third, fourth, fifth and subsequent assembly processes of the same object becomes greatly reduced (typically by at least about 10%, and often by at least about 20%, and sometimes by at least about 30%), whether being performed by the same user or a new user.

Preferred computer software programs for use in, or in connection with, the measuring apparatuses and/or optical projection assembly systems and methods of the invention are described below along with their function and source, many of which are related to each other. However, other computer software programs that function in the same or a similar manner may alternately or additionally be employed, and may be procured from sources that are known by those having ordinary skill in the art, or written by computer programmers having ordinary skill in the art, using the very detailed information, drawings and computer code that are provided herein. While it is preferred that all of the computer software programs that are described below are employed in the optical projection assembly systems and methods of the invention, some of these programs are optional, as is indicated. Commencing on the effective filing date of this U.S. patent application, a computer having one or more, or all, of these software programs installed thereon, and the various "Projection Works" computer software programs, are commercially available from Delta Sigma Corp. (2100 Barrett Park Drive, Suite 508, Kennesaw, Ga., 30144). While it is preferable that all of the different types of computer software discussed below, which have different functions, are employed in the optical projection assembly systems and methods of the invention, it is not necessary to employ all of them. For example, while antivirus and identity protection programs provide advantageous protection for a computer, a computer may be employed without such programs. Those having ordinary skill in the art may readily determine which computer programs are needed to employ the systems and methods of the present invention to assemble a particular workpiece or other three-dimensional object. Many of the computer software programs that are described below may be downloaded from the various web sites that are described herein. Further, many of those computer software programs that that are described below as being required are required for writing a software program that functions in the same manner as does the source code that is described herein, not for having the systems and the methods of the invention properly operate.

Software (Per Computer)

Computer Operating System
Windows Vista Business Service Pack 1 (32 Bit OS) (Microsoft Corporation, Redmond, Wash.) (Required; Operating System Related)
Viewer used to Read Files in PDF Format
Adobe Reader 9.1 (Adobe Systems Incorporated. San Jose, Calif.)
(Required; Document Display Software; Software Application)
Anti Virus Software
AVG 8.5 (AVG Technologies USA, Inc., Chelmsford, Mass.)
(Optional; Any Anti-Virus Software should Work; Security Softwale)
Identity Protection Sits on top of Installed Anti-Virus, Shielding Passwords, Credit Card Numbers and other Digital Information
AVG Identity Protection (AVG Technologies USA, Inc., Chelmsford, Mass.)
(Optional; Any Input Shielding Software should Work; Security Software)
Driver File for Enabling a Belkin Wireless G Adapter to Function Properly
Belkin Wireless G USB Adapter Driver (Belkin, Compton, Calif.)
(Optional; Any Wireless Device and Software Supported by Windows should work; Networking Software)
Utility used to Configure and provide Drivers for the Belkin USB Wireless Adapter Dock
Belkin Wireless USB Utility (Belkin, Compton, Calif.)
(Optional; Any Wireless Device and Software Supported by Windows should work; Networking Software)
Software Application used to Design, Manage and Deliver Data Reports via the Web or Enterprise Applications
Crystal Reports Basic for Visual Studio 2008 (Business Objects, SAP America, Inc., Newtown Square, Pa.)
(Required; Used for Writing Software: Database Software Development Software)
Utility used to Manage all Driver Files
Driver Download Manager (Dell Inc., Round Rock, Tex.)
(Required: Computer Manufacturer Dependent; Computer Configuration Software)
Device Drivers, Diagnostics and Technical Information
Dell Resource CD (Dell Inc., Round Rock, Tex.)
(Required; Computer Manufacturer Dependent; Computer Configuration Software)
Software Development Kit (SDK) used with Cameras
FlyCapture 2.0 Beta 06 (Point Grey Research, Richmond, BC, Canada)
(Required: Used for Writing Software for Cameras: Software Development Software)
Service Pack for the .NET Compact Framework
.NET Compact Framework 2.0 SP2 (Microsoft Corporation, Redmond, Wash.)
(Required; Used for Writing Software; Software Development Software)
A Hardware-Independent Environment that Supports Building and Running Managed applications on Resource-Constrained Computing Devices
.NET Compact Framework 3.5 (Microsoft Corporation, Redmond, Wash.)
(Required; Used for Writing Software; Software Development Software)
Redistributable Package which Installs the .NET Framework Runtime and Associated Files Required or Desired to Run applications Developed to Target the .NET Framework v3.5
.NET Framework 3.5 (Microsoft Corporation, Redmond, Wash.)
(Required; Used for Writing Software; Software Development Software)
Device Emulator for ARM-Based Devices
Device Emulator version 3.0 ENU (Microsoft Corporation, Redmond, Wash.)
(Required Used for Writing Software; Software Development Software)
Help Viewer for Visual Studio Documentation.
Document Explorer 2008 (Microsoft Corporation, Redmond, Wash.)

(Required; Used for Writing Software; Software Development Software)

A Computer Application used to Create Desktop, Enterprise, and Web-based Database Systems SQL Server 2005 (Microsoft Corporation, Redmond, Wash.)

(Required; Database Software that Stores Projection Works Data; Database Software Development Software)

The SQL Server Compact Design—Time Components used with Visual Studio

SQL Server Compact 3.5 Design Tools ENU (Microsoft Corporation, Redmond, Wash.)

(Required; Used for Writing Software; Database Software Development Software)

Used to Create Compact Databases that can be Deployed on Desktop Computers, Smart Devices and Tablet PCs.

SQL Server Compact 3.5 ENU (Microsoft Corporation, Redmond, Wash.)

(Required; Used for Writing Software; Database Software Development Software)

A Preferably Lightweight, Relational Database Engine used in Device Applications SQL Server Compact 3.5 for Devices ENU (Microsoft Corporation. Redmond, Wash.)

(Required: Used for Writing Software; Database Software Development Software)

Provides way to Publish Databases to T-SQL Scripts or Directly to Supporting Hosting Service Providers SQL Server Database Publishing Wizard 1.2 (Microsoft Corporation, Redmond, Wash.)

(Required; Used for Writing Software: Database Software Development Software)

Contains an SQL OLE DB Provider and SQL ODBC Driver in one Native Dynamic Link Library (DLL) Supporting applications using Native-Code APIs (ODBC, OLE DB and ADO) to Microsoft SQL Server SQL Server Native Client (Microsoft Corporation, Redmond, Wash.)

(Required; Used for Writing Software; Database Software Development Software)

Contains additional Files used in SQL Server Setup

SQL Server Setup Support Files (English) (Microsoft Corporation, Redmond, Wash.)

(Required; Used for Writing Software; Database Software Development Software)

Provides added Functionality for Backup and Restore of SQL Server through the Volume Shadow Copy Service (VSS) Framework SQL Server VSS Writer (Microsoft Corporation, Redmond, Wash.)

(Required; Used for Writing Software; Database Software Development Software)

Installs Runtime Components of Visual C++ Libraries Required to Run applications Developed with Visual C++ on a Computer that does not have Visual C++2005 Installed Visual C++2005 Redistributable (Microsoft Corporation, Redmond, Wash.)

(Required; Used for Writing Software; Database Software Development Software)

A Comprehensive Set of Tools that Accelerates the Process of Creating, Debugging and Deploying Software Development Projects that Target the Web (Including ASP.NET AJAX), Windows Vista, Windows Server 2008, the 2007 Microsoft Office system, SQL Server 2008 and Windows Mobile Devices Visual Studio 2008 Professional Edition ENU (Microsoft Corporation, Redmond, Wash.)

(Required: Used for Writing Software; Software Development Software)

An HTML/ASP.NET Design Surface that is Based on Former FrontPages Technologies

Visual Studio Web Authoring Component (Microsoft Corporation, Redmond, Wash.)

(Required; Used for Writing Software; Software Development Software)

Provides the Documentation, Samples, Header Files, Libraries and Tools (including C++ Compilers) that are Needed to Develop applications to Run on Windows Server 2008 and the .NET Framework 3.5.

Windows SDK for Visual Studio 2008 .NET Framework Tools (Microsoft Corporation, Redmond, Wash.)

(Required: Used for Writing Software; Software Development Software)

Provides Additional Documentation, Samples, Header Files, Libraries and Tools (including C++ compilers) that are Needed to Develop applications to Run on Windows Server 2008 and the .NET Framework 3.5.

Windows SDK for Visual Studio 2008 Headers and Libraries (Microsoft Corporation, Redmond, Wash.)

(Required; Used for Writing Software; Software Development Software)

Assemblies and Documentation for DSL Runtime Tools

Windows SDK for Visual Studio 2008 SDK Reference Assemblies and IntelliSense (Microsoft Corporation, Redmond, Wash.)

(Required; Used for Writing Software; Software Development Software)

Includes Tools, Documentation and Samples for Developers to Design, Build, Test and Deploy Extensions for Visual Studio 2008.

Windows SDK for Visual Studio 2008 Tools (Microsoft Corporation, Redmond, Wash.)

(Required; Used for Writing Software; Software Development Software)

A Set of Tools, Code Samples, Documentation, Compilers, Headers and Libraries that Developers can use to Create applications that run on Microsoft Windows Operating Systems using Native (Win32) or Managed (.NET Framework) Programming Models Windows SDK for Visual Studio 2008 Win32 Tools (Microsoft Corporation, Redmond, Wash.) (Required: Used for Writing Software; Software Development Software)

Resource of Information for Developers using Microsoft Tools, Products and Technologies MSDN Library for Visual Studio 2008—ENU (Microsoft Corporation. Redmond, Wash.)

(Required; Used for Writing Software: Software Development Software)

Driver Files used for the NVIDIA Graphics Card

NVIDIA Drivers (NVIDIA. Santa Clara, Calif.)

(Required; Video Graphics Card Dependent; Computer Configuration Software)

Opensource Computer Vision Software Development Kit (Contains Tools, Code Samples, Documentation, Headers and Libraries that Developers can use to Create Computer Vision applications that run on Microsoft Windows Operating Systems using Native (Win32) or Managed (.NET Framework) Programming Models)

OpenCV SDK—OpenCV project (SourceForge—see the web site sourceforge dot net)

(Required; Used for Writing Software for Cameras; Software Development Software)

Authoring Assembly Software Tool ("Authoring Tool")
(Windows Based Software Application that allows the User to Create Assembly Processes that may be Projected onto a Complex 3D Object in 3D)
ProjectionWorks Author (Delta Sigma Corp. Kennesaw, Ga.)
(Required: Used to Create Projected Images; Software Application)
Configurator Assembly Software Tool ("Configurator Tool")
(Windows Based Software Application that Allows the User to Configure Assembly Processes that may be Projected onto a Complex 3D Object in 3D)
ProjectionWorks Configurator (Delta Sigma Corp., Kennesaw, OA)
(Required; Used to Configure Projected Images; Software Application)
Operator Assembly Software Tool ("Operator Tool")
(Windows Based Software Application that Allows the User to Run Assembly Processes that may be Projected onto a Complex 3D Object in 3D)
ProjectionWorks Operator (Delta Sigma Corp., Kennesaw, Ga.)
(Required; Used to Display Projected Images; Software Application)
A Collection of Bindings to Facilitate Cross-Platform Graphics-Related Development utilizing the .NET Platform
ToaFramework 2.1.0 (for .NET) (TaoFramework, open source—see the web site taoframework dot con)
(Required; Used for Writing Software; Software Development Software)
For Running Solutions built using VSTO 2005 or VSTO 2005 SE
Visual Studio 2005 Tools for Office Second Edition Runtime (Microsoft Corporation, Redmond, Wash.)
(Required; Used for Writing Software; Software Development Software)
A Set of Development Tools available in the Form of a Visual Studio Add-in (Project Templates) and a Runtime that allows Microsoft Office 2003 and Later Versions of Office applications to Host the NET Framework Common Language Runtime (CLR) to Expose their Functionality via the .NET Type System
Visual Studio Tools for the Office System 3.0 Runtime (Microsoft Corporation, Redmond, Wash.) (Required: Used for Writing Software; Software Development Software)
Extends Visual Studio 2005 so that Managed and Native Application Software Targeting Windows Mobile 5.0 based Pocket PC Devices can be Written
Windows Mobile 5.0 SDK R2 for Pocket PC (Microsoft Corporation, Redmond, Wash.)
(Required; Used for Writing Software; Software Development Software)
Extends Visual Studio 2005 so that Managed and Native Application Software Targeting Smartphone Devices can be Written
Windows Mobile 5.0 SDK R2 for Smartphone (Microsoft Corporation, Redmond, Wash.)
A Library of highly Optimized, Extensively Threaded Math Routines for Science, Engineering, and Financial applications
Intel Math Kernel Library (Intel MKL) 10.2 (Intel Corporation, Santa Clara, Calif.)
(Required; Used for Writing Software; Software Development Software)

Additional information about computer software programs and computer programming is present in John Lewis et al., *Java Software Solutions* (2nd Edition, Pearson Education, Inc., 2007, ISBN 0-13-222251-5); Donald E. Knuth, *The Art of Computer Programming, Volumes* 1-4 (Addison-Wesley. ISBN 0-201-48541-9); O.-J. Dahl et al., *Structured Programming* (Academic Press. ISBN 0-12-200550-3); Wilkes. M. V. et al., *Preparation of Programs for an Electronic Digital Computer* (Addison-Wesley); and Alexander Stepanov et al., *Elements of Programming* (Pearson Education. Inc., ISBN 13-978-0-321-63537-2).

Using the detailed teachings, resources and other information that are provided herein, those of ordinary skill in the art may readily purchase and/or write various computer software programs that function in the manners that are described herein, and may properly install them in a computer to produce the measuring apparatuses, optical projection assembly systems and other systems of the present invention, and to carry out the methods of the present invention.

Set-Up and Operation of Systems

The optical projection assembly systems of the invention may be operated by a user using the step-by-step process that is described below, which includes all of the steps that the user may need to take in order to create and run a project. (The user "creates" a project by using the Authoring Tool to create assembly, manufacturing or other frames by importing the Base Geometry and Annotated Geometry, as well as using the Configurator Tool, to place the assembly, manufacturing or other steps in order, as well as assign all the projectors and monitors employed to appropriate or desired graphics ports. The user "runs" a project by taking the output from the Configurator Tool, and using it generally over and over again in the Operator Tool to assemble object parts.)

System Set-Up

The following is a step-by-step description for the set-up process that is preferably employed in connection with the optical projection assembly systems and methods of the invention. The steps that are described may be performed in any suitable order and/or manner, which may be determined by those having ordinary skill in the art. Steps that are optional are indicated.

1. Acquire components parts of the system (as is described herein).
2. Install software (described herein) onto a computer (or more than one computer).
3. Attach computer monitor(s) to computer(s) using included (or other) cables.
   (This step is optional if only a laptop computer(s) is being employed, and the only monitor(s) that is being employed is the one that is built into the laptop computer(s). If a desktop computer(s), or a laptop(s) using multiple monitors per laptop, is employed, this step generally is not optional.)
4. Attach keyboard(s) and mouse(s) to computer(s).
   (This step is generally required with a desktop computer(s), but optional with a laptop computer since an external mouse/keyboard can be used with a laptop computer if it is present in a docking station, or if the laptop is used as is.)
5. Mount a projector onto a tripod stand, or onto a ceiling, wall, table or other surface and/or object.
   (This step may be optional, depending upon the particular circumstances of a situation, but is very desirable, and it may be necessary to maintain a projector stationary and/ or to properly position the projector in a work area for a proper operation of the system, which may readily be determined by those having ordinary skill in the art. It is preferable that the projector be mounted, such that it cannot easily be moved if it is accidentally bumped or a person mistakenly runs into it. What one would mount it on would be dependent upon where it is being used. Some locations lend themselves to using a ceiling mount. Sometimes it may be possible to attach a projector to a worktable, or to the underside of a support beam. However, if sufficient room for a tripod is present in a particular work area, it is preferred to mount the projector on a tripod.)

6. Power up the projector (i.e., turn it "on" with, for example, an electrical cord being plugged into an electrical outlet), and determine its optimal placement, given the configuration of a particular work area, such as a room). Also determine:
   a. Will one projector cover the entire work surface being employed?
      i. Lens requirements in order to achieve item "a".
      ii. If multiple projectors are needed or desired to cover the work surface, determine location and lens requirements for each projector.
   b. Is it required that workers (or others) do not obscure the projected data?
      i. Determine the location and lens requirements for each projector in order to preferably achieve unobstructed coverage.

7. Attach projector(s) to the computer(s) using connection cables that permit data and/or information to be transferred between the projector(s) and the computer(s);

8. If the number of monitors and projectors exceeds the number of video card outputs currently installed (or otherwise present) in the computer, install one or more additional video cards.

9. If a measuring apparatus is to be used, optionally, to perform thickness or other measurements, it should be attached to the computer, preferably at this time.

10. Generate a stereo lithography format (STL) file that represents the base geometry that is to be used as the projection surface. (In other words, if the surface being projected upon is an aircraft tail section, such tail section should be modeled in 3D in any CADAM/Catia modeling code that is capable of exporting the file into .STL format.) This Base Geometry file should then be placed into the project directory on the computer containing the Authoring Tool, Configurator Tool and/or Operator Tool software.

11. The file that contains the information that will be projected onto the projection surface should be created, as well, and placed in a Comma, Tab or Whitespace delimited forma. This Annotated Geometry file should also be placed in the project directory on the computer containing the Authoring Tool, Configurator Tool and/or Operator Tool software. For example, for an object that is an airplane door, the Annotated Geometry file for the door skin would contain the fastener hole location in 3D for all the fasteners to be installed in the door skin. The contents of an example file are shown in FIG. 7. In this example file shown, each row represents a hole on the Base Geometries surface. The individual columns are defined as follows from left to right:
   a. Hole ID
   b. Part # for fastener for this hole
   c. X-Location of hole center in space
   d. Y-Location of hole center in space
   e. Z-Location of hole center in space
   f. I component of normal vector for the hole center
   g. J component of normal vector for the hole center
   h. K component of normal vector for the hole center
   i. Diameter of hole 12. The Authoring Tool should now be launched by selecting Start "All Programs" and "Projection Works Author." The screen shown in FIG. 5 will be displayed.

13. The Base Geometry file described in step 10 above should now be imported into the Authoring Tool (FIG. 5). This is done by selecting "Import-Base Geometry" using the drop down menu along the top frame. The user should select the Base Geometry .STL file to import it.

14. The Annotated Geometry file that is described in step 11 above should now be imported into the Author Software Tool (FIG. 5). Again, the user should use "Import-Annotated Geometry" to import this file into the Authoring Tool.

Figure 8:
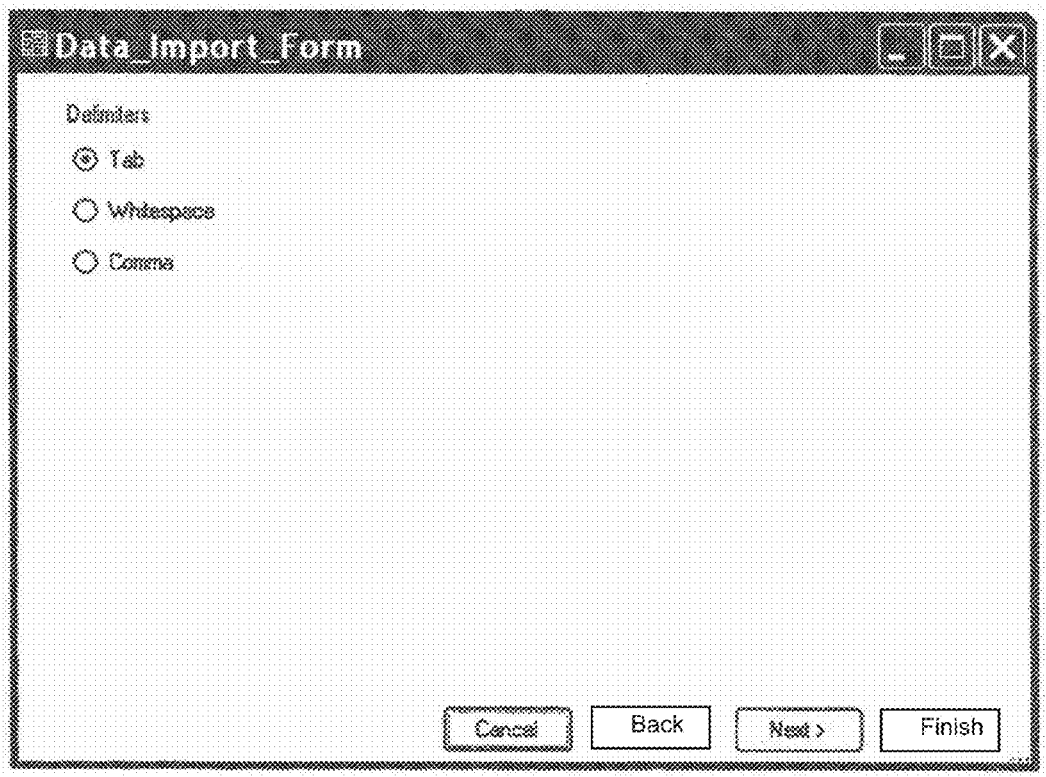
FIG. 8 is an illustration of a Data_Import_Form screen of an Authoring Assembly Software Tool ("Authoring Tool") in which a user may be prompted to enter a delimiter type (Tab, Whitespace or Comma) that may be used in an "Import" and "Annotated Geometry" file in the systems and methods of the invention.

15. After selecting the Annotated Geometry file and clicking "Open", the delimiter type used by the file should be selected, as shown in FIG. 8.

16. The details of the file layout should be specified next in order to ensure that the data is read into the Authoring Tool correctly. In this step, the user should identify what each column of data contains. After the delimiter type is selected, the screen shown in FIG. 9 should be used to identify what column a part ID and part # are located in.

17. The user should then identify how the data should be displayed. In this example, the data is for fastener holes on a 3D surface. The screen in FIG. 10 may be employed to indicate the display shape that is used for these holes. In this example, the shape selected is a circle using a fill color of yellow.

18. A screen that may be used to define the Annotated Geometry file data is shown in FIG. 11. This screen is used to identify the columns in which the x, y and z hole location data is present, and the columns in which the i, j and k normal vector data is located.

19. After selecting "Finish" on the screen in FIG. 11, a view of the annotated data overlayed onto the Base Geometry should be displayed, as shown in FIG. 12.

20. Define the process elements which should be included into the particular project. These include, for example, Calibration, Information, Tweaking, Measuring and/or Installing.

21. Identify a plurality (preferably at least 8) of calibration points to be used in a calibration step.

22. Using the menu of the User Interface screen of the Authoring Tool (FIG. 12), the project can now be saved in typical Microsoft fashion (i.e., by clicking on the save floppy disc icon, by selecting from the top level menu "File" and "Save," or the like). The project is preferably saved using the .pxp save type, which creates a private project that can be modified at a subsequent date and/or time. Once the project is ready for use, it can be published for use, preserving the private project for later modification.

23. Using the Configurator Tool that is shown in FIG. 13, the process elements defined in step 20 above should be put together to form the process steps that are to be employed for the project. In the Operator Process Steps frame shown in FIG. 13, the steps required or desired to perform the process should be added, for example, using the Add Step button or right clicking the mouse in the frame and choosing the desired step. Process elements should be added to each step as needed or desired by selecting the step using the mouse (or otherwise), then selecting the Process Element, then clicking the Copy to Step button between the Process Elements and Process Steps frames.

24. Once all of the necessary or desired process elements have been assigned to the required or desired process steps, measuring apparatuses of the invention (or other grip gages) should be assigned to the project using the Gages frame (FIG. 13). This is accomplished using the Add button on the Gages frame, and selecting the appropriate gage type.
25. Adding the required or desired number of projectors should be completed using the Views frame and the Add/Delete projector buttons (FIG. 13). The number of projectors visible in the Views frame should match the number of projectors in actual use. The number of projectors in this list should be the same as the number of projectors that will be in the work area, as determined by step 6 above.
26. Configure the views shown in the Views frames. Each view should be assigned a display screen that it should be using. For example, if there are four video ports in the computer that is being used, then each monitor/projector should be assigned to display the appropriate display value from 1-4. The display value selected should be shown on the display screen.
(The user should select the view (i.e. one of the items listed in the "Views" frame, such as "Projector 1," "Video Screen," or the like, to configure. Then, there are several properties shown just to the right of the Views" frame. To configure the "View," the user should assign a screen number to that view, so that the computer places that view onto the correct video port. The screen number field is a drop list, and the user clicks that list, and selects the correct screen number. By correct is meant that if the user selects "User Interface Screen," the screen number that the user picks should result in the User Interface screen being shown on the computer monitor in front of the user. If it shows up on the object to be assembled, then the user has selected the wrong screen. The Configurator Tool software detects the number of graphics ports that are available on the computer and populates the Screen drop list with the numbers that are available. The user just has to select the "View" with the mouse, and then pick the Screen number from the drop list. When the user does this, a large green number representing the graphics port number will be displayed on each projector and monitor, so that the user can see what graphics port is attached to what "View.")
27. Publish the project using the File-Publish selection from the menu on the User Interface of the Configurator Tool (FIG. 13).
(Publish means to create a file that can be used by the Operator Tool. This published file has all unnecessary information that is used by the Authoring Tool and the Configurator Tools stripped out of it. This beneficially reduces or eliminate unnecessary data from the file and renders the file so that the end user cannot modify it. Also, this permits the main file used by the Configurator Tool to contain numerous pieces of information that can be put together to create different "published files." The user can then create a number of different published files from one main file used by the Configurator Tool. An example of this is airplane tails that are made for F-22 aircrafts using the systems and methods of the invention. The F-22s have two vertical tails. The tail on a pilot's left hand side has an outboard and inboard surface skin, and the tail on the pilot's right hand side has an outboard and inboard surface skin, as well. The outboard skins for the left and right hand tail are mirror images of each other. The same is true for the inboard skins. So, what a user can do is put all of the information for all four of these skins into one main file used by the Authoring and ConfiguratorTools, and then "Publish" the file for each skin that gets used by the Operator Tool from this one main file. The advantage of this is that it keeps all of the data for all the skins in one place, which makes it easier to track, or makes changes to it if something in the Base Geometry or Annotated Geometry should change.)
28. Run the published project by launching the Operator Tool from "Start-All Programs" and "Projection-Works-Operator." (The user would click the Windows "Start" button, then select the "All Programs" option from that list, then select the "Projection Works Operator" option from the next list that pops up. Alternatively, the user could click the desktop shortcut if one exists.)
29. Select "File" and "Open" on the User Interface of the Operator Tool to open the publish project file described in step 27 above.
30. Once the project is opened, calibrate the project using the calibration step defined. (There is typically a calibration step defined in the Authoring and Configurator Tools. The user would have added one of the five available frames called "Calibrate" in the Authoring Tool, and then assigned this frame to a "Step" in the Configurator tool. When the Operator Tool is run using the published file, the Operator Tool will generally present each step to the user for the user to execute, and when the user is finished, the user would Select the "next" button). After calibration is completed, all of the projected holes should be projected onto the object. Verify that the hole alignment is connect. (The user would look at the projected circles (or whatever shape was chosen in the Authoring Tool and see if they are lined up over the holes in the projected object. If the calibration is performed correctly, each projected shape would be located directly over an actual hole in the object). If needed, re-run the calibration step. (This would be required if the projected shapes do not line up over an actual hole in the object, as described above. If this were to be the case, then the user should re-run the calibration step because the user may have clicked the mouse at a location on the object that did not correspond to the image shown on the computer screen that was instructing the user where to click. If several re-calibration attempts still do not yield a good alignment between the projected shape and the actual hole, the user may need to go all the way back to the Authoring Tool and add more calibration points.)
31. Once calibration is complete, continue to run the project steps that are defined in the Configuration software tool.
32. When all of the project steps have been run, exit from the Operator software tool and repeat running the Operator tool on all subsequent parts which use this project.

Operation

Detailed instructions regarding the operation of the optical projection assembly systems of the invention, which preferably include a use of three different assembly software tools (Authoring Tool, Configurator Tool and Operator Tool) have already been described hereinabove. However, a specific example of operation is described below in connection with taking grip measurements in pre-drilled holes present in the skin of a vertical stabilizer, a part of an aircraft, using the measurement apparatuses of the invention (referred to below as "grip gun.").

Figure 20:
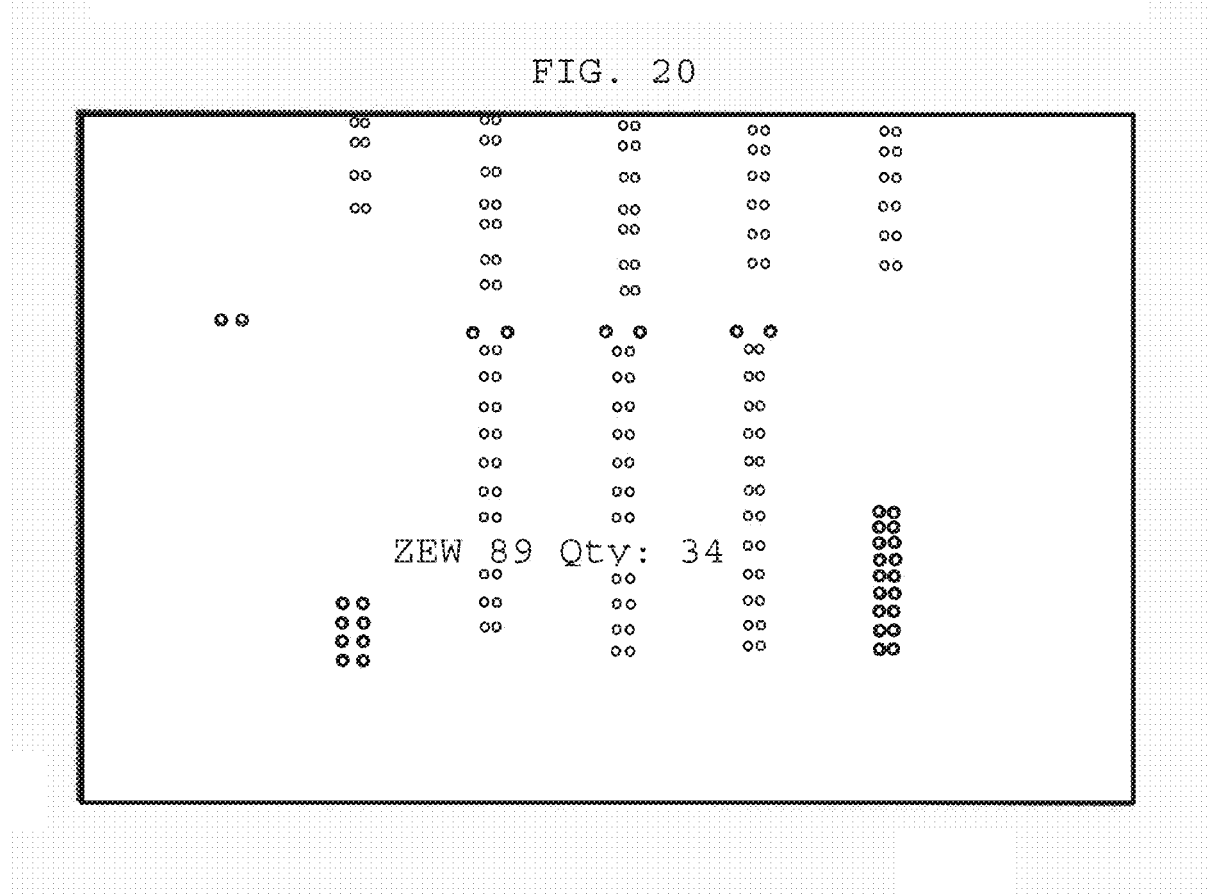

Grip measurements may be made, for example, in thousands of pre-drilled holes that are present in the skin of a vertical stabilizer, and then the correct size fasteners, out of thousands of different sizes and types, may be inserted therein to properly attach the skin to one or more different components of the vertical stabilizer, using the systems and methods of the invention in the following manner. After the system is properly set up (using the Authoring Tool, Configurator Tool and Operator Tool) in the manner described herein for this particular manufacturing process of producing aircraft vertical stabilizers, including having a plurality of assembly steps properly ordered for such process, an operator clicks a button on the User Interface of the Operator Tool and begins the assembly process created in the Configuration Tool (ordered step-by-step instructions). The operator will first calibrate the system. To do this, the individual calibration points are shown as a flashing red dot, one at a time, on the main computer monitor screen. At this point the user uses his mouse, or some other calibration method, to place the mouse cursor (crosshair) over the actual hole in the vertical stabilizer skin. He then clicks the mouse to record the location of this point. The operator proceeds in the same manner for all the calibration points. Once all points are completed, the annotated geometry is calibrated using all the data collected from each calibration point. All of the information that is required to perform a first assembly step of the vertical stabilizer, taking grip measurements in pre-drilled holes of its skin in this example, is then rapidly (virtually immediately) projected as text, image and/or symbol data sets onto the surface(s) of the three-dimensional vertical stabilizer, such as a starburst yellow pattern projected onto a first pre-drilled hole to be measured, as is shown in FIG. 3. An assembly technician can then insert a grip gun into this first pre-drilled hole, as is shown in FIG. 4, and the hole depth data is then transmitted back to, and recorded by, a computer that is operably connected with the grip gun, and with one or more optical projectors. After the first pre-drilled hole is measured, a yellow starburst pattern will automatically then be projected onto the next pre-drilled hole to be measured. This process is continued until all of the pre-drilled holes on the vertical stabilizer skin are measured at which time, the system provides a complete parts list, such as a list of a variety of different fasteners that should be inserted into the pre-drilled holes (possibly out of thousands of different fasteners) to properly fasten the vertical stabilizer skin to another component of the vertical stabilizer. The system then displays (via optical projection) a symbol on all of those pre-drilled holes in the vertical stabilizer skin that require the same type and length of fastener (i.e., the same fastener part number), as is shown in FIG. 20, or a plurality of such symbols for different required types and lengths of fasteners. The system may, for example, display 2, 3, 4 or more such symbols for 2, 3, 4 or more different types and lengths of fasteners (i.e. three other fastener part numbers), preferably all in different colors, permitting 2, 3, 4, or more different assembly technicians to work at the same time on the vertical stabilizer skin, but at different locations on the skin, and with different sized holes and different fasteners. For example, one technician could work with a series of holes that all required fastener #1, and all such holes could be illuminated on the vertical stabilizer skin in the color blue along with that fastener part number. A second technician could work with a series of holes that all required fastener #2, and all such holes could be illuminated on the vertical stabilizer skin in the color red along with that fastener part number. A third technician could work with a series of holes that all required fastener #3, and all such holes could be illuminated on the vertical stabilizer in the color yellow along with the fastener part number. A fourth technician could work with a series of holes that all requited fastener #4, and all such holes could be illuminated on the vertical stabilizer skin in the color green along with the fastener part number. The various assembly technicians could then proceed to insert the correct fasteners into the series of pre-drilled holes that they are working with to attach the vertical stabilizer skin to one or more other parts of the vertical stabilizer being manufactured. Once this step of the assembly process is completed, all of the information that is required to perform a second assembly step for a manufacture of the vertical stabilizer could then be projected onto the vertical stabilizer skin, or onto some other part thereof. Then, at some subsequent step in the manufacturing process, a completed vertical stabilizer could be attached to the rest of the aircraft being manufactured.

Measurement Apparatuses and Methods

Figure 30:
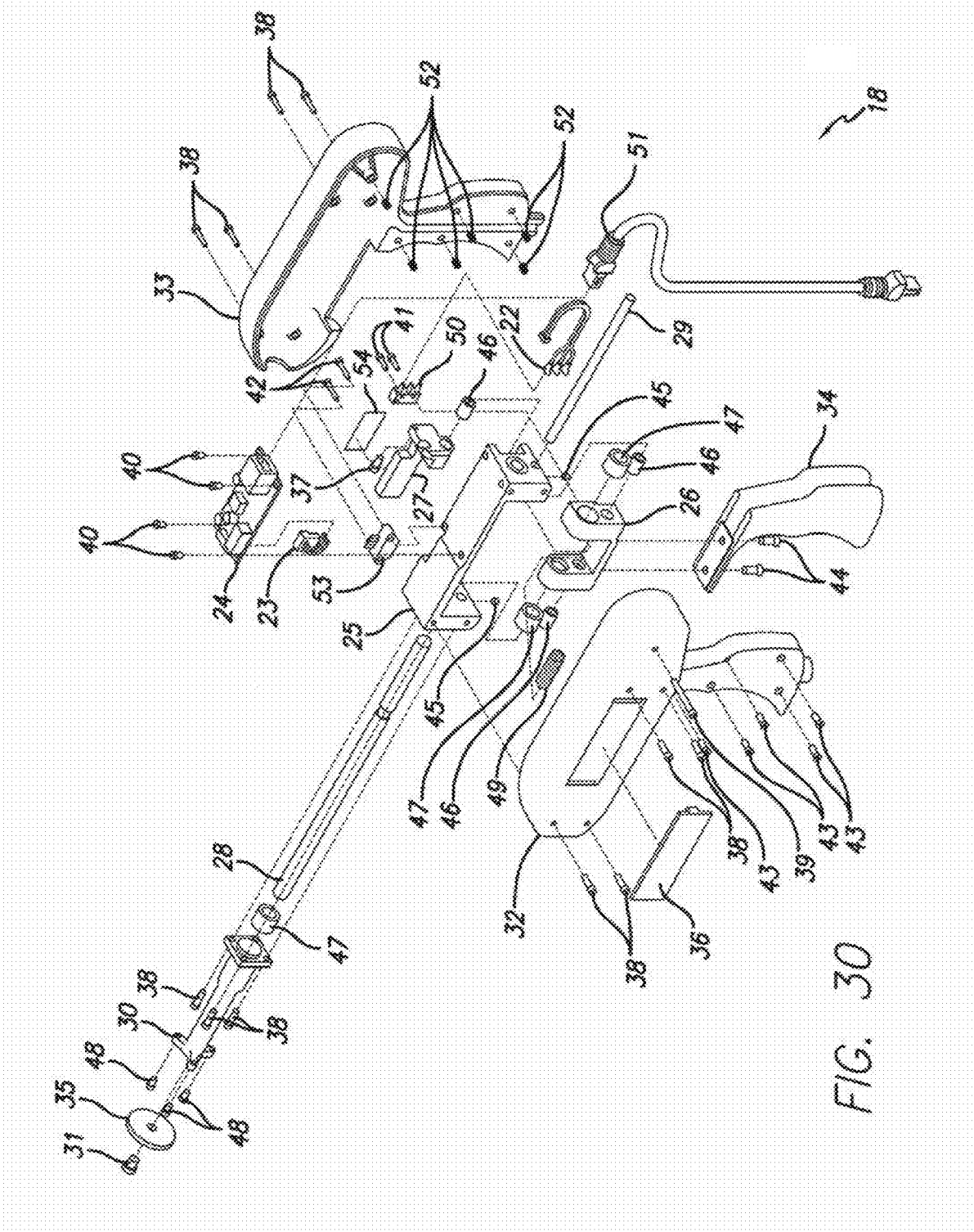
FIG. 30 is an exploded view of a measurement apparatus of the invention.
Figure 31:
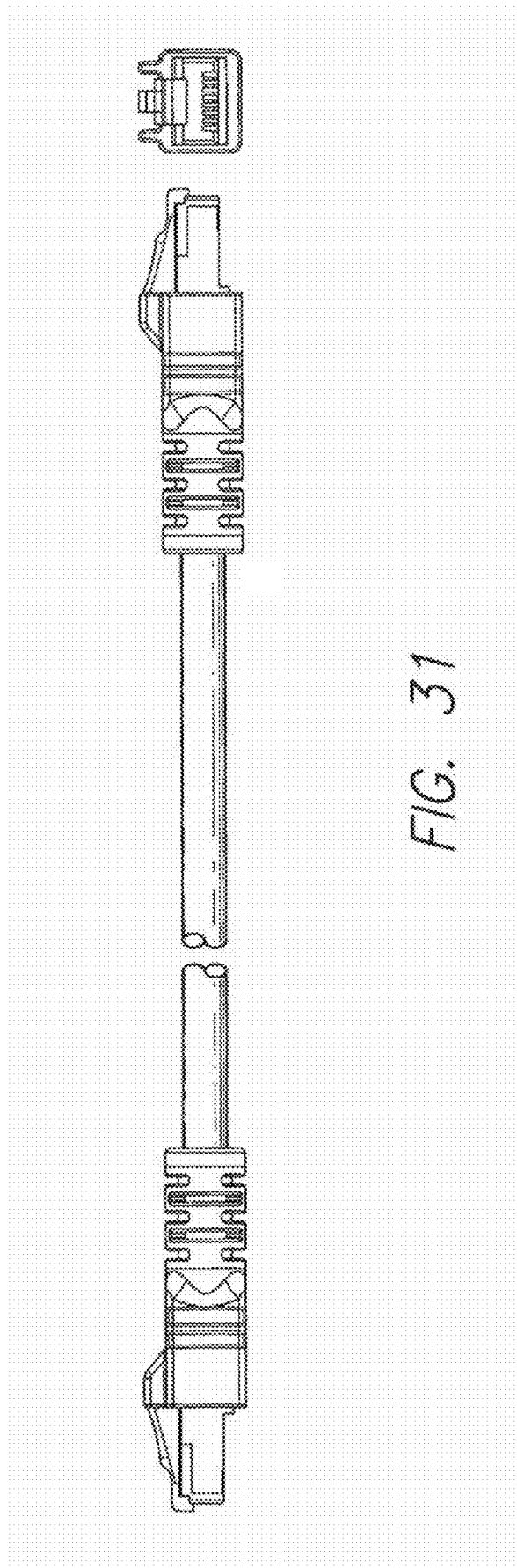
FIG. 31 is an illustration of an Ethernet cable that may be employed to operably connect a measurement apparatus of the invention to a computer.
Figure 32:
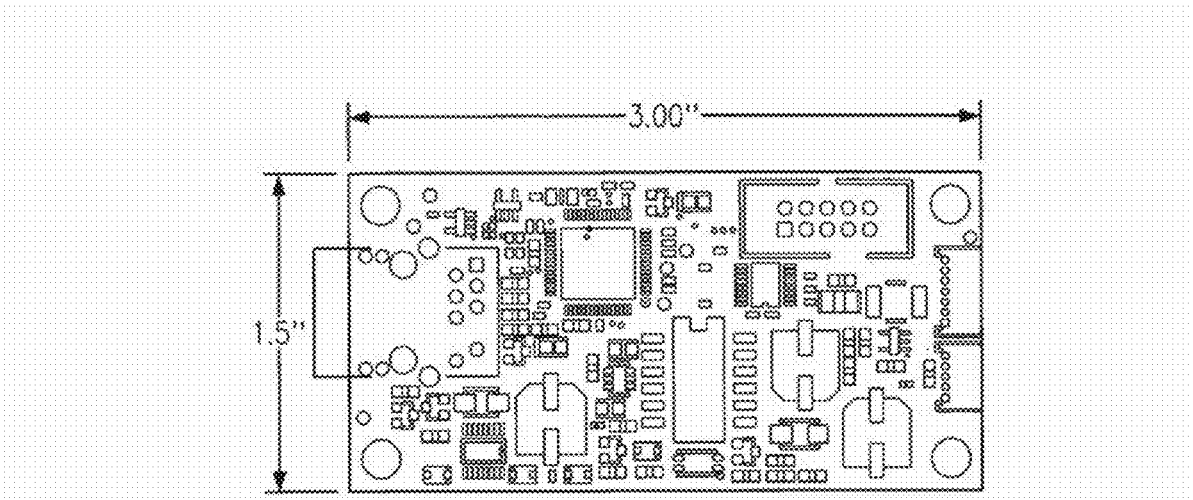
FIG. 32 is an illustration of a layout of a microprocessor board that may be employed in a measurement apparatuses of the invention (also shown in FIG. 30).
Figure 35:
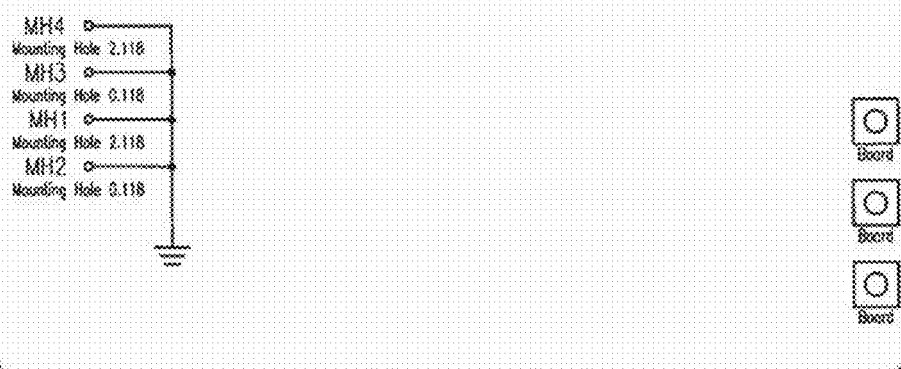
FIG. 35 is another illustration of a layout of a microprocessor board that may be employed in a measurement apparatuses of the invention (also shown in FIG. 30).
Figure 33:
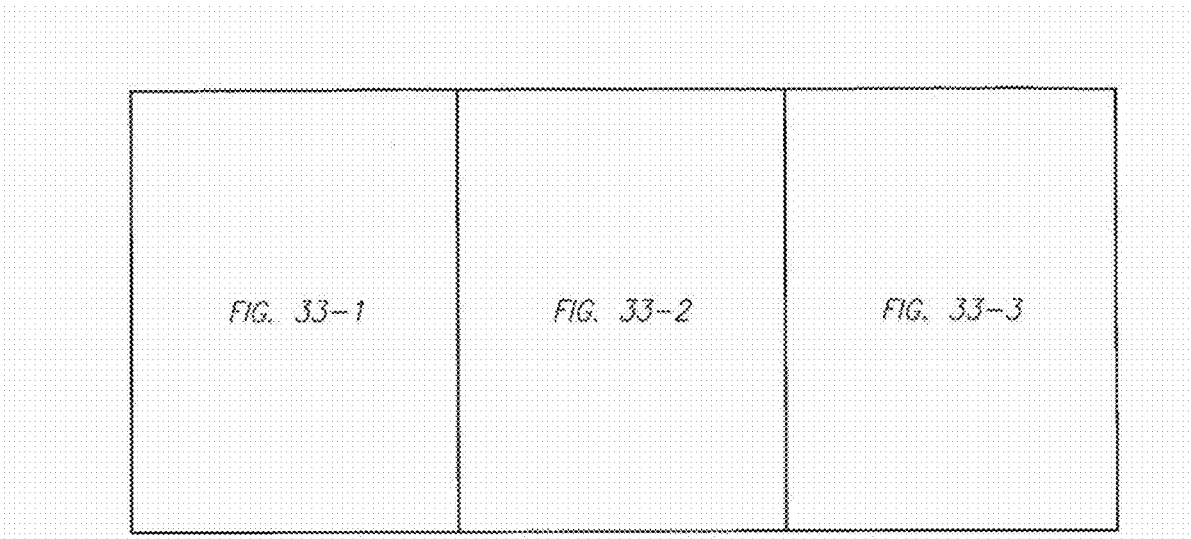
FIG. 33 is another illustration of a layout of a microprocessor board that may be employed in a measurement apparatuses of the invention (also shown in FIG. 30).
Figure 34:
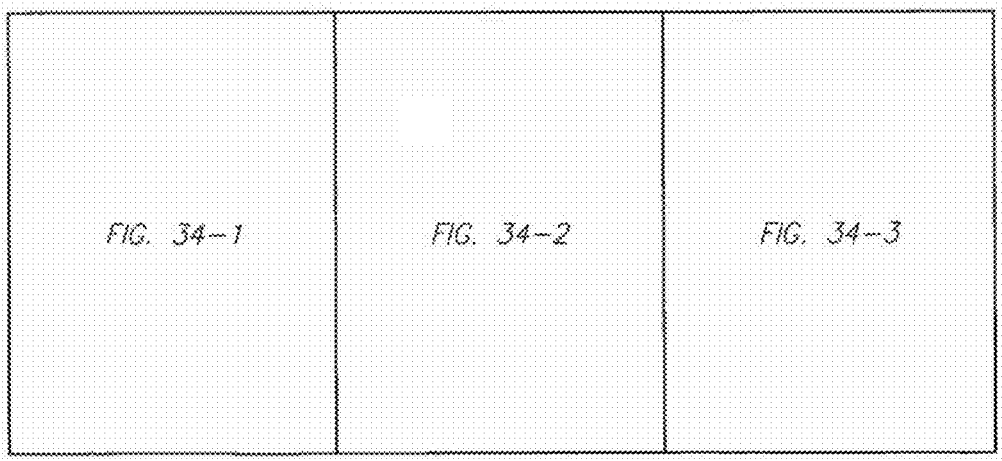
FIG. 34 is another illustration of a layout of a microprocessor board that may be employed in a measurement apparatuses of the invention (also shown in FIG. 30).
Figures 1, 33:
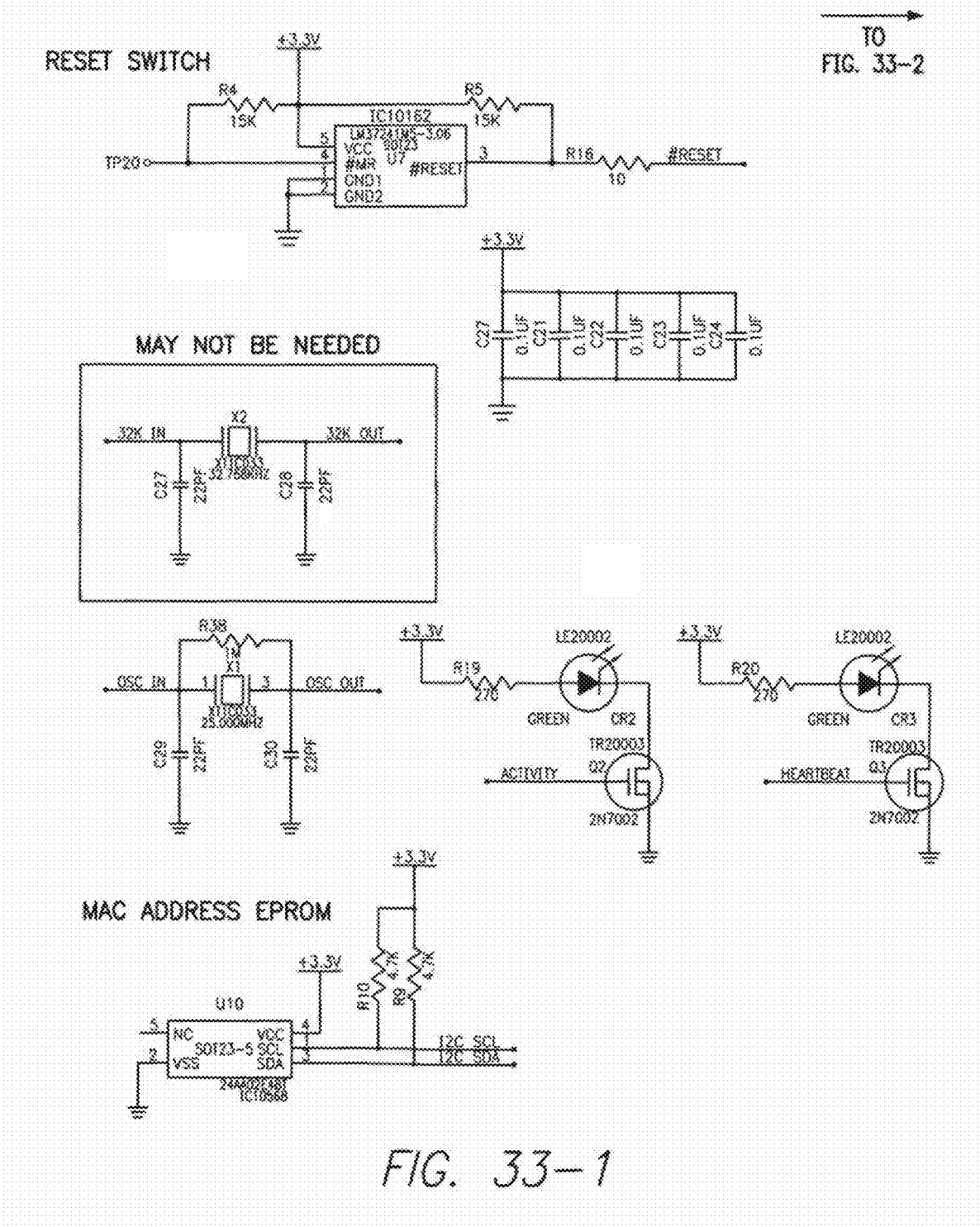
Figure 33:
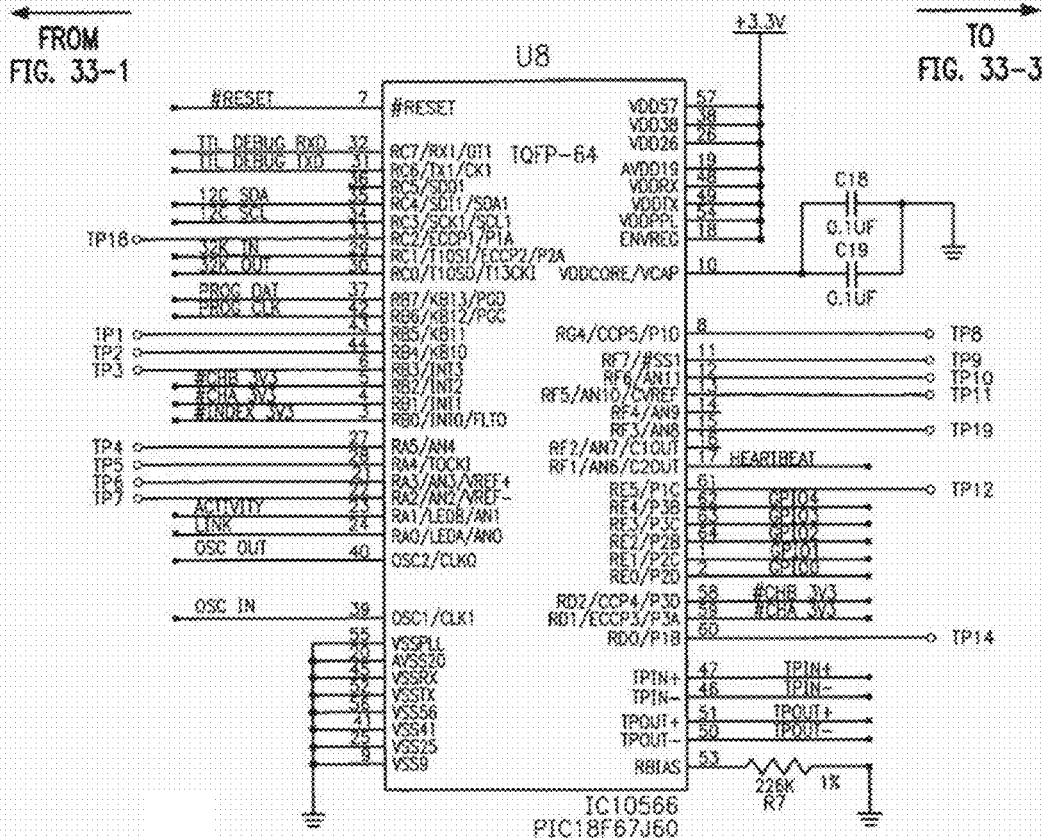
Figure 2:
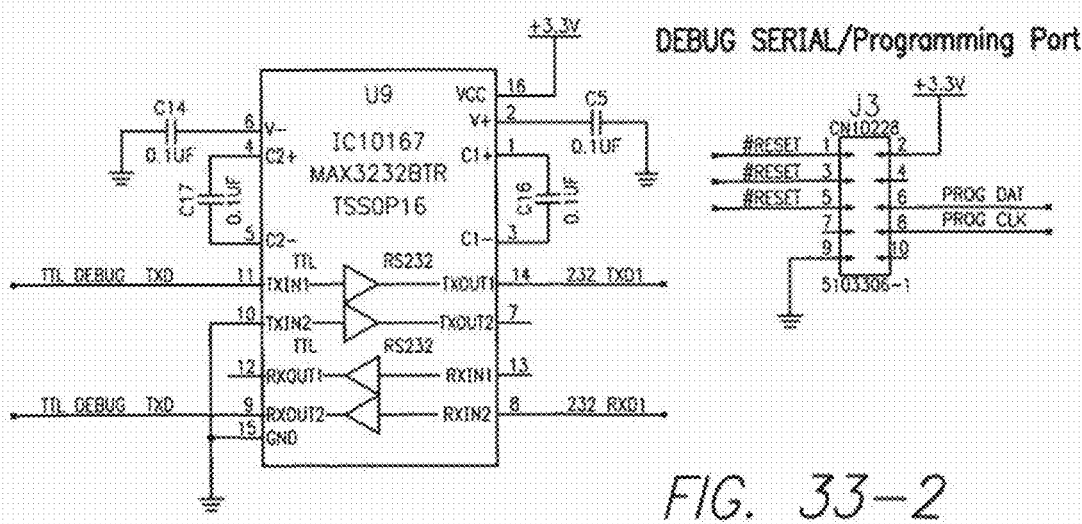
Figures 3, 33:
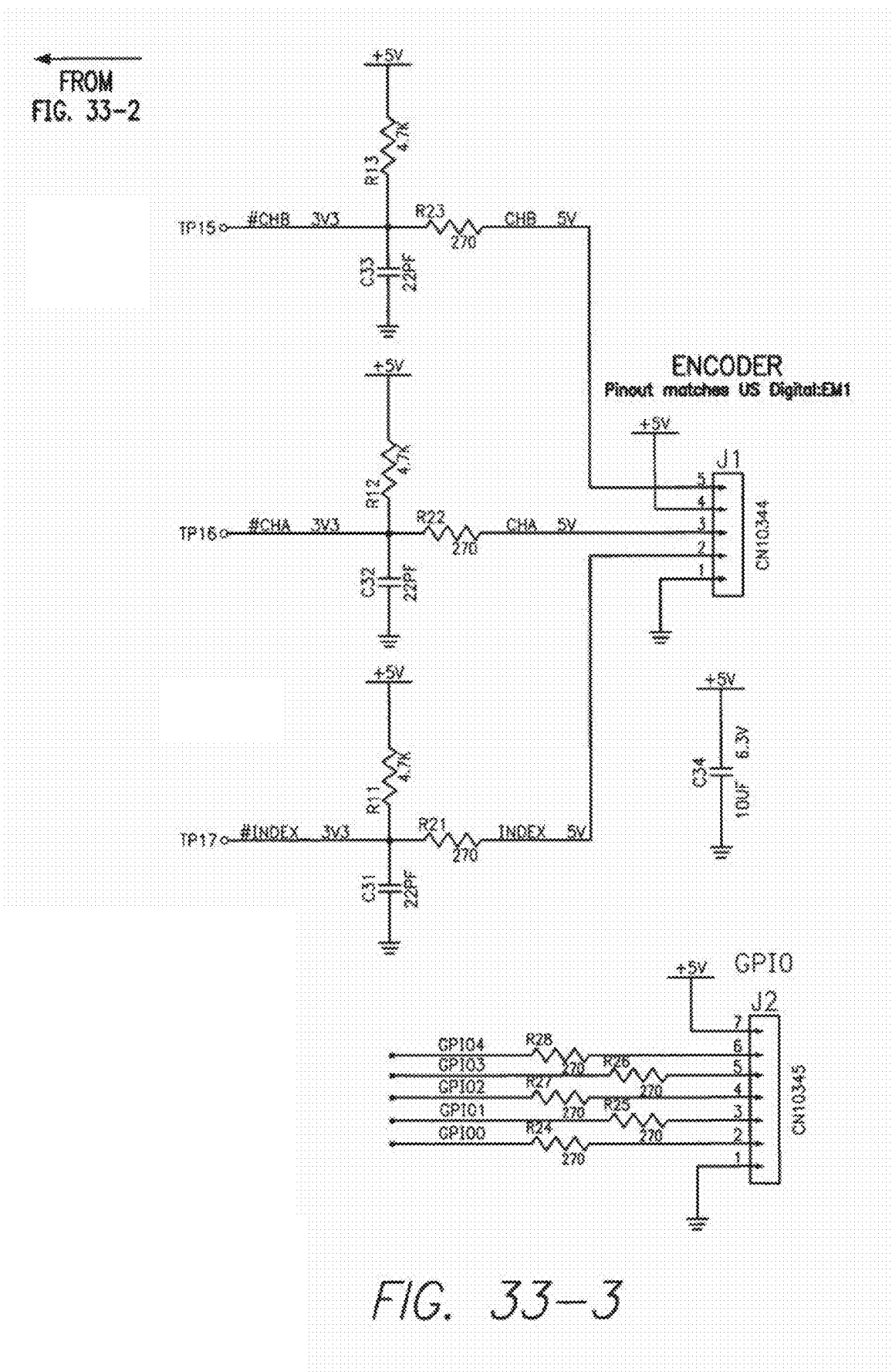
Figures 1, 34:
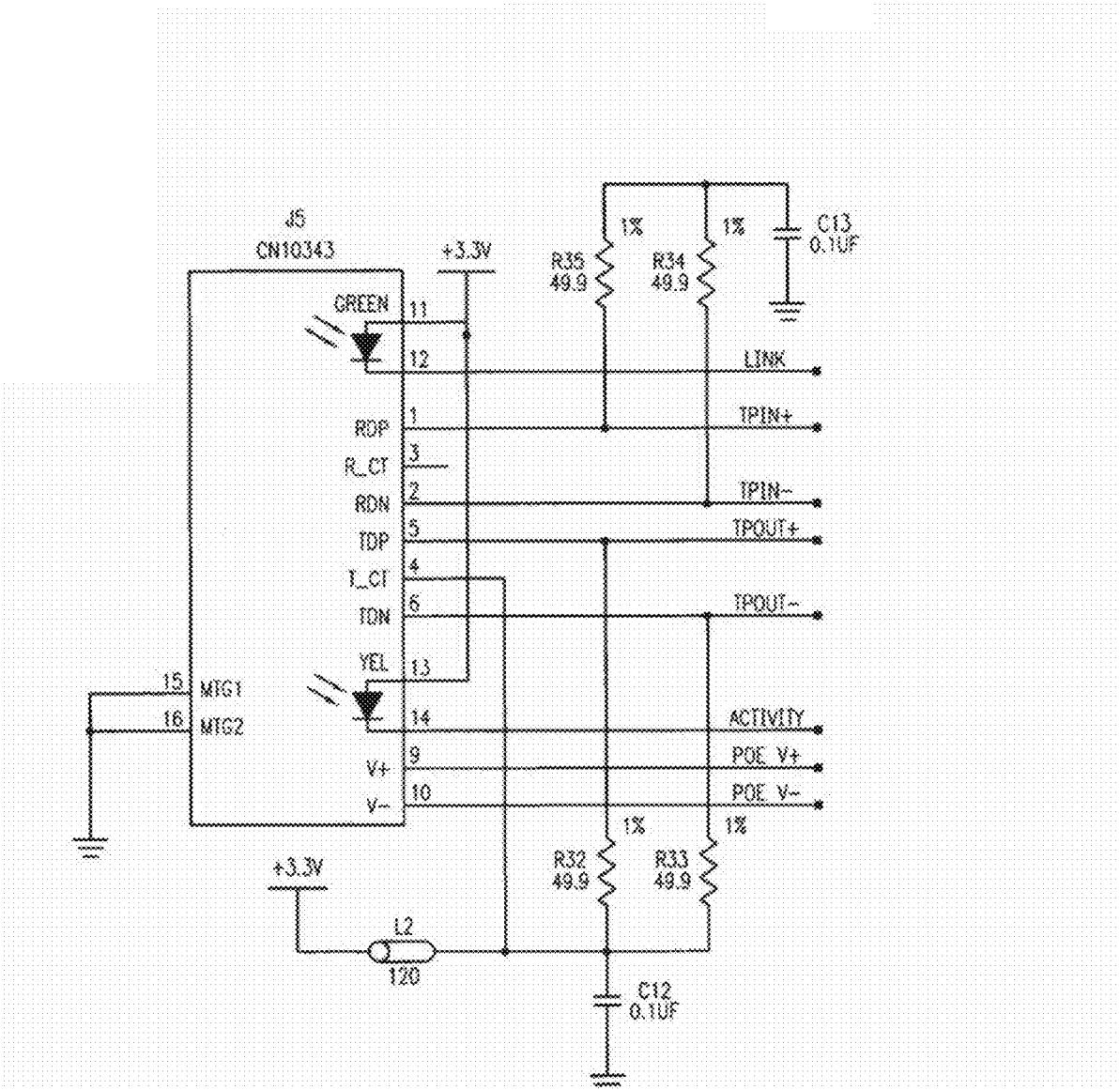
Figures 3, 34:
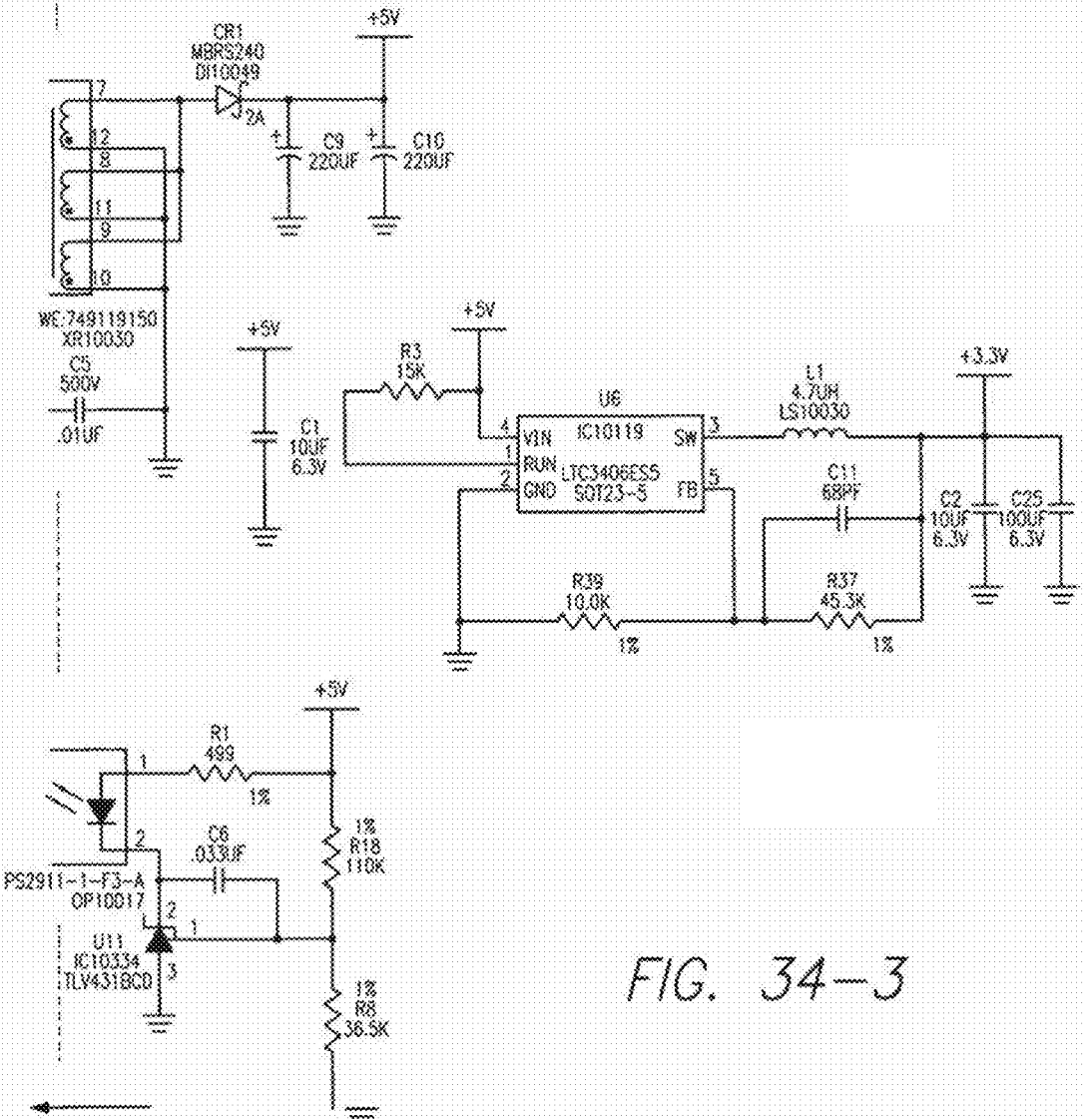

Preferred embodiments of the wired and wireless, and retraction or plunge style, measurement apparatuses of the invention are illustrated in FIGS. 24-26, 28-29 and 36-38, with FIG. 31 illustrating one type of Ethernet cable that may be employed to operably connect one or a plurality of such apparatuses with one or a plurality of computers and FIGS. 27, 30 and 39-49 showing exploded views of various portions of these apparatuses. FIGS. 32-35 and 50-54, 55A, 55B, 55C, 56A and 56B show layouts of microprocessor boards that may be included internally in such apparatuses, which are available from sources that are known by those having ordinary skill in the art, such as Delta Sigma Corporation (Kennesaw, Ga.).

Referring to the drawings, the measurement apparatuses that are depicted in FIGS. 24-26, 28-29 and 36-38 are wired or wireless hand-held devices in either a "retraction" or "plunge" style that function to perform high precision thickness measurements on various skins and other materials for the purpose of quality assurance, as well as for determining fastener hole diameter, hole depth, countersink depth, fastener length and/or other measurements. The apparatuses very advantageously provide a single squeeze or trigger motion that will align normal to the surface being measured and then perform the measurement, with the resulting measurement data transferred to one or a plurality of computers and/or other data collection devices for recording, storage, manipulation and/or some other use. They may have additional switches that allow the apparatuses to become active input devices to a computer program (like a keyboard) in order to facilitate automated measurements. The apparatuses transfer data to one or more of the computers and/or other data collection devices via a wired or wireless connection. This data is read by the microprocessor that is present inside of the apparatus using an optical encoder card and linear strip (scale) that are also present therein. This linear strip is a linear scale in which the divisions are uniformly spaced along its length and are readable by the optical encoder. The linear strip (scale) that is shown in FIGS. 39-43B, for example, has 500 divisions on it, and the optical encoder card present therein reads 4 counts per division. Therefore, each count that the optical encoder card reads is equivalent to $\frac{1}{2000}^{th}$ of an inch, giving this measurement apparatus a very high degree of accuracy. However, any of a wide variety of other divisions could also be employed. As the handle of a "retraction" type measurement apparatus is squeezed, the linear scale moves past the optical encoder card, and this optical encoder card counts the "tick marks" on the linear scale. The apparatus may be employed in a similar manner to measure countersink depth and/or hole diameter. One apparatus may, for example, include three different removable heads for the probe, one for taking hole depth measurements, one for taking countersink depth measurements and one for taking hole diameter measurements, or may include any combination thereof, or additional probe heads.

The operable connection between the apparatus and the computer can be USB, Serial, Ethernet, Power-over-Ethernet (POA), wireless, or any other means that is suitable for providing a data connection between the computer and the measurement apparatus. In the exploded view of the apparatus that is shown in FIG. 30, this connection is an Ethernet connection.

The measurement apparatus also provides users with a way to repeat a gripping measurement and/or other measurements and/or advance to the next measurement, for example, to a next hole to be measured. This is performed via a use of the membrane key switches, buttons or the like (hereinafter referred to as "buttons") on the side of the apparatus, as are shown in FIG. 24, or elsewhere (top, bottom or the like). There are 2 arrows on this keyboard, but may be fewer or a plurality thereof. When the left arrow, forward arrow or the like is selected by a user, the apparatus advances to the next measurement location, for example, as may be projected onto an object including the measurement location by the optical projection system that is described herein. When the right arrow, back arrow or the like is selected, this allows the apparatus to re-measure the last location or hole that was measured.

The measurement apparatus also provides a method used to perform a calibration of the apparatus. Prior to making a measurement with the measurement apparatus, a calibration to a reference plane must typically be made. A calibration device that is a known entity and manufactured to very high precision, such as the calibration puck 105 that is shown in FIG. 39, may be placed in or with the probe such that the probe body rests upon the reference plane of the calibration device and the probe tip is moved into position via a triggering handle or other activating mechanism in the normal way that the measurement apparatus operates. A momentary contact switch or button present on the side (or other area) of the device, which is preferably labeled "calibrate," may be briefly (or otherwise) depressed, and the measurement apparatus becomes calibrated.

A calibration disk or puck, for example, which is shown in FIGS. 30 and 39, may be inserted between the ball point, ball pad (or other) "feet" and the probe tip shown (or at any other desired location or otherwise). The handle of a "retraction" style of measurement apparatus is squeezed until the calibration disc is held firmly in place, and then a calibration membrane key, button or the like is pressed. This calibrates the apparatus to the known thickness measurement of the calibration disk. Calibration disks are commercially available from sources that are known by those having ordinary skill in the art, for example, from Delta Sigma Corporation (Kennesaw, Ga.).

The calibration is a recording of the location of a reader head that is present on an optical encoder card along an etched rail, as is described hereinbelow in detail, at the moment of the calibration trigger. Host computer software then subtracts this value from the measured position for all subsequent measurements. All measurements from that point on, until the measurement apparatus is powered down or off, or disconnected from a network, will measure the accurate dimension in absolute terms (current position minus calibration position). The calibration software for the measurement apparatuses may reside in a host computer(s) to which it is attached, and not inside of the measurement apparatus itself. Therefore, if the measurement apparatus is moved between computers, a recalibration will typically be necessary. Alternatively, the calibration software may reside in the firmware and be processed on the digital circuit card before being transmitted.

Referring now to FIGS. 36-49, which show various preferred measurement apparatuses 18 of the invention, and exploded views of portions thereof, the main structural component of these measurement apparatuses 18 is a frame 106, which establishes a reference system for the measurement apparatus 18, and is preferably located internally and centrally therein. Such frame 106 is present in the measurement apparatus 18 shown in FIGS. 36 (non-exploded view) and 39 (exploded view of same measurement apparatus 18), which is a wireless measurement apparatus 18 of a "retraction" type or style, in the measurement apparatus 18 shown in FIG. 37, which is a non-wireless (Ethernet or Power-over-Ethernet) measurement apparatus 18 of a "retraction" type or style, and in the measurement apparatus 18 shown in FIG. 38, which is a wireless measurement apparatus 18 of a "plunge" type or style, which is discussed in detail hereinbelow. The frame 106 is preferably attached centrally to a housing 22, which preferably comprises a plurality of parts, and preferably two similar or substantially similar main parts, a left hand outer body 118 on one side thereof and a right hand outer body 119 on the other side thereof, using means for affixing the same together, such as a plurality of fasteners, welding, pressure, pinning, riveting, epoxies (or other adhesives), gluing, chemical bonding, heat sealing or other methods and/or devices known by those having ordinary skill in the art. Preferably, ten screws 139 are employed.

Figure 40A:
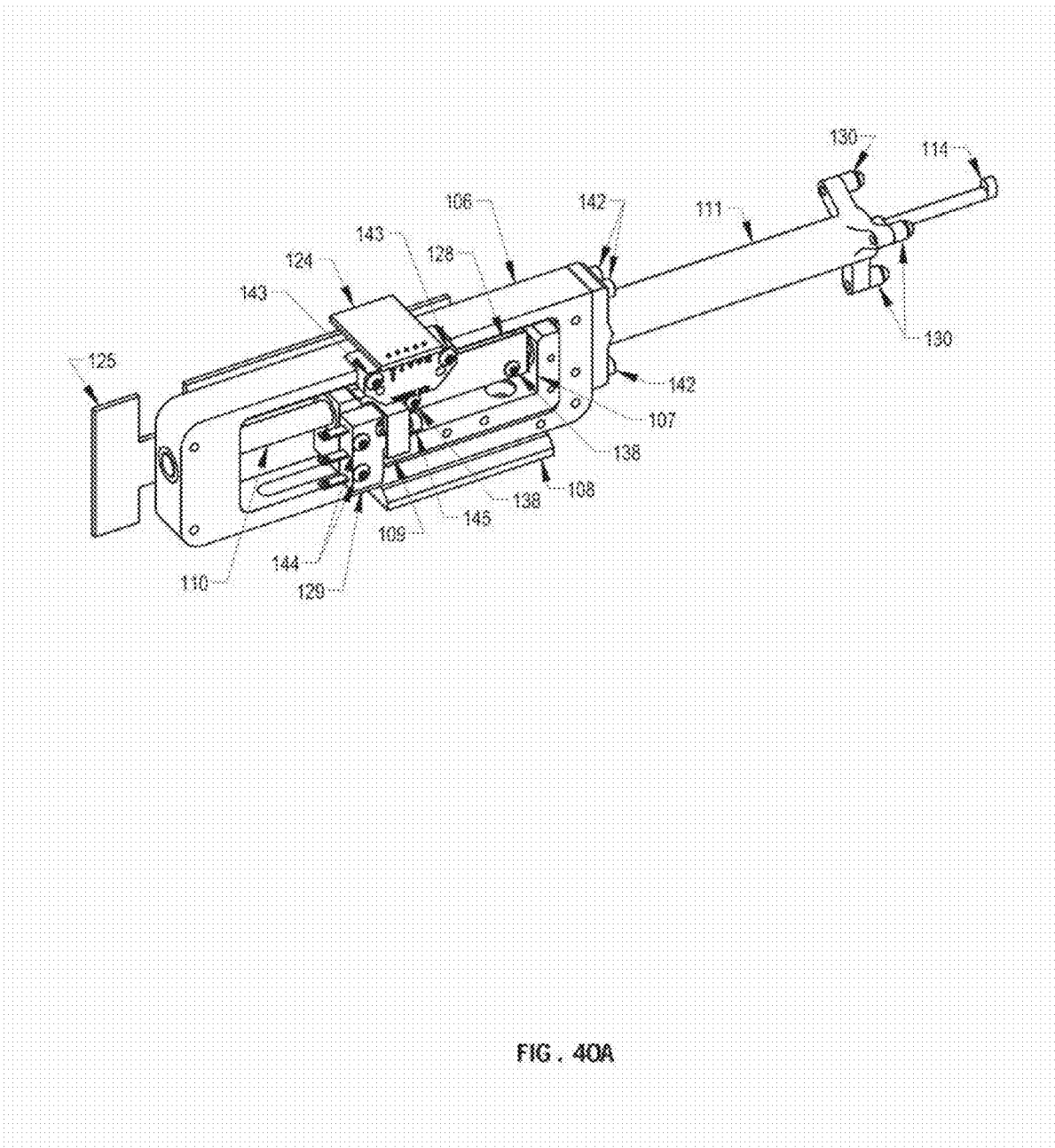
FIGS. 40A and 40B are illustrations of internal components of a measuring apparatus of the invention in a "Retraction Gun" style wherein the measurement mechanism present therein is present in an extended position.
Figure 41A:
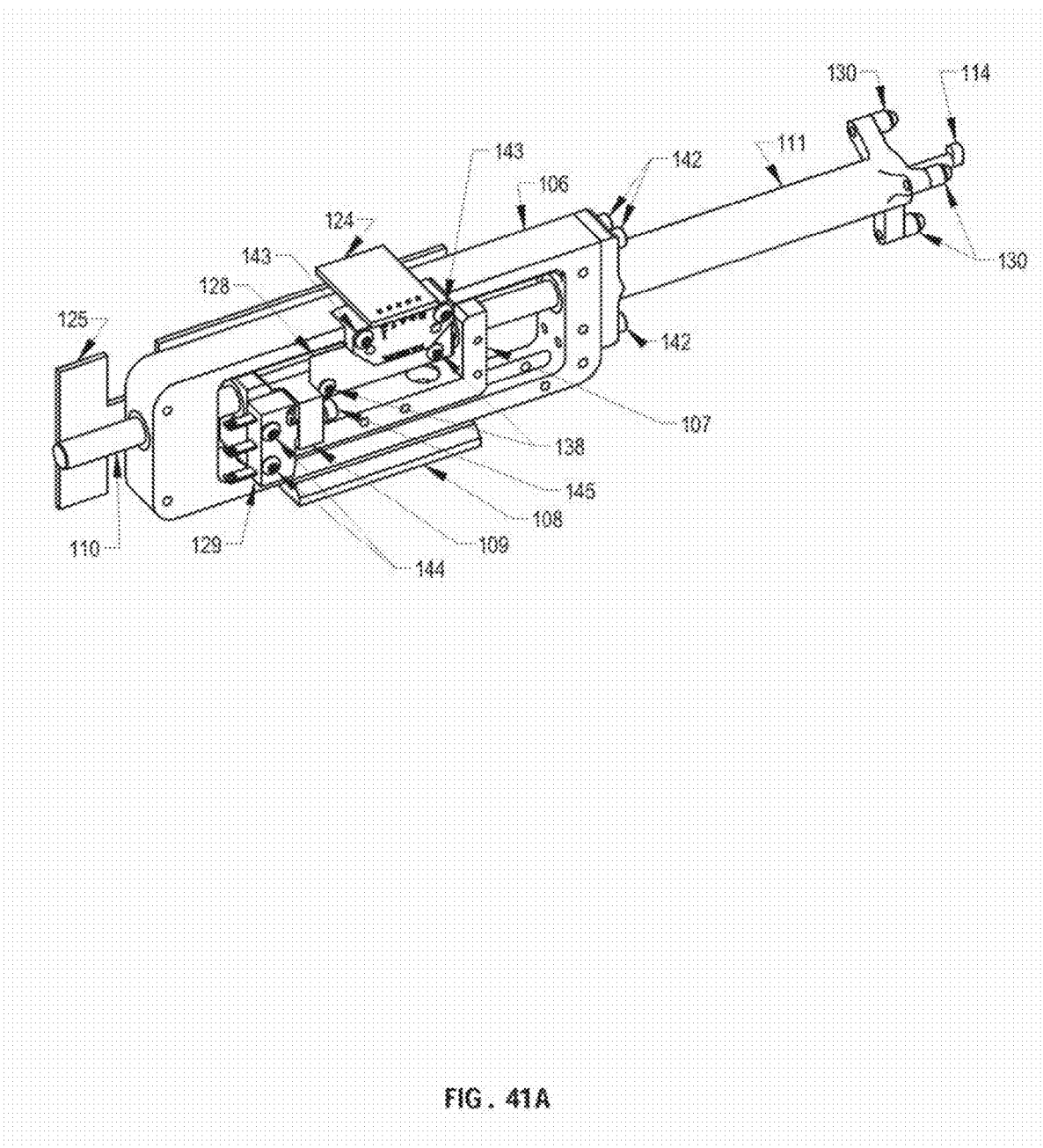
FIGS. 41A and 41B are illustrations of internal components of a measuring apparatus of the invention in a "Retraction Gun" style wherein the measurement mechanism present therein is present in a fully retracted position.
Figure 42A:
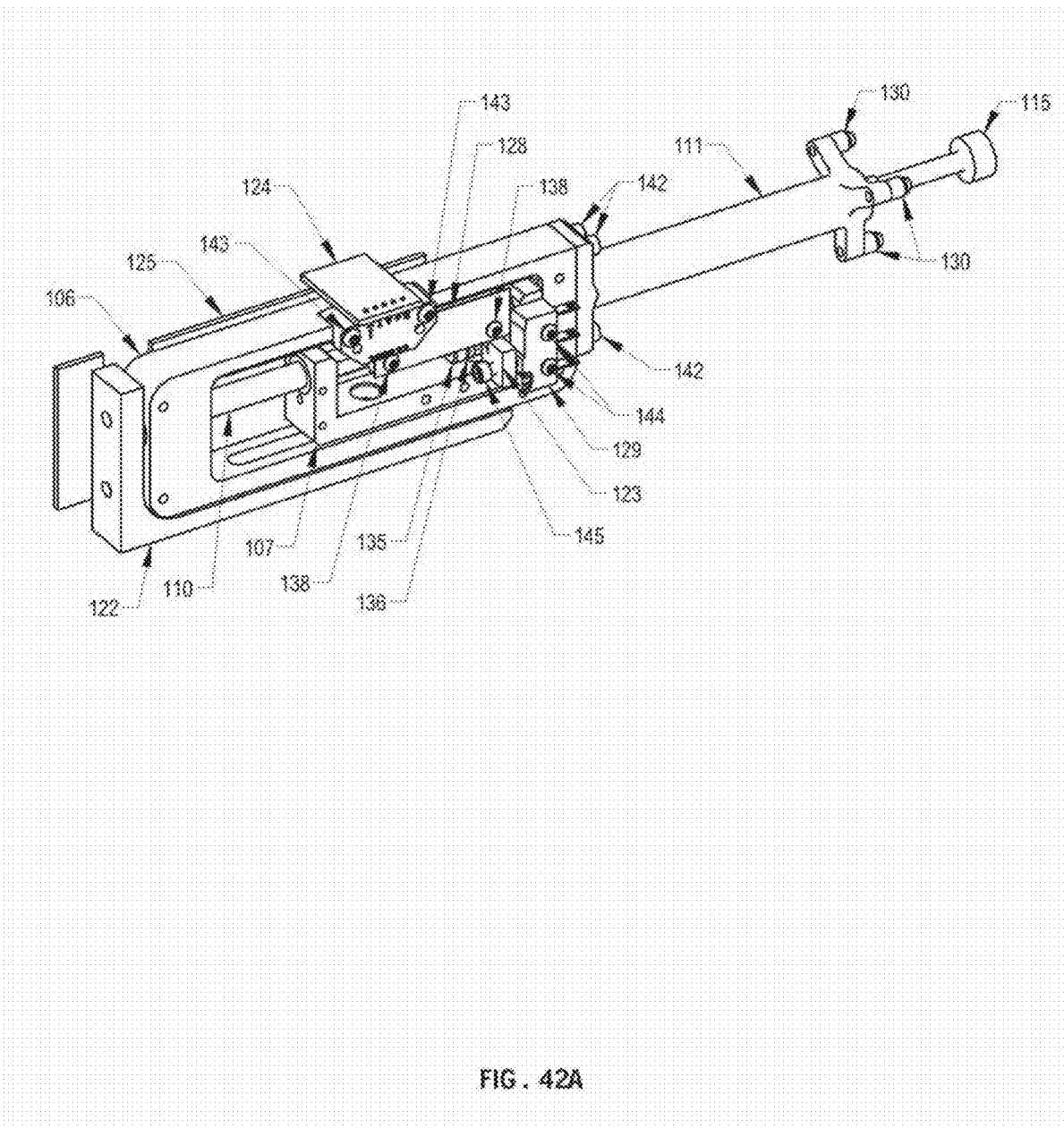
Figure 43A:
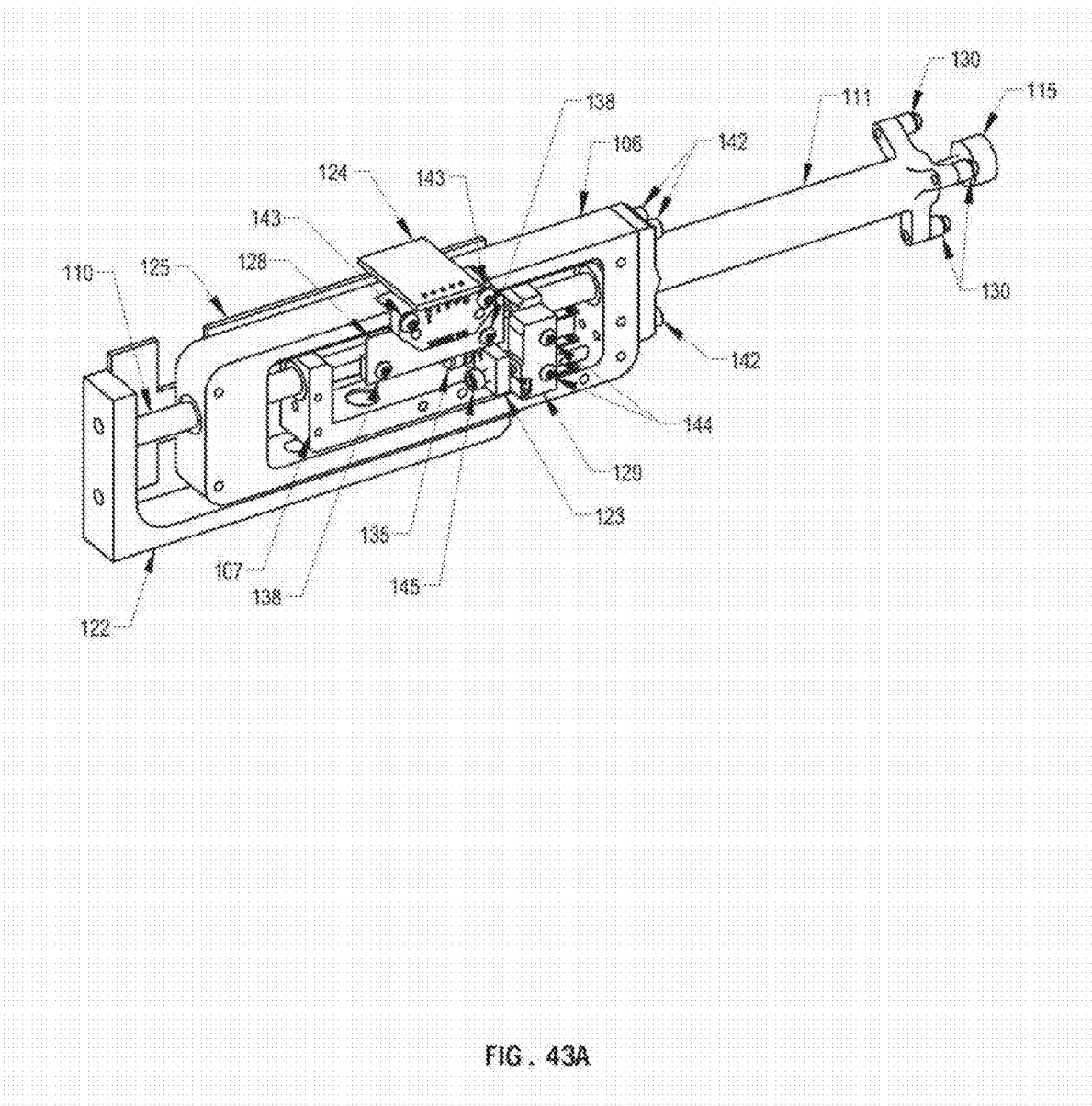
FIGS. 43A and 43B are illustrations of internal components of a measuring apparatus of the invention in a "Plunge Gun" style wherein the measurement mechanism present therein is present in a compressed position.
Figure 55A:
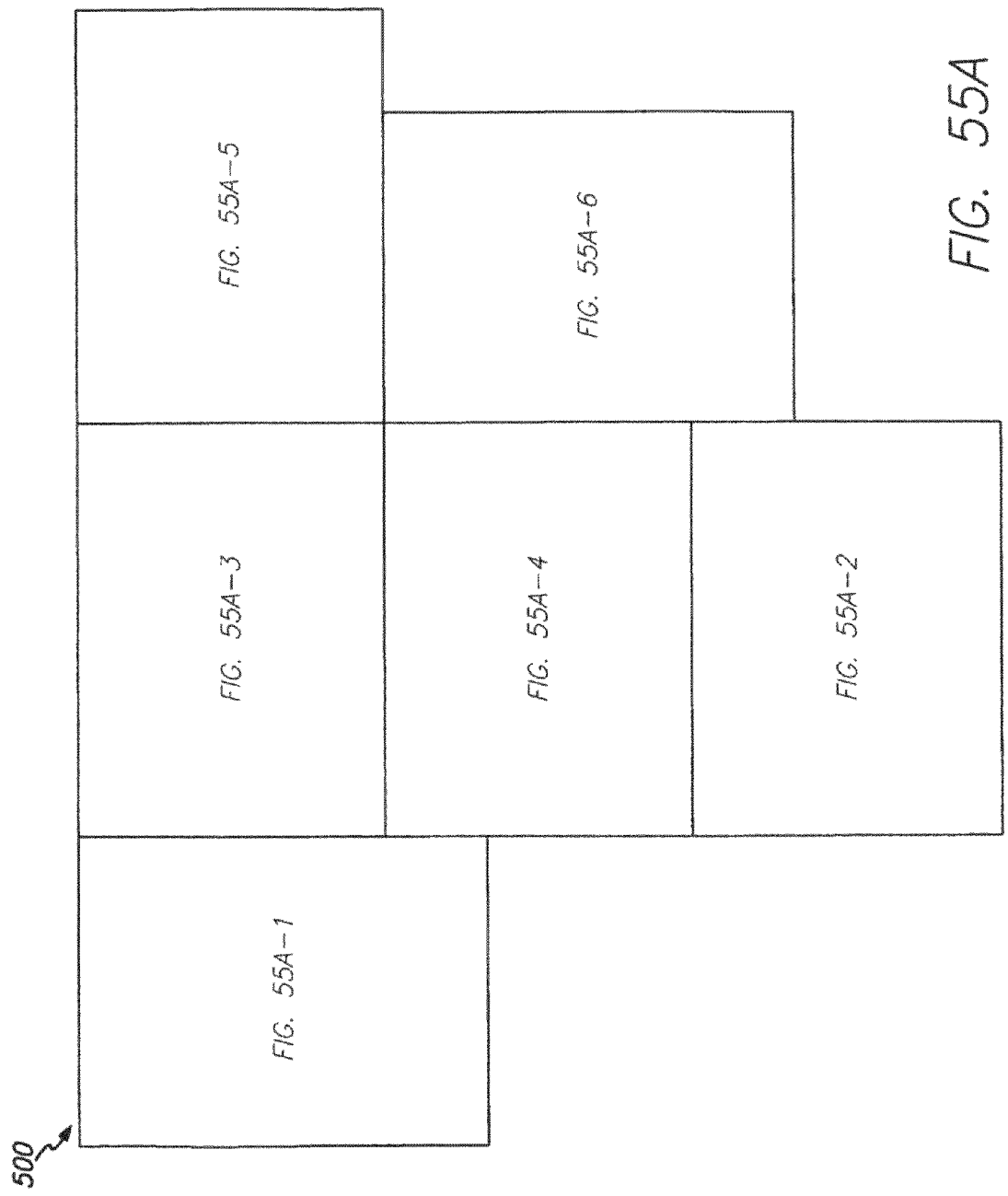
FIGS. 55A, 55B, and 55C are schematic illustrations of a digital circuit card that may be used in wireless measuring apparatuses of the invention, and may be used to process data and/or information procured from one or a plurality of measurements or other activities and transmit them to one or a plurality of computers and/or data collection devices for recording, storage, manipulation and/or some other type of a use.
Figure 55A:
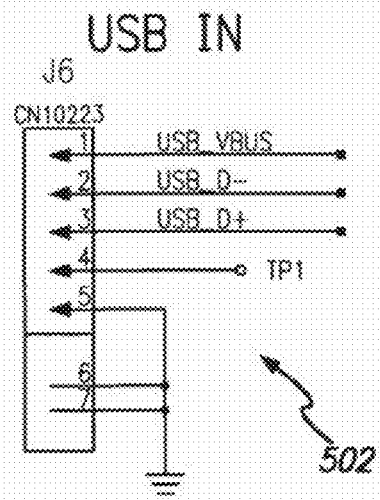
Figure 1:
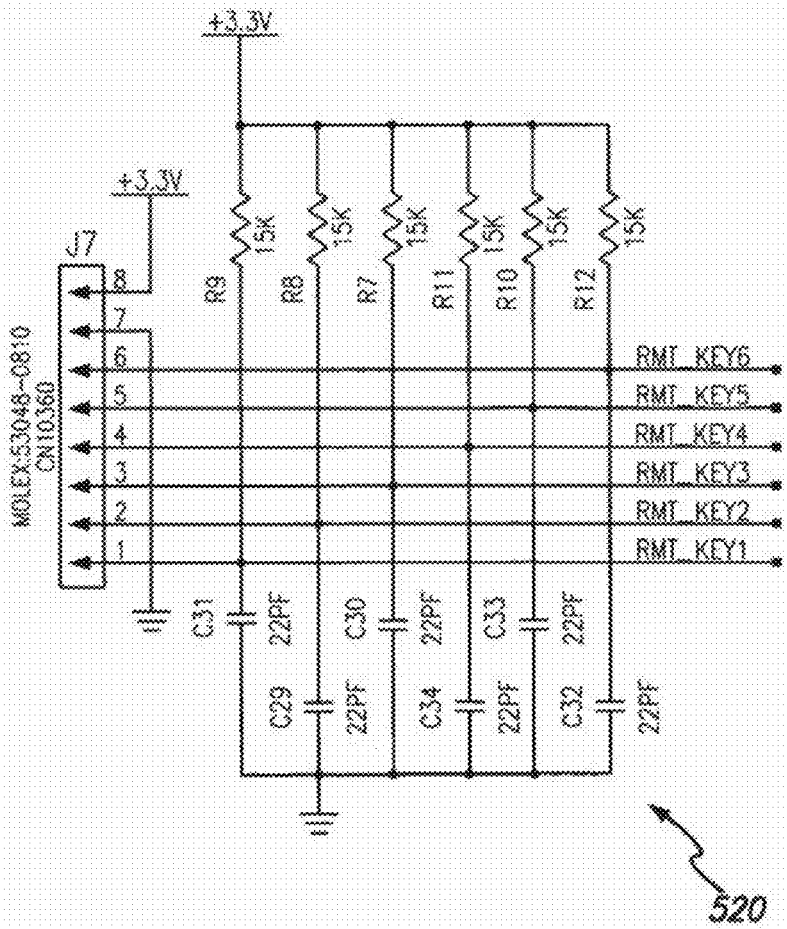
Figures 2, 55A:
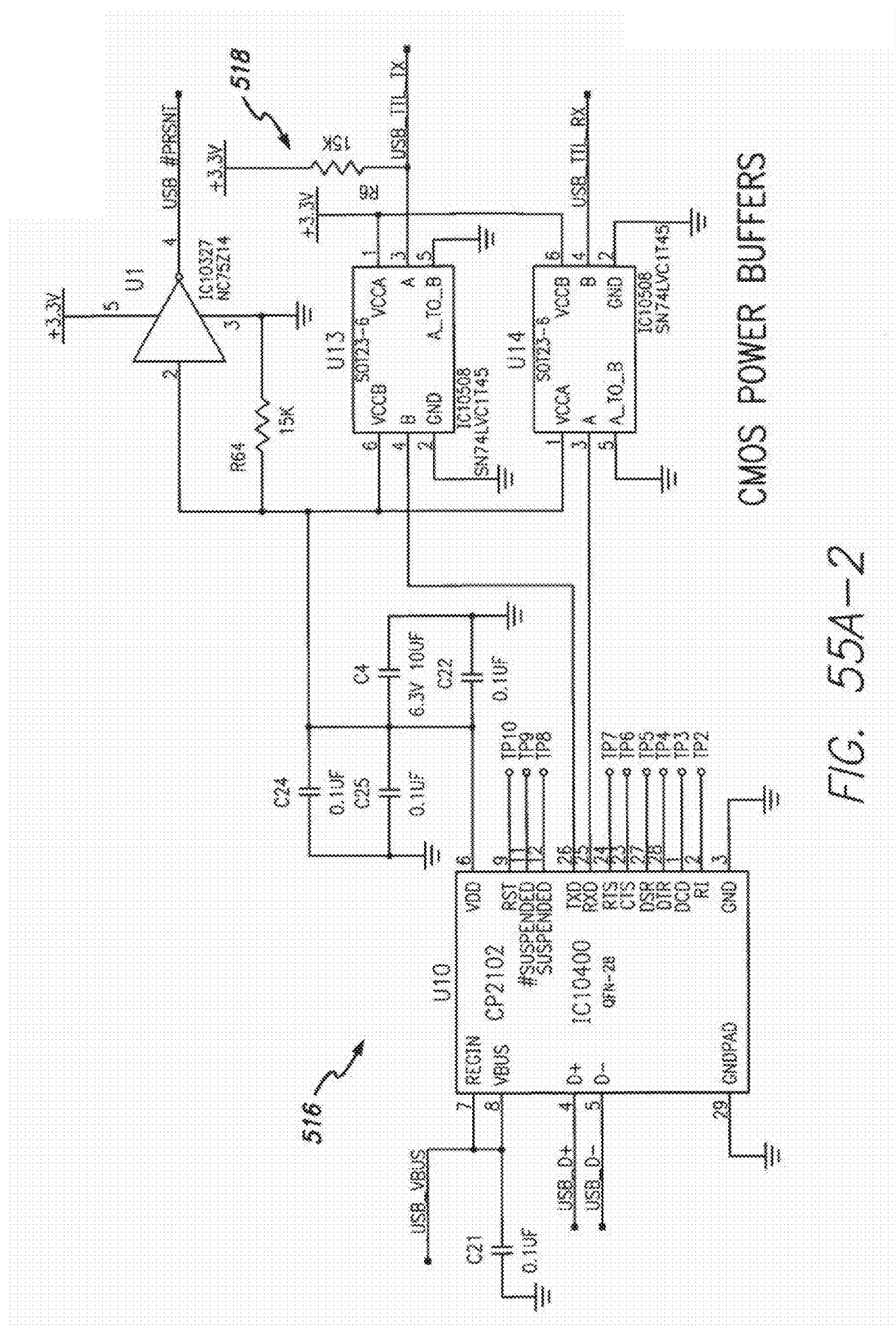
Figures 3, 55A:
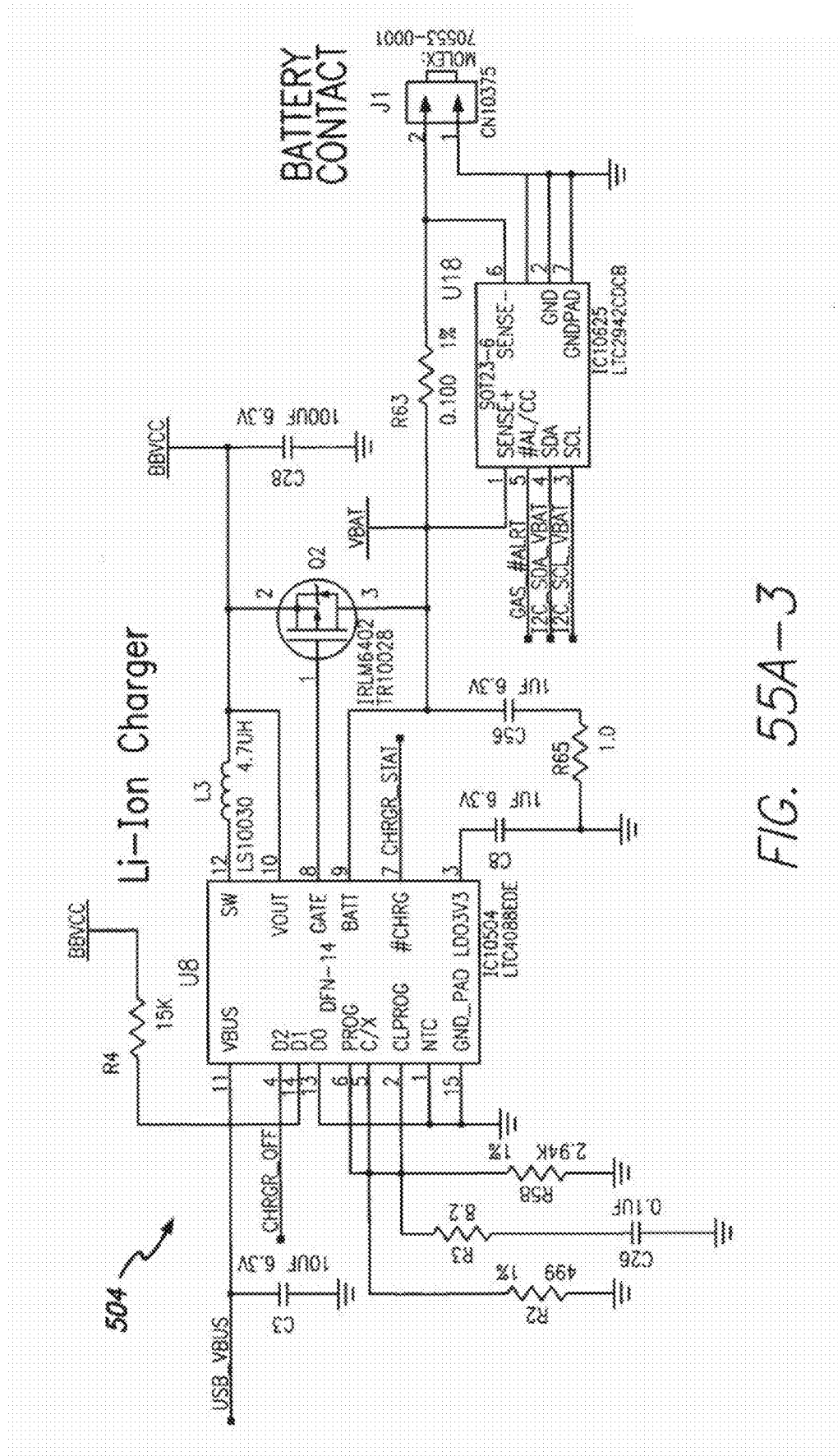
Figures 4, 55A:
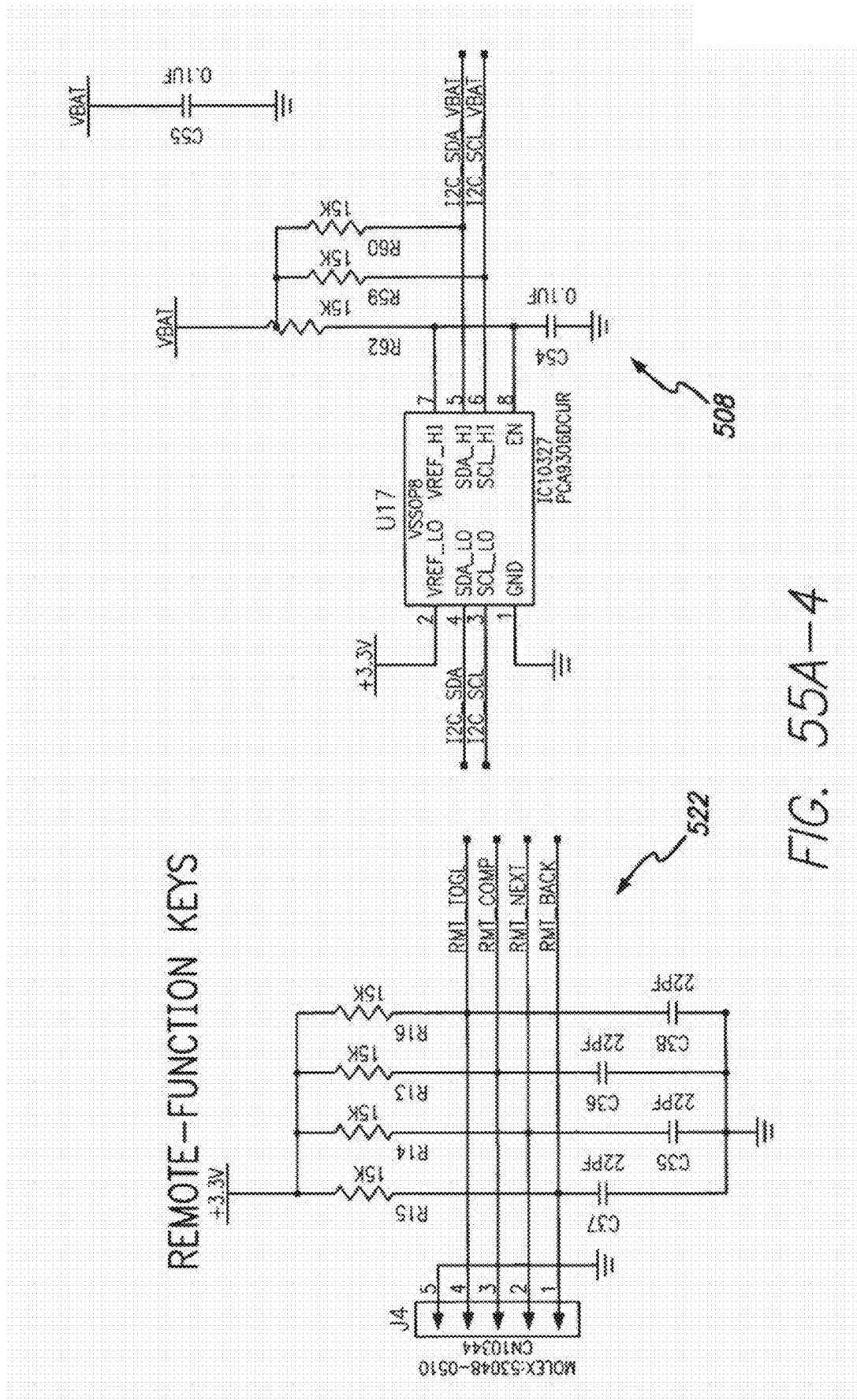
Figures 5, 55A:
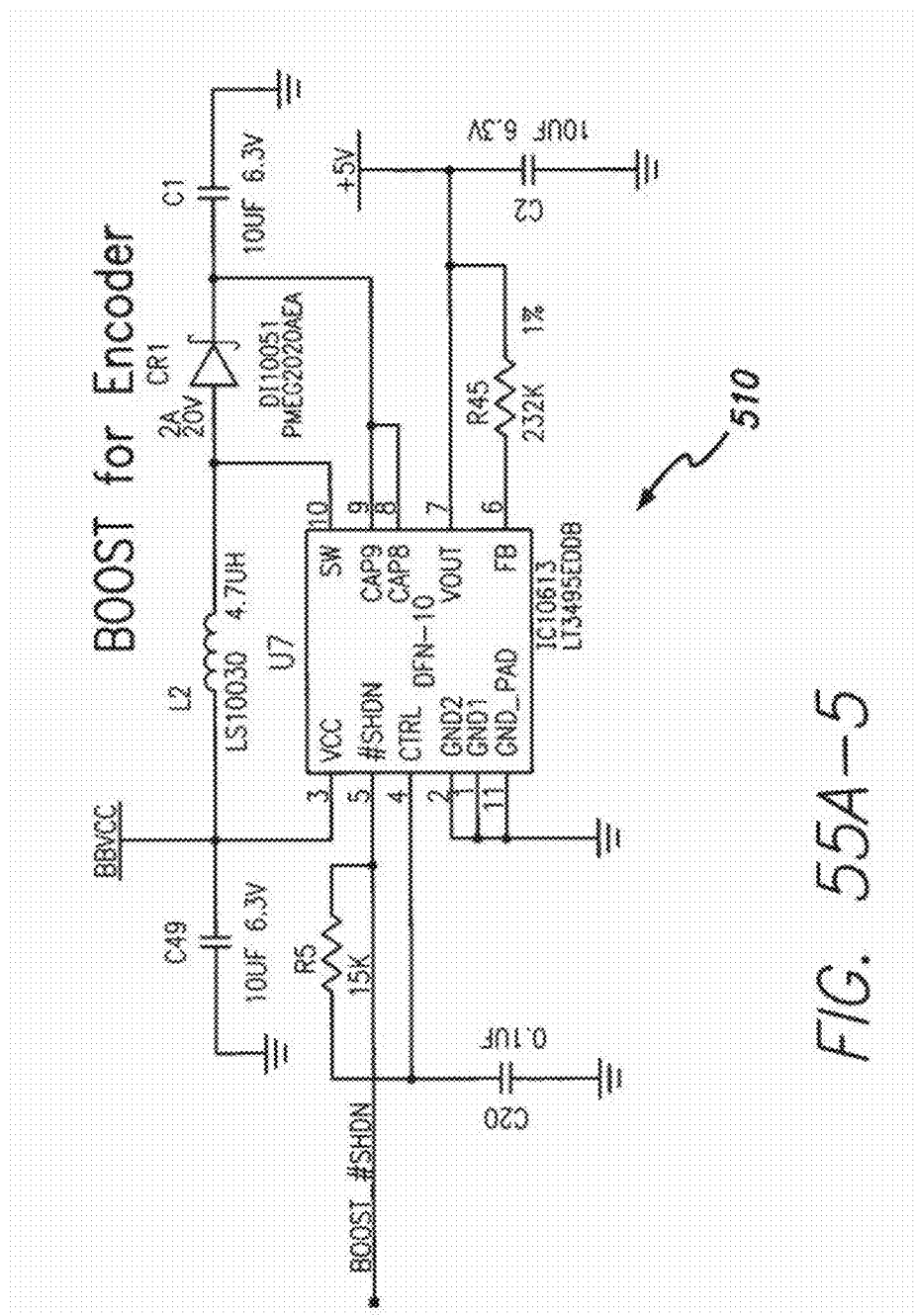
Figures 6, 55A:
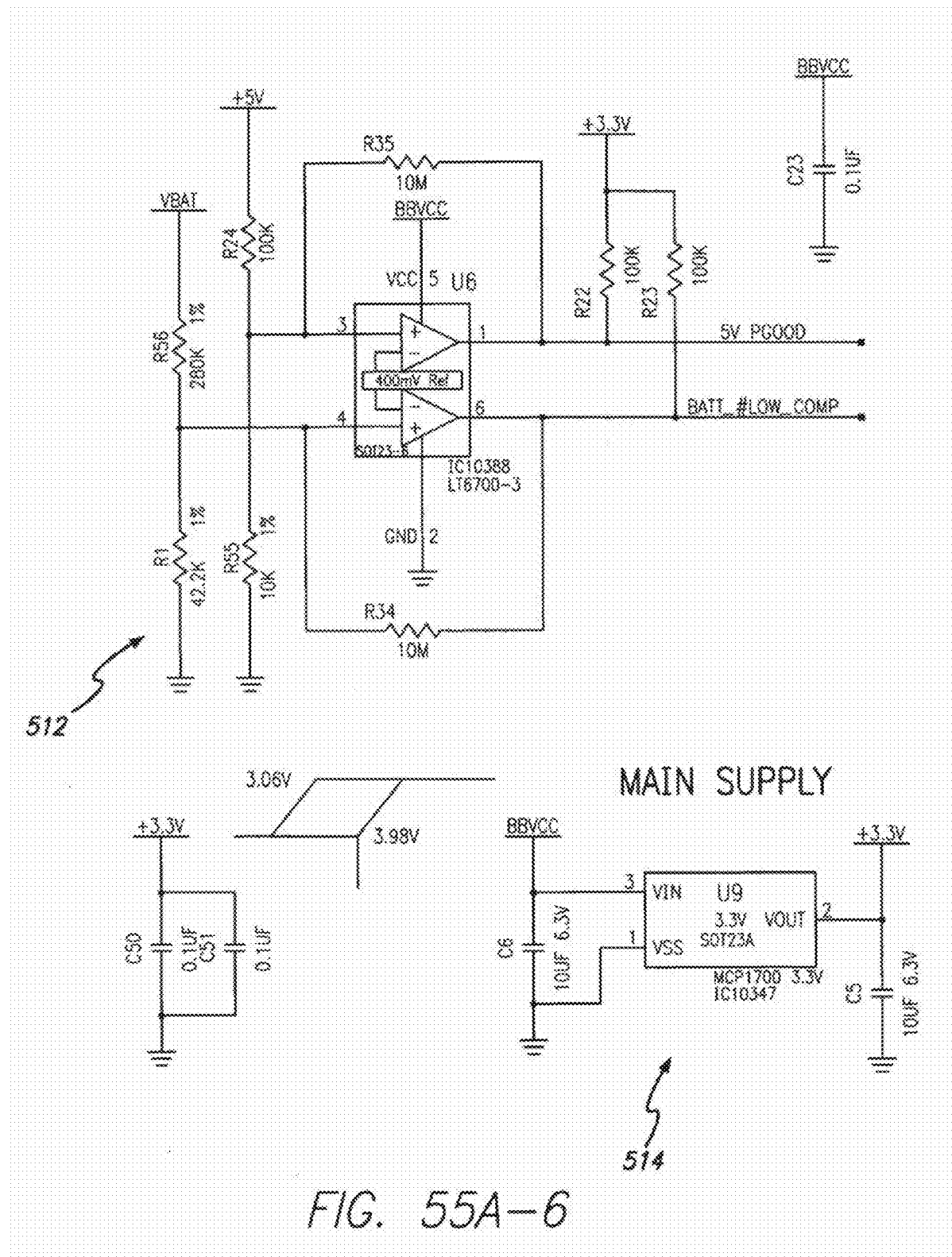
Figures 2, 55B:
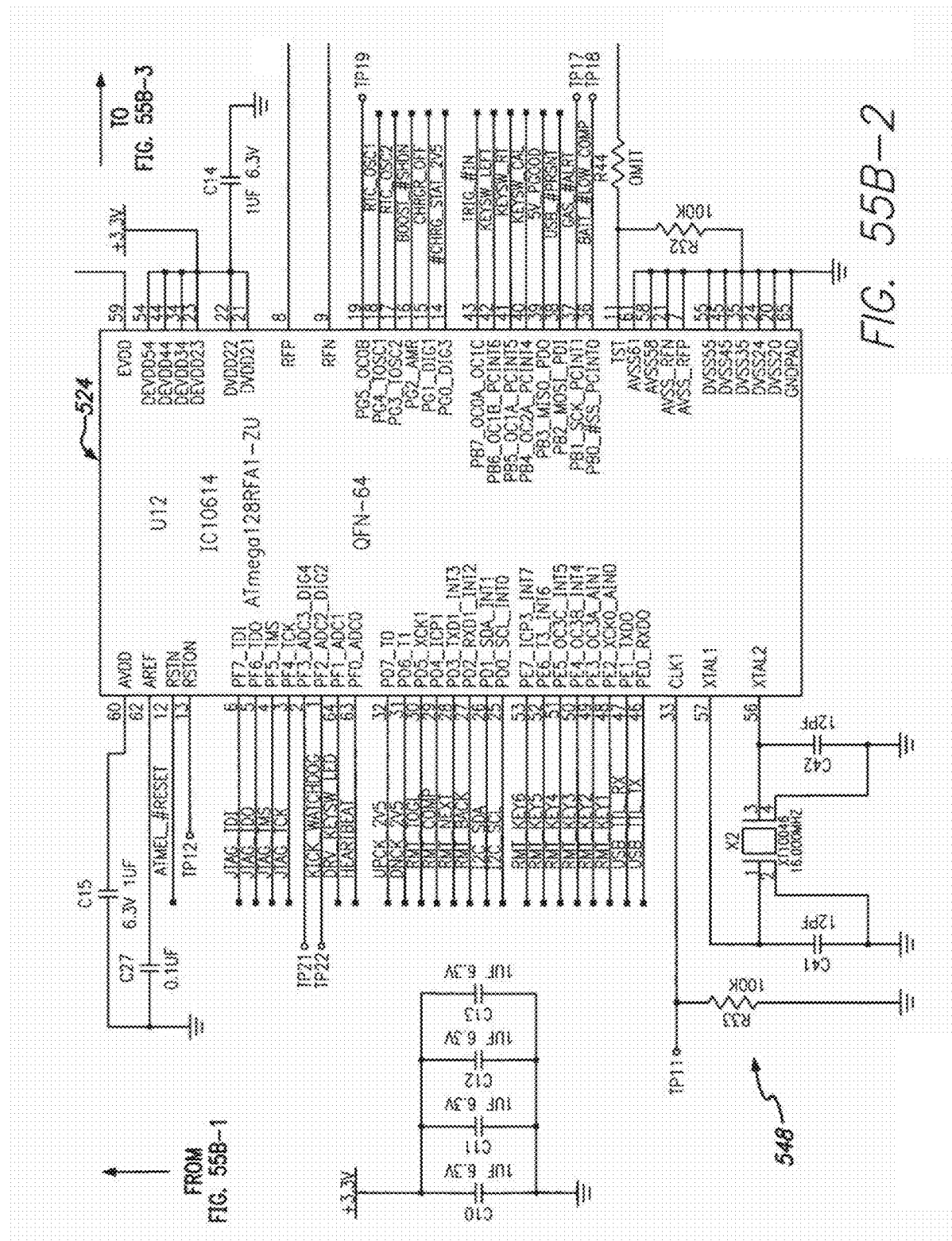
Figures 3, 55B:
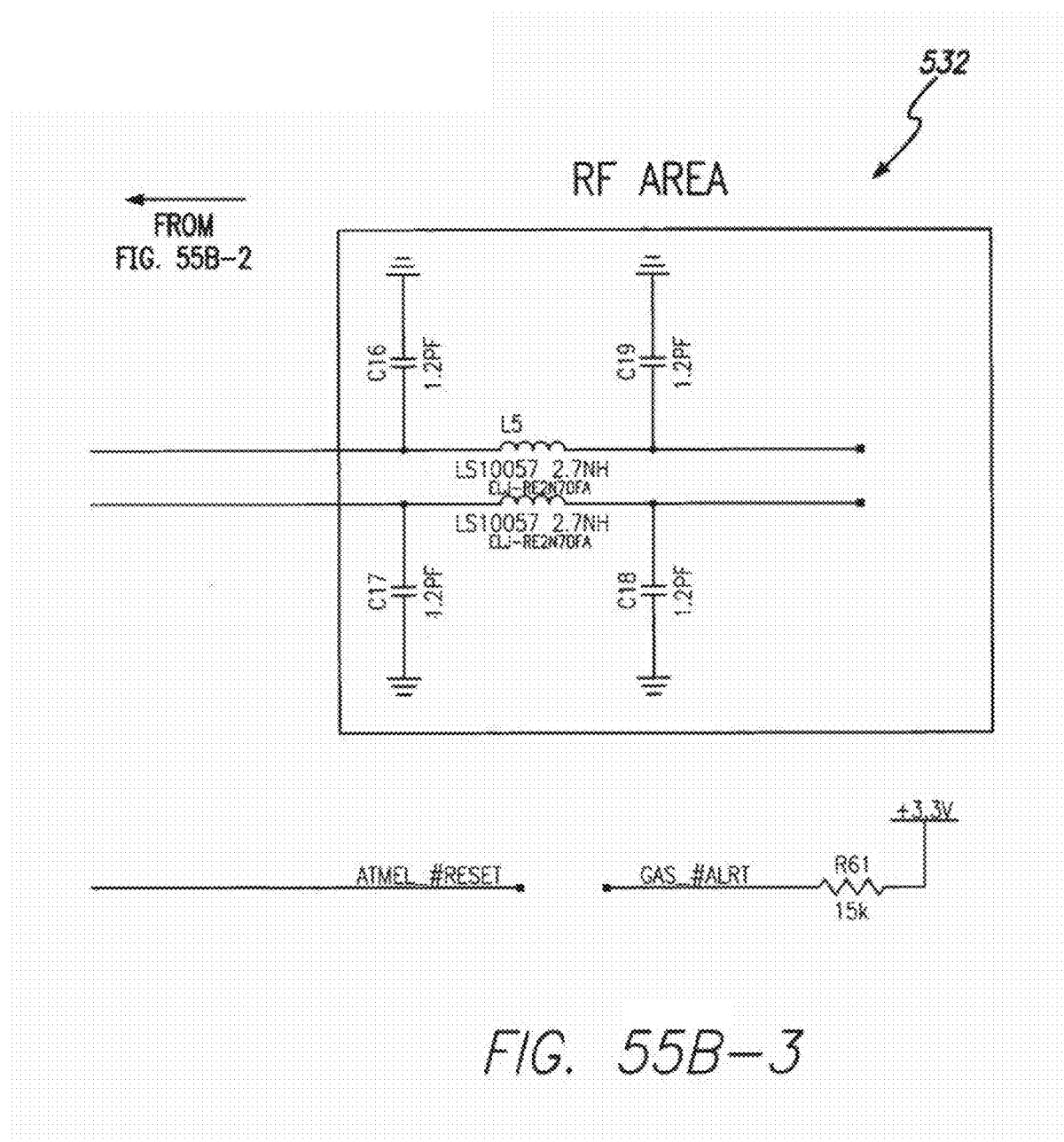
Figures 5, 55B:
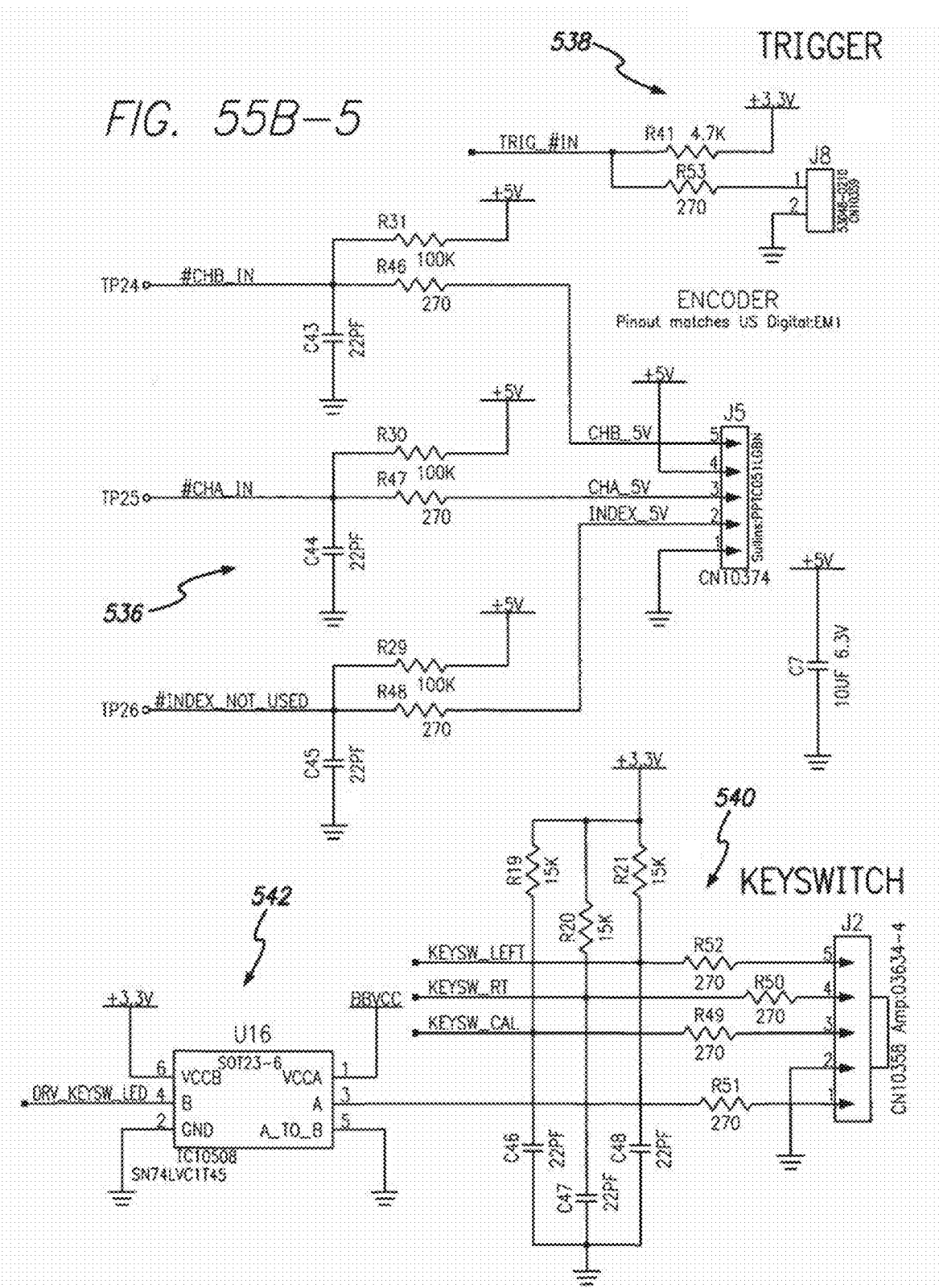
Figures 6, 55B:
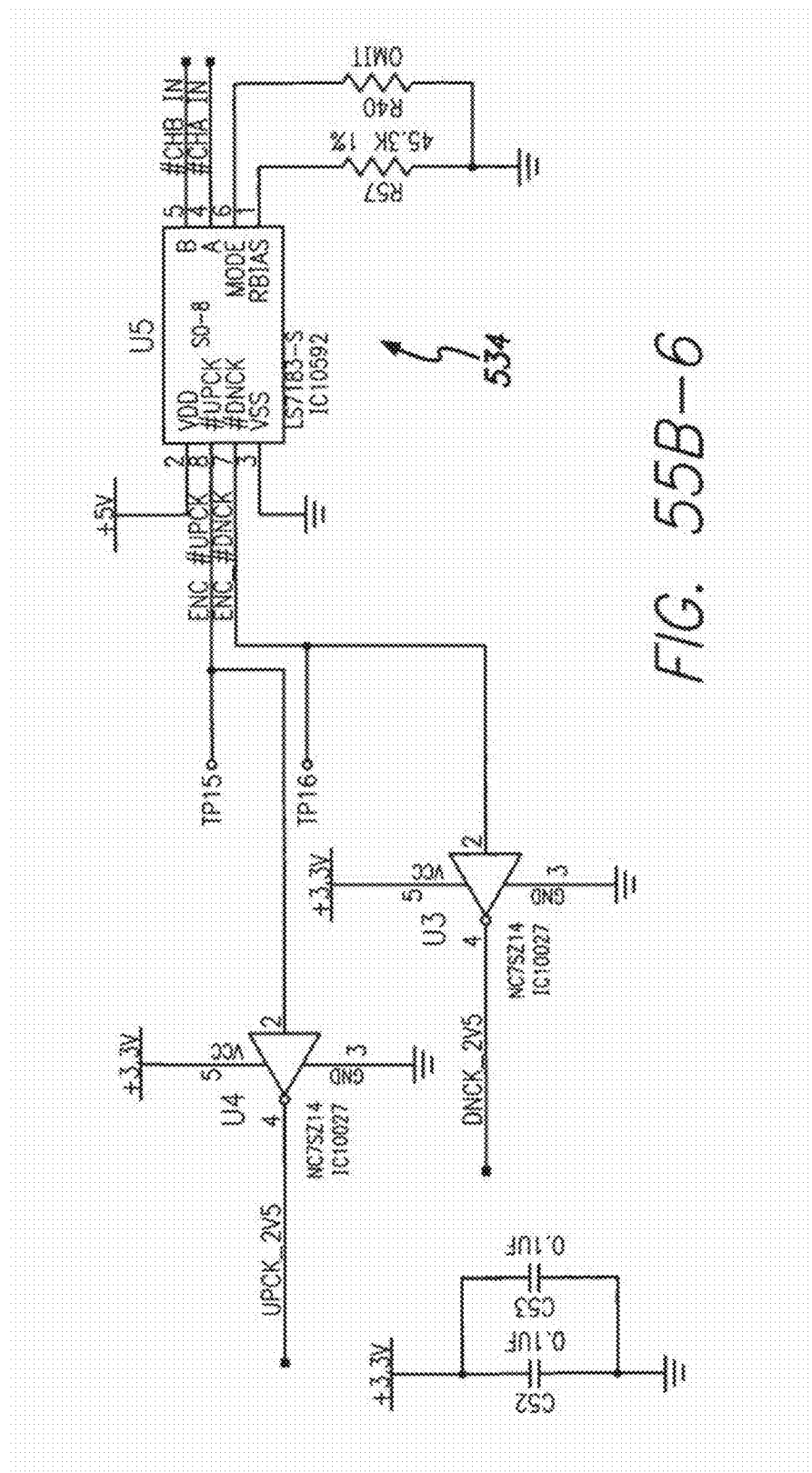
Figure 55C:
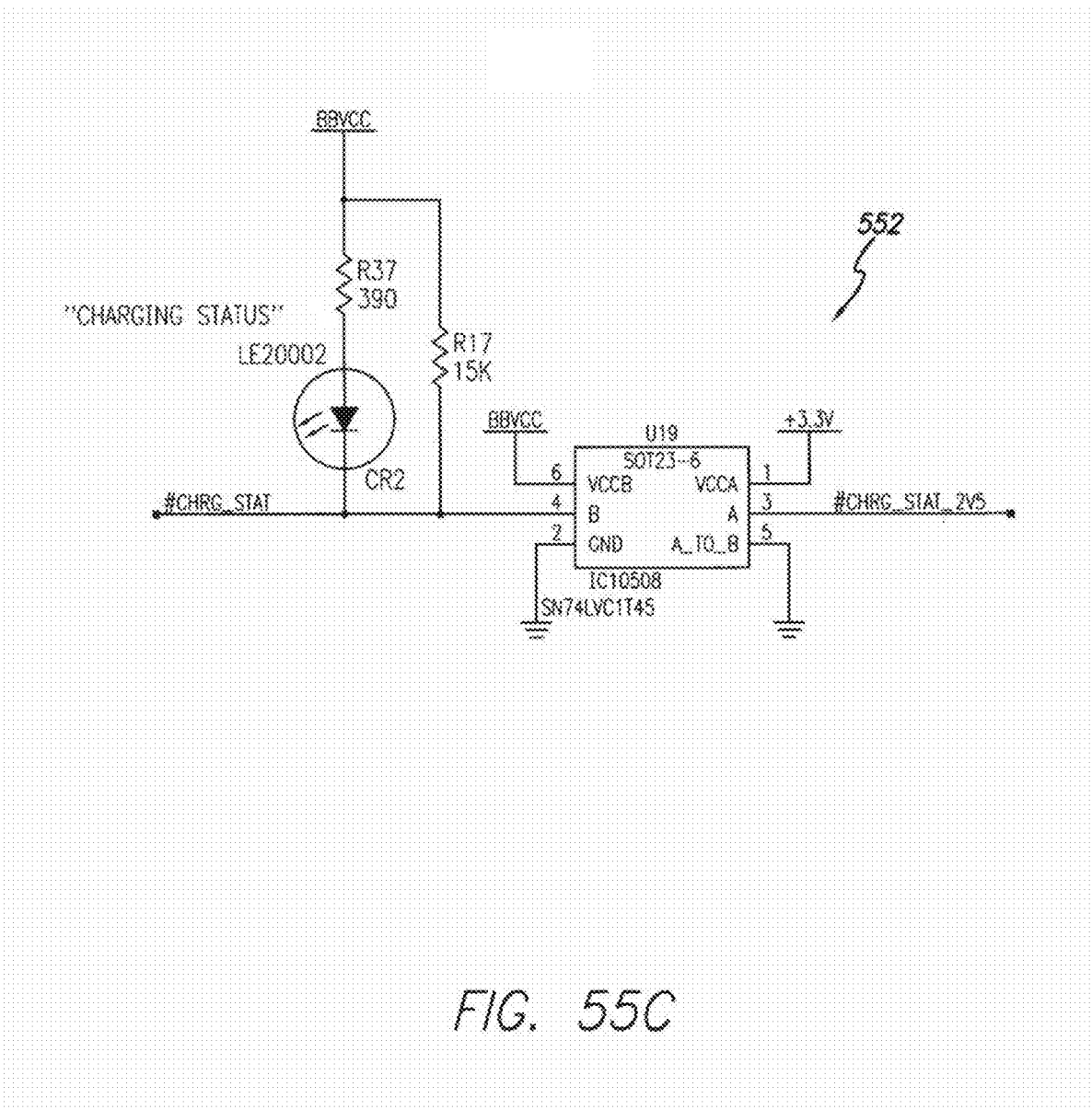

A reader head (not shown) that is present on an optical encoder card 124 is preferably rigidly attached to the frame 106 using a plurality of fasteners 143 (or other methods or means for doing so), and functions to read measurements that are made by the measurement apparatuses 18 (by reading one or a plurality of graduations that are present on a linear (scale) strip 128 each time that a measurement is made. The reader head preferably remains in a fixed position relative to the material, skin or three-dimensional object, or part thereof, being measured at all times in all cases. The linear (scale) strip 128 is a device that is capable of making a plurality of highly accurate linear measurements. The linear strip (scale) 128, which is preferably mechanically coupled to the movable part of the probe 19 (i.e., the tip 114, 115, 116) is typically either pushed in a direction towards the facing surface of the material, skin, three-dimensional object, or part thereof, being measured or worked on (in the case of a "plunge" type measurement for "plunge" type measurement apparatuses 18) or pulled towards the back surface thereof, such as a surface that is adjacent with a far end of a fastener hole being measured (in the case of a "retraction" type of measurement for a "retraction" type of measurement apparatus 18). The reader head, the linear (scale) strip 128 and the optical encoder card 124 are commercially available from sources that are described herein or are known by those having ordinary skill in the art, such as U.S. Digital (Vancouver, Wash.). Although resolutions of less than about one micron can be achieved using the linear strip (scale) 128, a resolution of from about 1 to about 1,000 microns is typical. An optical encoder card 124 or cable is preferably soldered (or otherwise joined, for example, by fastening) onto a read head which connects the linear strip (scale) 128 signal paths to an internal digital circuit or controller card 125 (for wireless versions of the measurement apparatuses 18) positioned between the left hand outer body 118 and the frame 106, as is shown in FIG. 39. (As is discussed hereinbelow, a Power-Over-Ethernet (POE) circuit card 150 is used in place of the digital circuit or controller card 125 for measurement apparatuses 18 that are not wireless.) The optical encoder card 124 is a set of a plurality of conductors that function to move the signals from one side or area of the measurement apparatus 18 to another other. The digital circuit or controller card 125, which is illustrated schematically in FIGS. 55A, 55B and 55C, is used to process the data and/or information resulting or procured from one or a plurality of measurements or other activities performed by the measurement apparatuses 18 and transmit (or otherwise transfer) them to one or a plurality of computers and/or data collection devices for recording, storage, manipulation and/or some other type of a use, as is discussed herein. The digital circuit or controller card 125 may be mounted or securely affixed to a side or area of the frame 106, such as a side at its aft end, as is shown in FIGS. 40A and 41A, or a side in a central area, as is shown in FIGS. 42A and 43A, with one or a plurality of fasteners. FIG. 39 shows a set of four screws 141 being used for this purpose, as well as a series of corresponding insulating spacers 133 that function to electrically isolate circuit card from the mechanical structure.

Bushings 132 and 134 (or sleeve bearings or other similarly functioning components) that are preferable press fit, but may be otherwise, preferably positioned internally at or near the forward end and the aft end of the frame 106 provide preferably precision passage for a slidable (or otherwise moveable) shaft 110 partially or fully through the frame 106 in a forward manner towards the forward end of the measurement apparatus 18 and/or in a backwards manner towards the aft end of the measurement apparatus 18 (preferably both), and at or near a central area of the frame 106.

Figure 44:
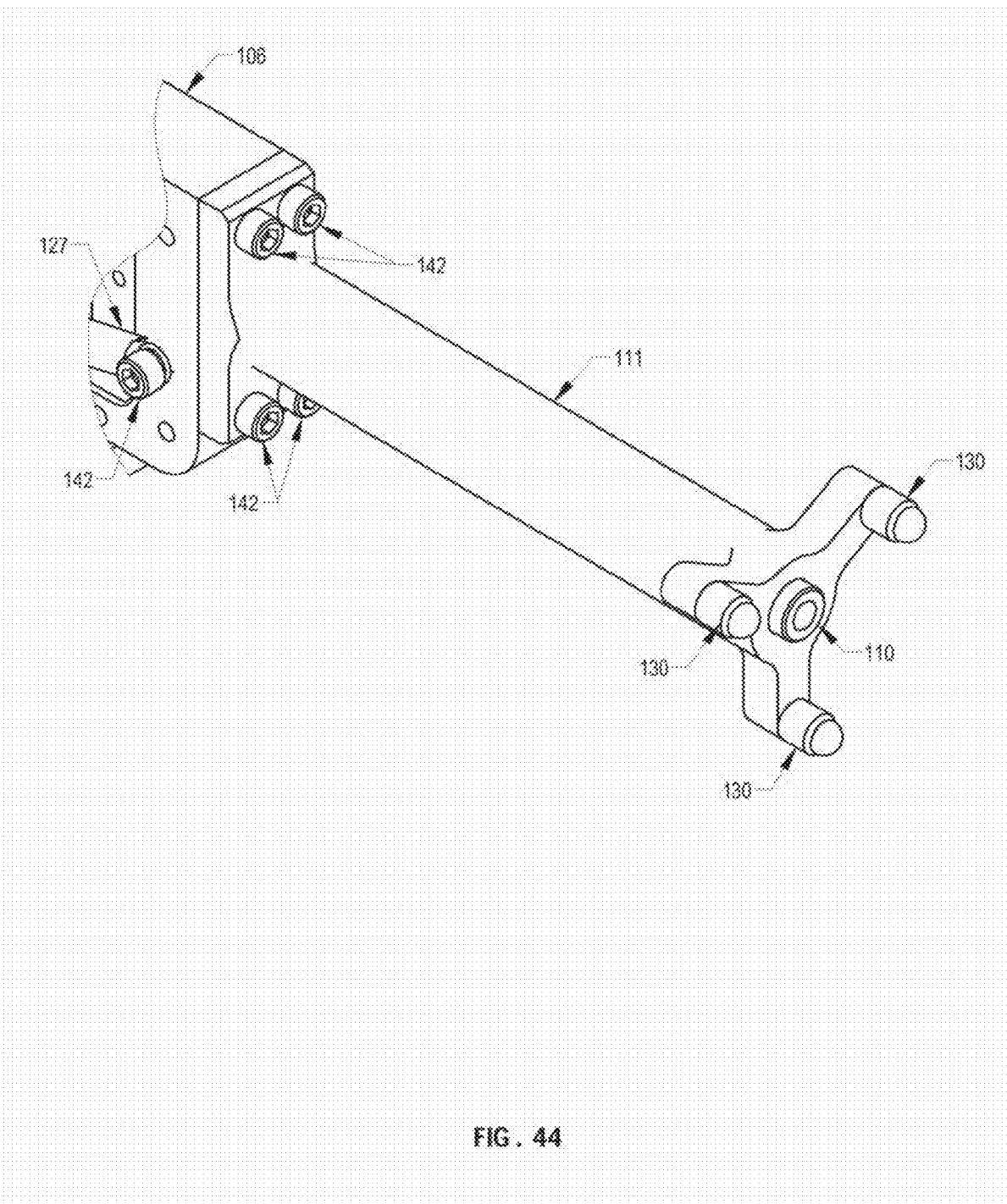
FIG. 44 is an illustration of a probe of a measuring apparatus of the invention including three ball pads.
Figure 45:
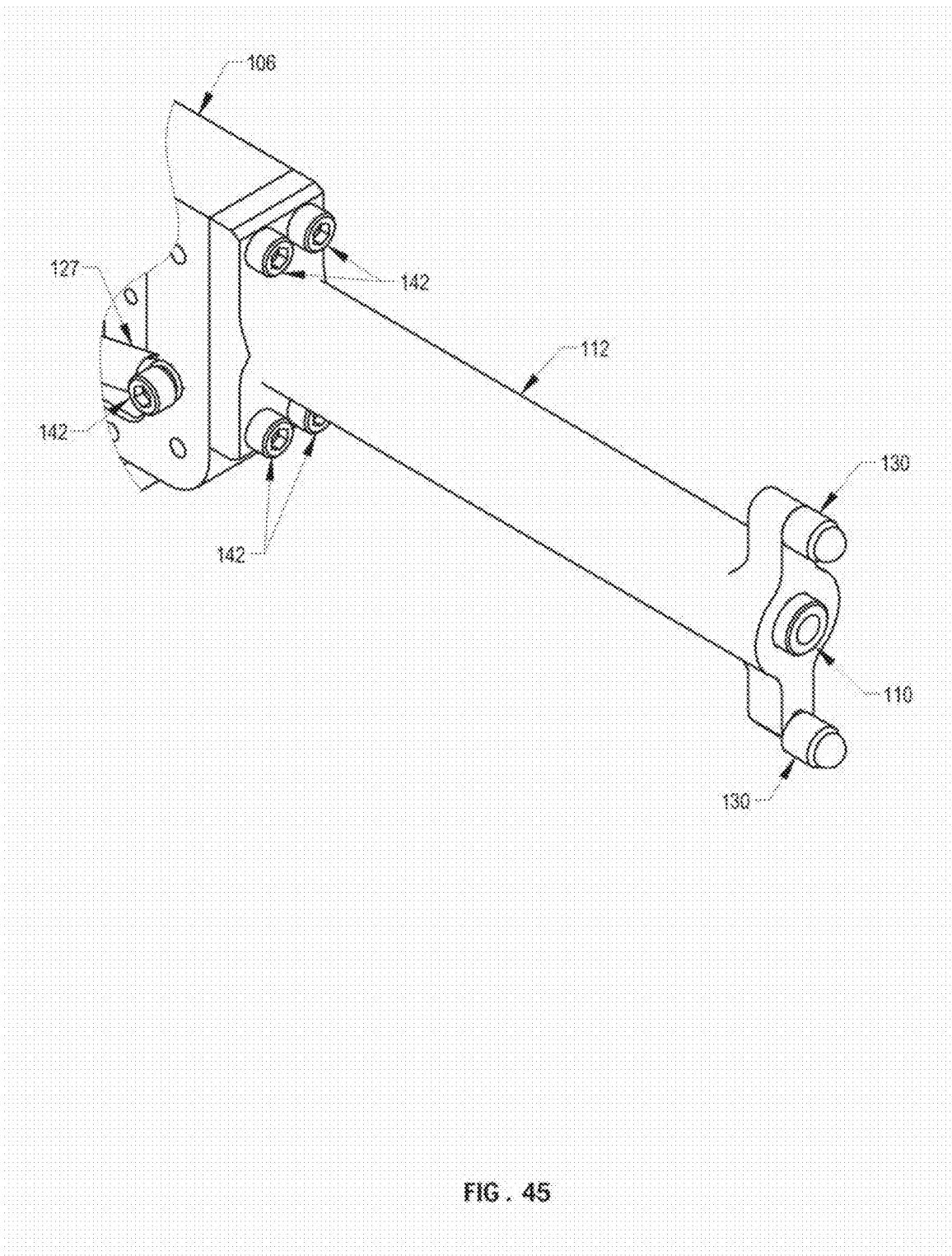
FIG. 45 is an illustration of a probe of a measuring apparatus of the invention including two ball pads.
Figure 46:
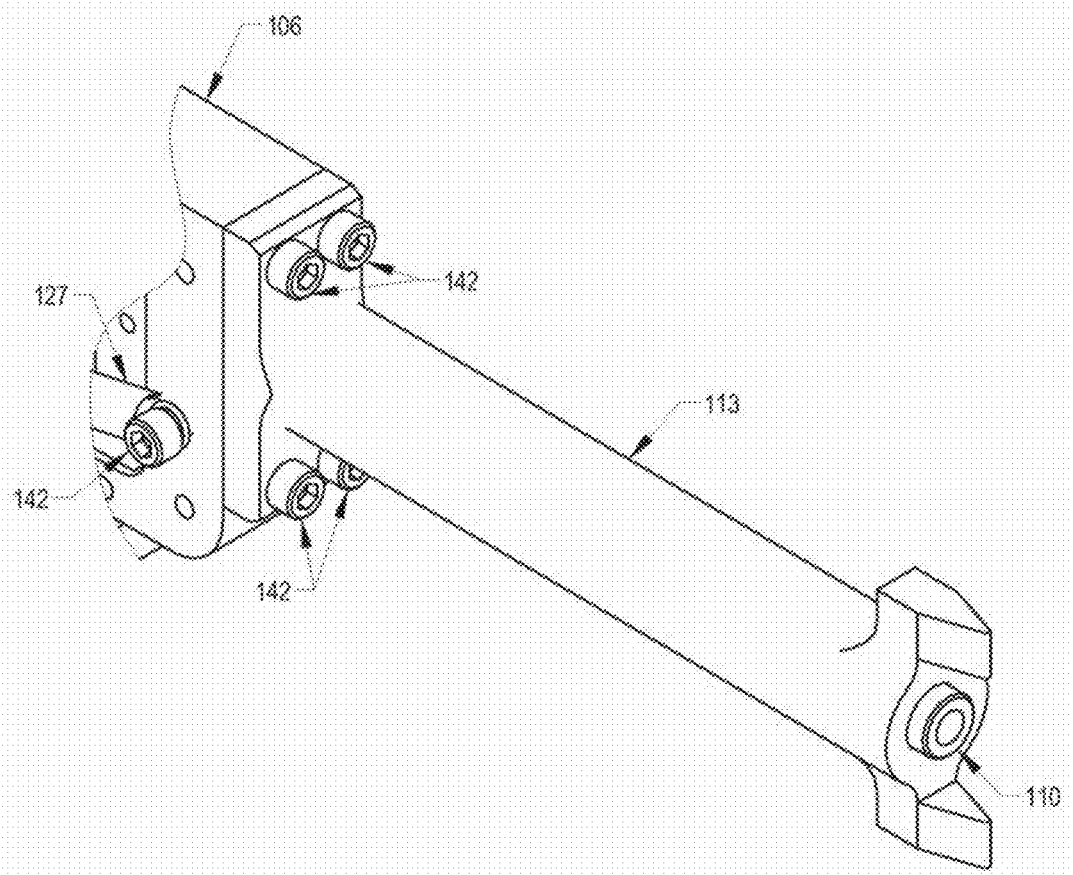
FIG. 46 is an illustration of a probe of a measuring apparatus of the invention having no ball pads and in a "wedge" style.
Figure 47:
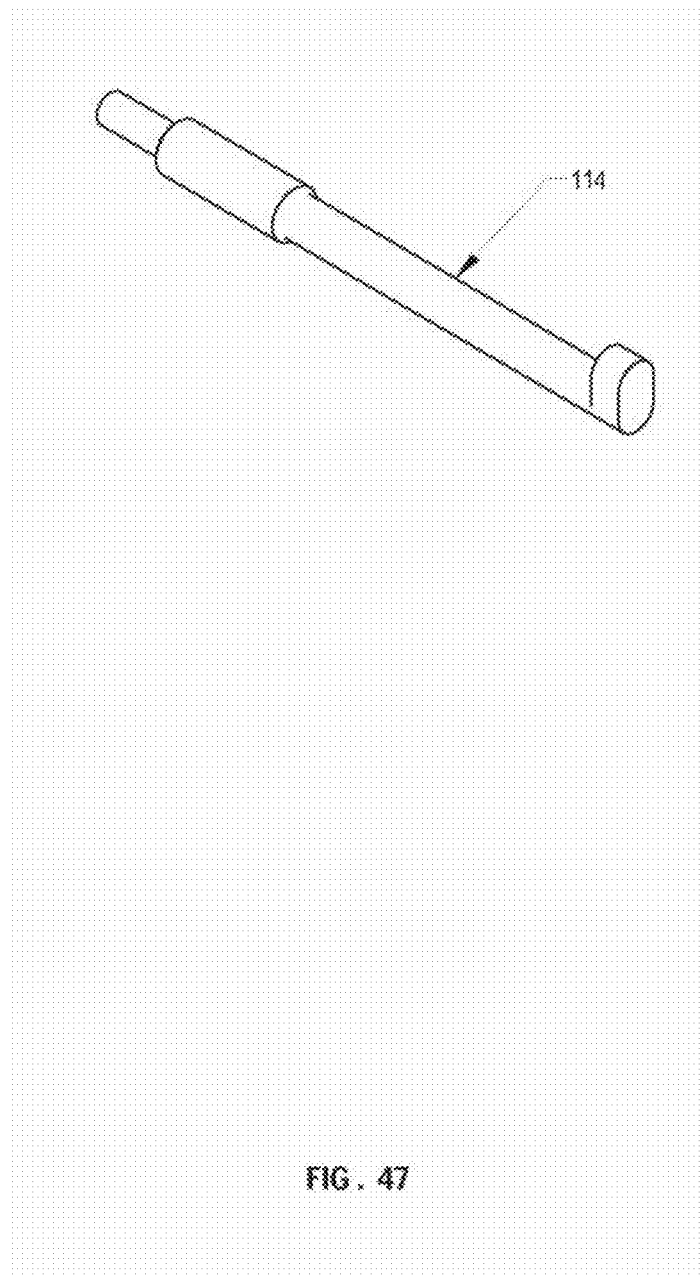
FIG. 47 is an illustration of a hook tip of a probe of a measuring apparatus of the invention.
Figure 48:
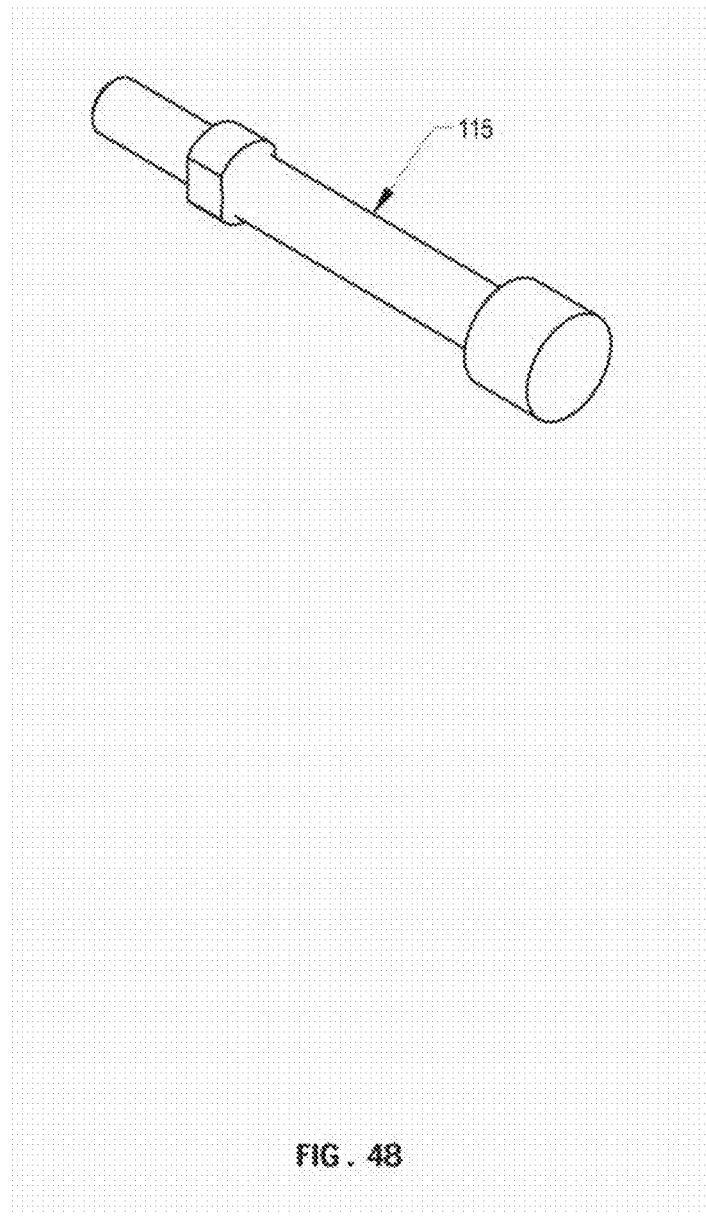
FIG. 48 is an illustration of plunge tip of a probe of a measuring apparatus of the invention.
Figure 49:
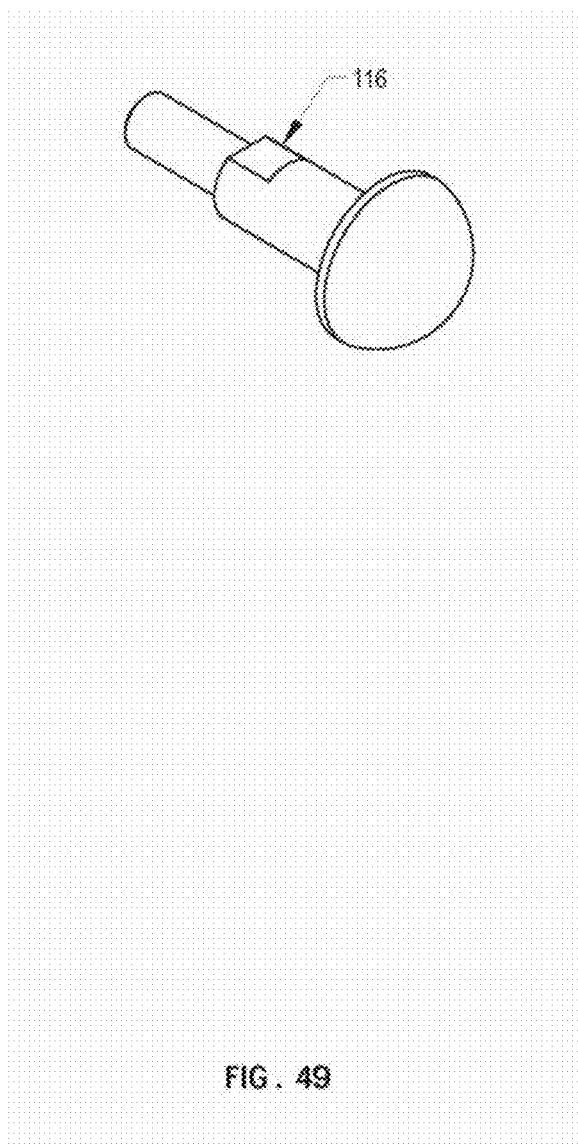
FIG. 49 is an illustration of a countersink tip of a probe of a measurement apparatus of the invention.

The measurement apparatuses 18 include a removably attached (or other) probe 19 including a body 111 (FIGS. 36-40A, 41A, 42A, 43A and 44), 112 (FIG. 45) and 113 (FIG. 46) preferably extending outwardly from the forward end of the frame 106 centrally, or substantially centrally, which preferably remains stationary, and establishes a reference plane from which a measurement is taken. The probe 19 and body 111 may be present in any one or more of several different forms, as is shown in FIGS. 44-49, and may be specific to a particular measurement application that is to be performed by an operator with the measurement apparatus 18. The probe 19 and body 111, 112, 113 are both preferably relatively long, the length of which may vary widely, and may be any length desired or required for a particular application. The probe preferably ranges from about 1 to about 10 inches in length, and more preferably ranges from about 1 to about 4 inches in length, and more preferably is about 1.5 inches in length. As is shown in FIGS. 39 and 44-49, the body 111, 112, 113 of the probe 19 often includes one or a plurality of ball pads 130 forming a part of the probe body 111, 112, 113, or affixed to it, preferably located at its forward end, or between its forward end or tip 114 (FIG. 47), 115 (FIG. 48), 116 (FIG. 49) and its aft end, and preferably centrally or substantially centrally. The ball pads 130 are preferably spaced an equidistant apart from each other, but may be spaced in any other manner desired or required, and that may come into contact with or rest upon, and become normalized with, one or a plurality of exteriors (or other) surfaces of a workpiece (or other three-dimensional object, or part thereof). The ball pads 130 may be selected specifically for a particular application, but are commonly hemispheres (or any other desired shape and/or size) that function to provide a steady, reliable plane for a measurement when resting on a surface of a three-dimensional (or other) object. FIGS. 44-49 show a variety of different styles of removably attached bodies 111, 112, 113 and probe 19 tips 114, 115, 116 that may be employed with the measurement apparatuses 18, and which are interchangeable (i.e., each of the different bodies 111, 112, 113 (and others) and tips 114, 115, 116 (and others) may be removably attached to the forward end (or other portion) of the measurement apparatuses 18, thereby enabling an operator to make a variety of different types of fastener hole, thickness, grip length or other measurements using the same measurement apparatus 18 (wired, wireless, "retraction" style, "plunge" style and/or the like) with different probes 19, bodies 111, 112, 113 (and others) and tips 114, 115, 116 (and others). The probe 19, and tip 114, 115, 116 thereof, act as an interface to a surface, material, workpiece or three-dimensional object, or part thereof, being measured, so that a variety of different types of measurements can be made using one common device. FIG. 44 shows a body 111 having three ball pads 130 at its forward end, which is typically used to make a variety of different measurements in a variety of different locations, as are described herein (or otherwise). FIG. 45 shows a body 112 style having two ball pads 130 at its forward end, which may facilitate making measurements in specific locations having tight or narrow radius surfaces. FIG. 46 shows a body 113 having no ball pads 130, which may also facilitate making measurements in specific locations having tight or narrow radius surfaces. FIG. 47 shows a tip 114 of a probe 19 that may be employed, for example, to measure a through-hole in a "retraction" type measurement apparatus 18 configuration. FIG. 48 shows a tip 115 of a probe 19 having a "plunge" style that may be employed, for example, for measuring holes having a "bottom," such as a nut plate. FIG. 49 shows a tip 116 of a probe 19 having a "countersink" style that may be employed, for example, in a "plunge" type of a configuration to measure the depth of a countersink cut. Other probes 19, bodies 111, 112, 113 and tips 114, 115, 116, and a variety of different types and/or styles thereof, which may be procured from sources that are described herein, or that are known by those having ordinary skill in the art, may also be removably affixed to the measurement apparatuses 18. The tip 114, 115, 116 of the probe 19 typically is movable, rather than stationary, and functions to make a measurement through, on, against, in or in some other manner interacting with a skin, material, hole, workpiece or other three-dimensional object, or part thereof, to be measured, and can be used or designed in various forms that optimize it in connection with a particular application. A selection of a tip 114, 115, 116 having a correct diameter for a particular measurement application is important, and may readily be performed by those having ordinary skill in the art using the information and drawings that are provided in great detail herein. The diameter of any tip 114, 115, 116 must generally be smaller than the diameter of a hole (or other structure or area) into which the tip 114, 115, 116 may be inserted. Some tips 114 have a configuration of a fish hook, which can be passed fully through a fastener (or other) hole and hook onto a surface of a workpiece or other object, or part thereof, that it adjacent with the rear side of a hole. Further, probe 19 and body 11, 112, 113 styles, such as those shown in FIGS. 45 and 46, may be used to establish a reference line rather than a reference plane. A reference line is often preferable when measuring surfaces with a significant contour, whereas a reference plane is often preferable when the measured area is flat or substantially flat (i.e., having little or no contour.) The probe 19 and body 111, 112, 113 (and other components) may be precision machined and removably attached to the forward (or other) end of the frame 106 of the measurement apparatuses 18 using any of a variety of different means or methods, such as using a plurality of fasteners. FIG. 39 shows a series of four screws 142 used for this purpose. The forward end or tip 114, 115, 116 of the probe 19 may be pressed by an operator against an object, or part or surface thereof, to be measured, such as partially or fully through a pre-drilled fastener hole to make a hole depth, countersink depth or diameter measurement or a grip length or thickness measurement. The body 111, 112, 113 is preferably hollow to allow the shaft 110 to slide or otherwise pass or extend partially or fully through its interior centrally or substantially centrally. Various tips 114 (FIG. 47), 115 (FIG. 48), 116 (FIG. 49) (or others) may be removable attached to the forward (or other) end of the shaft 110 by means for attaching the two together, such as one or a plurality of fasteners, or screwing the tips 114, 115, 116 into a threaded end of the shaft 110. The tip is selected based on the type of measurement desired, and may be secured to the shaft 110 using a fastener or other means, such as the probe nut 117 shown in FIG. 39.

An internal grip clip 107 (or device having a similar function) that is preferably employed in the measuring apparatuses 18 of the invention is shown in FIGS. 40A-43B (in exploded views), as well as in FIG. 39. This grip clip 107 is preferably located centrally, or substantially centrally, within the frame 106, and preferably abutting one or a plurality of interior surfaces of the frame 106, such as are present at the forward and lower ends, as is shown in FIG. 40A. The grip clip 107 slides (or otherwise moves) in a forwards and/or backwards direction whenever a probe 19 tip 114, 115, 116 is retracted (drawn in a backwards manner) or compressed (extended in a forward manner). The displacement between the grip clip 107 and the frame 106 is the desired linear measurement. The grip clip 107 allows the shaft 110 to pass or extend through the frame 106 via a plurality of adjacent pressed-fit (or other) bushings 134. Two such bushings 134 are shown in FIG. 39. Initially, the grip clip 107 and the shaft 110 are preferably tightly coupled to each other as a result of a compression force being applied thereon by an internal compression spring 136 positioned forward of the grip clip 107 (as is shown in FIGS. 40B, 41B, 42B and 43B). The compression spring 136 has an ability to apply a force preferably ranging from about 1 to about 5 pounds, and more preferably ranging from about 2 to about 4 pounds, and most preferably about 3 pounds, to the grip clip 107 and the shaft 110, which causes them to remain tightly coupled. Compression springs 136 (and the various screws, sleeve bearings, switches, inserts and ball pads that are described and/or illustrated herein) are commercially available from sources that are known by those having ordinary skill in the art, such as McMaster Carr (Elmhurst, Ill.). Unless otherwise indicated, all of the other components of the measurement apparatuses 18 that are described and/or illustrated herein are commercially available from Delta Sigma Corporation (Kennesaw, Ga.) or from other sources that are known by those having ordinary skill in the art.

An extension spring 127 is preferably located near, adjacent with, or substantially adjacent with, one side (or other area) of the frame 106, as is shown in FIG. 39. The extension spring 127 has an ability to apply a force preferably ranging from about 0.5 to about 3 pounds, and more preferably ranging from about 0.5 to about 2 pounds, and most preferably about 1 pound, between the grip clip 107 and the frame 106, which causes the shaft 110, and thus the probe tip 114, 115, 116 to extend outwards in a forward direction from the frame 106 (i.e. towards the forward end of the measurement apparatus 18) and, thus, also causes the shaft 110 and probe 19 tip 14, 115, 116 to do the same. Such an amount of force is preferably less than the amount of force applied to the grip clip 107 and shaft 110 by the compression spring 136 (i.e., the amount of force applied by the compression spring 136 to the grip clip 107 and shaft 110 is greater than the amount of force applied by the extension spring 127 to the grip clip 107). The compression spring 136 should be somewhat stronger, and preferably significantly stronger, than the extension spring 127. These two springs 136 and 127, with one being stronger than the other, provide a means for making and procuring rapid and accurate measurements and automatic triggering for data transfer from the measurement apparatus 18 to one or a plurality of host (or other) computers and/or data collection devices. When the common grip (handle) 120 is retracted in the case of a "retraction" configuration, or the probe tip 115 is pushed back in the case of the "plunge" configuration, the weaker extension spring 127 generally always yields first, which causes the linear (scale) strip 128 to pass through the read head of the optical encoder card 124. When a mechanical interference impedes the movement of the probe tip 114 (or 115), this impediment supplies a reactive force that is sufficient to overcome its compressive force of the stronger compression spring 136 to release the actuator on the compression trigger switch 129. This is an important feature of the measurement apparatuses 18 of the invention, and enables an operator to apply an amount of force to the handle area (common grip 120) of a "retraction" type of measurement apparatus 18 (or to a plunge end cap 149 in a "plunge" type of measurement apparatus 18) that is sufficient to overcome the amount of force being applied by the compression spring 136 between the grip clip 107 and the frame 106. This is a "trigger" type of action that may be activated by an operator in only one single action and using only one hand, and/or one or a plurality of fingers on that one hand, for example, by squeezing it, which causes the compression trigger switch 129 to separate from the encoder clip 109, thus initiating the sequence of capturing the linear displacement data and transmitting it to the host computer. When the operator applies such force to the handle area (common grip 120) of the measurement apparatus 18, this has an effect of pushing the compression (trigger) switch 129 (discussed in detail below) away from the encoder clip 109 (also discussed below) and trigger screw 145, which, in turn, causes the measurement apparatus 18 to simultaneously, or substantially simultaneously, and instantaneously, or substantially instantaneously, perform all three of the following actions: (i) normalize its probe 19 relative to a surface or hole present in the material, skin, workpiece or other three-dimensional object, or part thereof, being worked on by the force applied by reacting the extension spring 127 against the outer surface of the same (and once the probe tip 114 is mechanically impeded, the additional force of the compression spring 136 further aids the operator in normalizing the probe 19); (ii) make a measurement (material thickness, fastener hole depth, diameter or countersink depth, grip length or the like); and (iii) transmit resulting or procured measurement data and/or information to one or a plurality or host or other computers and/or data collection devices. The above components and forces also function to prevent the measurement apparatuses from mistakenly being activated (i.e., being activated when not wanting them to become activated). Extension springs 137 are commercially available from sources that are known by those having ordinary skill in the art, such as Lee Spring (Greensboro, N.C.).

In some embodiments of the measurement apparatuses 18 of the invention, such as those shown in FIGS. 2, 24-26, 28-30, 36-37 and 39, which have a "grip" or "trigger" style, an operator activates the measurement apparatus 18 to make a measurement by squeezing (or otherwise applying pressure to) an external common grip 120 preferably located towards the lower portion and aft end of the measurement apparatus 18, which is operably connected with an internal slidable T-foot 108 (or similarly functioning component) affixed to the underside of the bottom of the frame 106, preferably centrally, substantially centrally or towards the forward end of the frame 106, by one or a plurality of fasteners 140. (See FIGS. 39, 40A and 41A.) The T-foot 108 slides in a forwards and/or backwards direction within a slot (not shown) present in the bottom of the frame 106, which provides a stroke length that is, usable measurement length preferably ranging from about 0.1 to about 10 inches, and more preferably ranging from about 1 to about 3 inches, and most preferably about one inch. The stroke length may be increased or decreased to any desired or required length based upon the requirements of a particular application or upon the needs or desires of an operator. A grip clip 107 that functions to guide the encoder clip 109 is connected with the top side of the T-foot 108 (with a portion of the lower part of the frame 106 between the two) by means for attaching such components together, such as a plurality of fasteners. FIG. 39 shows the use of two screws 140 for this purpose. As is shown in FIGS. 40A, 40B, 41A and 41B, an encoder clip 109 that functions to generate the trigger action is positioned within the frame 106, preferably near or adjacent with the aft end of the grip clip 107, and is affixed with a side or other area of the shaft 110 by a means for affixing the two together, such as with a plurality of fasteners. FIGS. 40A, 40B, 41A and 41B show a use of two screws 138 for bolting these two parts together, and also for mounting an internal linear strip (scale) 128, which forms a part of the measurement apparatus 152, and is present on the optical encoder card 124, onto the encoder clip 109. The linear strip (scale) 128 is preferably a magnetically etched rail having a series of readable graduations, and functions in the manner discussed hereinbelow.

Compressing the common grip 120, which may be performed by an application of pressure by one hand of an operator, or by one or a plurality of fingers on that one hand, applies tension to the extension spring 127 while simultaneously, or substantially simultaneously, sliding the linear (scale) strip 128 present on the optical encoder card 124 through the reader head (not shown) of the optical encoder card 124 and pulling the probe tip 114, 115, 116 toward the body 111, 112, 113 of the probe 19 via the slidable shaft 110, which moves towards the aft end of the measurement apparatus 18. As the measurement mechanism 152 moves backwards, graduations (not shown) that are present on the linear (scale) strip 128 pass through the optical encoder card 124 which is operably wired using an electrical wire harness 102 to an encoder input circuit of the digital circuit or controller card 125 to make one or a plurality of linear measurements. (See FIGS. 39, 40B and 41B.) Such graduations may be any sized graduations required for a particular application or required or desired by an operator, but generally range from about 1 to about 1,000 microns in length, such as about 1, 2, 3, 4 or 5 microns. The encoder electronics present on the digital circuit or controller card 125 which, for example, may be those that are illustrated in FIGS. 55A, 55B, 55C, 56A, 568, have an ability to continuously capture or read the current position of the linear strip (scale) 128 and count the graduations in an up and/or down direction as it moves over the magnetic graduations as the quadrature signals from the liner strip (scale) 128 are passed to it.

When a hook (shown in FIG. 47) that is present at the forward end of a probe tip 114 engages a back surface of a skin, workpiece or other three-dimensional object, or part thereof, such as when it passes fully through a fastener hole and hooks onto (or otherwise comes into contact with) a surface that is at the far end of the hole, the entire sliding measurement mechanism preferably stops moving as a result of this mechanical impediment. Continuing to squeeze the common grip 120 or trigger handle, the now added force provided by the trigger compression spring 136 of at least about 2 pounds of force, and preferably of at least about 3 pounds of force, will typically "normalize" the probe 19 body 111, 112, 113 on the facing surface of the part being measured (i.e., the surface facing the operator), and move the compression trigger switch 129 off the encoder clip 109. By "normalizing" in this context is meant that the probe 19 is in alignment with the surface of the part being measured. An adjustment screw 145, shown in FIGS. 40A, 40B, 41A, 41B, 42A, 42B, 43A and 43B, or a similar mechanism, is preferably used to set or establish how far the common grip 120 or trigger handle must be pulled to generate a trigger action after the encoder clip 109 has stopped moving. This is typically set to about 0.02 inches, but is adjustable to user preference, and may vary widely, for example, from about 0.00.1 to about 0.1 inches. The compression trigger switch 129 transition from "closed" to "open" preferably generates an electrical trigger signal that is wired to the digital circuit or controller card 125 to "capture" (procure) a measurement reading from the optical encoder card 124 at the moment of such transition.

Figure 40B:
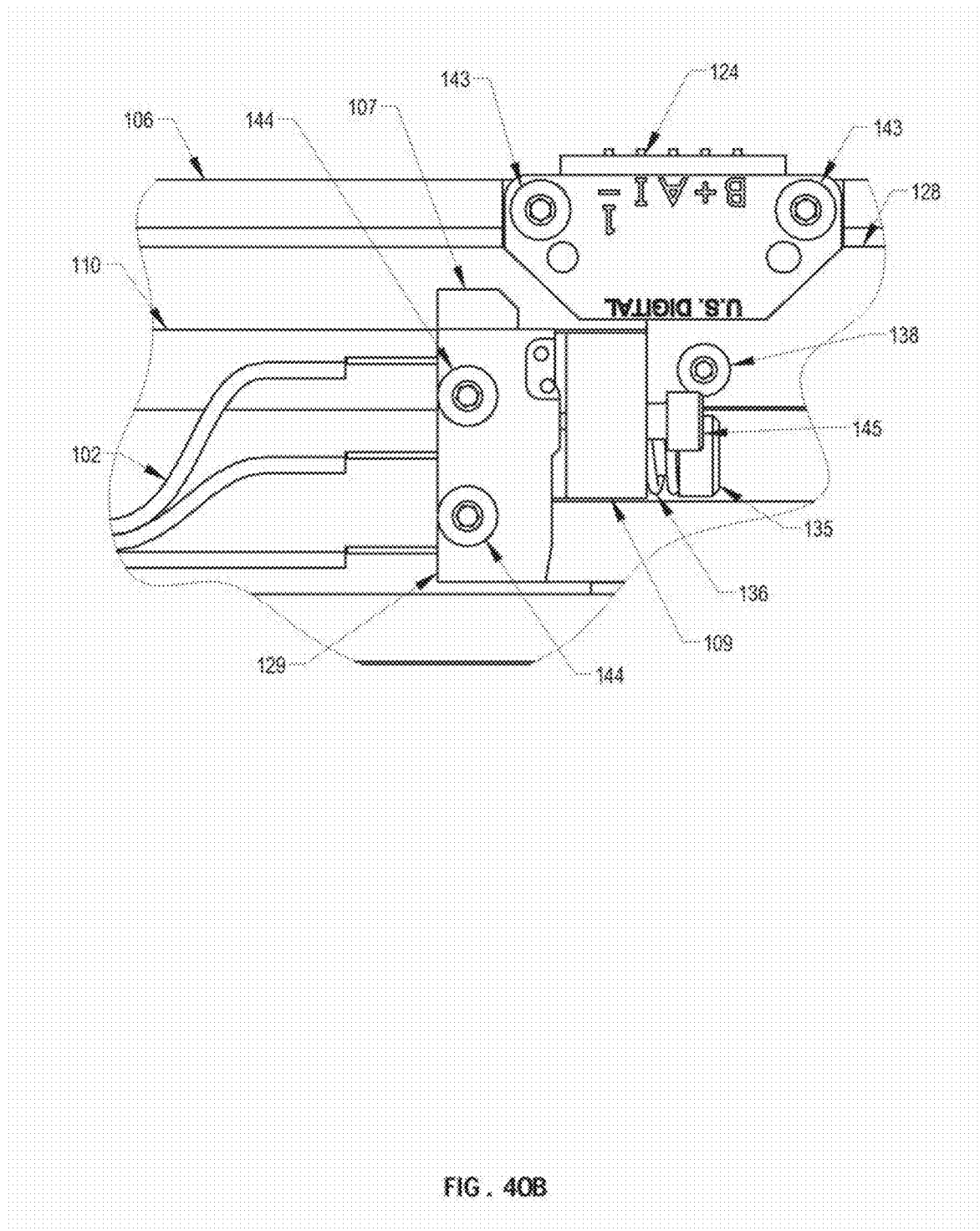
Figure 41B:
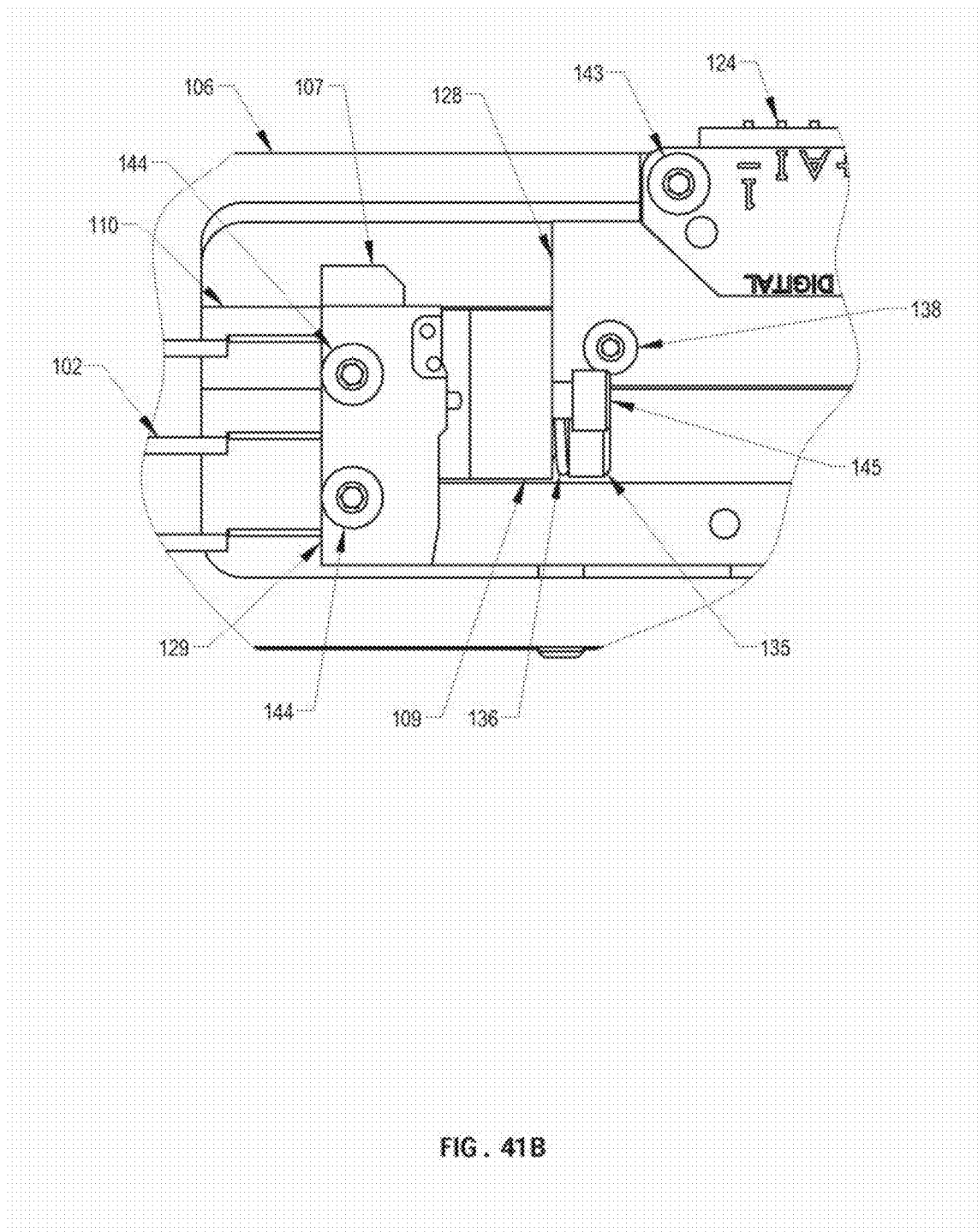

The trigger mechanism is shown in FIGS. 40A, 40B, 41A, 41B, 42A, 42B, 43A and 43B, and also in FIG. 39. FIGS. 40A and 40B show the measurement mechanism in an extended position, while FIGS. 41A and 41B show it in a fully (100%) retracted position. (Both retraction and compression may range from just above about 0% to 100%.) The position of the encoder clip 109 in FIGS. 40A and 40B is quite different from its position in FIGS. 41A and 41B. In FIGS. 40A and 40B, the compression spring 136 has not been overcome by the force applied between the common grip 120 and the probe tip 114 as a result of mechanical impediment. Additionally, a compression (trigger) switch 129, which functions to indicate that the measurement position has been reached, and which is preferably positioned within the frame 106 near or adjacent with the aft end of the encoder clip 109 and at near or at the aft end of the compression clip 107, is still in a "closed" position. It is located centrally, or substantially centrally within the frame 106. In contrast, in FIGS. 41A and 41B, the trigger mechanism has been fully retracted, and the compression (trigger) switch 129 is now transitioned to an "open" position as the compression (trigger) switch 129 (and the encoder clip 109) have moved away from the adjustment screw 145 in a direction towards the aft end of the frame 106. This is accomplished by overcoming the amount of the force that was applied on the encoder clip 109 by the compression spring 136 by squeezing the common grip 120. The compression (trigger) switch 129 may be attached to the grip clip 107 by any means for attaching these two components together, such as a plurality of fasteners. FIGS. 40A, 40B, 41A and 41B show a use of two screws 144 for this purpose. An electrical wire harness 102 is soldered or otherwise affixed to the compression (trigger) switch 129 leads and preferably has a connector to plug into the digital circuit or controller card 125.

The housing 22 or body of the measurement apparatus 18 is preferably made of a plastic material, preferably acrylonitrile butadiene styrene (ABS), but may be made of any other suitable plastic or other material (i.e., a material that enables it to function in the manner described herein). It may be made by fused deposition modeling (FDM), injection molding or other suitable methods, which may be determined by those having ordinary skill in the art. One or a plurality of inserts 131, as are shown in FIG. 39, may optionally be pressed, or otherwise inserted, into the housing 22, left hand outer body 118 and/or right hand outer body 119 to provide a high quality or strong thread to any fasteners that are used to assemble the measurement apparatus 18.

On one or a plurality of sides or areas of the housing 22 of the measurement apparatus 18, such as on the left hand outer body 118 (as is shown in FIG. 39) or on the right hand outer body 119, a membrane switch panel 101 or set of one or more buttons or other means for providing an operator with program or other control of the measurement apparatus 18, such as forward or reverse, is preferably affixed thereto by, for example, one or a plurality of fasteners, such as glue or other adhesives. The membrane switch panel 101 (or similar mechanism or device) preferably includes one or a plurality of switches that provides an operator of the measurement apparatuses 18 with partial or full (preferably full) program control thereof. Program control allows the operator to manipulate various portion of software that is running in a host (or other) computer and/or data collection device via the measurement apparatus 18. This is say, that it has the ability to handle the exceptional cases that occasionally occur when taking many thousands of measurements. Key switches included with the measurement apparatus 18 allow the operator to make choices to cause various software routines to operate that enhance the functionality of the device in handling the exception events. Preferably, the membrane switch panel 101 has at least three switches (i.e., devices for making, breaking and/or changing one or a plurality of connections in an electrical circuit): (i) one that causes or activates the measurement apparatus 18 to perform a new measurement or other activity, such as a "forward" arrow; (ii) one that causes or activates the measurement apparatus 18 to repeat a measurement already taken or an activity already performed, such as a "reverse" arrow; and (iii) one that causes or activates the measurement apparatus 18 to perform a calibration, such as a "calibrate" switch. Additionally, it preferably includes a light emitting diode that indicates that a particular calibration is current. A calibration puck 105, such as the one shown in FIG. 39 at the forward end of the measurement apparatus 18 (in front, or forward, of the probe 19 tip 114) is preferably used in conjunction with the calibration switch on the membrane switch panel 101 (or similar device) to calibrate the measurement apparatus 18 with a particular probe 19 tip 114, 115, 116 that is being used. The puck 105 should have a known precision thickness, which is preferably coded into calibration firmware that is present on the digital circuit or controller card 125.

One or a plurality of fasteners or other means may be used to securely affix the left hand outer body 118 and the right hand outer body 119 together at one or a plurality of different locations. FIG. 39 shows a use of about twelve screws 139, 146 being used for this purpose (six with the left hand outer body 118 and six with the right hand outer body 119).

An internal or external, rechargeable or non-rechargeable, battery 126 that is preferably removable from the measurement apparatus 18, such as an AA lithium-ion battery or an Ultra Fire AA battery, may be used to provide power to measurement apparatuses 18 that, for example, are wireless. Such batteries are commercially available from sources that are known by those having ordinary skill in the art, such as Shenzhen Zhangyang Technology Co. Ltd. (Shenzhen City, China). FIG. 39 shows such a battery being present and stored in the handle portion (bottom portion at the aft end of the measurement apparatus 18) of the left hand outer body 118. A standard USB connector, or similar means for charging the battery is preferably a part of the digital circuit or controller card 125, and may be employed to charge the battery. It is preferably removably positioned in a convenient side or area of the housing 22, such as the left hand outer body 118, than enables the battery to be easily charged, and may be covered by an optional battery compartment cover 121, as is shown in FIG. 39. Preferably, it may also be removed and replaced for instant restart by removing the battery compartment cover 121. A battery charge typically will last for a period of about 8 hours, but may be longer or shorter, as is known by those having ordinary skill in the art.

Figure 36:
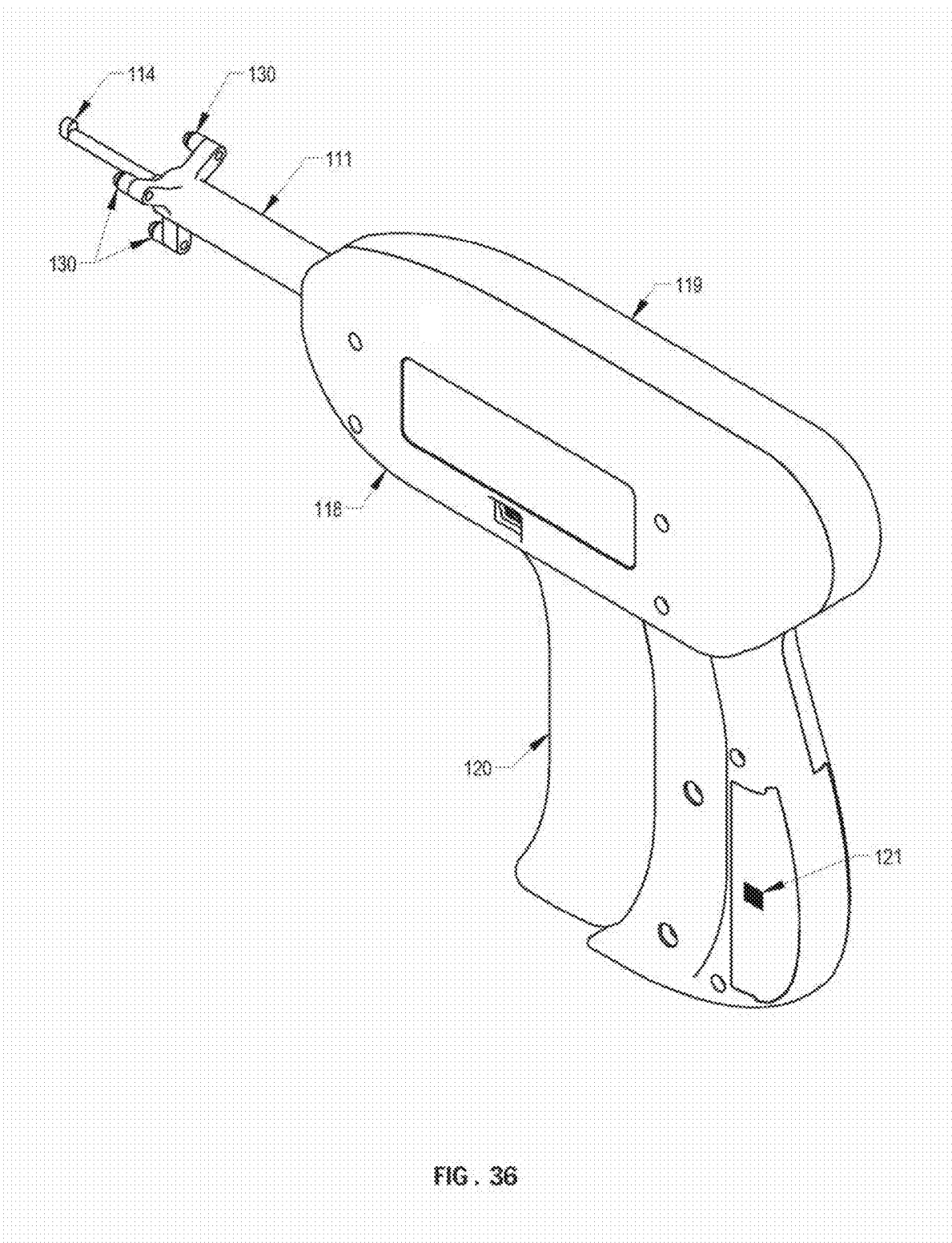
FIG. 36 is an illustration of a side view of a wireless "retraction" type measurement apparatus of the invention, which shows a compartment to house a battery in its handle (at 121).
Figure 37:
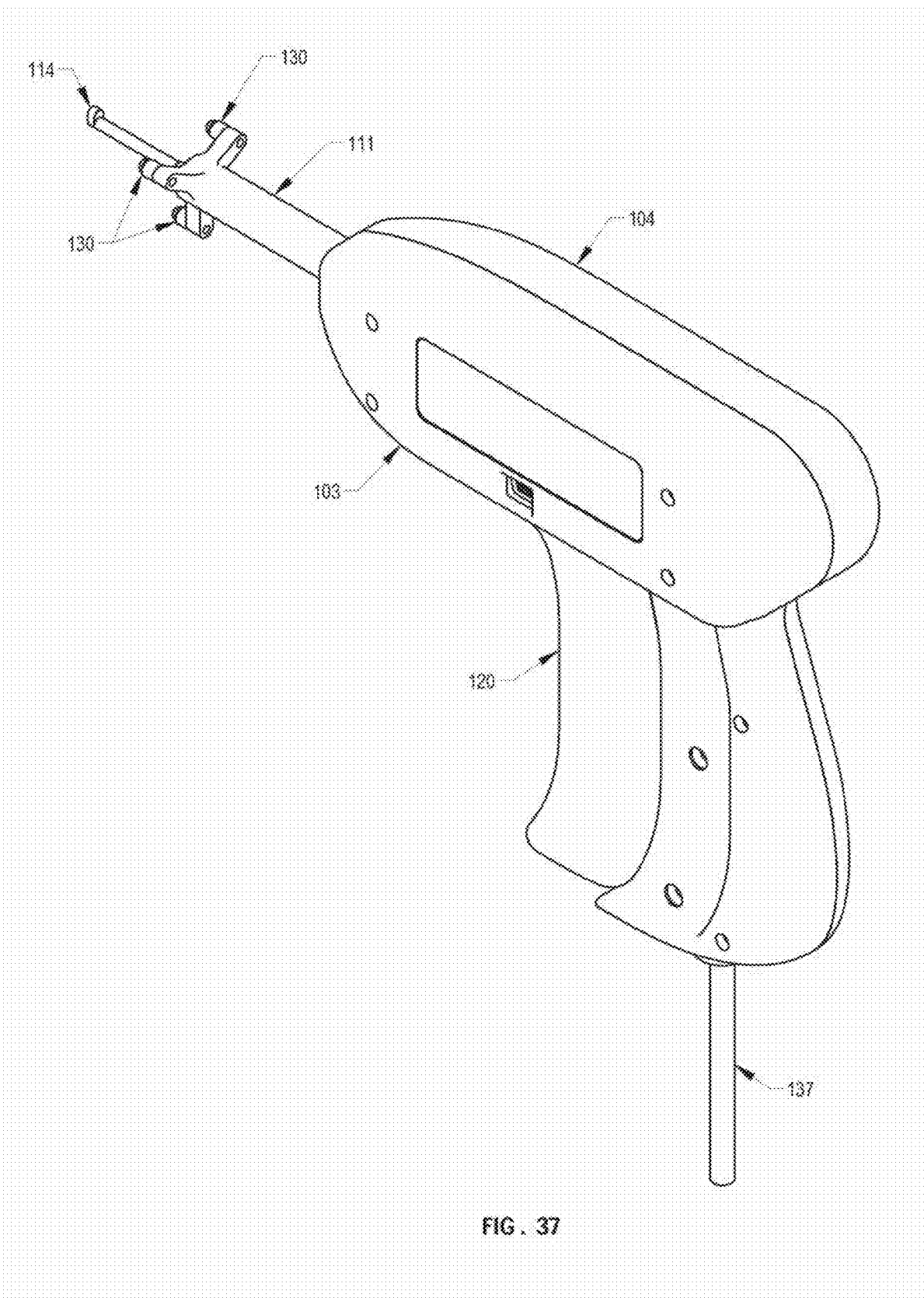
FIG. 37 is an illustration of a side view of a wired (non-wireless) Power-over-Ethernet (POE) "retraction" type measurement apparatus of the invention, which does not show a compartment to house a battery in its handle.
Figure 42B:
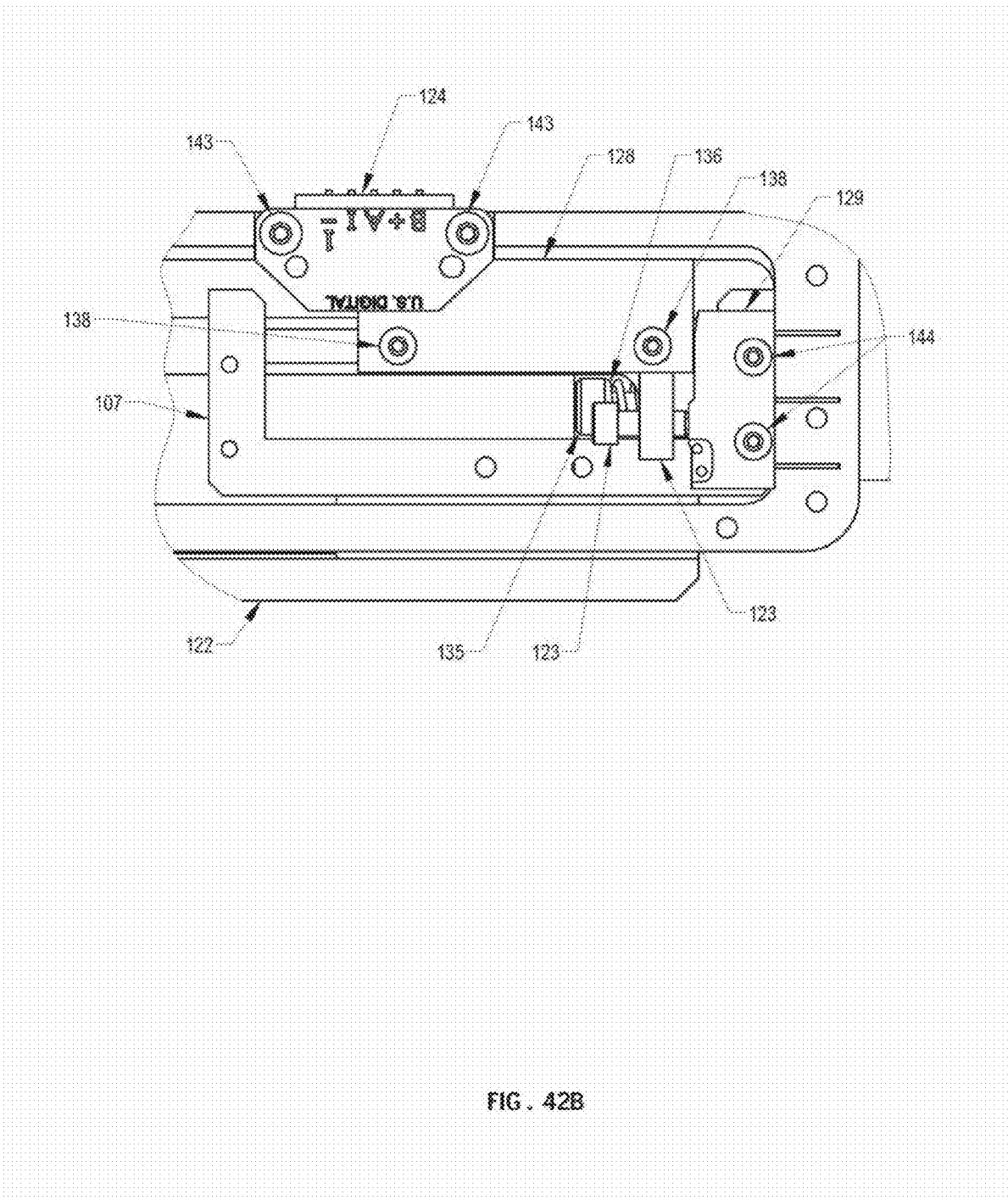
Figure 43B:
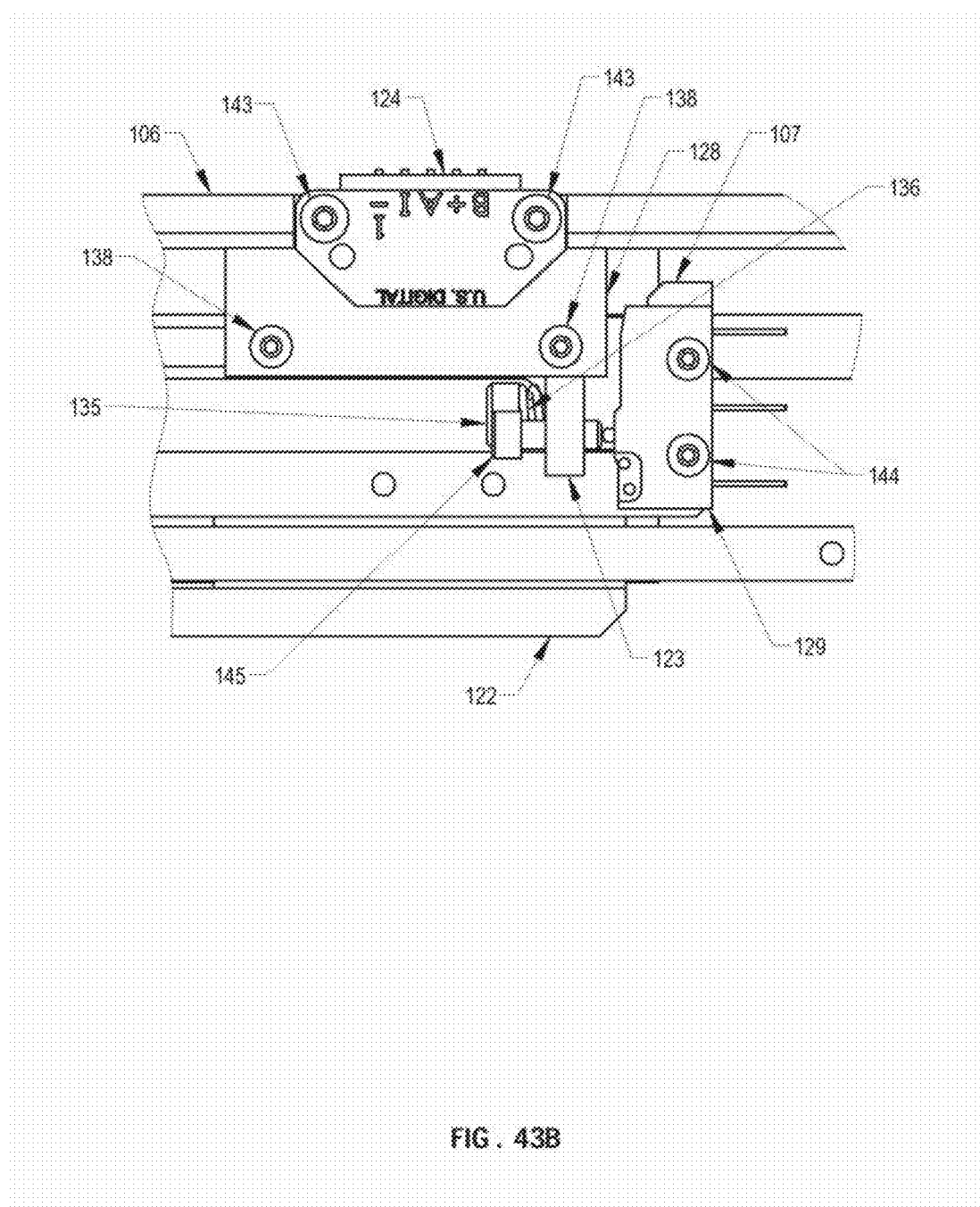

Some of the discussion above relates only to the "retraction" or "pistol" type or style of a measurement apparatus 18 of the invention (either wireless or non-wireless). There are a few configuration changes for the "plunge" type or style of the measurement apparatus 18 of the invention (wireless and non-wireless). First the "pistol" type grip style and preferred shape of the left hand outer body 118 and right hand outer body 119 of the "retraction" type apparatuses, as are shown in FIGS. 36, 37 and 39, are preferably replaced a "barrel" style and shape of plastic (or other) left hand outer body 147 and right hand outer body 148, as is shown in FIG. 38. Second, FIG. 42A shows an internal mechanism of the "plunge" configuration measurement apparatus 18. Comparing FIG. 42A with FIG. 41A, the differences in the configurations can be readily discerned. Most notably, the compression trigger switch 129 has been moved from the rear or aft end of the frame 106 to the forward end of the frame 106. When the probe 19 tip 115 is inserted into a fastener or other hole, the tip 115 and shaft 110 and grip clip 107 all push back in a backwards direction towards the aft end of the frame 106 and measurement apparatus 18, preferably as one unit, identically, or substantially identically, to the manner done by the "retraction" style measurement apparatus 18, thereby overcoming the force applied by the extension spring 127. The trigger switch 129 is again tightly coupled to the encoder clip 123 via the screw 145 (or similar mechanism or device), and the compression spring 136 is much stronger than the tension spring 127. When the ball pads 130 touch, or otherwise come into contact with, a surface of a material, workpiece or other three-dimensional object, or part thereof, the linear (scale) strip 128 will typically be positioned in a manner to accurately measure the depth of the hole, as is shown in FIG. 43A. The functionality for countersink, fastener flushness, and step measurements is identical, with only a change of the probe tip. A plunge end cap 149 that is preferably the size and shape, or substantially so, as the aft end of the "plunge" style measurement apparatus 18, as is shown in FIG. 38, is preferably attached to the aft end of the plunge T-foot 122, as is shown in FIGS. 42A and 42B. The operator pushes the end cap 149 (or otherwise applies force thereto) with one hand, which pushes the compression (trigger) switch 129 away from the encoder clip 123 and trigger screw 145, as is shown in FIG. 43B. The "trigger" action causes the measurement apparatus to simultaneously, or substantially simultaneously, and instantaneously, or substantially instantaneously, perform the three functions that are described above in connection with a "pistol" or "retraction" type of measurement apparatus 18. A linear (scale) strip 128 value will be read into the digital circuit or controller card 125 (for wireless measurement apparatuses 18) or Power-Over-Ethernet (POE) circuit card 150 (for non-wireless measurement apparatuses 18), which is subsequently transmitted to the host computer.

The Power-Over-Ethernet (wired) embodiments of the measurement apparatuses 18 of the invention (i.e., those that are not wireless), such as the "retraction" or "plunge" type measurement apparatus, are structurally and functionally identical, or substantially identical, to the wireless embodiments of the measurement apparatuses of the invention, such as the "retraction" or "plunge" type of measurement apparatus, except for the following exceptions, which relate to the connection to the outer body and the placement of the data trigger switch. First, a Power-Over-Ethernet (POE) circuit or controller card 150 is used in place of the wireless digital circuit or controller card 125. The POE circuit card 150 preferably includes a standard RJ-45 Ethernet connection, and lacks a battery connection (J1 on FIG. 55B). The data and/or information that is transferred thereto is the same in both cases, but the circuit that handles the data interface to the host computer(s) and/or other data collection devices is different.

Second, the Power-Over-Ethernet (wired) embodiments of the measurement apparatuses 18 of the invention preferably will not have a battery compartment present, or build, into their handle area (or other areas), as no need for a battery in such embodiments exists. For example, the plastic (or other) body parts 103, 104 shown in FIG. 37 (left hand outer body 103 and right hand outer body 104) preferably replace the left hand outer body 118 and the right hand outer body 119 that are shown in FIG. 36. Other than the foregoing, all structure and functionality are generally identical, or substantially identical.

All of the wired and wireless measurement apparatuses 18 that are described herein preferably have the following common important components or features:

- They may use any of the various probes 19 and/or tips 114, 115, 116 that are described herein or that are otherwise available for use or known by those having ordinary skill in the art.
- They include the type of internal measurement mechanism that is described above;
- They activate or trigger upon retraction (as is shown in FIGS. 36, 37 and 39) or upon plunge (as is shown in FIG. 38), thereby permitting an operator to perform several functions (normalization, measurement and data transmission) using only one hand.
- All of the various POE (power over Ethernet) type measurement apparatuses 18 can use the circuit boards that are illustrated in FIGS. 55A and 55B, which are common to all such devices.

All of the various wireless type measurement apparatuses 18 can use the circuit boards that are illustrated in FIGS. 55A, 55B and 55C, which are common to all such devices.

The internal mechanism and electronics present in the measurement apparatuses of the present invention can be configured in any one or more of a variety of different ways to accomplish one or more different tasks. The trigger mechanism, for example, can be configured to capture measurement data on either a "retraction" or a "plunge" movement, and the probe, including its tip, may be configured for a number of applications such as grip length, diameter, step, gap, flushness, countersink depth, material thickness and/or the like.

All of the numeric values that are set forth above are for reference only, and while they are a typical case, values either smaller or greater may be used as required for the application.

Optional components of, or accessories that can be employed with the measurement apparatuses of the invention include, but are not limited to, wrist (or other) straps, a case (preferably dust and water resistant or proof).

Production of Measurement Apparatuses

Measurement apparatuses within the invention may be constructed, for example, in the following manner, or in other manners, using known machining and other technologies. The following method refers to the parts that are listed in FIG. 30 as follows:

| ITEM NO. | QTY. | PartNo | NOMENCLATURE | Description |
| --- | --- | --- | --- | --- |
| 54 | 1 | LIN-500-1.5-N | Linear Strip | US Digital Vancouver, WA |
| 53 | 1 | EM1-0-500 | Optical Encoder | US Digital Vancouver, WA |
| 52 | 6 | 99362A200 | Insert | McMaster Carr Elmhurst, Il |
| 51 | 1 | 9953K69 | Cable Assembly | McMaster Carr Elmhurst, Il |
| 50 | 1 | 7658K190 | Switch | McMaster Carr Elmhurst, Il |
| 49 | 1 | 9657K154 | Spring | McMaster Carr Elmhurst, Il |
| 48 | 3 | 1851A12 | Ball Tip | McMaster Carr Elmhurst, Il |
| 47 | 4 | PS0610-04 | Sleeve Bearing | Pacific Bearing Roscoe, IL |
| 46 | 3 | PS0406-04 | Sleeve Bearing | Pacific Bearing Roscoe, IL |
| 45 | 2 | | Set Screw - Cup Point | #6-32 x 3/16 LG McMaster Carr Elmhurst, Il |
| 44 | 2 | | Screw | #8-23 FHCS x 1/2 LG McMaster Carr Elmhurst, Il |
| 43 | 5 | | Screw | #4-40 FHCS x 3/8 LG McMaster Carr Elmhurst, Il |
| 42 | 2 | | Screw | #3-48 PHMS x 5/8 LG McMaster Carr Elmhurst, Il |
| 41 | 2 | | Screw | #3-48 PHMS x 7/16 LG McMaster Carr Elmhurst, Il |
| 40 | 4 | | Screw | #2-56 SHCS x 1/4 LG McMaster Carr Elmhurst, Il |
| 39 | 1 | | Screw | #4-40 SHCS x 1.25 LG McMaster Carr Elmhurst, Il |
| 38 | 12 | | Screw | #4-40 SHCS x 1/2 LG McMaster Carr Elmhurst, Il |

-continued

| ITEM NO. | QTY. | PartNo | NOMENCLATURE | Description |
|---|---|---|---|---|
| 37 | 1 | | Screw | #6-32 SHCS x 1/2 LG McMaster Carr Elmhurst, Il |
| 36 | 1 | DS80-501-1 | Membrane Switch | Delta Sigma Kennesaw, GA |
| 35 | 1 | PW80-111 | Calibration Puck | Delta Sigma Kennesaw, GA |
| 34 | 1 | PW80-110 | Grip | Delta Sigma Kennesaw, GA |
| 33 | 1 | PW80-109 | Body RH | Delta Sigma Kennesaw, GA |
| 32 | 1 | PW80-108 | Body LH | Delta Sigma Kennesaw, GA |
| 31 | 1 | PW80-107 | Probe | Delta Sigma Kennesaw, GA |
| 30 | 1 | PW80-106 | Nose | Delta Sigma Kennesaw, GA |
| 29 | 1 | PW80-105 | Guide Rod | Delta Sigma Kennesaw, GA |
| 28 | 1 | PW80-104 | Shaft | Delta Sigma Kennesaw, GA |
| 27 | 1 | PW80-103 | Switch Block | Delta Sigma Kennesaw, GA |
| 26 | 1 | PW80-102 | Clip | Delta Sigma Kennesaw, GA |
| 25 | 1 | PW80-101 | Frame | Delta Sigma Kennesaw, GA |
| 24 | 1 | | PC Board | Delta Sigma Kennesaw, GA |
| 23 | 1 | PW80-042 | Connector-Encoder | Delta Sigma Kennesaw, GA |
| 22 | 1 | PW80-041 | Switch Cable | Delta Sigma Kennesaw, GA |

First, assemble the Frame (26) and Sleeve Bearing (47). Install Sleeve Bearing (47) and Sleeve Bearing (46) into Clip (27). Install Sleeve Bearing (46) and Screw (37) into Switch Block (28). Insert Shaft (29) into the front face of the Frame (26), through the Clip (27) and out the back of the Frame (26). Next, insert the cut in the Switch Block (28) into the groove on the Shaft (29). Insert the Spring (49) between the Clip (27) and the Switch Block (28). Insert the Guide Rod (30) through the Frame (26), Clip (27), Switch Block (28) and Spring (49). Flush the Guide Rod (30) with the ends of the Frame (26) and insert the Set Screws (45). Next, install the Sleeve Bearing (47) Into the Nose (31). Slide the Nose (31) onto the Shaft (29) and fasten it to the Frame (26) with Screws (38). Install Ball Tip (48) into Nose (31), then install Probe (32) into Shaft (29).

Second, install Linear Strip (54) onto Switch Block (28) with adhesive tape. Install Switch (50) onto Switch Block (28) with Screw (41). Install Optical Encoder (53) over Linear Strip (54) and fasten to Frame (26) with Screw (42). Install Control Board (22) onto Frame (26) with Screw (40). Connect Optical Encoder (53) to Control Board (22) with Encoder Cable (25). Connect Switch (50) to Control Board (22) with Switch Cable (24) and insert Data Cable (51) to Control Board (22).

Third, mount Membrane Switch (23) to Body LH (33) with adhesive tape. Mount Body LH (33) to Frame (26) with Screw (38). Connect Membrane Switch (23) to Control Board (22). Route Data Cable (51) in curved part of Body LH (33) and out groove cut into the handle. Install Insert (52) into Body RH (34), then install Body RH (34) onto Frame (26) with Screw (38). Install Screw (39) and Screw (43) through Body LH (33) into Body RH (34). Install Grip (35) onto Clip (27) with Screw (44).

Usage of Apparatuses

To use the apparatuses, the following steps should be followed:

1.) Connect the computer to the projector using the required video cables.
2.) Install the projection software onto the computer.
3.) Position the projector(s) so that optimal coverage of the 3D object is achieved
4.) Launch the projection system software.
5.) The apparatus must be calibrated first
   a. Make sure the apparatus is attached to the computer using the required RJ-45 CAT-6 Ethernet cable.
   b. Place the calibration disk between the probe tip and the ball point feet of the grip gun
   c. Squeeze the apparatus handle until the calibration disk is firmly held in place between probe tip and the ball point feet.
   d. Press the Cal button on the side of the grip gun. The red calibration LED on the membrane keyboard should flash, indicating that the gun has been calibrated.
   e. Release the handle and remove the calibration disk.
6.) When the projection system software indicates a measurement is needed, a starburst pattern will be displayed over the hole where a measurement is to be taken, as shown in the drawings.
7.) The apparatus should be placed into the hole as shown in the drawings and the handle squeezed until die probe and the three ball point feet are firmly in contact with the object as shown in the drawings.
8.) If the measurement was successful, the starburst pattern will be automatically placed over the next hole to be measured.
9.) The apparatus handle should be released, and the apparatus should then be placed into the next hole illuminated by the starburst pattern and measure the thickness.

10.) If the gripping measurement was not successful, the hole will be illuminated in a red starburst pattern. When this occurs, the user has the option of repeating the measurement by pressing the right arrow on the membrane keyboard, which will indicate to the projection software that the last hole measurement will be repeated.

11.) If the user elects to skip the bad measurement, the left arrow button on the membrane keyboard should be selected, advancing the starburst pattern to the next hole to be measured.

12.) The measurement process for each hole should be repeated as described above until all holes have been measured by the grip gun.

13.) When all holes have been measured, the assembly process can continue as described by the projection software.

The following are specifications for the Ethernet cable that is shown in FIG. 31.

| SPECIFICATIONS | |
|---|---|
| CONTACT CARRIER MATERIAL/ COLOR (RJ45S) | POLYCARBONATE/CLEAR |
| MOLDED HEAD MATERIAL/ COLOR (RJ45S) | THERMOPLASTIC PUR/BLACK |
| CONTACT MATERIAL/PLATING (RJ45S) | BRONZE/GOLD |
| RATED CURRENT [A] | 1.5 A |
| RATED VOLTAGE [V] | 42 V |
| OUTER CABLE JACKET MATERIAL/COLOR | PUR/TEAL (HALOGEN FREE) |
| CONDUCTOR INSULATION MATERIAL | PE |
| NUMBER OF CONDUCTORS [AWG] | 8 × 26 AWG, STRANDED, CAT 5e |
| SHIELDING | TINNED-COPPER BRAID |
| TEMPERATURE RANGE | −40° C. TO +50° C. (−40° F. TO +122° F.) |
| PROTECTION CLASS | IEC IP20 |

| TOLERANCE | |
|---|---|
| CABLE LENGTH | |
| ALL LENGTHS | +4% (OR 50 mm) OF LENGTH −0% (OR 0 mm) OF LENGTH WHICHEVER IS GREATER |
| STRIP LENGTH | |
| 0-7 mm | ±0.5 mm |
| 8-29 mm | ±1.0 mm |
| 30-49 mm | ±2.0 mm |
| 50-69 mm | ±3.0 mm |
| 70-100 mm | ±4.0 mm |
| OVER 100 mm | ±5.0 mm |
| OVER 100 mm | |

As explained above, numerous types of depths and other dimensional measurements may be made using the measurement apparatuses of the disclosed embodiments. This flexibility is attributable primarily to the measurement apparatuses using the same or essentially the same signal processing operations for each type of depth measurement. These operations mainly involve counting or otherwise keeping track of the number of graduations or divisions (or tick marks) on a linear scale or strip, or possibly a quadrature or rotary scale depending on the implementation, that are displaced when a probe or a measurement apparatus passes into or out of a hole or opening being measured. These graduations or divisions, as described earlier, are uniformly spaced at known, predefined intervals (e.g., a few microns) to allow extremely accurate distance or length measurements for most applications. The measurement apparatuses thereafter calculate or otherwise convert the number of graduations or divisions that are displaced by the movement of a probe into a value that corresponds to the depth of the hole or opening being measured.

The displacement value used by the measurement apparatuses to calculate the depth values may represent displacement in one direction, typically into the hole or opening being measured, or out of the hole or opening being measured, depending on the type of depth measurement made. It is also possible, however, for the measurement apparatuses to use a net total displacement value, that is, the displacement in one direction (e.g., into the hole being measured) minus the displacement in the other direction (e.g., out of the hole being measured). These various measurement operations may be performed by the digital circuit or control card (or board) within the measurement apparatuses, such as the card 125 or 150 discussed above. In some implementations, however, it may be desirable to configure the digital circuit or control card 125 or 150 to simply acquire or otherwise count the number of graduations or divisions that have been displaced, then transmit that information to an external application for performing the depth value calculations.

Figure 50:
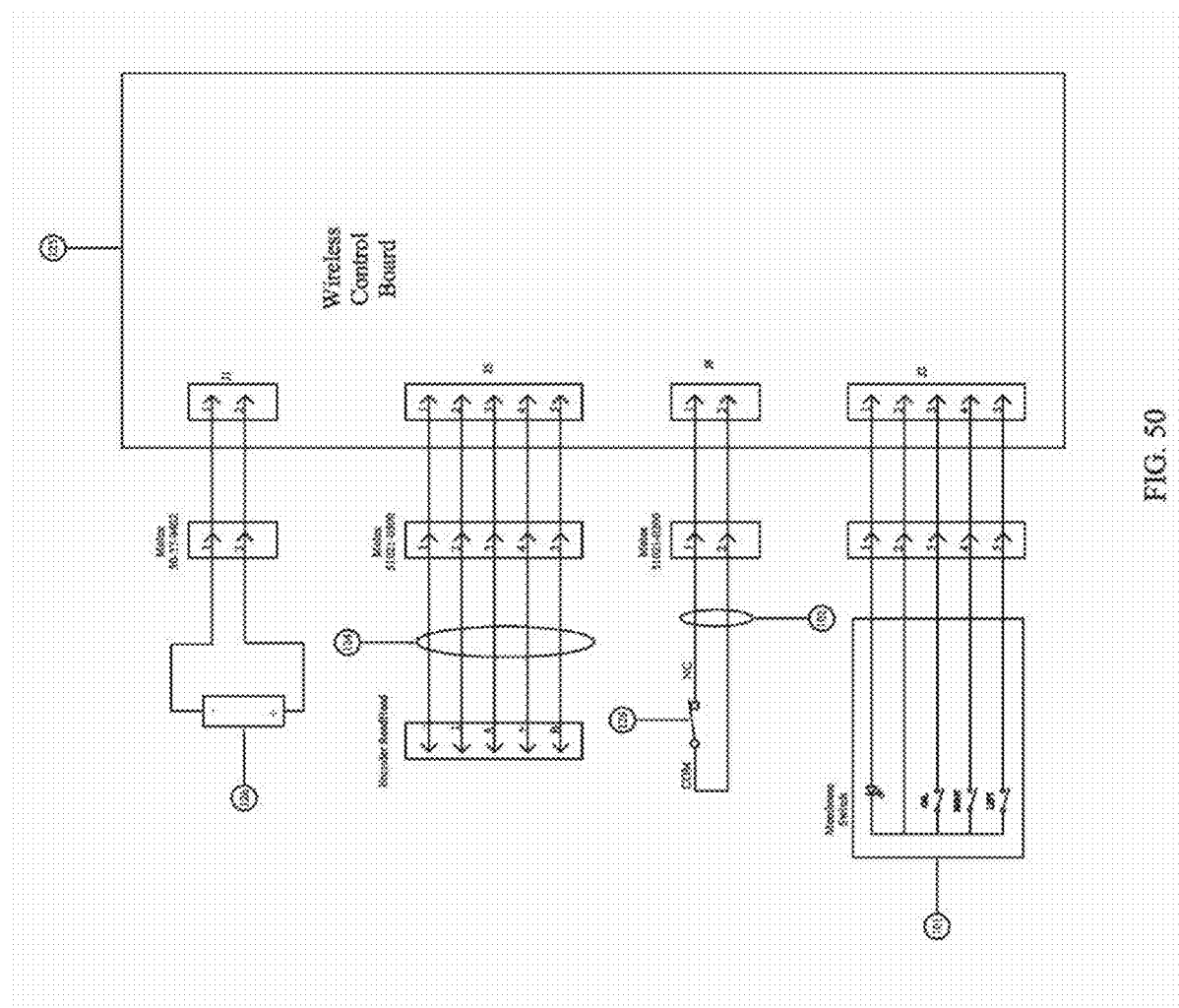
FIG. 50 is an illustration of a schematic diagram of a wireless version of digital circuit or control card of the measurement apparatus of the invention.
Figure 51:
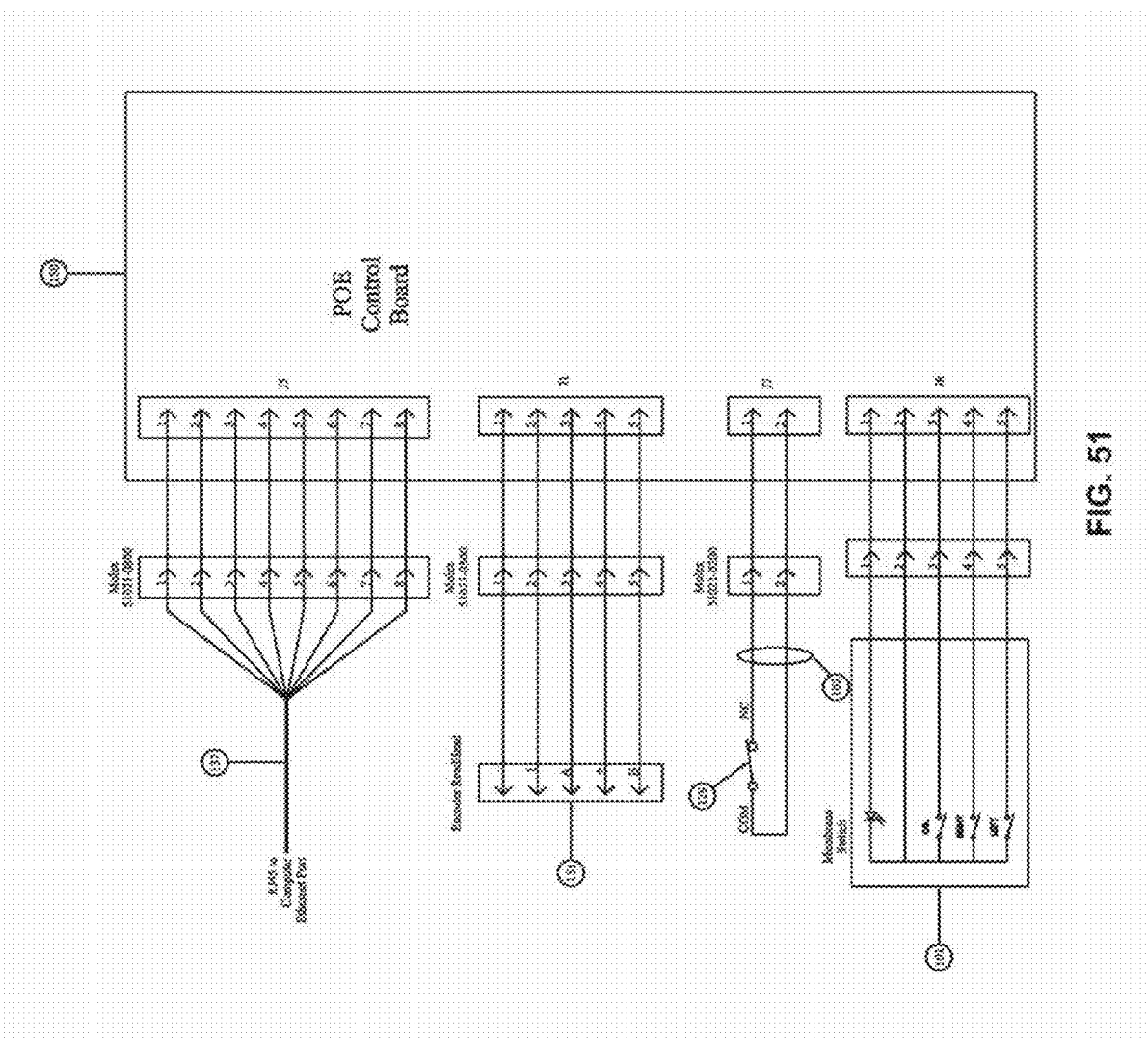
FIG. 51 is an illustration of a schematic diagram of a Power-over-Ethernet (POE) version of a digital circuit or control card of the measurement apparatus of the invention (i.e. not wireless).

FIG. 50 shows an example of how the digital circuit or control card 125 (i.e., the card with wireless communication capability) may be electrically connected to a measurement apparatus according to the disclosed embodiments. As can be seen, various cables, wires, and/or bundles thereof from other components of the measurement apparatus may be routed to the digital circuit or control card 125 where connectors electrically couple these components to the card 125. These connectors, shown in more detail later herein, may be standard or commonly used wire-to-board connectors well known to those having ordinary skill in the art. FIG. 51, similarly depicts an example of the digital circuit or control card 150 (i.e., the card with wired communication capability) being electrically connected to a measurement apparatus according to the disclosed embodiments.

Although they are designed to be used in different ways, both the digital circuit or control cards 125 and 150, as well as other control cards that may be used with the measurement apparatuses discussed herein, have a number of common features or functional components. These functional components may be seen in FIG. 52, which illustrates an example of a control board 200 like the control cards 125 and 150 in terms of the main functionality provided by the board. As can be seen, the control board 200 may include a controller module 202, a DC power supply module 204, one or more internal system interfaces 206, an optical decoder 208, one or more human operator interfaces 210, and one or more external system interfaces 212. Also shown for reference purposes are one or more internal system components of the measurement apparatuses, denoted generally at 214, that may be electrically connected to the control board 200, as well as one or more external computer systems, denoted generally at 216, that may be communicatively coupled to the measurement apparatuses.

Figure 52:
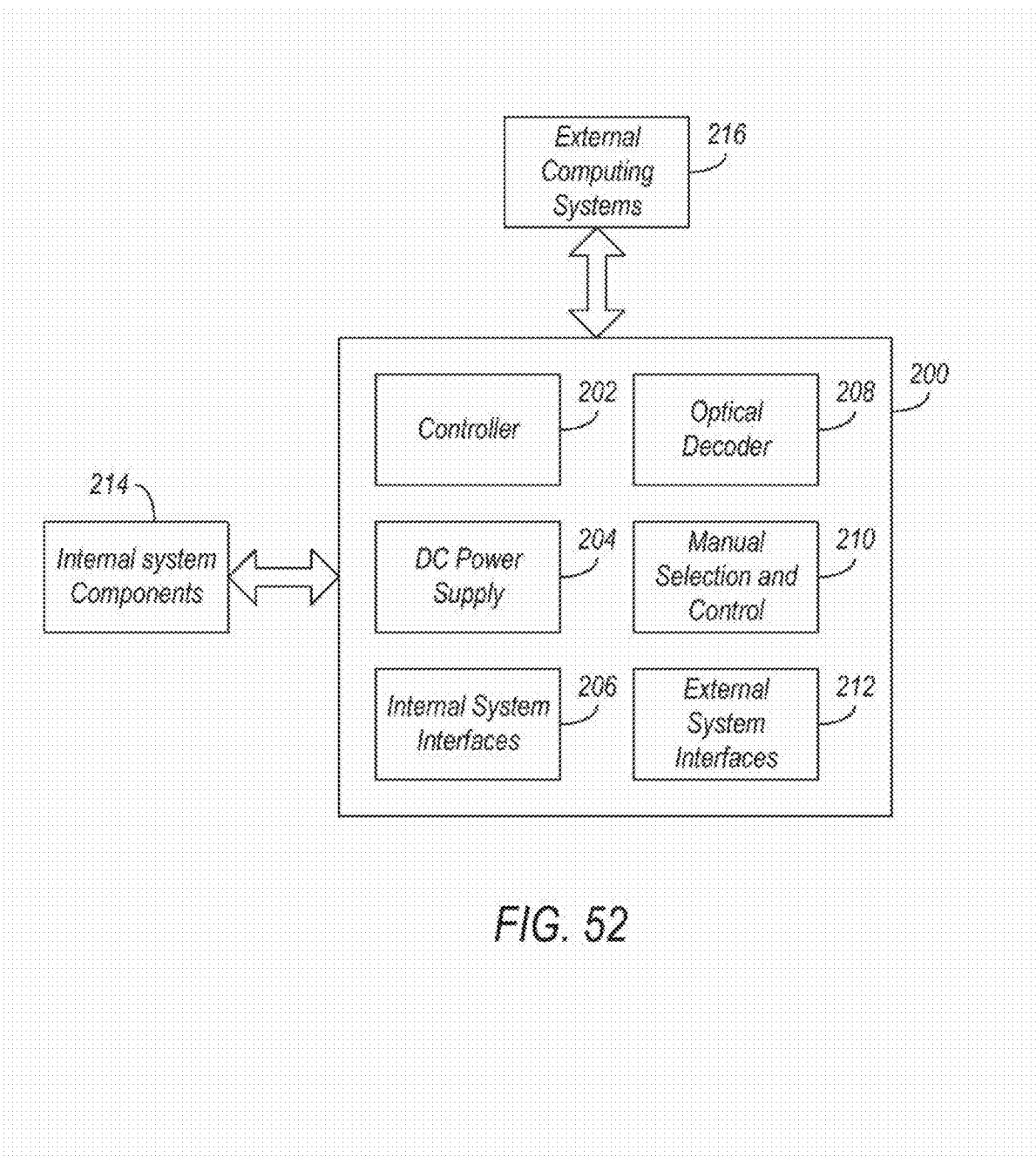
FIG. 52 is an illustration of a functional block diagram of a wired or wireless digital circuit or control card of the measurement apparatus of the invention.

It should be noted that although the functional components in FIG. 52 are illustrated as individual blocks, those having ordinary skill in the art will understand that any individual block may be divided into several constituent blocks, each representing one or more functional sub-components, without departing from the disclosed embodiments. In addition, any two or more of the blocks shown, and possibly all of the blocks shown in some implementations, may be combined into a single super block representing a highly integrated functional component, without departing from the scope of the disclosed embodiments. Moreover, other blocks representing other functional components besides the blocks shown may be added to the controller module board 200 as needed, or one or more of the blocks shown may be removed from the controller module board 200 as needed, without departing from the scope of the disclosed embodiments. Each of the functional components is discussed in more detail below.

In general, the controller module 202 provides overall control of the operation of the measurement apparatuses. The main responsibility of the controller module 202 is reading or otherwise acquiring the number of displaced graduations or divisions for a given depth measurement, then calculating depth values based on the number of displaced graduations or divisions. In addition, the controller module 202 monitors and processes various inputs received by the control board 200, both from the internal system components 214 as well as the external computer systems 216. The controller module 202 also controls the transmission of certain data, such as the depth values that have been calculated and, optionally, the date and/or time information therefor, to and from the external computer systems 216. Conversely, the controller module 202 may called upon to execute or carry out any commands or instructions it receives from the external computer systems 216, including calibration commands, keypad or control key assignment definitions, and the like. The controller module 202 may also need to generate various outputs for the measurement apparatuses, including status indicators, warnings or alarms signals, and the like. An exemplary computer program listing reflecting one specific implementation of the controller module 202 is provided herewith as a computer program listing appendix, which is hereby incorporated herein by reference in its entirety.

The DC (direct current) power supply module 204, as the label suggests, provides power to the various components of the control board 200. In general, the power supply module 204 receives power from a power source and, depending on the particular implementation, provides that power at multiple different voltage levels to the various components. For example, some components on the control board 200 may require a 5 volt (V) DC power supply, other components may require a 3.3 V DC power supply, while still other components may require a 1.5 V DC power supply, and so forth. The DC power supply module 204 is therefore responsible for converting (e.g., by either stepping down or stepping up) the input voltage it receives to one or more voltage levels required by the various components of the control board 200. Multiple conversion stages may be needed, depending on the requirements of the particular implementation. The power source that feeds the power supply module 204 may be an external power source, such as an AC power line, or it may be an internal power source, such as a battery, battery pack, backup battery, and the like, attached to or residing within the measurement apparatuses or on the control board 200. In alternative embodiments, power may be fed to the power supply module 204 over an Ethernet connection using the Power-Over-Ethernet (POE) protocol, or other similar protocols where power is transmitted over a data line.

The internal system interfaces 206 generally provide a way for the control board 200 to communicate with one or more internal system components 214 of the measurement apparatuses. In some implementations, the internal system interfaces 206 may take the form of one or more connectors, jumpers, sockets, and the like, or various combinations thereof. Electrical wires, traces, lines, and other pathways may be provided to carry electrically signals to/from the internal system components 214 from/to these internal system interfaces 206 and, hence, to the control board 200 for processing.

The optical decoder 208 processes input, typically (but not necessarily) electrical pulses, representing the graduations or divisions that are received by the control board 200. These electrical pulses or other input may be provided by a separate optical encoder as discussed above, including the optical encoder 124 shown in FIG. 40B. Such optical encoders are well known in the art and are capable of optically detecting the presence of a graduation or division, or the passing of one, and generating an output representing that graduation or division. Generally speaking, the optical decoder 208 is designed to output one or more signals corresponding to the electrical pulses or other input received from the optical encoder, but having the appropriate voltage levels, shape, and timing needed by the controller module 202. This allows the controller module 202 to focus its processing capacity on counting or tracking how many graduations or divisions were displaced using the signals from the optical decoder 208. However, depending on the particular embodiment, a discrete decoder 208 may not be needed, as the controller module 202 may be capable of performing (i.e., may have sufficient processing power to perform) this function. And while an optical encoder is the one mainly discussed herein, it may be desirable in some implementations to use a magnetic encoder instead.

The operator interface 210 functions mainly to receive input from and provide output to a human operator. To this end, the operator interface 210 may take the form of one or more mechanical and/or solid state switches, relays, contacts, drivers, and the like, or various combinations thereof. This allows the human operator to interact with and otherwise use the measurement apparatuses, including initiating calibration, taking a depth measurement, selecting an operational mode, and so forth, by actuating a trigger, pressing a button, scrolling a wheel, touching a touchscreen, and the like. When the human operator performs one or more of these tasks, the operator interface 210 conveys a signal corresponding to the performed task to the controller module 202 of the control board 200. The operator interface 210 may also facilitate one or more signals from the controller module 202 to external indicators for indicating (e.g., via light emitting diodes (LEDs)) or otherwise displaying (e.g., via a liquid crystal or other type of display) the status of the measurement apparatuses, depth values that were measured panel, as well as various warning and/or alert messages.

As for the external system interfaces 212, these interfaces allow the control board 200 to communicate with the external computer systems 216. Such communication may take place wirelessly using, for example, ZygBee, Bluetooth, Wi-Fi, WPAN (Wireless Personal Area Network), and other IEEE 802 compatible wireless protocols. The communication may also occur over wired connections using, for example, Ethernet, USB (Universal Serial Bus), RS-232 (serial communication), FireWire, or other wired communication protocols. The specific communication protocol used, however, is not functionally important for successful implementation of the measurement apparatuses disclosed herein, as the decision regarding a particular protocol may be informed by other factors and is not strictly limited to functionality. The external system interfaces 212 may be implemented using one or more dedicated modules that are designed to carry out the particular communication protocol adopted. In some embodiments, however, the functionality of the external system interfaces 212 may be partially or entirely incorporated into the controller module 202.

The above embodiments of the control board 200 provides a number of advantages. In addition to automatically, accurately, and quickly taking a depth measurement, the control board 200 allows the measurement apparatuses to make various different types of depth measurements without altering or making any changes to the control board 200. These different types of depth measurements may include, for example, retraction type grip gage, plunger type grip gage, step gage, gap gage, countersink depth gage, fastener flushness gage, diameter gage, and other depth measurements known to those having ordinary skill in the art. The specific type of depth measurement may be made simply by attaching an appropriate probe selected from a plurality of probes designed for that type of depth measurement. The overall method of calculating the depth values, however, does not need to be changed with each different type of depth measurement. This overall method is discussed in further details below in the form of one or more flowcharts.

Figure 53:
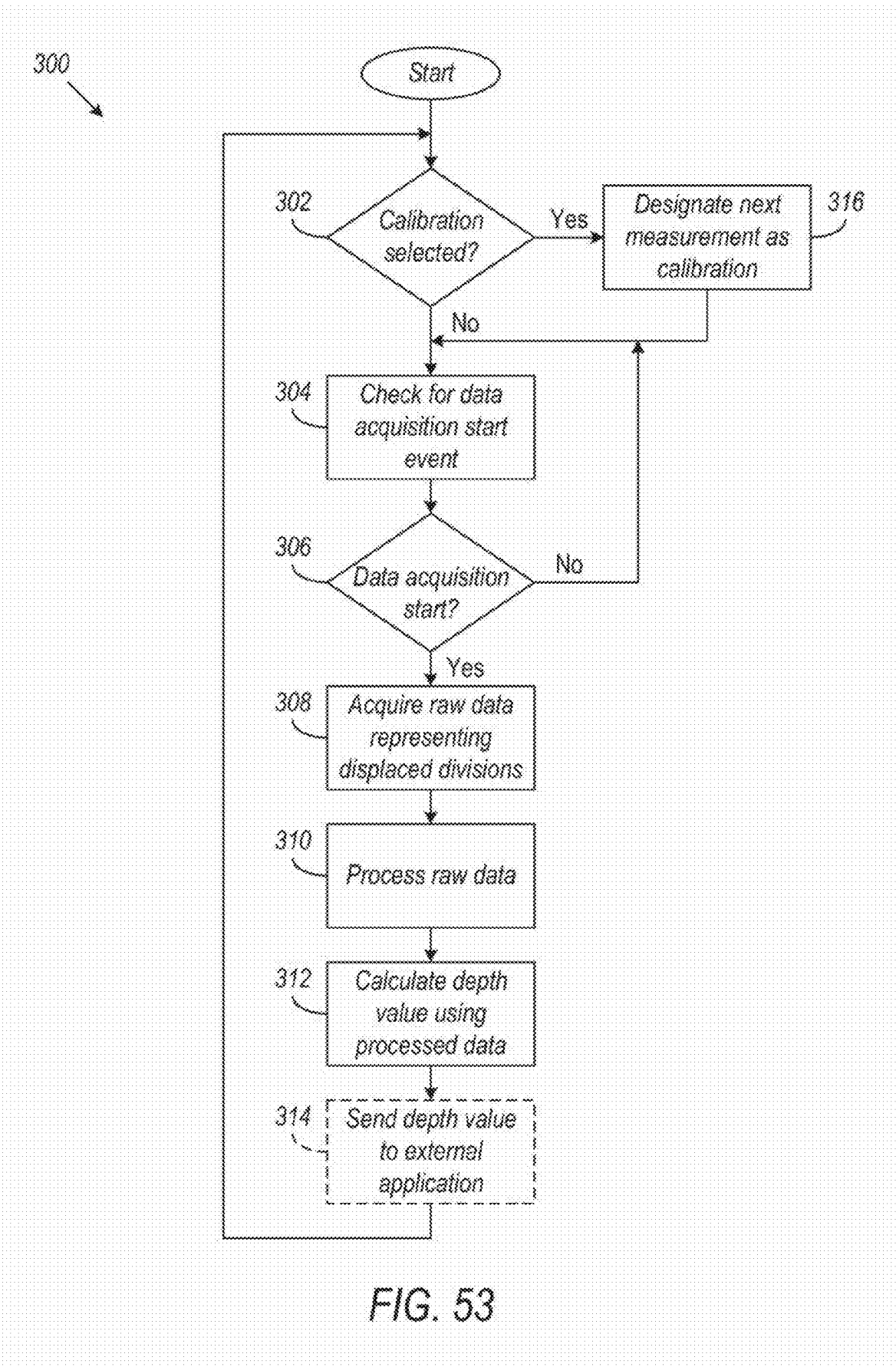
FIG. 53 is an illustration of a flowchart for a wired or wireless digital circuit or control card of the measurement apparatus of the invention.

Referring now to FIG. 53, a flowchart 300 is shown representing one exemplary method of taking a depth measurement that may be performed by the measurement apparatuses. It should be noted that the steps of the flowchart 300, like the functional components of FIG. 52, are shown in discrete blocks. As such, those having ordinary skill in the art will understand that two or more blocks may be combined into a single block, and that any individual block may be divided into several constituent blocks, without departing from the disclosed embodiments. And although the blocks of the flowchart have been arranged in a particular sequence, those having ordinary skill in the art will understand that one or more blocks may be rearranged in a different sequence within the flowchart without departing from the scope of the disclosed embodiments.

As can be seen, the flowchart 300 begins generally at block 302, where a determination is made whether calibration has been selected on the measurement apparatuses. Such calibration may be selected manually by a human operator by manipulating an appropriate control, such as by pressing a calibration key, button, or switch on the measurement apparatuses. In addition, or alternatively, calibration may be automatically selected by a software application running on an external computer system connected to the measurement apparatuses. In either case, if the answer at block 302 is no, then the flowchart 300 proceeds to block 304 where a check is made to see whether a data acquisition start event, such as a trigger being actuated, has occurred. At block 306, a determination is made as to whether the data acquisition start event has occurred. If the answer at block 306 is no, then the flowchart 300 returns to the previous step and performs another check.

If the answer at block 306 is yes, then the flowchart 300 proceeds to block 308, where raw data representing the number of displaced graduations or divisions is acquired. As mentioned above, this data may be obtained in one exemplary implementation by using an optical encoder to optically or magnetically detect graduations or divisions passing by the encoder (the movement of the measurement apparatus probe into or out of the hole being measured drives the linear scale or strip and hence the graduations or divisions thereon). In an alternative implementation, where a linear scale or strip is used (as opposed to a rotary scale), it is possible to secure the linear strip in place while moving the optical encoder with the measurement apparatus probe. The output of the optical encoder in either case may then be processed by an optical decoder to generate one or more output signals representing the graduations or divisions that were displaced during the movement of the probe.

The flowchart 300 thereafter proceeds to block 310, where the raw data representing the displaced graduations or divisions is processed. This processing may involve, for example, counting or otherwise tracking the number of graduations or divisions that were displaced. In some implementations, the counting may be performed for a preset time interval that is sufficiently long to ensure that the probe has been returned to its starting position and thus no additional graduations or divisions may be expected. In other implementations, rather than using a preset time interval, the counting may be performed until no additional graduations or divisions are counted (i.e., the counter is not incremented) for predefined amount of time. Such counting may occur in both an increasing direction as well as a decreasing direction, or a combination of both, depending on the particular implementation.

Once the counting has stopped, the count of the graduations or divisions that have been displaced is used to calculate a depth value at block 312. In one embodiment, the depth value may be calculated by multiplying the displaced graduations or divisions by the predefined interval between each graduation or division. In the case of a linear interval, no additional calculations are necessary to determine the depth value. In the case of an angular interval, where a rotary scale is used, the angular value may be converted to a linear value using mathematical techniques known to those having ordinary skill in the art. As an optional step, the calculated depth value may be transmitted to an external application on an external computer system to be used as needed at block 314. Such external transmission may be initiated automatically by the measurement apparatuses as soon as the depth value calculations are completed, or it may be initiated manually by a human operator. In the latter case, if the human operator does not feel like the depth value was measured or taken properly for some reason, or if the depth value displayed by the measurement apparatuses is obviously in error, he or she may decline to forward such value to the external application.

Referring back to block 302, if the answer here is yes, then at block 316, an indicator or other signal is provided to indicate that the next depth measurement taken is to be designated as a calibration measurement. The calibration measurement itself, however, proceeds as described above with respect to blocks 304-314, except that the measurement is performed on a calibration disk or puck 105 (FIG. 39). As explained earlier, the calibration disk or puck 105 is placed against the probe of the measurement apparatus so that the foot thereof rests on the reference plane or surface of the calibration device or disk, and a measurement is taken with the probe thus arranged. The depth value measured is then subtracted from (or added to) all subsequent depth measurements during the depth value calculation block 312.

In the above implementation, calibration and the subsequent use of the calibration measurement to adjust subsequent depth values may occur locally within the measurement apparatuses. In some implementations, however, rather than perform the adjustment of subsequent measurements locally within the measurement apparatuses, the calibration value may be sent to an external computer system connected to the measurement apparatuses where an external application may perform the adjustments. If a measurement apparatus is disconnected from the external computer system and moved to another external computer system, then calibration will need to be repeated for the second external computer system.

Figure 54:
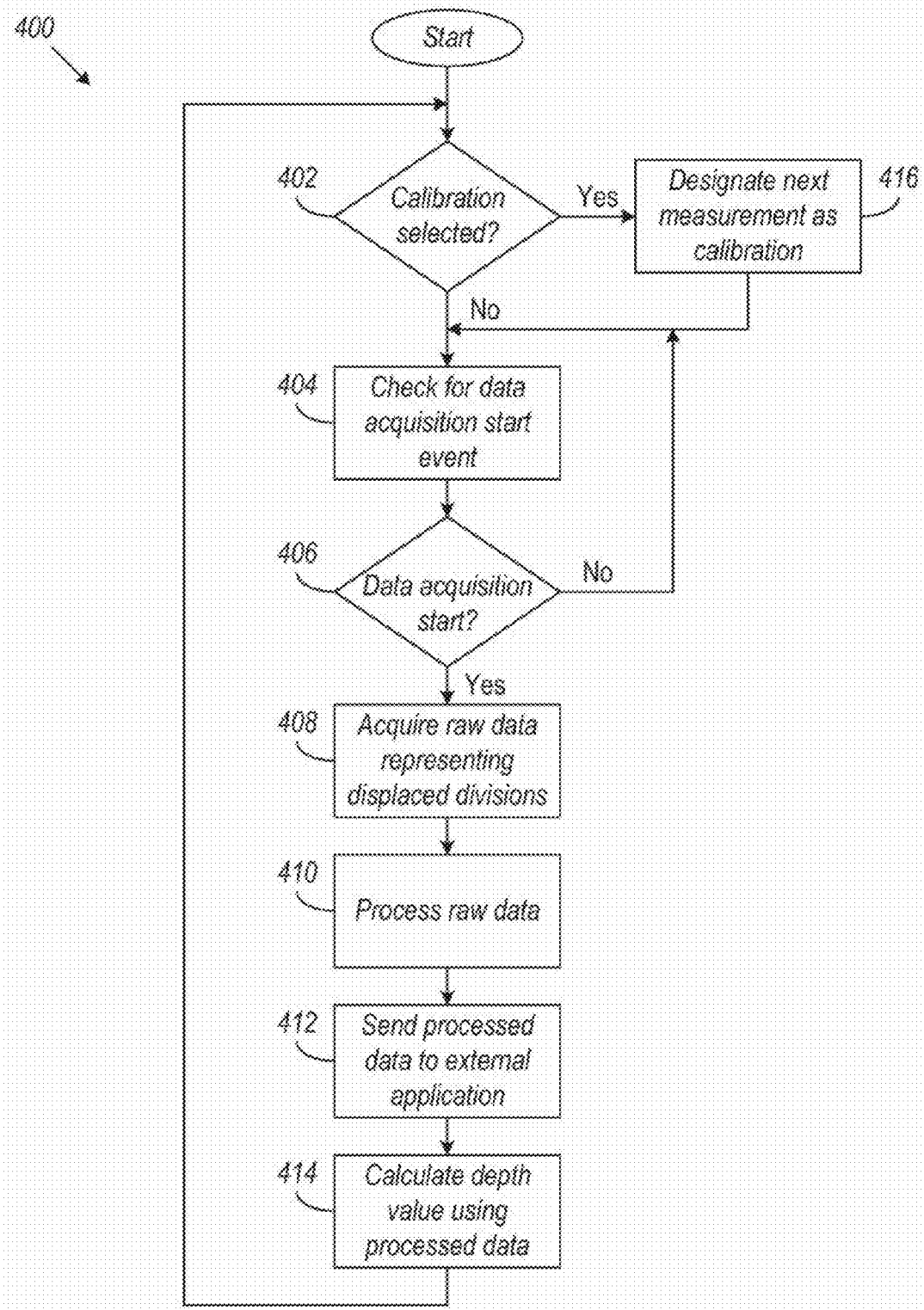
FIG. 54 is an illustration of another flowchart for a wired or wireless digital circuit or control card of the measurement apparatus of the invention.

In some arrangements, the depth value calculations themselves may also be performed by the external application on the external computer system rather than locally. An example of such an arrangement is illustrated in FIG. 54 via a flowchart 400. As can be seen, the flowchart 400 is otherwise similar to the flowchart 300 of FIG. 53, except that after the raw data representing displaced graduations or divisions is processed at block 410, the processed data is sent to the external application at block 412. Both the depth value calculations and any calibrations are then performed by the external application at block 414.

Figure 56A:
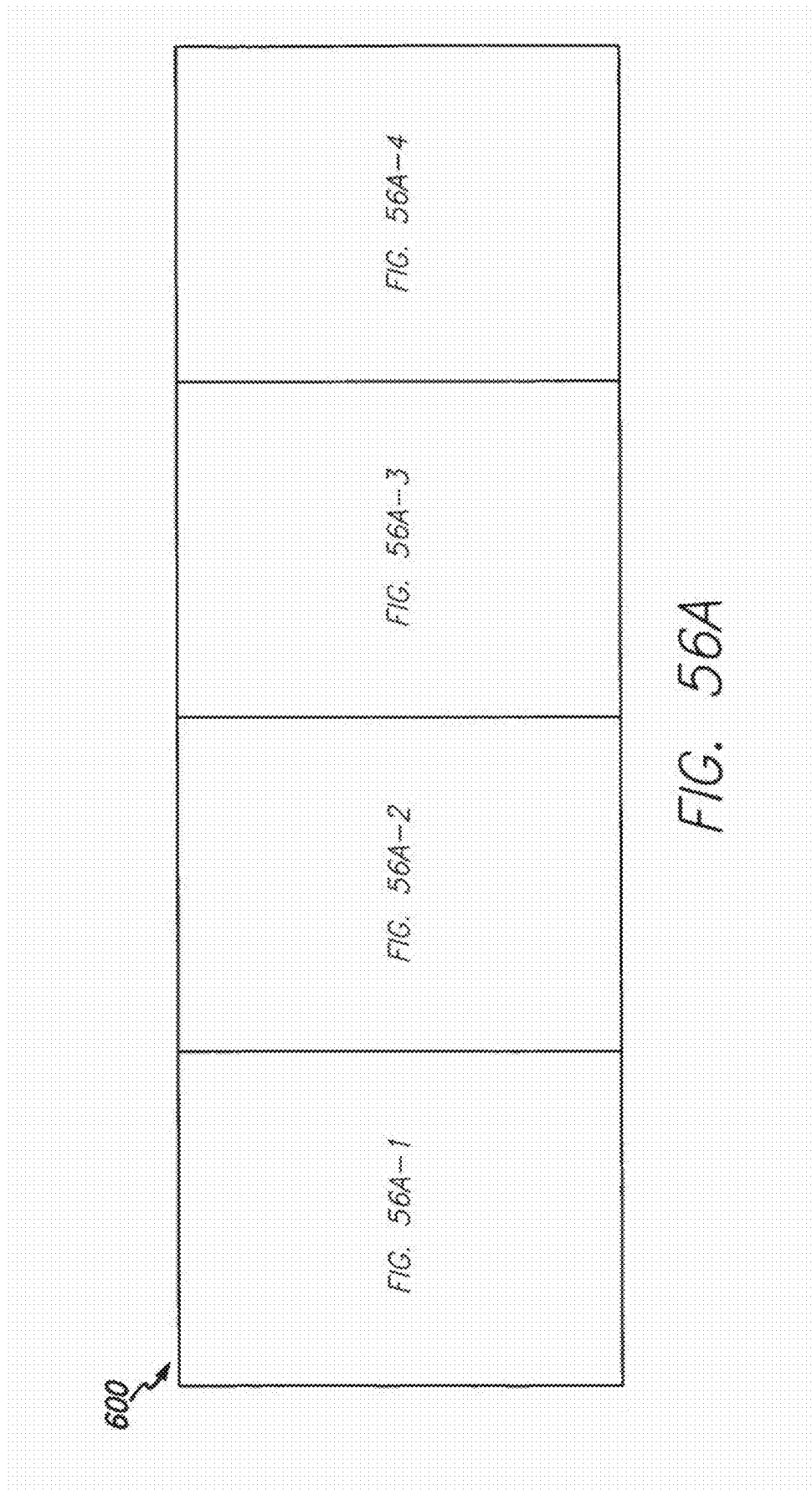
FIGS. 56A and 56B are schematic illustrations of a digital circuit card that may be used in wired (POE or power over Ethernet) measuring apparatuses of the invention, and may be used to process data and/or information procured from one or a plurality of measurements or other activities and transmit them to one or a plurality of computers and/or data collection devices for recording, storage, manipulation and/or some other type of a use.
Figures 1, 56A:
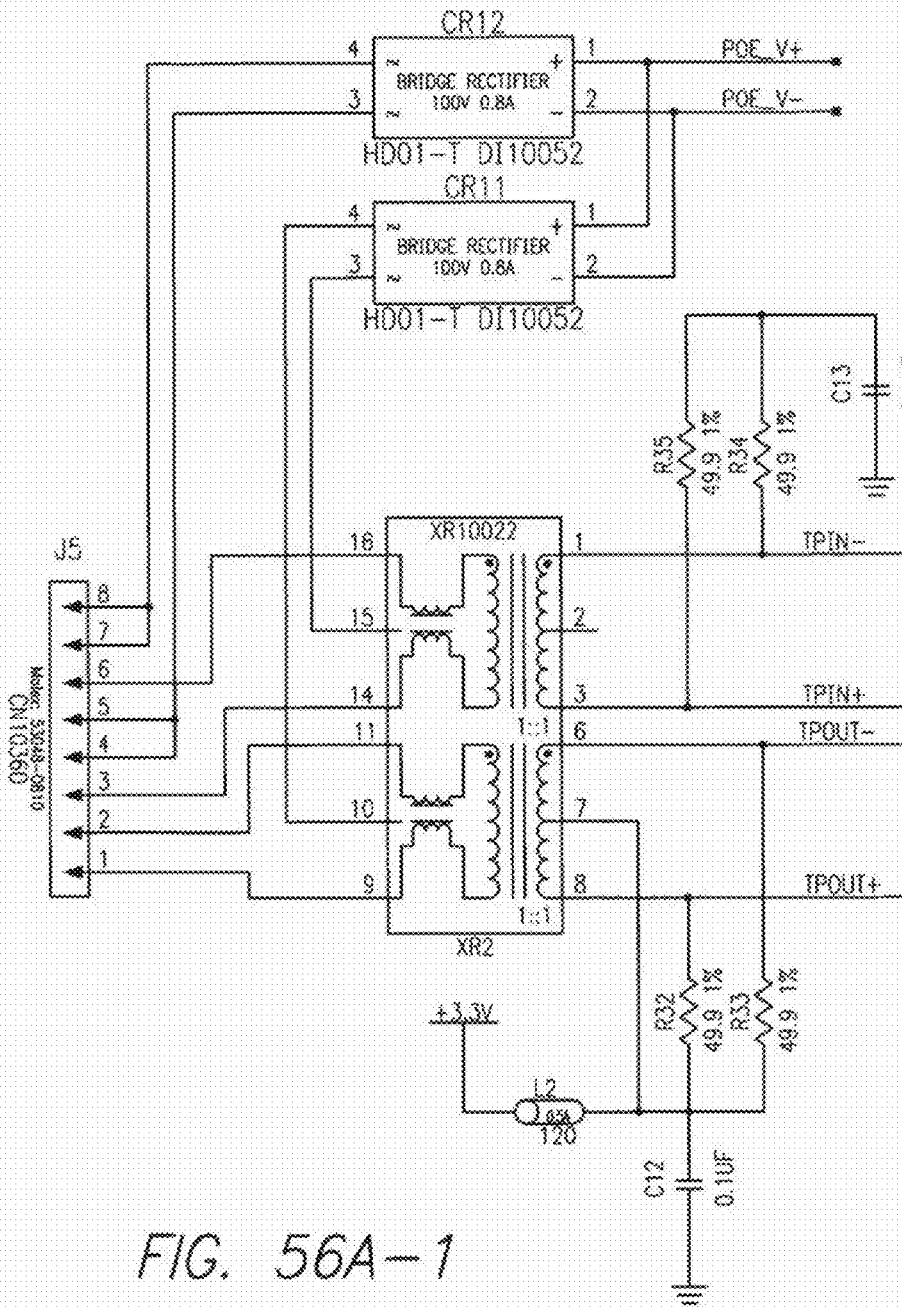
Figures 2, 56A:
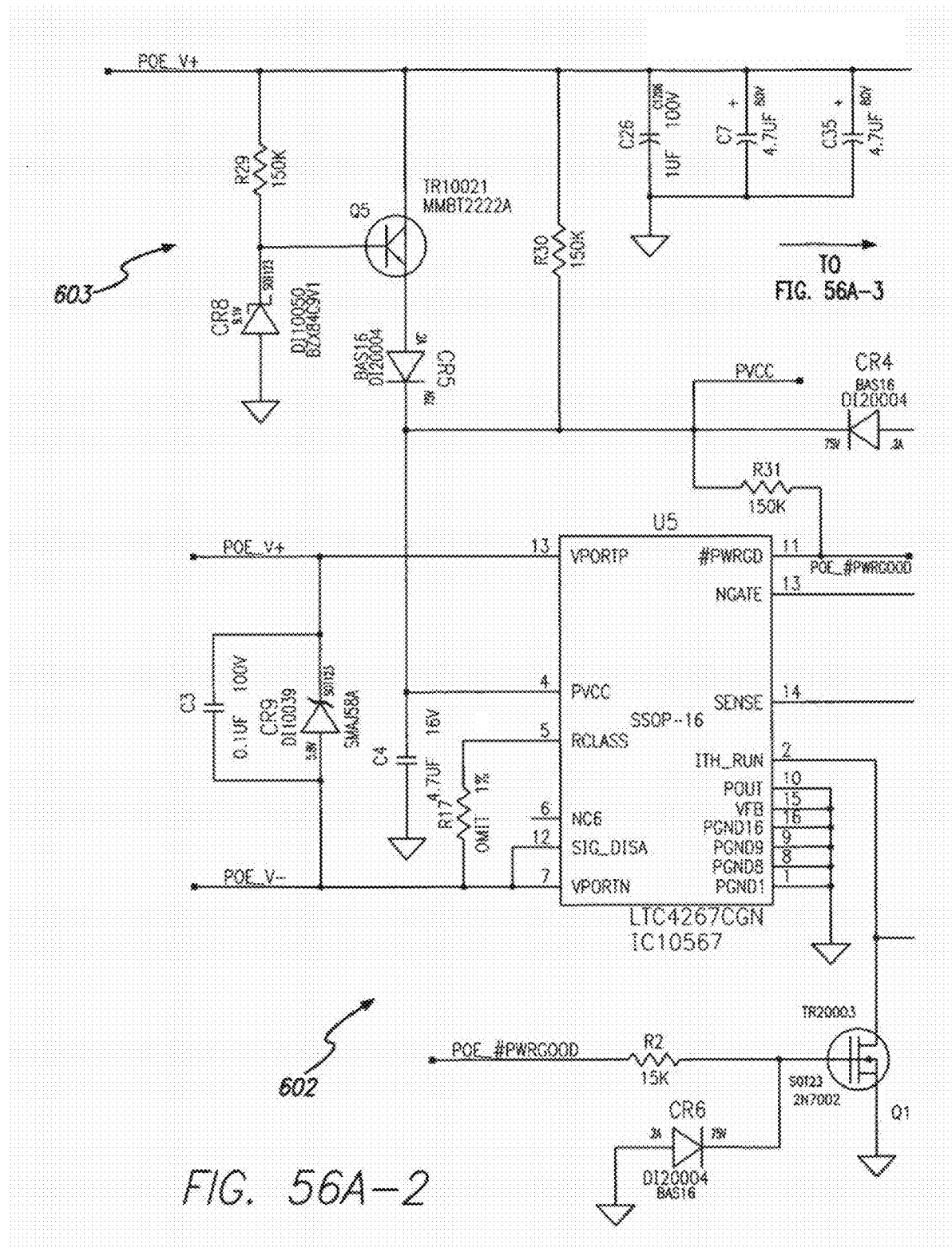
Figures 3, 56A:
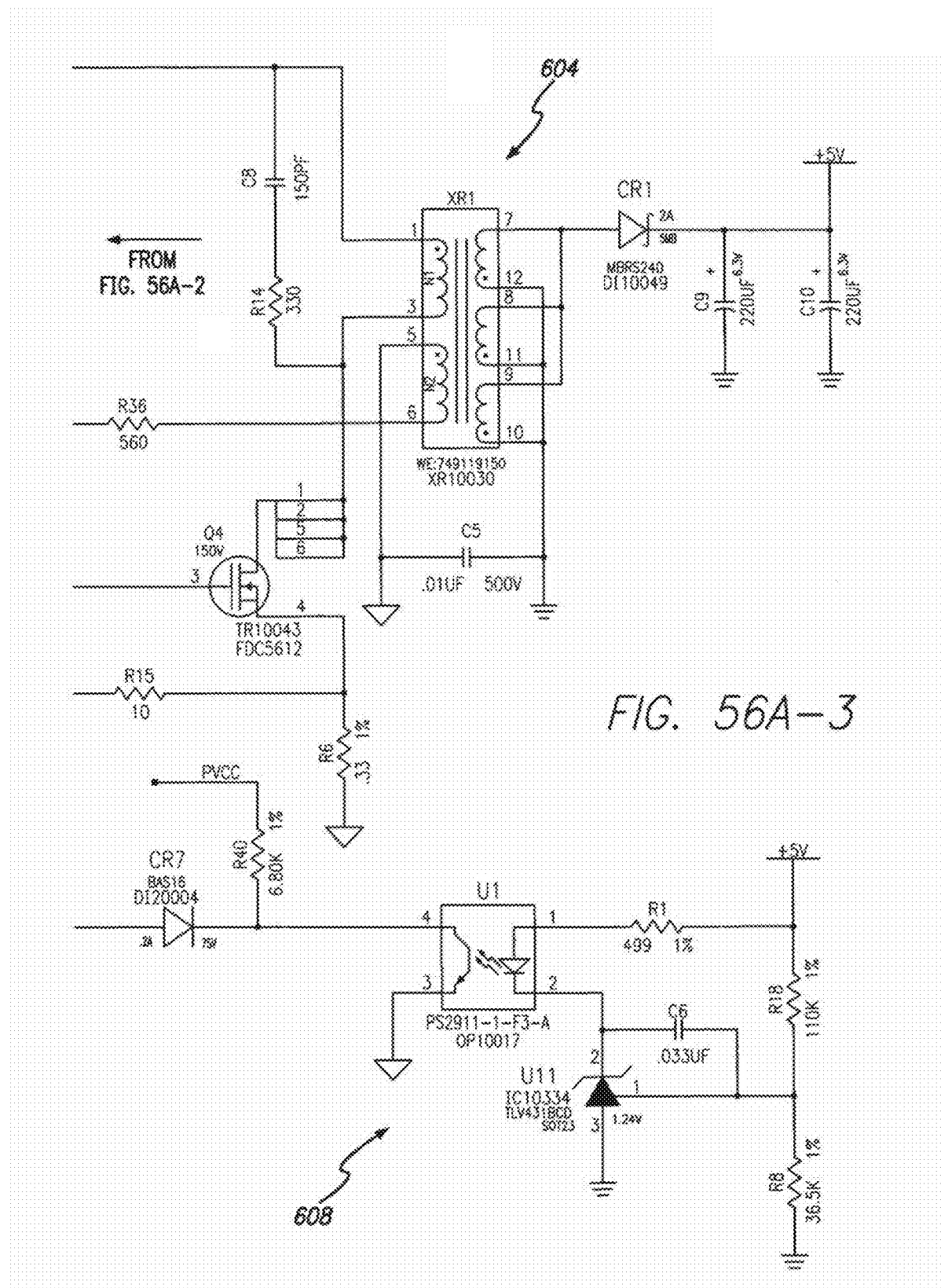
Figures 4, 56A:
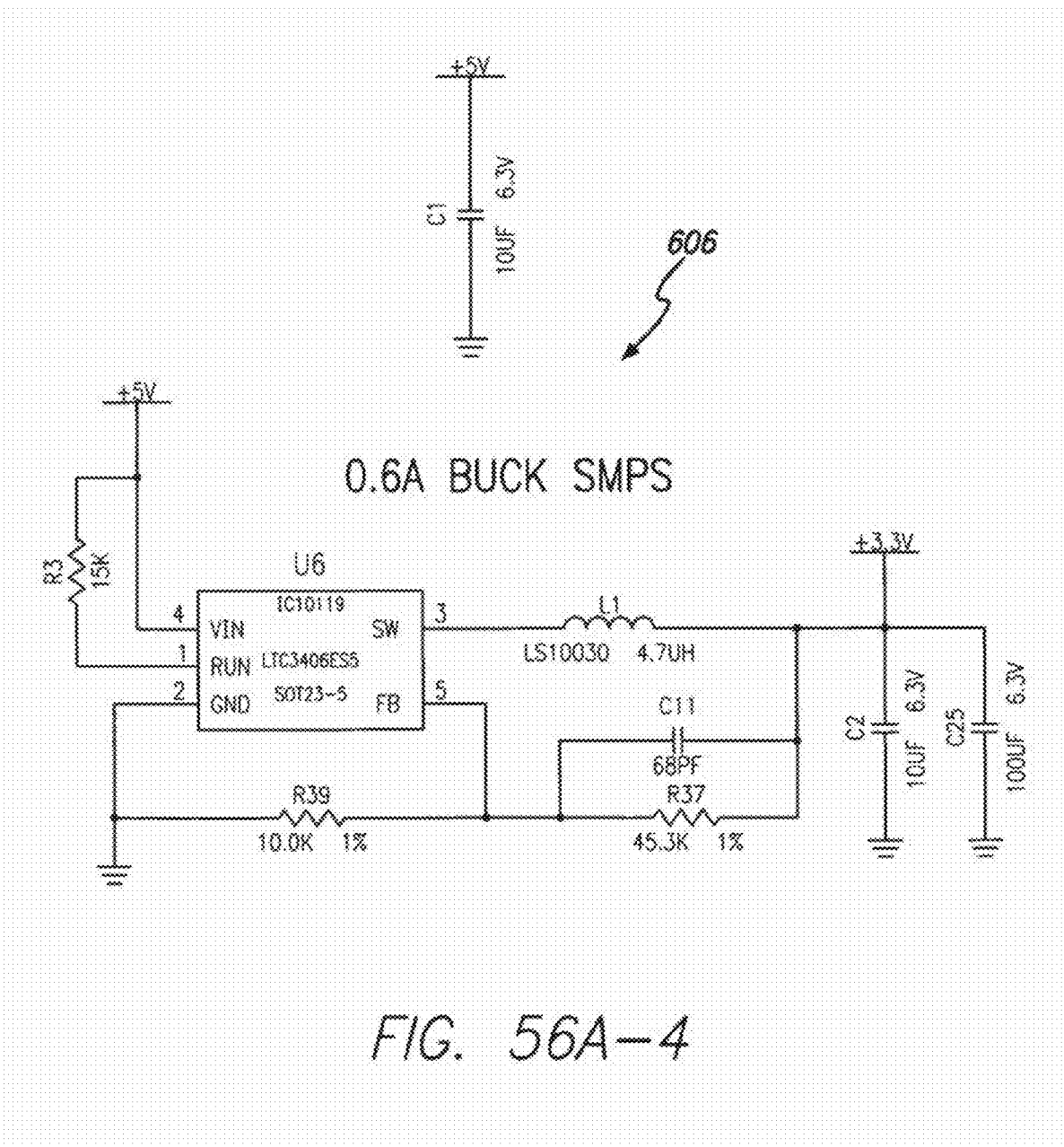

Turning now to FIGS. 55A-55C and FIGS. 56A-56B, exemplary implementations of the control board discussed above are shown in the form of circuit diagrams. As can be seen, the circuit diagrams depict specific electrical components, including transformers, transistors, diodes, capacitors, conductors, resistors, and integrated circuits electrically connected together, typically on a printed circuit board. However, not all of these components may be needed for every implementation, and/or alternative components may be substituted in some cases. A listing of exemplary manufacturers, part numbers, and component values (where applicable) for each component is provided in Table 1 (FIGS. 55A-55C) and Table 2 (FIGS. 56A-56B) below. Those having ordinary skill in the art may obtain a detailed understanding of the operation of the circuit diagrams by considering the component information in Tables 1 and 2 in view of the connections shown in the FIGS. 55A-55C and 56A-56B. Accordingly, only a high-level description of the functionality embodied by the circuit diagrams is offered herein. Also, to better view the circuit diagrams, most of the FIGS. 55A-55C and 56A-56B have been spread over two pages, so that FIG. 55A actually refers to FIGS. 55A-1 and 55A-2. FIG. 56A actually refers to FIGS. 56A-1 and 56A-2, and so forth.

Referring first to FIGS. 55A-55C, an exemplary implementation of a control board 500 for the measurement apparatuses that uses wireless communication to connect to an external computer system is shown. This implementation of the control board 500, which may correspond to the wireless digital circuit or control card 125, derives operational power from a battery and thus several circuits relating to battery power management and charging are shown. As can be seen in FIG. 55A, the exemplary control board 500 may include a USB input circuit shown generally at 502, which may include a standard USB connector, for allowing the control board 500 to communicate with an external computer system over a USB cable. The USB input circuit 502 may also be used to charge the battery of the control board 500 via the USB cable. The battery, although not expressly shown here, may be a battery similar to the lithium ion battery mentioned earlier. This lithium ion battery may be configured as needed to provide approximately 3.3 V DC, denoted as BBVCC, to the control board 500. Charging of the battery may then be accomplished through a battery charging circuit shown generally at 504, which may include a battery charger/USB power manager, Part No. LTC4088 from Linear Technology Corp., for managing the charging the battery. A current monitoring circuit denoted generally at 506 may also be provided, including a battery gas gauge. Part No. LTC2942CDCB from Linear Technology Corp., for monitoring the amount of current flowing into and out of the battery. A buffer circuit 508, including a voltage translator, Part No. PCA9306DCUR from Texas Instruments, Inc. may be provided to convert the output voltage of the current monitoring circuit 506 to a level that may be usable by the microcontroller (shown in FIG. 55B) of the control board 500.

In the exemplary control board 500, some of the circuits and/or components may require more than 3.3 V DC, depending on the particular components used in the measurement apparatuses. For example, the optical encoder used in the present implementation, which is a transmissive optical encoder, Part No. EM-1-500 from US Digital, requires a 5 V DC power supply. Accordingly, where needed, a power supply boost circuit 510 may be provided, including a switching DC-DC converter and controller, Part No. LT3495EDDB from Linear Technology Corp., for raising the 3.3 V DC power supply to a 5 V DC power supply. A comparator circuit 512 may additionally be provided to monitor and verify that the 5 V DC power supply is being adequately maintained. For similar reasons, a regulator for the 3.3 V DC power supply may also be provided, generally designated as 514, including voltage regulator Part No. MCP1700 from Microchip Technology. Inc., to maintain a steady 3.3V DC power supply for other components on the control board 500.

As mentioned above, the USB input circuit 502 allows the control board 500 to connect to and communicate with an external computer system. Such communication may be accomplished, for example, using a USB communication circuit 516, including a USB transceiver, Part No. QFN-28 from Silicon Laboratories. Inc., for converting data to/from a USB format from/to a UART (Universal Asynchronous Receiver/Transmitter) format. Because the USB communication circuit 516 is only needed when the control board 500 is connected to an external computer system, power for the USB communication circuit 518 may be derived over the USB cable from the external computer system. As such, a USB voltage regulator circuit 518 may be provided, including a voltage level translator, Part No. SN74LVCIT45 from Texas Instruments, Inc., to bring the voltage from the external computer system down to the level required by the USB communication circuit 516, which is 3.3 V in the present instance.

A remote directional key input circuit 520 and a remote function key input circuit 522, including standard or commonly used wire-to-board connectors, may also be provided for allowing remotely generated directional key inputs and function key inputs to be conveyed to the control board 500 from, for example, an external application. The assignment or functionality associated with the directional keys and function keys may be defined as needed to allow an external application to interact with the measurement apparatuses.

Turning now to FIG. 55B, a controller circuit 524, including a microcontroller, Part No. ATmega128RFA1 from Atmel Corporation, having IEEE 802.15.4 (WPAN) compliant wireless transmission capability, functions as the controller for the control board 500. This controller circuit 524 manages the overall operation of the control board 500, including performing the depth value calculations, as well as communicating with an external application running on an external computer system. An exemplary computer program listing for the microcontroller of the controller circuit 524 is provided herewith as a computer program listing appendix, which is hereby incorporated herein by reference in its entirety.

A reset circuit 526 may be provided, including a reset watchdog timer, Part No. STM6822ZWY6F from STMicroelectronics, that operates to reset the microcontroller of the controller circuit 524 in the event of a malfunction (e.g., an invalid or inadequate power supply). A reset enable circuit 528 enables the reset watchdog circuit 526. A heartbeat circuit 530 may also be provided in some cases for debugging purposes. Radio frequency (RF) transmission circuit 532 allows the control board 500 to send/receive data wirelessly to/from an external computer system.

An optical decoder circuit 534, including a quadrature clock converter. Part No. LS7183-S from LSI Computer Systems, Inc., processes input received by the control board 500 from an optical encoder (e.g., optical encoder 124). As mentioned above, this input represents the graduations or divisions that were displaced by the movement of the measurement apparatus probe during a depth measurement. An encoder input circuit 536, including a standard or commonly used wire-to-board connector, electrically connects the optical encoder to the control board 500. Depth measurements may be initiated by actuation of a trigger (not expressly shown here) on the measurement apparatuses. The actuation of the trigger is conveyed to the control board 500 via a trigger input circuit 538 that connects the trigger to the control board 500. A key switch control circuit 540, including another standard or commonly used wire-to-board connectors, may be provided in some implementation to connect a left arrow button, a right arrow button, and a calibration button to the control board 500. These buttons allow a human operator to manipulate various operational aspects of the measurement apparatuses, including selecting a calibration operation or mode, indicating to an external application whether the measurement apparatuses is being advanced to take the next depth measurement or returning to a previous depth measurement, and the like. An LED buffer circuit 542 is provided to help drive any LEDs that may be used with the measurement apparatuses. A JTAG (Joint Test Action Group) test port 544 may be provided for testing, programming, and debugging of the microcontroller in the controller circuit 524. Crystal oscillator circuits 546 and 548 generate the clock signals for the control board 500. A MAC address circuit 550, including a MAC EEPROM, may be provided for uniquely identifying the control board 500 to an external application. A charging status circuit 552, shown in FIG. 55C, may be provided to indicate whether the battery of the control board 500 is being charged.

Figure 56B:
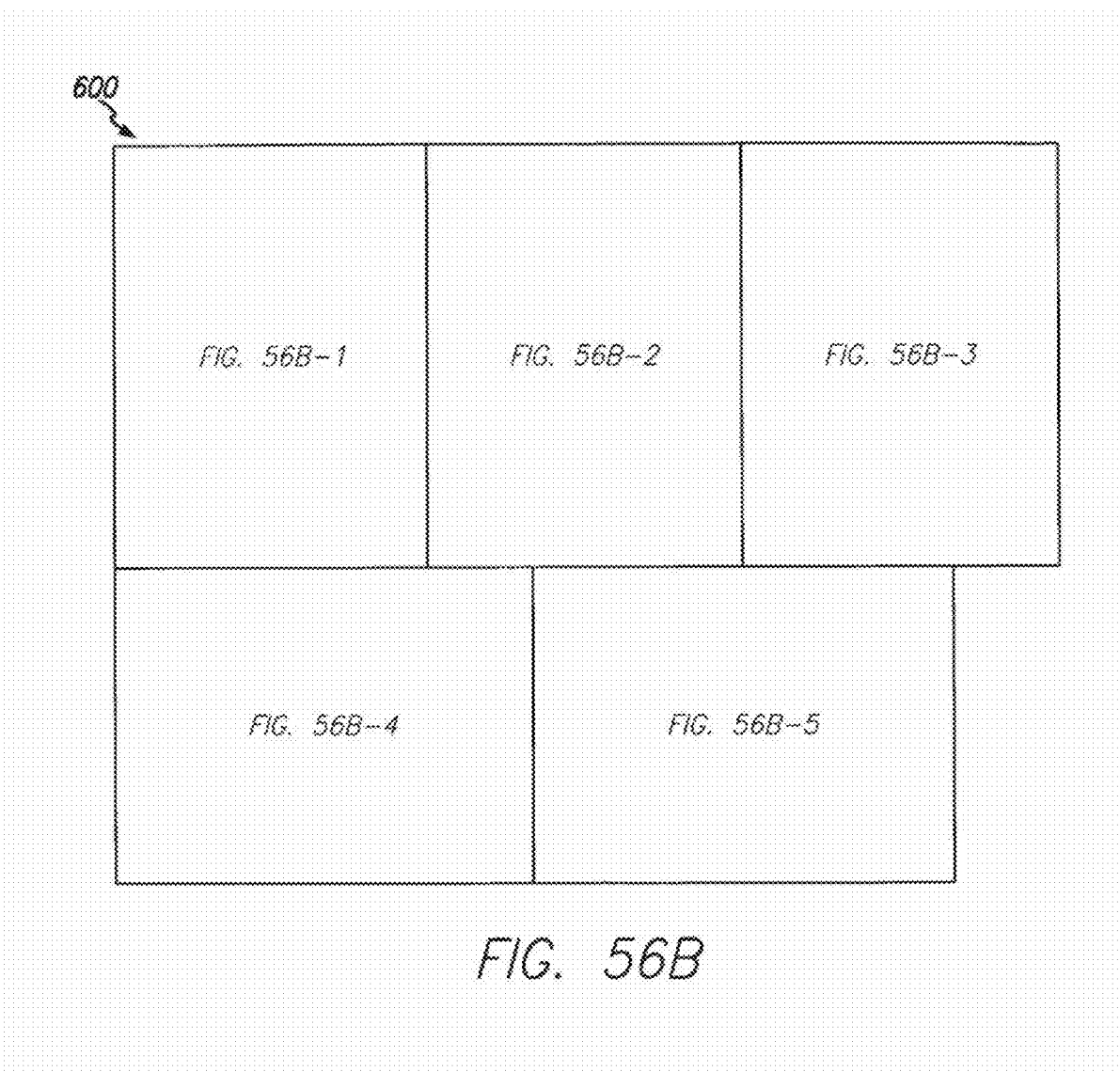
Figures 1, 56B:
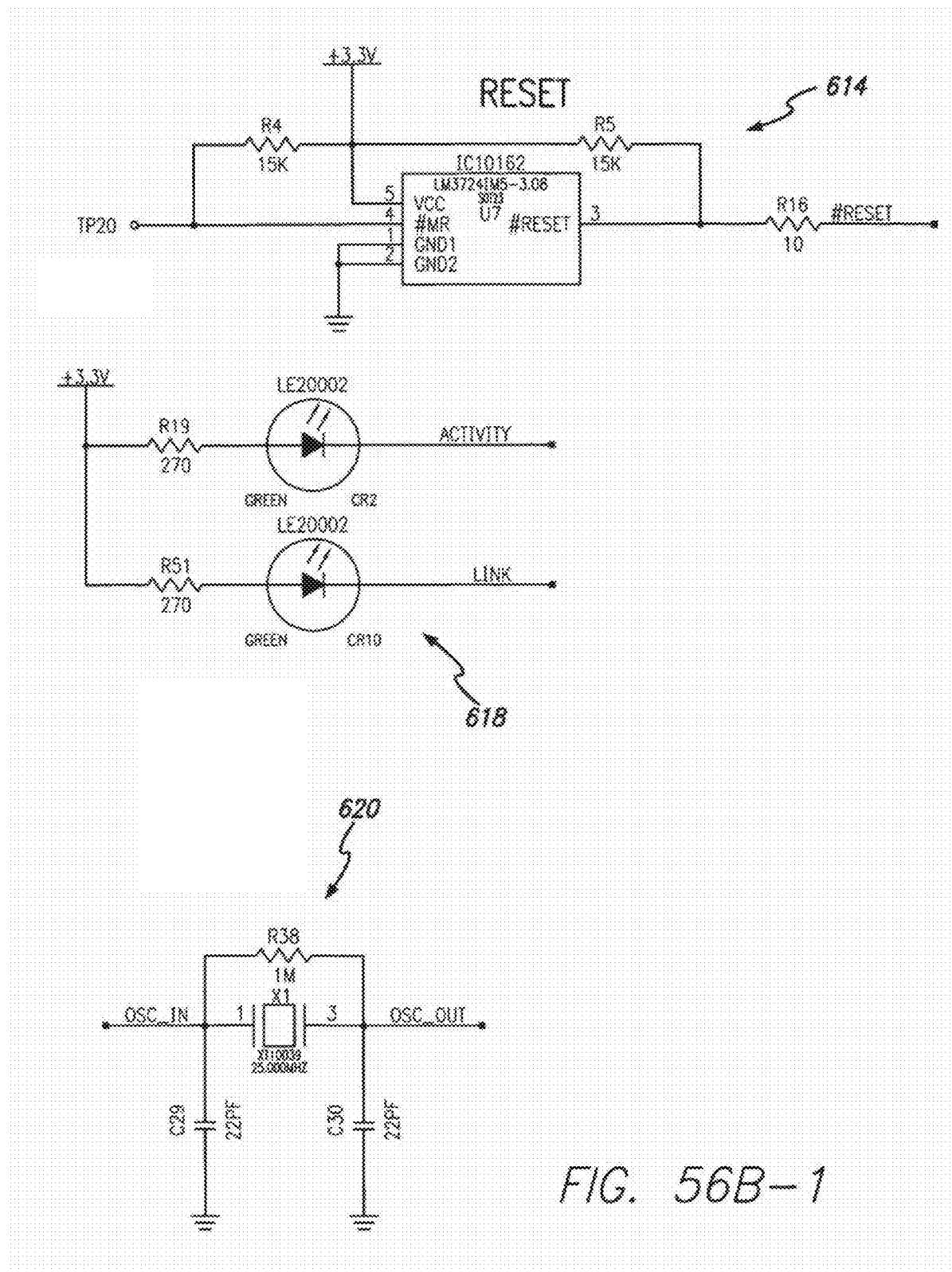
Figures 2, 56B:
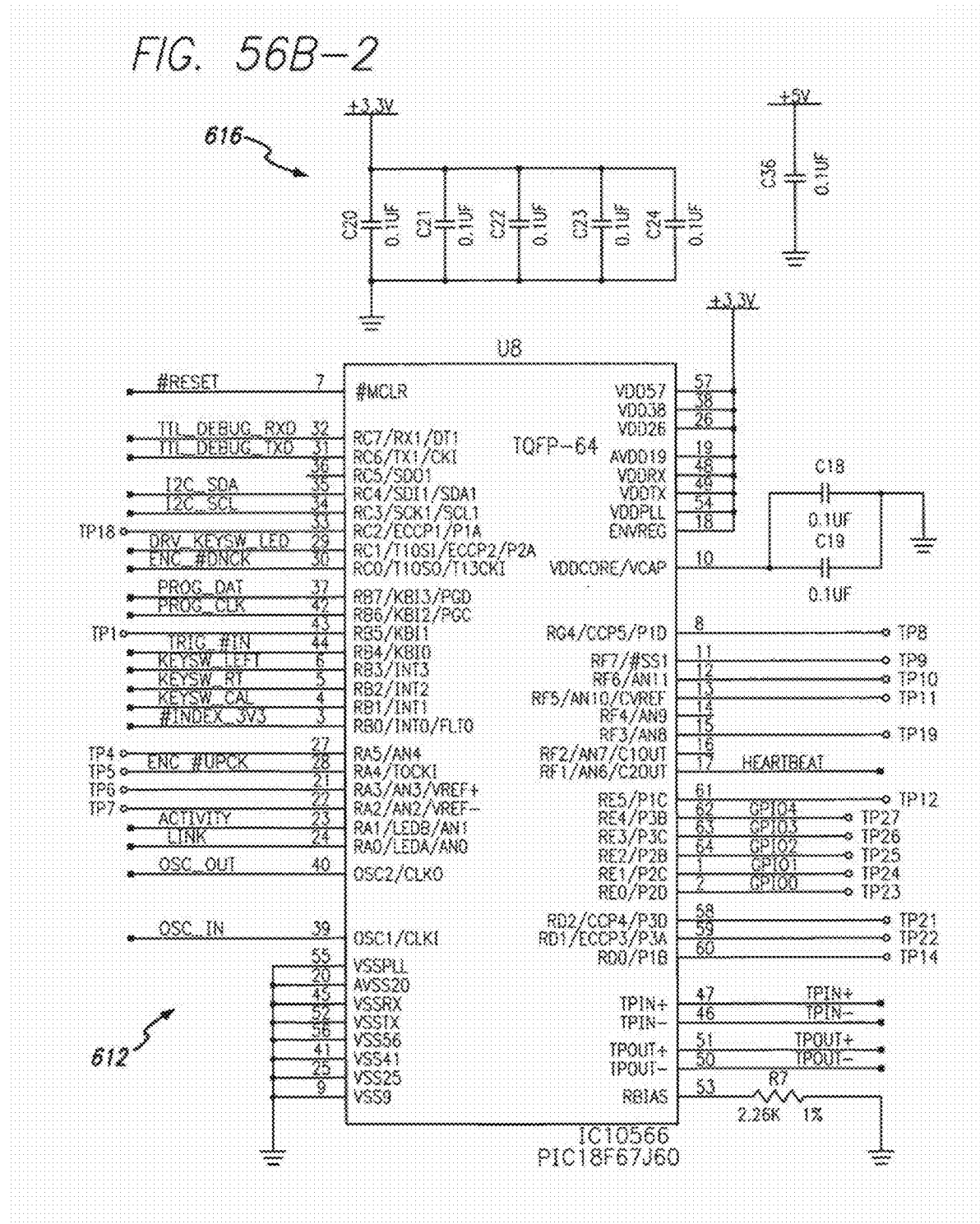
Figures 3, 56B:
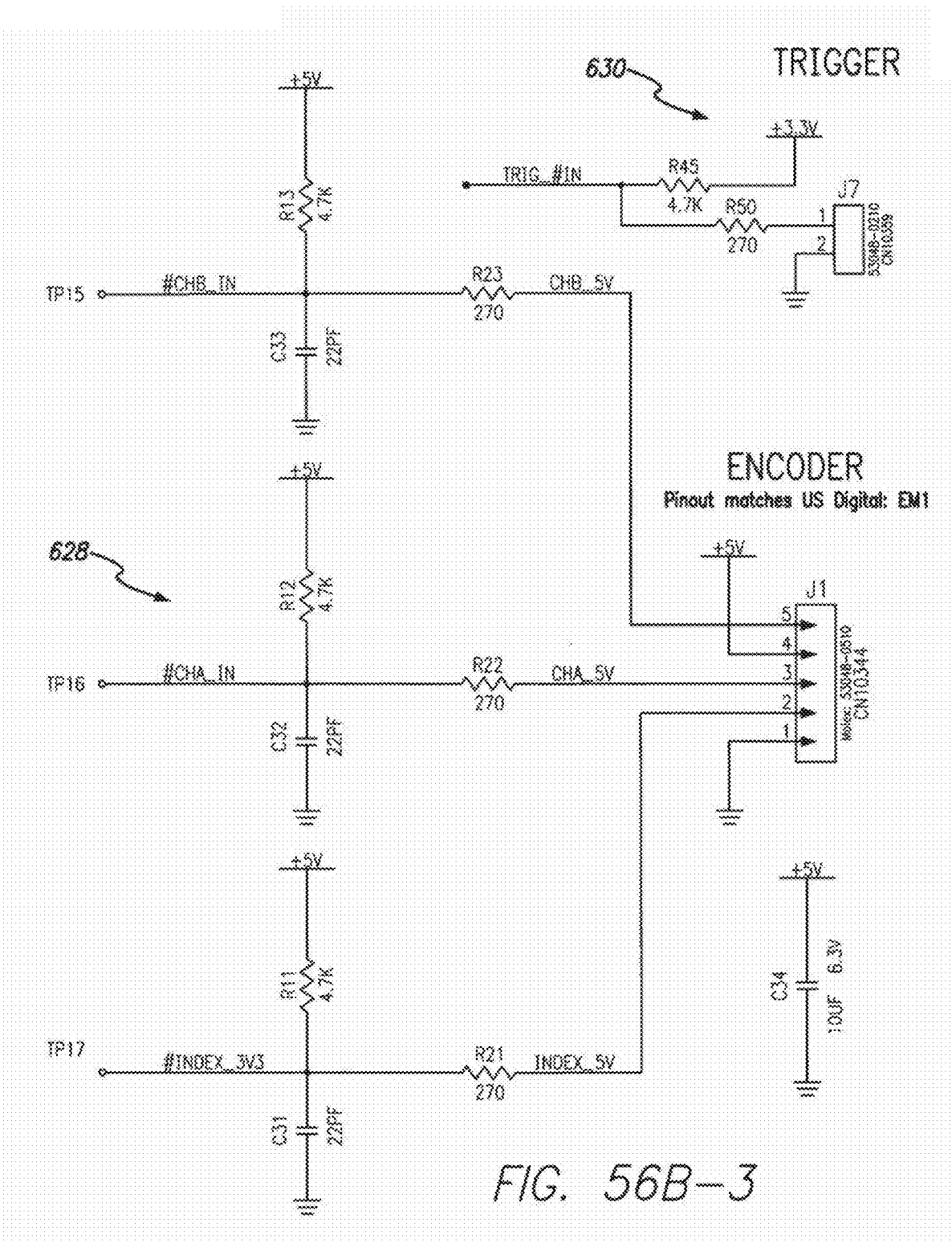
Figures 4, 56B:
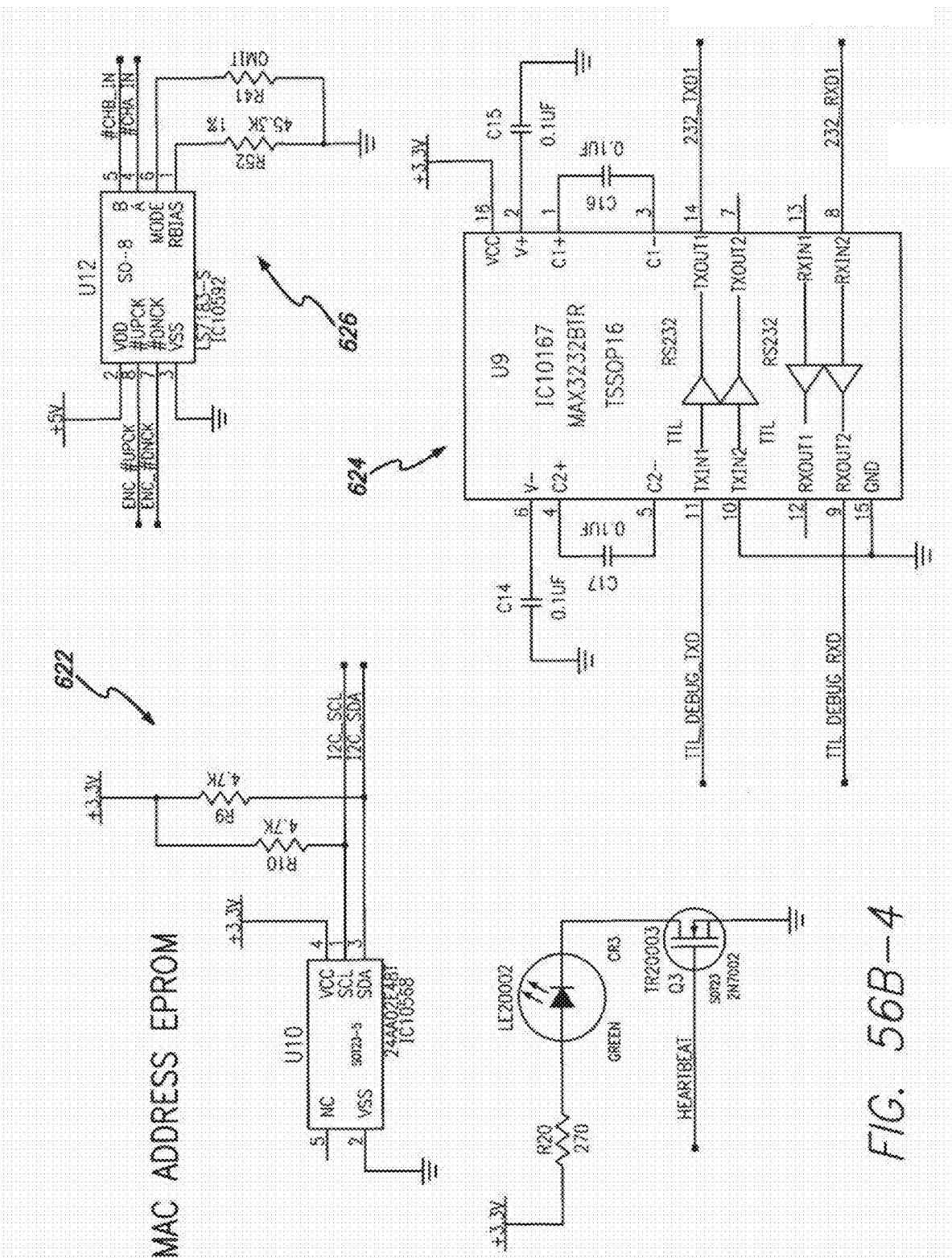
Figures 5, 56B:
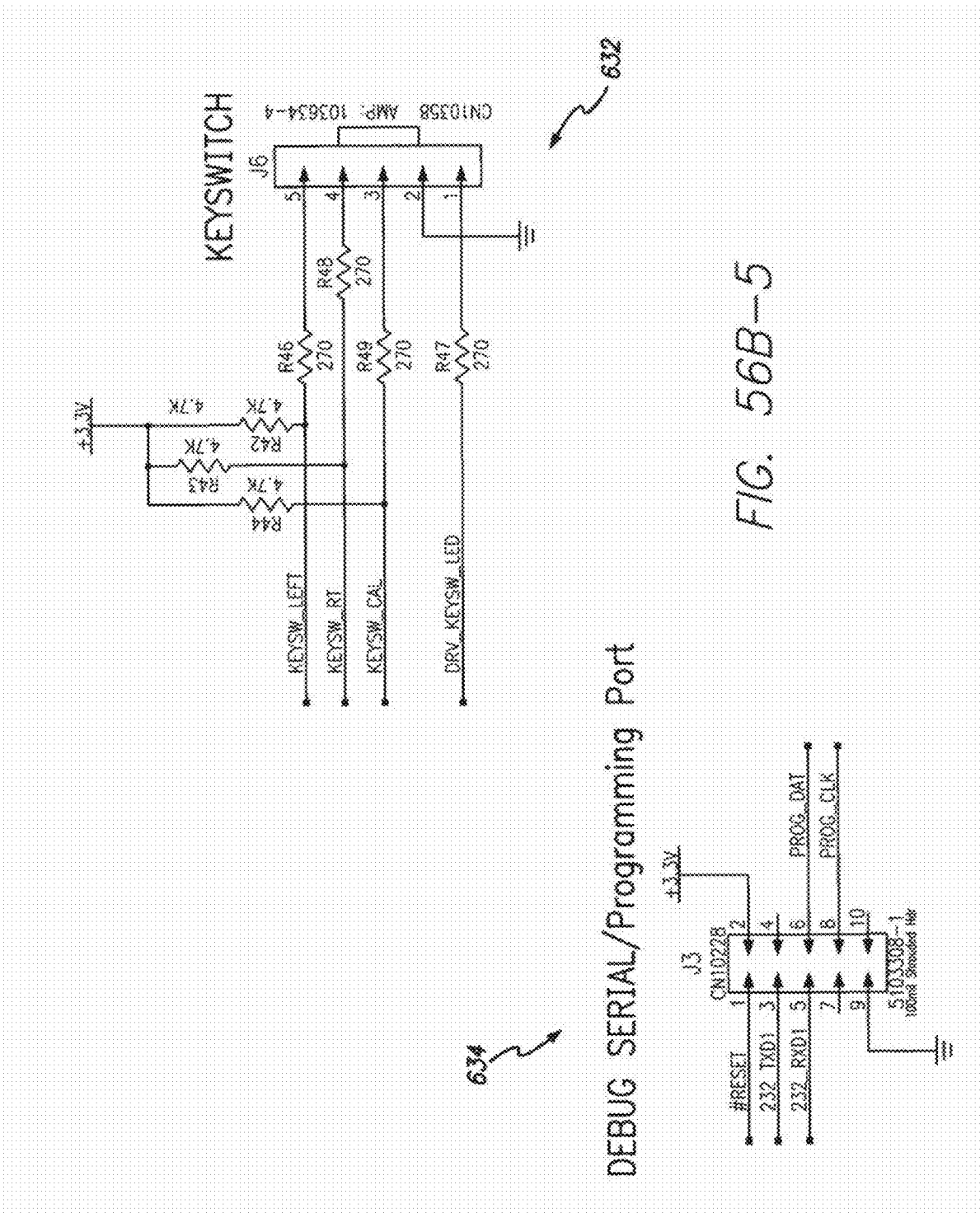

Turning now to FIGS. 56A-56B, an alternative exemplary implementation of a control board 600 is shown. The control board 600, which correspond to the digital circuit or control card 150, performs many of the same operations as the control board 500 of FIGS. 55A-55C, except that the control board 600 uses an Ethernet cable to communicate with an external computer system. Power to the control board 600 is also provided over the Ethernet cable using the well-known POE (Power-Over-Ethernet) standard. To this end, several circuits are present that relate to Ethernet communication and the provision of power over an Ethernet cable. For example, in the present implementation, a POE management circuit 602 may be provided, including Part No. LTC4267CGN from Linear Technology Corp., for receiving power over the Ethernet cable (not expressly shown) and stepping it from a standard 48 V DC down to a 5 V DC level that may be used by the various components on the control board 600. Specifically, the 48 V DC input voltage from the Ethernet cable is received by a voltage input circuit 603 and subsequently switched at a frequency controlled by the POE management circuit 602 to a transformer circuit 604 to step the voltage from 48 V DC to 5 V DC.

A switch mode power supply circuit 606 converts the 5 V DC provided by the transformer circuit 604 down to 3.3 V DC, which is the level required by the microcontroller of the control board's controller circuit (discussed later herein). A feedback circuit 608 provides a 5 V DC reference voltage to the POE management circuit 602 over an opto-coupler to help the POE management circuit 602 maintain the switching of the 48 V input at the appropriate frequency. The transformer circuit 604 and the opto-coupler in the feedback circuit 608 isolates the high 48 V input from the rest of the control board 600. An Ethernet interface circuit 610, including a standard or commonly use Ethernet connector (e.g., RJ-45), allows a standard Ethernet cable to be connected to the control board 600.

Referring next to FIG. 568, a controller circuit 612, including a microcontroller with integrated IEEE 802.3 compatible Ethernet controls, Part No. PIC18F67J60 from Microchip Technology. Inc., may be provided on the controller module 600. The controller circuit 612 manages the overall operation of the control board 600, including performing the depth value calculations described earlier, as well as communicating with an external application running on an external computer system. In some embodiments, the control board 600 may also include a reset circuit 614 with a processor power manager and supervisor, Part No. LM37241M5-3.08 from National Semiconductor Corp., that operates to reset the microcontroller of the controller circuit 612 in the event of a malfunction (e.g., an invalid or inadequate power supply). A decoupler circuit 616, which is essentially several capacitors connected in parallel, may also be provided in the control board 600 to smooth or filter out any noise that may appear on the 3.3 V DC power supply.

A status indicator circuit 618, including an activity LED for indicating the presence of data traffic on the Ethernet cable, as well as a link LED for indicating a valid Ethernet connection, provides the status of the Ethernet connection. A crystal oscillator circuit 620 generates a clock signal for the control board 600. A MAC address circuit 622, including a MAC EEPROM, helps uniquely identify the control board 600 to an external application. A transceiver circuit, including an RS-232 transceiver, Part No. MAX3232BTR from Maxim Integrated Products, Inc., helps convert data transmitted/received over the Ethernet cable to/from the RS-232 serial for the control board 600.

As with the control board 500 of FIGS. 55A-55B, the control board 600 may also include an optical decoder circuit 626, including a quadrature clock decoder, Part No. LS7183-S from LSI Computer Systems, Inc., for processing the input received by the control board 600 from an optical encoder (e.g. read head 124). Recall that this input represents the graduations or divisions that were displaced by the movement of the measurement apparatus probe during a depth measurement. An encoder input circuit 628, including a standard or commonly used wire-to-board connector, electrically connects the optical encoder to the control board 600. Depth measurements may be initiated by actuation of a trigger (not expressly shown here) on the measurement apparatuses. The actuation of the trigger is conveyed to the control board 600 via a trigger input circuit 630 that connects the trigger to the control board 600.

A key switch control circuit 632, including another standard or commonly used wire-to-board connectors, may be provided in some implementation to connect a left arrow button, a right arrow button, and a calibration button to the control board 600. These buttons facilitate human manipulation of various operational aspects of the measurement apparatuses, including calibration, advancing to take the next depth measurement, and returning to a previous depth measurement, and the like. Finally, the control board 600 may also include a debugging serial/programming port 634 for allowing testing, programming, and debugging of the microcontroller in the controller circuit 612.

Following are Tables 1 and 2 that list, among other things, exemplary manufacturers, part numbers, and component values (where applicable) for each component in FIGS. 55A-55C and FIGS. 56A-56B.

TABLE 1

| Part No. | Qty | Description | Designators | Manufacturer | Mfg Part No. |
|---|---|---|---|---|---|
| CC11012 | 4 | 1.2 pF, 10 V, C0G, 0402 SMT Capacitor | C16-19 | Murata Electronics North America, Smyrna, GA | GRM1555C1H1R2CZ01D |
| CC11104 | 14 | 100 nF, 10 V, X5R, 0402 SMT Capacitor | C20-27, C50-55 | AVX, Fountain Inn, SC | 0402ZD104KAT2A |
|  |  |  |  | Panasonic, Secaucus, NJ | ECJ-0EB1A104K |
| CC11105 | 9 | 1uF, 6.3 V, X5R, 0402 SMT Capacitor | C8-15, C56 | Panasonic, Secaucus, NJ | ECJ-0EB0J105M |
| CC11220 | 16 | 22 pF, 50 V, NP0, 0402 SMT Capacitor | C29-38, C43-48 | Murata Electronics North America, Smyrna, GA | GRM1555C1H220JZ01D |
| CC21106 | 8 | 10uF, 6.3 V, X5R, 0603 SMT Capacitor | C1-7, C49 | Panasonic, Secaucus, NJ | ECJ-1VB0J106M |
| CC41107 | 1 | 100uF, 6.3 V, X5R, 1206 SMT Capacitor | C28 | Taiyo Yuden, Japan | JMK316BJ107ML-T |
| CN10223 | 1 | Mini-USB Client, Vertical Connector | J6 | Molex, Lisle, IL | 500075-0517 |
| CN10344 | 1 | 5 Pos. PicoBlade R/A | J4 | Molex, Lisle, IL | 53048-0510 |
| CN10358 | 1 | 5P R/A Shrd Lkg Connector | J2 | Amp - Tyco Electronics, Berwyn, PA | 5-103634-4 |
|  |  |  |  | Amp - Tyco Electronics, Berwyn, PA | 103634-4 |
| CN10359 | 1 | 2 Pos. TH R/A Picoblade | J8 | Molex, Lisle, IL | 53048-0210 |
| CN10360 | 1 | 8 Pos. TH R/A Picoblade | J7 | Molex, Lisle, IL | 53048-0810 |
| CN10366 | 1 | 2 × 5 Header, 0.050" pitch, SMD | J3 | Sullins, San Marcos, CA | GRPB052VWQS-RC |
| CN10374 | 1 | 5 Pos. R/A Female Header, 0.1" Centers | J5 | Sullins San Marcos, CA | PPTC051LGBN-RC |
| CN10375 | 1 | 2 Pos. RA Shrouded Header, C-Grid SL, 0.1" | J1 | Molex, Lisle, IL | 70553-0001 |
| DI10051 | 1 | PMEG2020AEA 2 A 20 V, SOD323 Schottky Diode | CR1 | NXP Semiconductors, Eindhoven, The Netherlands | PMEG2020AEA |
| FB10010 | 1 | 1000 Ohm, 0402 Ferrite Bead | L1 | Murata Electronics North America, Smyrna, GA | BLM15AG102SN1D |
| IC10027 | 4 | NC7S14, Single Inv w/Schmitt Trigger | U1, U3-4, U20 | Fairchild Semiconductor, South Portland, ME or San Jose, CA | NC7SZ14M5X |
| IC10388 | 1 | LT6700CS6-3 Dual Comparator w/Reference | U6 | Linear Tech, Milipitas, CA | LT6700CS6-3#PBF |
|  |  |  |  | Linear Tech, Milipitas, CA | LT6700CS6-3 |
| IC10400 | 1 | CP2102-GM | U10 | Silicon Laboratories, Inc. Austin, TX | CP2102-GM |
| IC10504 | 1 | LTC4088 USB Power Manager/Charger, DFN-14 | U8 | Linear Tech, Milipitas, CA | LTC4088EDE#PBF |
| IC10508 | 4 | SN74LVC1T45 Single Bit Voltage Translator 5 V | U13-14, U16, U19 | Texas Instruments, Inc. Dallas, TX | SN74LVC1T45DBVR |

TABLE 1-continued

| Part No. | Qty | Description | Designators | Manufacturer | Mfg Part No. |
|---|---|---|---|---|---|
| IC10568 | 1 | 24AA02E48T MAC Address ROM, SOT-23-5 | U11 | Microchip Technology, Inc. Chandler, AZ | 24AA02E48T-I/OT |
| IC10592 | 1 | LS7183-S Quadrature clock converter, SO-8 | U15 | [None] | LSI Computer Systems: LS7183-S |
| IC10613 | 1 | LT3495EDDB Boost SMPS with disconnect, DFN-10 | U7 | Linear Tech, Milipitas, CA | LT3495EDDB#TRPBF |
| IC10614 | 1 | ATmega128RFA1 Micro with RF deck, QFN-64 | U12 | Atmel, San Jose, CA | ATmega128RFA1-ZU |
| IC10616 | 1 | STM6822ZWY6 2.3 V Reset w/Watchdog, SOT23-5 Pkg. | U5 | ST Microelectronics Geneva, Switzerland | STM6822ZWY6F |
| LE20002 | 2 | 0805 Green SMT LED | CR2-3 | Lumex, Palatine, IL | SML-LXT0805GW-TR |
| LS10030 | 2 | 4.7uH, 1608 SMD 1.5 A Inductor | L2-3 | Bourns, Inc., Riverside, CA | SDR0703-4R7ML |
|  |  |  |  | J. W. Miller (Bourns), Riverside, CA | PM1608-4R7M-RC |
|  |  |  |  | Tyco Electronics, Berwyn, PA | MGDU1-00005 |
|  |  |  |  | Vishay-Sprague, (Vishay Americas), Shelton, CT | IDC2512ER4R7M |
|  |  |  |  | J. W. Miller (Bourns), Riverside, CA | PM1608-4R7M |
| LS10057 | 2 | 2.7 nH 0603 Inductor, High Freq. | L4-5 | Panasonic, Secaucus, NJ | ELJ-RE2N7DFA |
| PC10124 | 1 | PCB, Delta Sigma Wireless Grip Gauge | PC1 |  |  |
| Omit | 1 |  | R44 |  |  |
| RS10104 | 11 | 100K, 5%, 0402 SMT Resistor | R22-26, R29-33, R62 | Panasonic, Secaucus, NJ | ERJ-2GEJ104X |
| Omit | 2 |  | R27-28 |  |  |
| Omit | 1 |  | R36 |  |  |
| RS10106 | 2 | 10M, 5%, 0402 SMT Resistor | R34-35 | Panasonic, Secaucus, NJ | ERJ-2GEJ106X |
| RS10153 | 22 | 15K, 5%, 0402 SMT Resistor | R4-21, R59-61, R64 | Vishay-Sprague, (Vishay Americas), Shelton, CT | CRCW040215K0JNED |
|  |  |  |  | Yageo America, San Jose, CA | RC0402JR-0715KL |
| RS10472 | 3 | 4.7K, 5%, 0402 SMT Resistor | R41-43 | Vishay-Sprague, (Vishay Americas), Shelton, CT | CRCW04024K70JNED |
| RS11002 | 1 | 10K, 1%, 0402 SMT Resistor | R55 | Panasonic, Secaucus, NJ | ERJ-2RKF1002X |
| RS20000 | 1 | 0 Ohm, 5%, 0603 SMT Resistor | R38 | Panasonic, Secaucus, NJ | ERJ-3GEY0R00V |
| Omit | 1 |  | R39 |  |  |
| RS20271 | 9 | 270 Ohm, 5%, 0603 SMT Resistor | R46-54 | Panasonic, Secaucus, NJ | ERJ-3GEYJ271V |
| RS20391 | 1 | 390 Ohm, 5%, 0603 SMT Resistor | R37 | Panasonic, Secaucus, NJ | ERJ-3GEYJ391V |
| RS20829 | 1 | 8.2 Ohm, 5%, 0603 SMT Resistor | R3 | Panasonic, Secaucus, NJ | ERJ-3GEYJ8R2V |
| RS22323 | 1 | 232K, 1%, 0603 SMT Resistor | R45 | Panasonic, Secaucus, NJ | ERJ-3EKF2323V |
| RS22803 | 1 | 280K, 1%, 0603 SMT Resistor | R56 | Panasonic, Secaucus, NJ | ERJ-3EKF2803V |

TABLE 1-continued

| Part No. | Qty | Description | Designators | Manufacturer | Mfg Part No. |
|---|---|---|---|---|---|
| RS22941 | 1 | 2.94K, 1%, 0603 SMT Resistor | R58 | Panasonic, Secaucus, NJ | ERJ-3EKF2941V |
| RS24222 | 1 | 42.2K, 1%, 0603 SMT Resistor | R1 | Panasonic, Secaucus, NJ | ERJ-3EKF4222V |
| RS24532 | 1 | 45.3K, 1%, 0603 SMT Resistor | R57 | Panasonic, Secaucus, NJ | ERJ-3EKF4532V |
| RS24990 | 1 | 499 Ohm, 1%, 0603 SMT Resistor | R2 | Panasonic, Secaucus, NJ | ERJ-3EKF4990V |
| | | | | Vishay Dale, (Vishay Americas), Shelton, CT | CRCW0603499RFKEA |
| TR10028 | 1 | IRLML6402PbFP-channel SOT-23 Low Vgs | Q2 | International Rectifier, El Segundo, CA | IRLML6402PbF |
| TR20003 | 1 | 2N7002, N-channel FET SOT23 Transistor | Q3 | On Semi-conductor, Phoenix, AZ | 2N7002LT1G |
| | | | | On Semi-conductor, Phoenix, AZ | 2N7002LT1 |
| XT10033 | 1 | 32.768 KHz Crystal, 3.2 × 1.5 mm Package | X1 | Pletronics, Lynnwood, WA | SM8S-32.768K-20 |
| | | | | AVX, Fountain Inn, SC | ST3215SB32768H5HPWZZ |
| | | | | Citizen Crystals Chicago, IL | CM31532.768KDZF-UT |
| CN20007 | 1 | Keystone Testpoint - Surface mount | TP27 | Keystone Electronics, Astoria, NY | 5016 |
| | | | | Keystone Electronics, Astoria, NY | 5016KCT-ND |
| IC10327 | 1 | PCA9306DC I2C Level Translator | U17 | Texas Instruments, Inc. Dallas, TX | PCA9306DCUR |
| IC10625 | 1 | LTC2942 Gas Gauge, DFN-6 | U18 | Linear Tech, Milipitas, CA | LTC2942CDCB#TRPBF |
| RS30108 | 1 | .1 Ohm, 5%, 0805 SMT Resistor | R63 | Panasonic, Secaucus, NJ | ERJ-6RSJR10V |
| Omit | 1 | | R40 | | |
| RS20010 | 1 | 1.0 ohm, 5%, 0603 SMT Resistor | R65 | Panasonic, Secaucus, NJ | ERJ-3GEYJ1R0V |
| CC11120 | 2 | 12 pF, 50 V, COG, 0402 SMT Capacitor | C39-40 | Panasonic, Secaucus, NJ | ECJ-0EC1H120J |
| IC10430 | 1 | NC7SZ125 Single Tri-State buffer | U21 | Fairchild Semi-conductor, South Portland, ME or San Jose, CA | NC7SZ125M5X |
| XT10046 | 1 | 16.000 MHz Crystal, 2.5 × 3.2 SMD Package | X2 | Abracon, Rancho Santa Margarita, CA | ABM8G-16.000MHZ-18-D2Y-T |
| CC22120 | 2 | 12 pF, 50 V, NP0, 0603 SMT Capacitor | C41-42 | Panasonic, Secaucus, NJ | ECJ-1VC1H120J |
| IC10347 | 1 | MCP1700 3.3 V LDO SOT-23 | U9 | Microchip Technology, Inc. Chandler, AZ | MCP1700T-3302E/TT |

TABLE 2

| Part No. | Qty | Description | Designator | Manufacturer | Mfg Part No. |
|---|---|---|---|---|---|
| CA10001 | 2 | 4.7 uF, 80 V Alum. Cap. 7.8 × 7.8 × 6 | C7, C35 | Panasonic, Secaucus, NJ | EEE-FK1K4R7P |
| CA80227 | 2 | 220 uF, 6.3 V Alum Cap, Low ESR | C9-10 | Sanyo Electric Co. Ltd., Osaka, Japan | 6SVPA220MAA |
| | | | | United Chemi-Con, Rosemont, IL | APXC6R3ARA221MH70G |
| | | | | Panasonic, Secaucus, NJ | EEF-WA0J221P |
| CC11104 | 14 | 100 nF, 10 V, X5R, 0402 SMT Capacitor | C12-24, C36 | AVX, Fountain Inn, SC | 0402Z0104KAT2A |
| | | | | Panasonic, Secaucus, NJ | ECJ-0EB1A104K |
| CC11220 | 5 | 22 pF, 50 V, NP0, 0402 SMT Capacitor | C29-33 | Murata Electronics North America, Smyrna, GA | GRM1555C1H220JZ01D |
| CC21106 | 3 | 10 uF, 6.3 V, X5R, 0603 SMT Capacitor | C1-2, C34 | Panasonic, Secaucus, NJ | ECJ-1VB0J106M |
| CC21333 | 1 | 33 nF, 16 V, X7R, 0603 10% Capacitor | C6 | Panasonic, Secaucus, NJ | ECJ-1VB1C333K |
| CC22151 | 1 | 150 pF, 100 V, COG/NPO, 0603 SMT Capacitor | C8 | Murata Electronics North America, Smyrna, GA | GRM1885C2A151JA01D |
| CC22680 | 1 | 68 pF, 50 V, X7R, 0603 SMT Capacitor | C11 | Panasonic, Secaucus, NJ | ECJ-1VC1H680J |
| CC41107 | 1 | 100 uF, 6.3 V, X5R, 1206 SMT Capacitor | C25 | [None] | Taiyo Yuden: JMK316BJ107ML-T |
| CC42475 | 1 | 4.7 uF, 16 V, X5R, 1206 SMT Capacitor | C4 | Panasonic, Secaucus, NJ | ECJ-3YB1C475K |
| CC46104 | 1 | 100 nF, 100 V, 1206 SMT Capacitor | C3 | Kemet, Simpsonville, SC | C1206C104K1RACTU |
| CC46105 | 1 | 1 uF, 100 V, X7R, 1206 SMT Capacitor | C26 | Murata Electronics North America, Smyrna, GA | GRM31CR72A105KA01L |
| CN10228 | 1 | 2 × 5 Shrouded 100 mil Connector | J3 | Amp - Tyco Electronics, Berwyn, PA | 5103308-1 |
| CN10344 | 1 | 5 Pos. PicoBlade R/A | J1 | Molex, Lisle, IL | 53048-0510 |
| CN10358 | 1 | 5P R/A Shrd Lkg Connector | J6 | Amp - Tyco Electronics, Berwyn, PA | 103634-4 |
| DI10039 | 1 | SMAJ58A 58 V TVS | CR9 | Littlefuse, Chicago, IL | SMAJ58A |
| DI10049 | 1 | MBRS240LT32A, 40 V SMB Case | CR1 | On Semi-conductor, Phoenix, AZ | MBRS240LT3G |
| DI10050 | 1 | 9.1 V Zener, SOT-23 Package | CR8 | Fairchild Semi-conductor, South Portland, ME or San Jose, CA | BZX84C9V1 |
| DI20004 | 4 | 0.2 A, 75 V Diode SOD323 | CR4-7 | On Semi-conductor, Phoenix, AZ | BAS16HT1 |
| FB10012 | 1 | Ferrite Bead, 120 Ohm, 500 mA | L2 | Panasonic, Secaucus, NJ | EXC-3BP121H |
| IC10119 | 1 | LTC3406 Buck Regulator, SOT-23 | U6 | Linear Tech, Milipitas, CA | LTC3406ES5#PBF |
| | | | | Linear Tech, Milipitas, CA | LTC3406ES5 |

TABLE 2-continued

| Part No. | Qty | Description | Designator | Manufacturer | Mfg Part No. |
|---|---|---|---|---|---|
| IC10162 | 1 | LM3724IM5-3.08 Reset Generator, Open Drain | U7 | National Semiconductor Santa Clara, CA | LM3724IM5-3.08/NOPB |
|  |  |  |  | National Semiconductor Santa Clara, CA | LM3724IM5-3.08 |
| IC10167 | 1 | ST3232BTR 2TX, 2RX RS-232 Transceiver, TSSOP | U9 | Sipex Corp., Milpitas, CA | SP3232EBCY |
|  |  |  |  | ST Micro-electronics Geneva, Switzerland | ST3232BTR |
|  |  |  |  | Texas Instruments, Inc. Dallas, TX | MAX3232CPW |
| IC10334 | 1 | TLV431BCD Voltage Reference | U11 | Texas Instruments, Inc. Dallas, Texas | TLV431BCDBZR |
| IC10566 | 1 | PIC18F67J60-I/PT MPU, TQFP-64 | U8 | Microchip Technology, Inc. Chandler, AZ | PIC18F67J60-I/PT |
| IC10567 | 1 | LTC4267 POE Controller with SMPS, SSOP-16 | U5 | Linear Tech, Milpitas, CA | LTC4267CGN#PBF |
| IC10568 | 1 | 24AA02E48T MAC Address ROM, SOT-23-5 | U10 | Microchip Technology, Inc. Chandler, AZ | 24AA02E48T-I/OT |
| LE20002 | 3 | 0805 Green SMT LED | CR2-3, CR10 | Lumex, Palatine, IL | SML-LXT0805GW-TR |
| LS10030 | 1 | 4.7uH, 1608 SMD 1.5 A Inductor | L1 | Bourns, Inc., Riverside, CA | SDR0703-4R7ML |
|  |  |  |  | J. W. Miller (Bourns), Riverside, CA | PM1608-4R7M-RC |
|  |  |  |  | Tyco Electronics, Berwyn, PA | MGDU1-00005 |
|  |  |  |  | Vishay-Sprague, (Vishay Americas), Shelton, CT | IDC2512ER4R7M |
|  |  |  |  | J. W. Miller (Bourns), Riverside, CA | PM1608-4R7M |
| OP10017 | 1 | PS2911-1 Opto Isolator | U1 | NEC Corporation of America, Irving, TX | PS2911-1-F3-A |
| PC10115 | 1 | PCB, Delta Sigma Grip Gauge | PC1 | [None] |  |
| RS10100 | 2 | 10 Ohm, 5%, 0402 SMT Resistor | R15-16 | Panasonic, Secaucus, NJ | ERJ-2GEJ100X |
|  |  |  |  | Vishay-Sprague, (Vishay Americas), Shelton, CT | CRCW040210R0JNED |
| RS10153 | 4 | 15K, 5%, 0402 SMT Resistor | R2-5 | Vishay-Sprague, (Vishay Americas), Shelton, CT | CRCW040215K0JNED |
|  |  |  |  | Yageo America, San Jose, CA | RC0402JR-0715KL |
| RS10472 | 9 | 4.7K, 5%, 0402 SMT Resistor | R9-13, R42-45 | Vishay-Sprague, (Vishay Americas), Shelton, CT | CRCW04024K70JNED |

TABLE 2-continued

| Part No. | Qty | Description | Designator | Manufacturer | Mfg Part No. |
|---|---|---|---|---|---|
| RS20105 | 1 | 1M, 5%, 0603 SMT Resistor | R38 | Panasonic, Secaucus, NJ | ERJ-3GEYJ105V |
|  |  |  |  | Vishay-Sprague, (Vishay Americas), Shelton, CT | CRCW06031M00JNEA |
| RS20154 | 3 | 150K, 5%, 0603 SMT Resistor | R29-31 |  |  |
| RS20271 | 11 | 270 Ohm, 5%, 0603 SMT Resistor | R19-23, R46-51 | Panasonic, Secaucus, NJ | ERJ-3GEYJ271V |
| RS20561 | 1 | 560 Ohm, 5%, 0603 SMT Resistor | R36 | Panasonic, Secaucus, NJ | ERJ-3GEYJ561V |
| RS21002 | 1 | 10K, 1%, 0603 SMT Resistor | R39 | Vishay-Sprague, (Vishay Americas), Shelton, CT | CRCW060310K0FKEA |
|  |  |  |  | Yageo America, San Jose, CA | RC0603FR-0710KL |
| RS21103 | 1 | 110K, 1%, 0603 SMT Resistor | R18 | Panasonic, Secaucus, NJ | ERJ-3EKF1103V |
| RS22261 | 1 | 2.26K, 1%, 0603 SMT Resistor | R7 | Panasonic, Secaucus, NJ | ERJ-3EKF2261V |
| RS23652 | 1 | 36.5K, 1%, 0603 SMT Resistor | R8 | Panasonic, Secaucus, NJ | ERJ-3EKF3652V |
| RS24532 | 2 | 45.3K, 1%, 0603 SMT Resistor | R37, R52 | Panasonic, Secaucus, NJ | ERJ-3EKF4532V |
| RS24990 | 1 | 499 Ohm, 1%, 0603 SMT Resistor | R1 | Panasonic, Secaucus, NJ | ERJ-3EKF4990V |
| RS24999 | 4 | 49.9 Ohm, 1%, 0603 SMT Resistor | R32-35 | Vishay-Dale, (Vishay Americas), Shelton, CT | RCW060349R9FKEA |
|  |  |  |  | Yageo America, San Jose, CA | RT0603FRE0749R9L |
|  |  |  |  | Yageo America, San Jose, CA | 9T06031A49R9FBHFT |
| RS26801 | 1 | 6.8K, 1%, 0603 SMT Resistor | R40 |  |  |
| Omit | 1 |  | R17 |  |  |
| RS30331 | 1 | 330 Ohm, 5%, 0805 SMT Resistor | R14 |  |  |
| RS33308 | 1 | .33 Ohm, 1%, 0805 SMT Resistor | R6 | Panasonic, Secaucus, NJ | ERJ-6RQFR33V |
| TR10021 | 1 | MMBT2222A NPN SOT-23 Transistor | Q5 | Diodes Inc., Dallas, TX | MMBT2222A-7-F |
| TR10043 | 1 | FDC2512 150 V, 1.2 A SOT-6 N-Chnl FET | Q4 | Fairchild Semi-conductor, South Portland, ME or San Jose, CA | FDC2512 |
| TR20003 | 2 | 2N7002, N-channel FET SOT23 Transistor | Q1, Q3 | On Semi-conductor, Phoenix, AZ | 2N7002LT1G |
|  |  |  |  | On Semi-conductor, Phoenix, AZ | 2N7002LT1 |
| XR10030 | 1 | POE Transformer to 5 V, 4 W, SMD-12 | XR1 | [None] | Wurth Electronics: 749119150 |
| XT10039 | 1 | 25.000 MHz, 2 × 2.5 mm Crystal | X1 | Abracon, Rancho Santa Margarita, CA | ABM10-25.000 MHZ-E20-T |
| CC48103 | 1 | 10 nF, 500 V, X7R, 1206 SMT Capacitor | C5 | Vishay-Sprague, (Vishay Americas), Shelton, CT | VJ1206Y103KXEAT5Z |
| CN10359 | 1 | 2 Pos. TH R/A Picoblade | J7 | Molex, Lisle, IL | 53048-0210 |
| CN10360 | 1 | 8 Pos. TH R/A Picoblade | J5 | Molex, Lisle, IL | 53048-0810 |

TABLE 2-continued

| Part No. | Qty | Description | Designator | Manufacturer | Mfg Part No. |
|---|---|---|---|---|---|
| DI10052 | 2 | HD01-T 100 V 0.8 A Diode Bridge | CR11-12 | Diodes Inc., Dallas, TX | HD01-T |
| IC10592 | 1 | LS7183-S Quadrature clock converter, SO-8 | U12 | [None] | LSI Computer Systems: LS7183-S |
| Omit | 1 | | R41 | | |
| XR10022 | 1 | H1102 Ethernet Transformer 1:1 1:1 | XR2 | Pulse, San Diego, CA | H1102 |

Sources for Components of Apparatus

All of the components that are present in the measurement apparatuses of the present invention are commercially available from sources that are known by those having ordinary skill in the art, such as ProjectionWorks, Inc. (Kennesaw, Ga.), Delta Sigma Corporation (Kennesaw, Ga.), other sources that are described herein, and other sources that are known by those having ordinary skill in the art.

The following example describes and illustrates the systems and methods of the present invention. This example is intended to be merely illustrative of the present invention, and not limiting thereof in either scope or spirit. Those of ordinary skill in the art will readily understand that many variations of certain of the devices, components, materials, ingredients, computer software, conditions and/or steps employed in the systems and procedures described in the example, and otherwise described herein, can be employed.

EXAMPLE

Production of Wire Harness

In order to test the invention in an actual assembly environment, rather than in a laboratory environment, which is not employed for assembly operations, an experiment was performed at an aircraft manufacturer facility (under the terms of a confidentiality agreement, and under the control of the inventors) to test the theory that optically projected work instructions would be helpful to assembly technicians (in terms of saving time, labor, blueprints, plans, instruction manuals, computer screens, and the like).

A particular wire harness was selected for this experiment. Abundant data from many years of cost tracking for this particular assembly was available to the inventors. A person that was skilled at making this particular wire harness averaged making it in 21 hours, whereas a person skilled at making wire harnesses in general, but not this particular wire harness, averaged making it in 28 hours.

Assembly data was input into a programmable computer as it was gathered from a technician who had built this particular assembly (wire harness) dozens of times, taking him 21 hours to construct the wire harness in his usual manual manner of construction.

About a month later, the same technician built the same wire harness using the assembly data that was input into the programmable computer and optically projected assembly instructions (projected onto the wire harness). He was able to build the wire harness this time in 19 hours, which was his personal record for that harness, and a savings of 2 hours of time for just this one wire harness, and an increase of efficiency of the assembly of about 10%. (If he were to construct several of these wire harnesses, the time savings would be even greater (i.e., two hours times the number of wire harnesses being constructed.)

The next month, a technician that had never built this particular wire harness built it using the same optically projected assembly instructions, and also built the wire harness in 19 hours (even though she had never built it before).

Comments received from both technicians were very favorable, reporting that the optically projected assembly instructions had a definite positive impact on their assembly work or relatively complex objects. Further, both wire harness assemblies were completed with no errors.

In addition to demonstrating the time reduction in assembly that results from optically projected assembly instructions onto an object being assembled, this test also demonstrates how the knowledge from the most experienced technicians may easily be transferred to lesser experienced or inexperienced workers when using optically projected assembly instructions, resulting in a higher throughput with fewer errors. This, in turn, results in significantly lower production costs.

The knowledge transfer using three-dimensional optical projection technology is vastly more efficient than traditional methods of training because the exact information that is needed for the single step that is presently being worked on in a particular assembly is displayed precisely where it is needed in full-scale, three-dimensional, color text, pictures and/or symbols directly on the assembly in an undistorted manner, at the precise moment that it is needed. Three-dimensional optical projection technology allows an assembly, manufacturing (or other) business to record its "best" practices (i.e., the best ordered sequence of assembly, manufacturing or other steps), so that there is an assurance that every worker knows the "best" way to perform any task, assembly, manufacture or other process, any time that task is being done, even if the worker has never done this task before.

While the test above showed cost savings of about 10% and 30% for experienced and inexperienced assemblers, a wire harness is not a very complex assembly. The more complexity there is in an assembly process, the greater the savings will typically be. Cost savings well in excess of about 50% will not be rare, and from about 30% to about 50% will be very common. Savings of this magnitude will take millions of dollars out of the cost of assembling each very complex object, such as an airplane. Other applications of the technology will have proportional effects.

While the apparatuses, systems and methods of the present invention have been described herein with specificity, and with reference to certain preferred embodiments thereof, those of ordinary skill in the art will recognize numerous variations, modifications and substitutions of that which has been described which can be made, and which are within the scope and spirit of the invention, which is pioneering. It is intended that all of these modifications and variations be within the scope of the present invention us it is described and claimed herein, and that the invention be limited only by the scope of the claims which follow, and that such claims be interpreted as broadly as is reasonable for a pioneering invention.

Throughout this document, various books, catalogs, manuals, patents, patent applications, journal articles, web sites and other publications have been cited. The entireties of each of these books, catalogs, manuals, patents, patent applications, journal articles, web sites and other publications are hereby incorporated by reference herein.

What is claimed:

1. An automated apparatus comprising:
   a housing;
   a measurement device affixed to a frame capable of making linear or rotary measurements;
   a reader head affixed to the measurement device having an ability to read one or a plurality of divisions when a measurement is made by the measurement device;
   a shaft that is moveable in a forwards direction or a backwards direction through the frame in which a probe tip may be affixed;
   a scale affixed to the shaft including a plurality of divisions uniformly spaced apart thereon that is readable by the measurement device;
   a probe, wherein the probe includes:
      a hollow body having its aft end affixed to a forward end of the frame, and having a diameter that is larger than the diameter of the shaft, through which the shaft may move; and
      a tip having its aft end attached to the forward end of the shaft, having a diameter smaller than a diameter of a hole to be measured, and capable of making measurements upon contact with a three-dimensional object;
   a common grip operably located externally to the apparatus that may be compressed by a user, and when compressed, activates the apparatus thereby causing the tip of the probe to move in a backwards direction towards the aft end of the apparatus, and the scale to move past, the reader head of the measurement device, and the measurement device to count the divisions present on the scale; and
   a digital circuit card affixed to the frame that has an ability to process measurement data, wherein the digital circuit card when activated is configured to cause the apparatus to perform:
      normalizing the probe relative to a surface present on or in the three-dimensional object;
      making a measurement, wherein the measurement is made of a thickness of the three-dimensional object, of a hole depth, of a hole diameter, of a countersink depth, of a fastener length, of a grip length of the three-dimensional object, or any combination thereof;
      transfer data, resulting from the measurement made by the apparatus to a data collection device; and
      presenting information as to a particular length, diameter, or type of a fastener that can be installed in the three-dimensional object.

2. The apparatus of claim 1, wherein the apparatus has a wireless configuration.

3. The apparatus of claim 1, wherein the apparatus has a Power-over-Ethernet configuration.

4. The apparatus of claim 1, wherein the divisions on the scale range from about 0.1 to about 1,000 microns.

5. The apparatus of claim 1, wherein the divisions on the scale range from about 1.0 to about 100 microns.

6. The apparatus of claim 1, wherein the body of the probe includes one or more ball pads.

7. The apparatus of claim 1, wherein the probe is removably affixed to the frame.

8. The apparatus of claim 1, wherein the apparatus includes a calibration disk having a known thickness measurement positioned at the forward end of the tip of the probe.

9. The apparatus of claim 8, wherein the apparatus includes one or a plurality of buttons located externally to the apparatus that, when depressed, compressed, pushed or activated, cause the apparatus to: repeat a measurement previously made by the apparatus; advance to a new or different measurement; or become calibrated to a known thickness of the calibration disk.

10. The apparatus of claim 1, wherein the apparatus has an ability to measure the depths of one or a plurality of holes having an open front end and an open rear end, and through which the probe has an ability to pass through fully.

11. The apparatus of claim 1, wherein the apparatus has an ability to measure the depths of one or a plurality of holes having an open front end and a closed rear end, and through which the probe cannot pass through fully.

12. A measurement apparatus for automatically measuring a dimension of an aperture on an assembly object, the apparatus comprising:
   a housing;
   a frame located inside of, and affixed to, the housing;
   a probe of the apparatus configured to move in a forward direction and a backwards direction;
   a detection device secured to the frame, the detection device having a read head configured to detect divisions on a scale when the scale passes within a predefined range of the read head, the detection device providing an output corresponding to the divisions detected by the read head as the probe moves into the aperture being measured in the forward direction or as the probe moves out of the aperture being measured in the backwards direction; and
   a control module located within the housing and electrically connected to the detection device, the control module including:
      a decoder configured to receive the output from the detection device and provide a signal representing the divisions detected by the read head; and
      a processor configured to receive the signal from the decoder and track a number of divisions detected by the read head, the processor further configured to calculate a value for a preselected dimension on the aperture of the assembly object based on the number of divisions detected by the read head;
   wherein the preselected dimension comprises a hole depth, hole diameter, countersink depth, grip length, flushness, or gap; and
   wherein the control module further includes a communication interface configured to allow the control module to communicate with an external computing system.

13. The measurement apparatus of claim 12, wherein the control module further includes a DC power supply configured to receive power from a power source and provide multiple DC voltages to the control module.

14. The measurement apparatus of claim 13, wherein the power source is internal within the housing.

15. The measurement apparatus of claim 13, wherein the power source is external to the housing.

16. The measurement apparatus of claim 12, wherein the control module is further configured to communicate the value of the preselected dimension to the external computing system.

17. The measurement apparatus of claim 12, wherein the communication interface is configured to implement a wired communication protocol.

18. The measurement apparatus of claim 12, wherein the communication interface is configured to implement a wireless communication protocol.

19. The measurement apparatus of claim 12, wherein the processor is further configured to adjust the value of the preselected dimension based on a calibration of the measurement apparatus.

20. A method for automatically measuring a dimension of an aperture on an assembly object by a measurement device, the method comprising:

positioning, by the measurement device, a probe within contact of a bottom surface below the aperture on the assembly object, wherein the probe includes a tip having a diameter smaller than a diameter of the aperture to be measured;

moving, by the measurement device, the tip of the probe in a backwards direction towards an aft end of the measurement device away from the bottom surface below the aperture being measured;

counting, by a reader head of the measurement device, divisions present on a scale as the probe moves in the backwards direction;

making a measurement, by the measurement device, based at least in part on the count of divisions by the reader head as the probe moves in the backwards direction, wherein the measurement is made of a thickness of the assembly object, of a hole depth, of a hole diameter, of a countersink depth, of a fastener length, of a grip length of the assembly object, or any combination thereof;

transferring data, resulting from the measurement, to a data collection device; and presenting information as to a particular length, diameter, or type of a fastener that can be installed in the assembly object.

* * * * *